(12) United States Patent  (10) Patent No.: US 7,982,888 B2
Yamada et al.  (45) Date of Patent: Jul. 19, 2011

(54) PRINT SYSTEM, JOB PROCESSING METHOD, STORAGE MEDIUM AND PROGRAM

(75) Inventors: Michihiko Yamada, Kawasaki (JP); Kazuhiko Ushiyama, Tokyo (JP)

(73) Assignee: Canon Kabushiki Kaisha (JP)

( * ) Notice: Subject to any disclaimer, the term of this patent is extended or adjusted under 35 U.S.C. 154(b) by 1099 days.

(21) Appl. No.: 11/676,287

(22) Filed: Feb. 17, 2007

(65) Prior Publication Data

US 2007/0201071 A1  Aug. 30, 2007

(30) Foreign Application Priority Data

Feb. 28, 2006  (JP) .................................. 2006-053801
Dec. 22, 2006  (JP) .................................. 2006-346657

(51) Int. Cl.
*G06F 3/12* (2006.01)
*G06F 15/00* (2006.01)
*G06K 1/00* (2006.01)
*G06K 15/00* (2006.01)

(52) U.S. Cl. ...................... 358/1.13; 358/1.15; 358/1.12; 358/1.14; 358/1.9

(58) Field of Classification Search ......... 358/1.11–1.18
See application file for complete search history.

(56) References Cited

U.S. PATENT DOCUMENTS

| | | | | |
|---|---|---|---|---|
| 6,515,756 B1 * | 2/2003 | Mastie et al. | ................ | 358/1.15 |
| 7,663,773 B2 * | 2/2010 | Minato | ........................ | 358/1.15 |
| 2003/0161000 A1 * | 8/2003 | Suzuki | ........................ | 358/1.15 |
| 2004/0190057 A1 * | 9/2004 | Takahashi et al. | ........... | 358/1.15 |
| 2006/0092453 A1 * | 5/2006 | Okada et al. | .................. | 358/1.14 |
| 2009/0303525 A1 * | 12/2009 | Yoshida | ....................... | 358/1.15 |
| 2009/0304409 A1 * | 12/2009 | Matoba | .......................... | 399/82 |
| 2010/0007070 A1 * | 1/2010 | Iguchi et al. | .................... | 270/18 |
| 2010/0091311 A1 * | 4/2010 | Sato et al. | ..................... | 358/1.12 |

FOREIGN PATENT DOCUMENTS

JP  2005-165722 A  6/2005

* cited by examiner

*Primary Examiner* — James A Thompson
*Assistant Examiner* — Satwant K Singh
(74) *Attorney, Agent, or Firm* — Rossi, Kimms & McDowell LLP

(57) ABSTRACT

A job processing method for a print system (1000) adapted to be able to perform a processing concerning a job to be processed by a print apparatus (100), the method comprising the steps of: enabling (s1207) by using a user interface (204) an input of an instruction for performing both a first operation and a second operation, the first operation being an operation that needs to perform a first print-processing (operation 3 of FIG. 30B) for a first number of sets and needs to perform a first-processing (operation 4 of FIG. 30B), the second operation being an operation that needs to perform a second print-processing (operation 5 of FIG. 30B) for a second number of sets using print data which is used in the first print-processing and does not needs to perform the first-processing, and enabling (s1212) both the first operation and the second operation by using the print apparatus (100) after receiving the instruction.

20 Claims, 54 Drawing Sheets

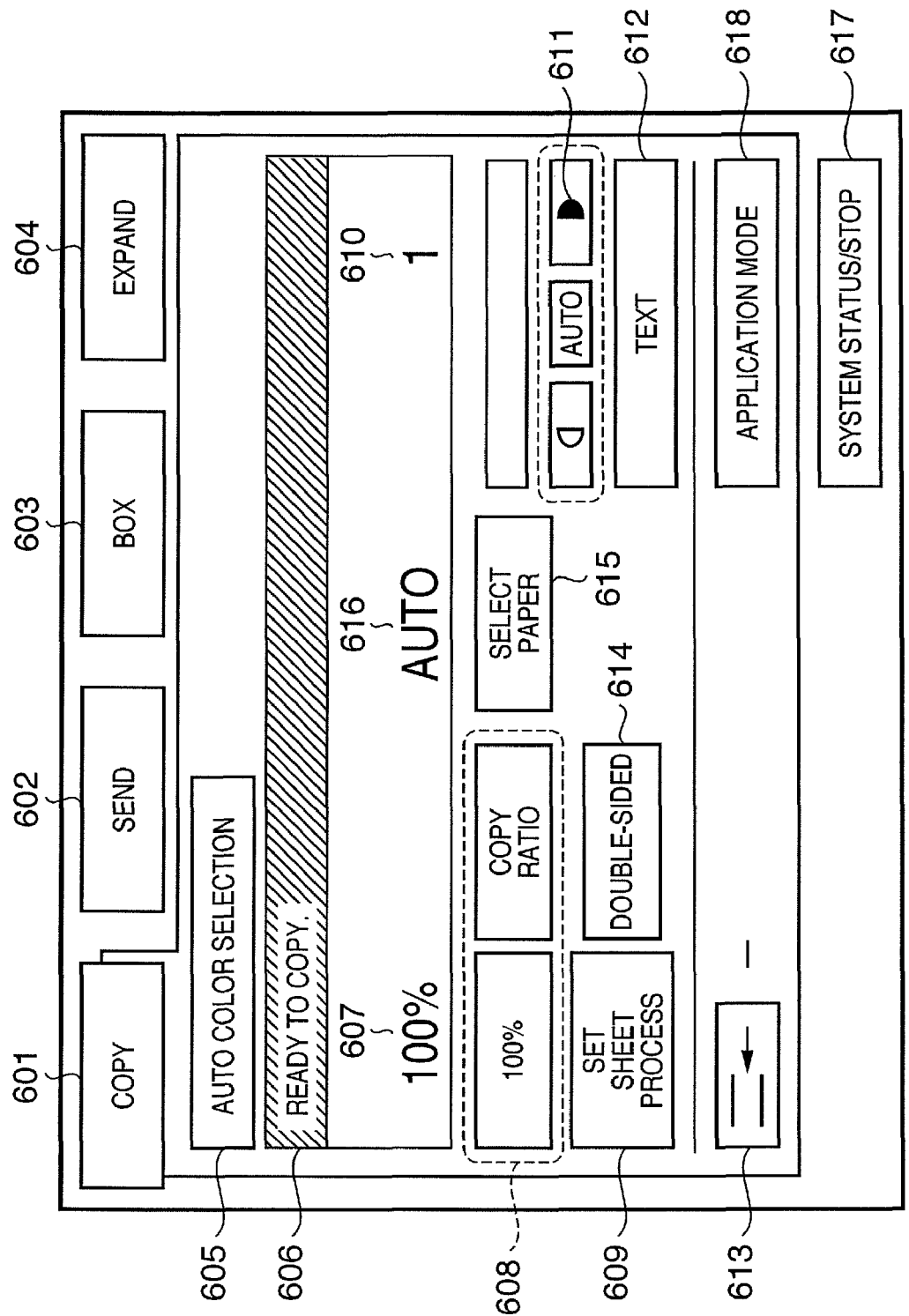

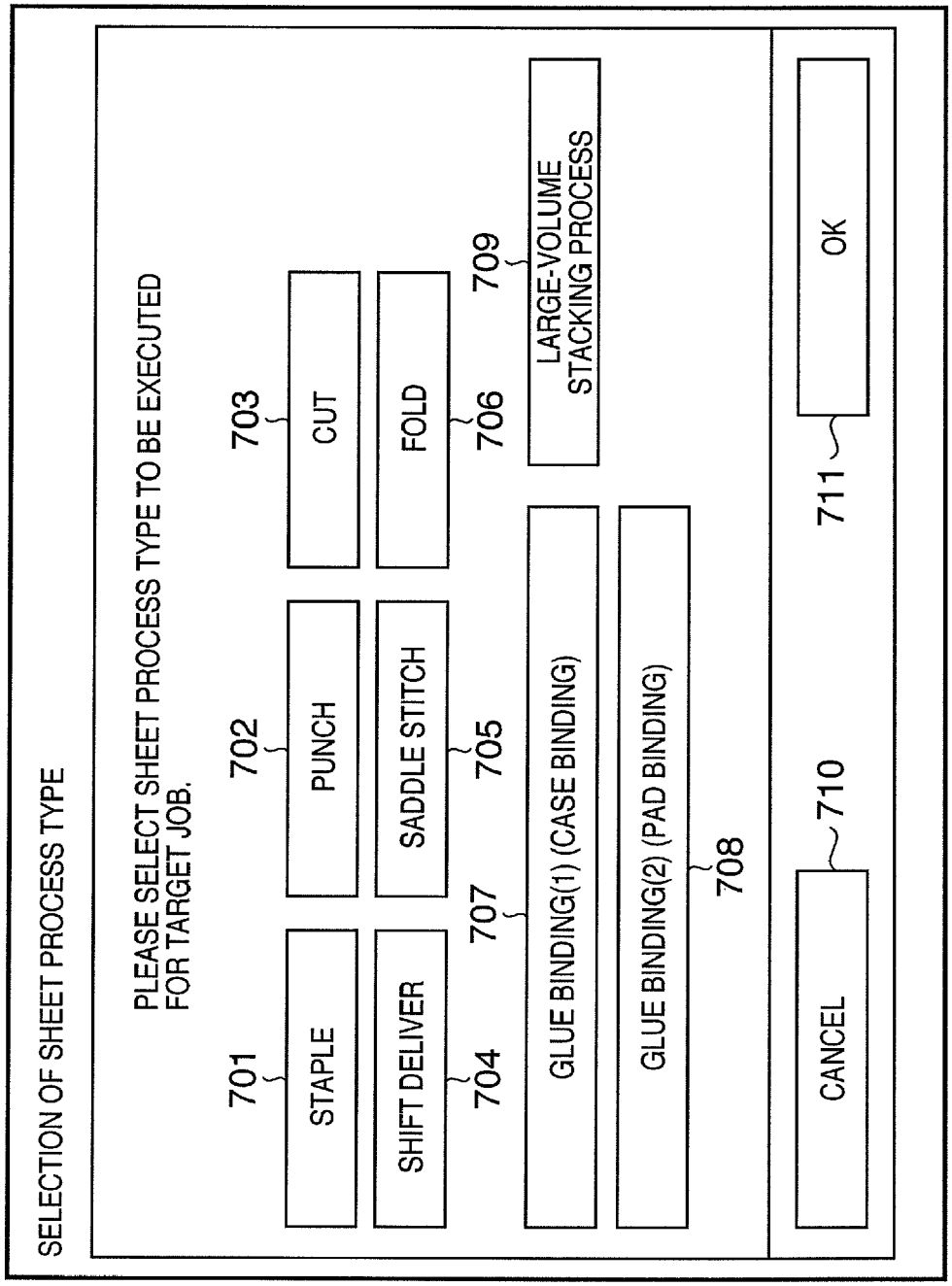

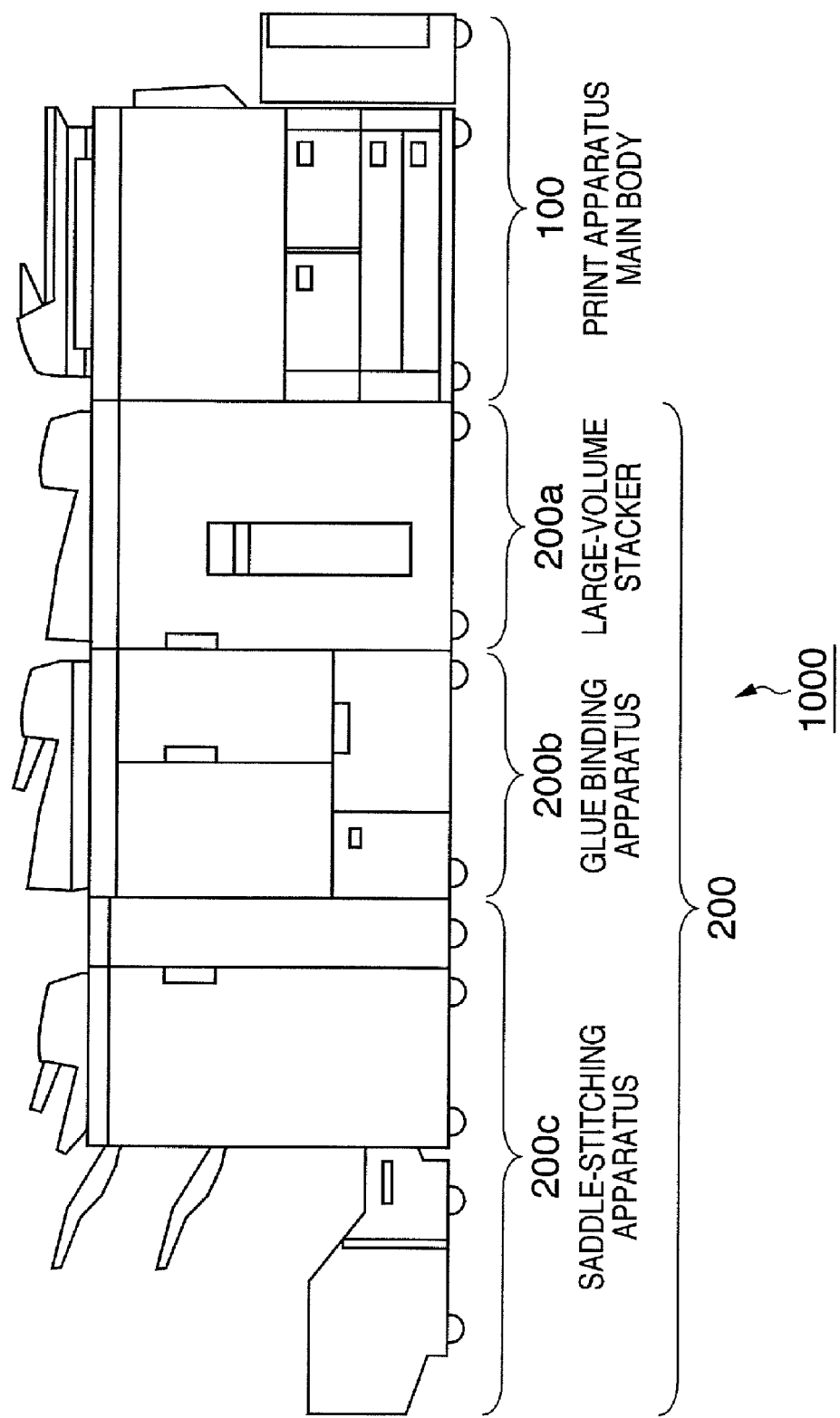

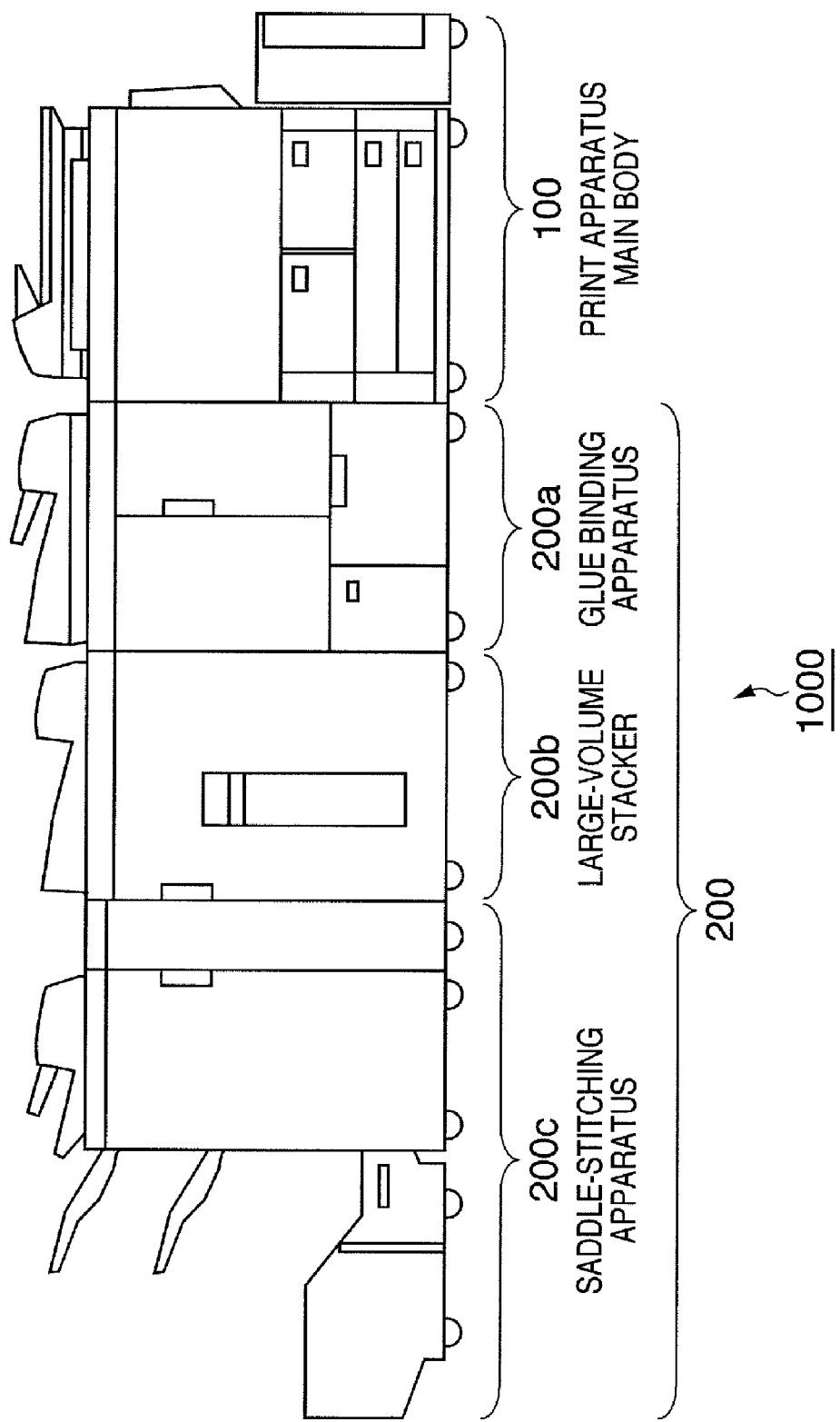

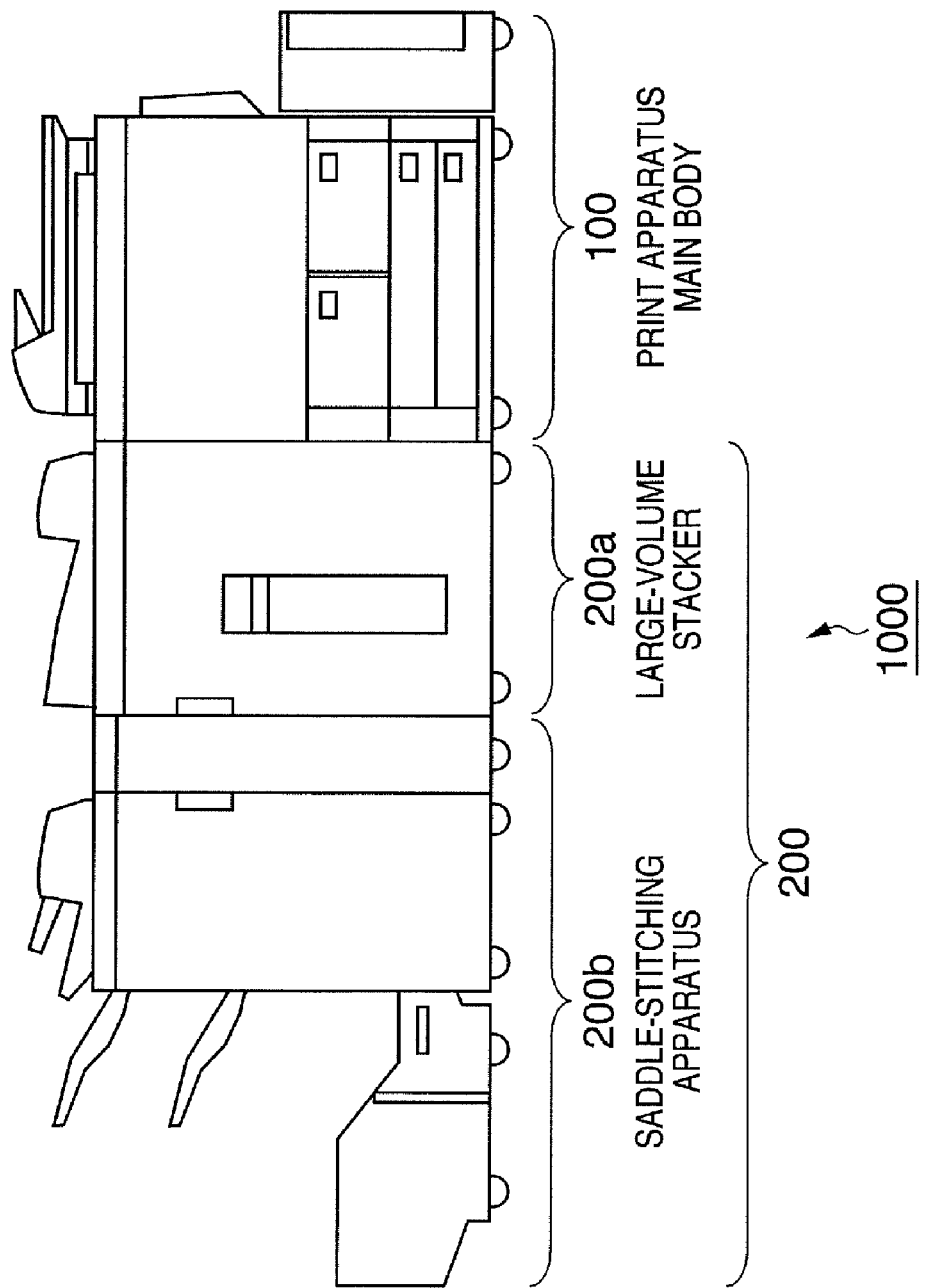

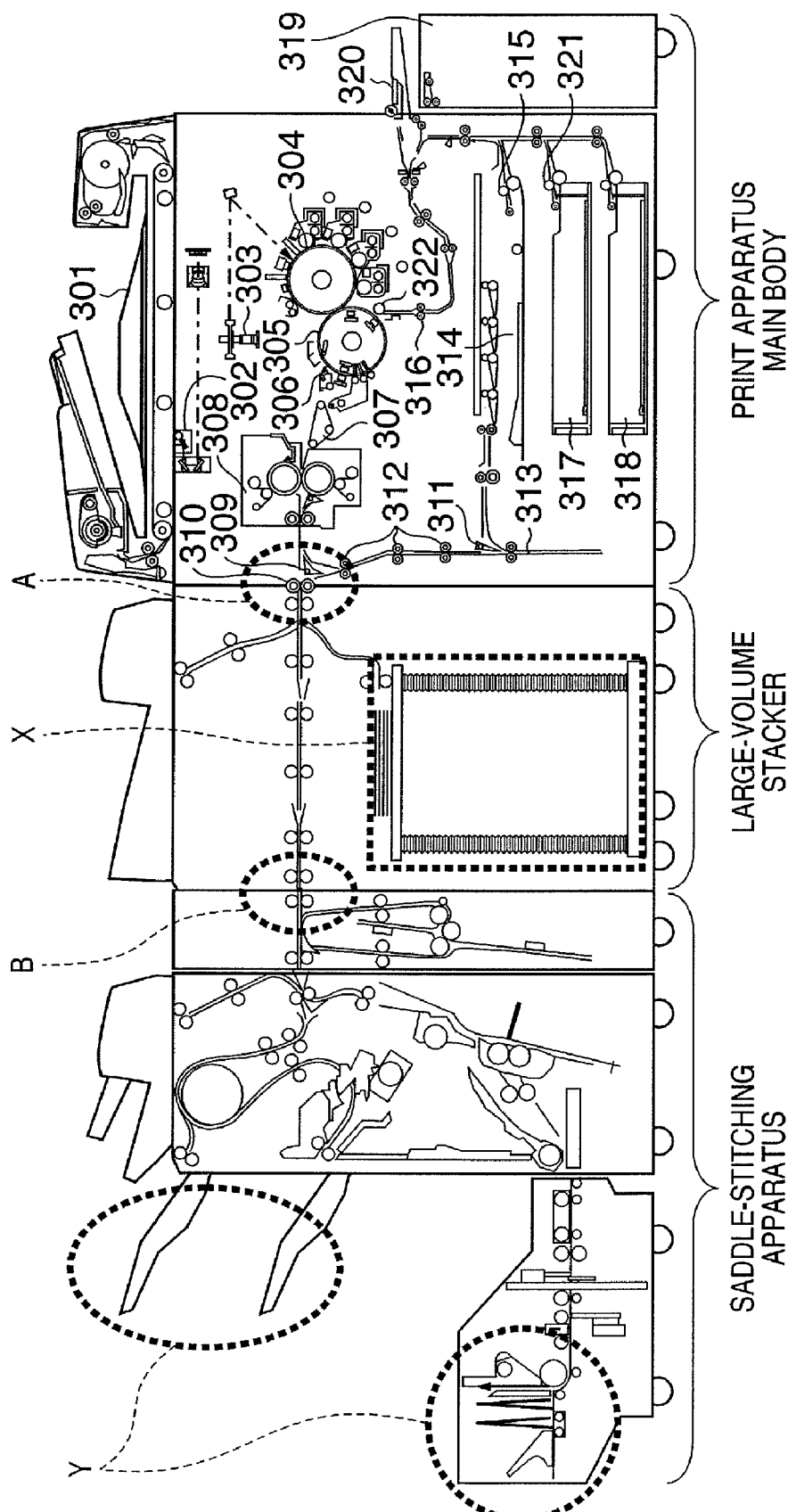

FIG. 15
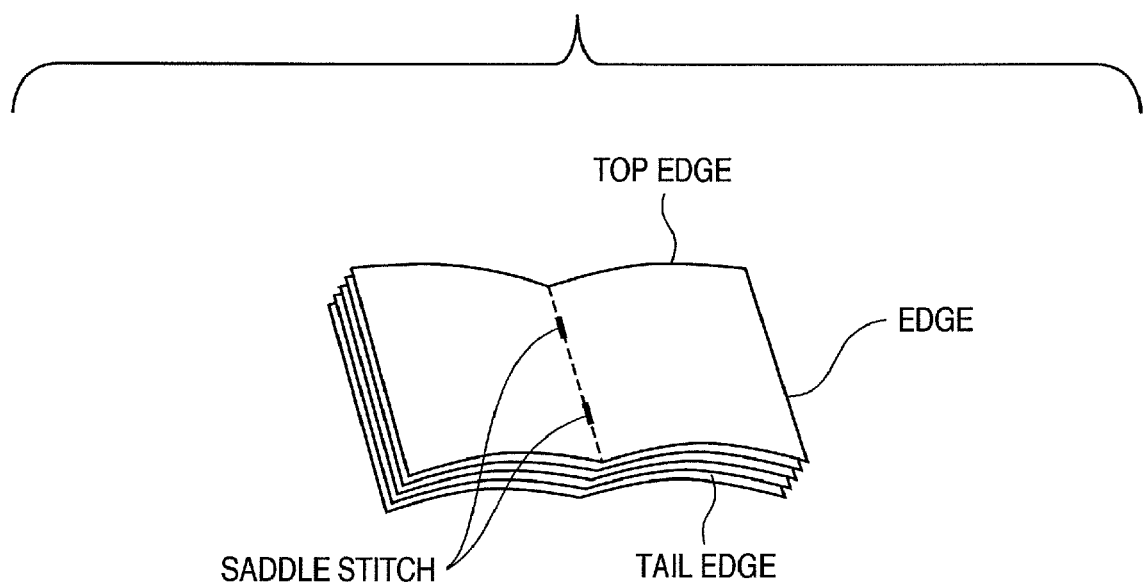
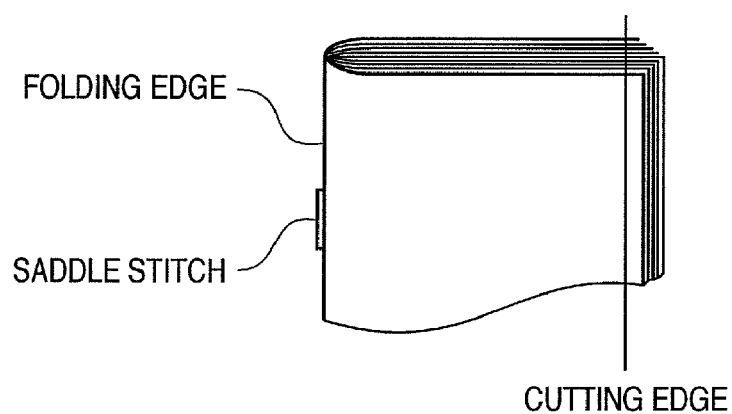

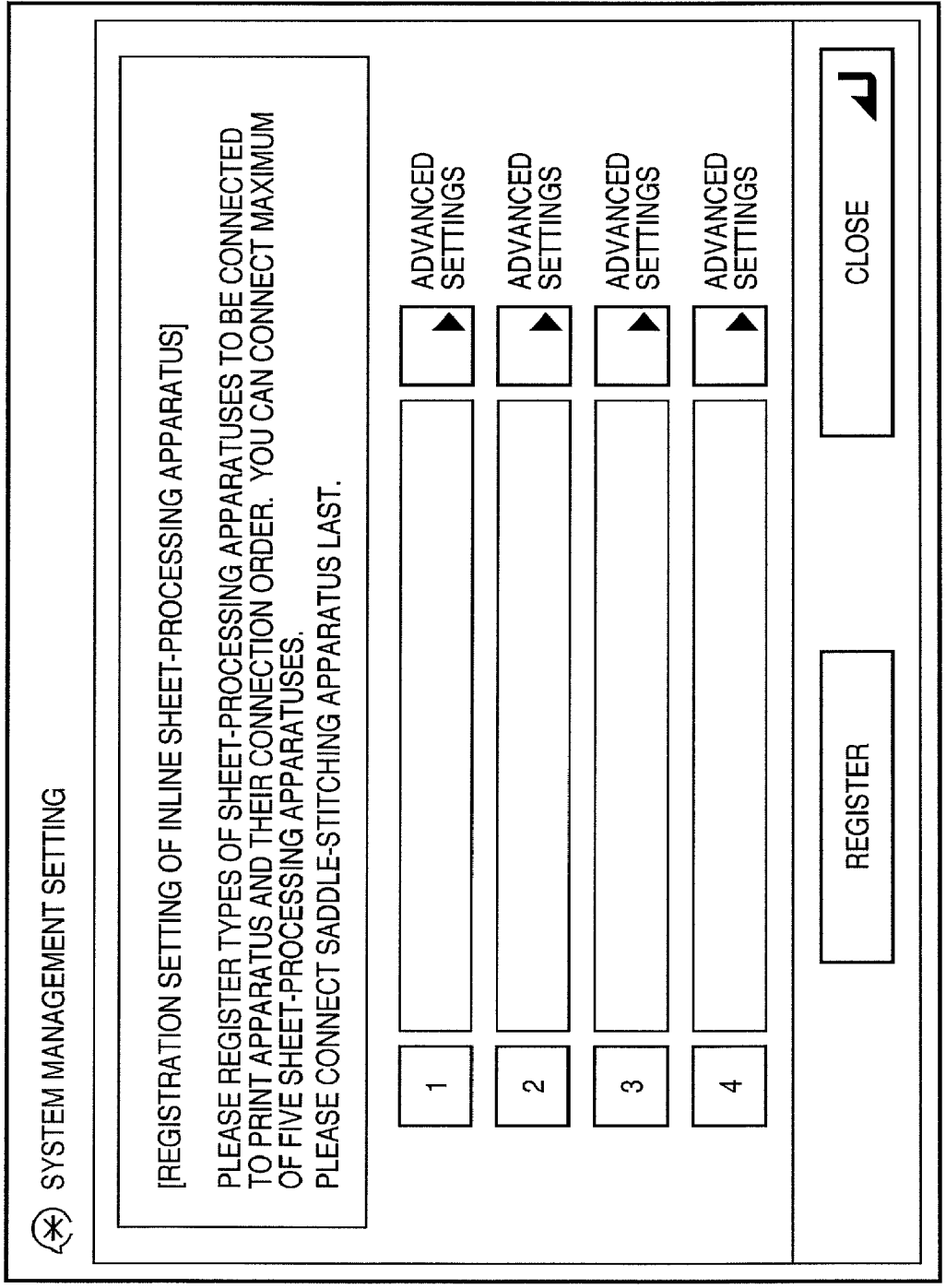

FIG. 18B

 SYSTEM MANAGEMENT SETTING

[REGISTRATION SETTING OF INLINE SHEET-PROCESSING APPARATUS]

PLEASE REGISTER TYPES OF SHEET-PROCESSING APPARATUSES TO BE CONNECTED TO PRINT APPARATUS AND THEIR CONNECTION ORDER. YOU CAN CONNECT MAXIMUM OF FIVE SHEET-PROCESSING APPARATUSES.
PLEASE CONNECT SADDLE-STITCHING APPARATUS LAST.

| 1 | LARGE-VOLUME STACKER | ▲ ADVANCED SETTINGS |
| 2 | GLUE BINDING APPARATUS | ▲ ADVANCED SETTINGS |
| 3 | SADDLE-STITCHING APPARATUS | ▲ ADVANCED SETTINGS |
| 4 | | ▲ ADVANCED SETTINGS |

REGISTER      CLOSE ⏎

FIG. 18D

SYSTEM MANAGEMENT SETTING

[REGISTRATION SETTING OF INLINE SHEET-PROCESSING APPARATUS]

PLEASE REGISTER TYPES OF SHEET-PROCESSING APPARATUSES TO BE CONNECTED TO PRINT APPARATUS AND THEIR CONNECTION ORDER. YOU CAN CONNECT MAXIMUM OF FIVE SHEET-PROCESSING APPARATUSES.
PLEASE CONNECT SADDLE-STITCHING APPARATUS LAST.

| 1 | LARGE-VOLUME STACKER | ▲ ADVANCED SETTINGS |
| 2 | SADDLE-STITCHING APPARATUS | ▲ ADVANCED SETTINGS |
| 3 | | ▲ ADVANCED SETTINGS |
| 4 | | ▲ ADVANCED SETTINGS |

REGISTER     CLOSE

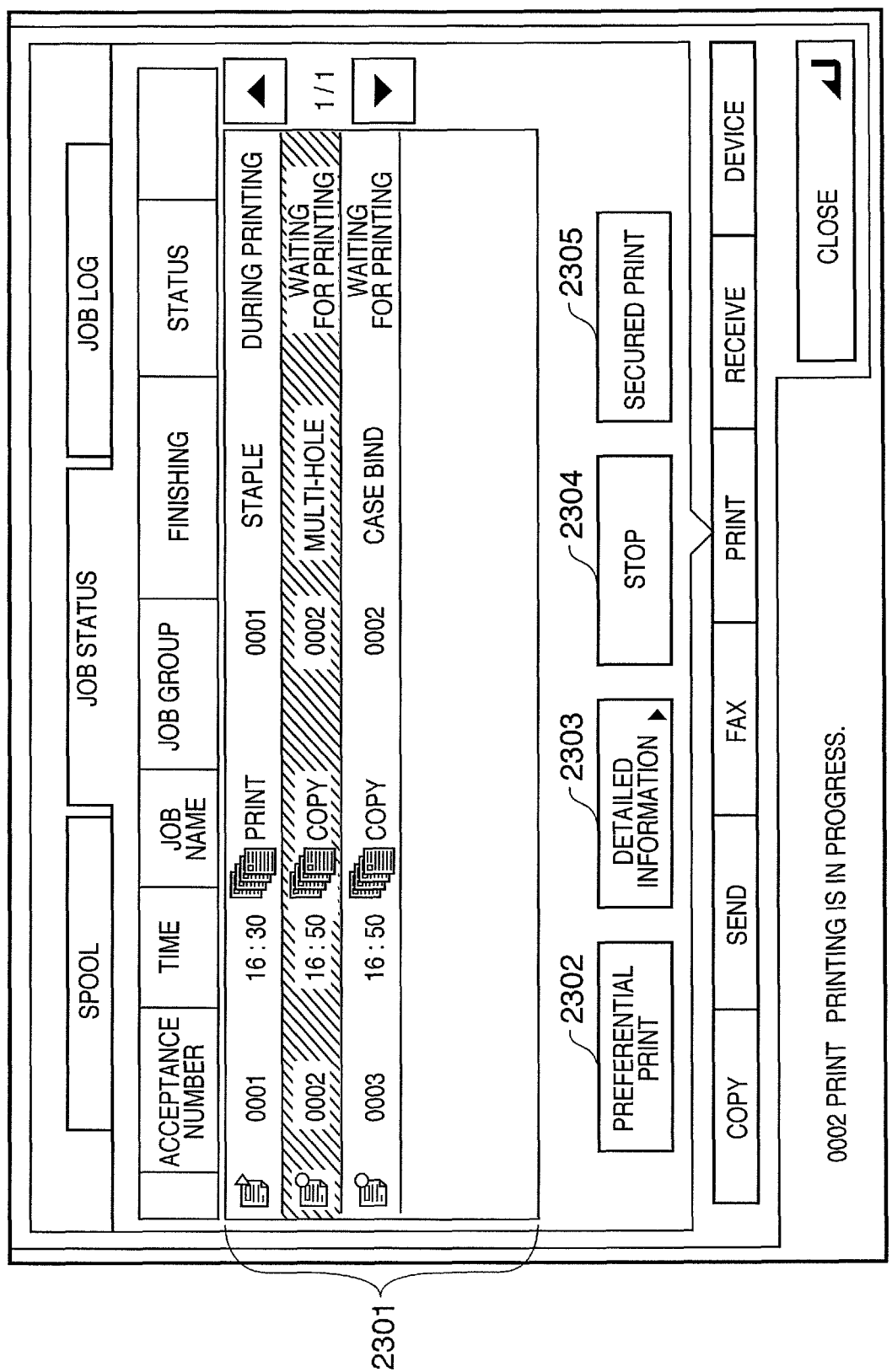

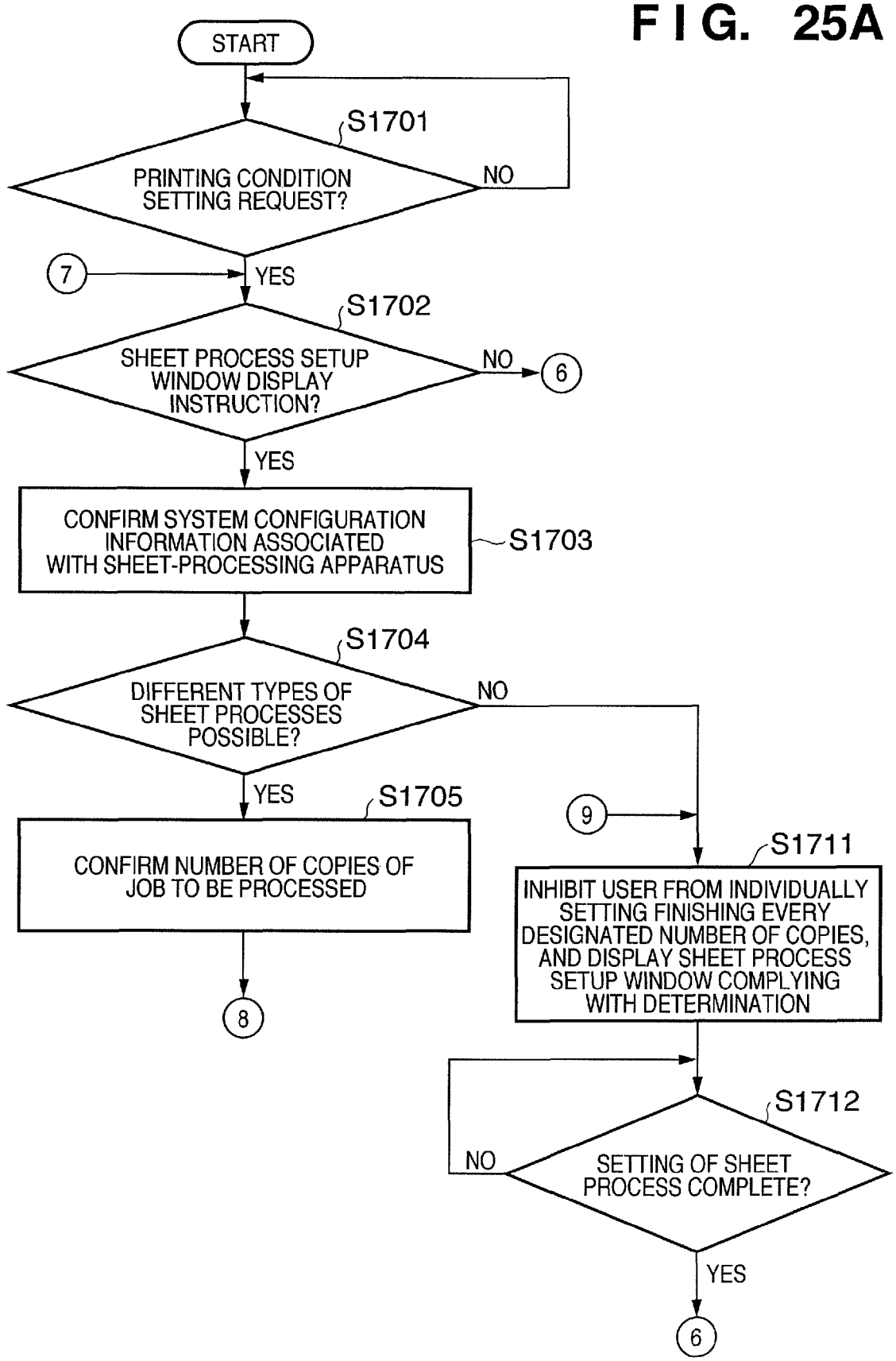

PRINTER PROPERTIES — 1501

Tabs: PAGE SETUP | FINISHING | PAPER SOURCE | QUALITY

PROFILE (F): DEFAULT SETTINGS    HOW TO OUTPUT (M): PRINT

PRINT STYLE (Y): 1-SIDED PRINTING
☐ PRINT WITH MIXED PAPER SIZES/ORIENTATIONS (X)
BOOKLET (K)...

BINDING LOCATION (B): LONG EDGE (LEFT)
GUTTER (U)...

— 1510

Region 2701:

SHEET PROCESS TYPE (Q):
- ☐ SORT (EVERY COPY) — 1502, 0 — 1503
- ☐ SADDLE STITCH — 1504, 0 — 1505
- ☐ STAPLE & SORT — 1506, 0 — 1507
- ☑ CASE BIND — 1508, 9 — 1509
- ☑ MULTI-HOLE PUNCH — 1511, 1 — 1513
- ☐ TWO-HOLE PUNCH — 1512

ADVANCED SETTING (S)... — 1514

A4 (SCALING: AUTO)
VIEW SETTINGS (V)

[ OK ] [ CANCEL ] [ RESTORE DEFAULTS (R) ] [ HELP ]

FIG. 28

PRINTER PROPERTIES

Tabs: PAGE SETUP | FINISHING | PAPER SOURCE | QUALITY

PROFILE (F): DEFAULT SETTINGS

HOW TO OUTPUT (M): PRINT

PRINT STYLE (Y): 1-SIDED PRINTING

☐ PRINT WITH MIXED PAPER SIZES/ORIENTATIONS (X)

BOOKLET (K)...

BINDING LOCATION (B): LONG EDGE (LEFT)

GUTTER (U)...

SHEET PROCESS TYPE (Q):
- 1602 ☐ SORT (EVERY COPY)
- 1603 ☐ SADDLE STITCH
- 1604 ☐ STAPLE & SORT
- 1605 ☐ CASE BIND
- 1606 ☑ MULTI-HOLE PUNCH
- 1607 ☐ TWO-HOLE PUNCH

A4 (SCALING: AUTO)

VIEW SETTINGS (V)

ADVANCED SETTING (S)... — 1608

OK | CANCEL | RESTORE DEFAULTS (R) | HELP

3101A — SYSTEM CONFIGURATION INFORMATION OF PRINT SYSTEM 1000

| | |
|---|---|
| (INFORMATION 1) | CONNECTION/NON-CONNECTION OF INLINE SHEET-PROCESSING APPARATUS IN SYSTEM 1000: [CONNECTED] |
| (INFORMATION 2) | NUMBER OF CONNECTED INLINE SHEET-PROCESSING APPARATUSES IN SYSTEM 1000: [THREE] |
| (INFORMATION 3) | TYPES OF CONNECTED INLINE SHEET-PROCESSING APPARATUSES IN SYSTEM 1000: [LARGE-VOLUME STACKER, GLUE BINDING APPARATUS, AND SADDLE-STITCHING APPARATUS] |
| (INFORMATION 4) | TYPES OF EXECUTABLE SHEET PROCESSES IN SYSTEM 1000: NINE TYPES (STAPLING, PUNCHING, CUTTING, SHIFT DELIVERY, SADDLE-STITCHING, FOLDING, CASE BINDING, PAD BINDING, AND LARGE-VOLUME STACKING) |
| (INFORMATION 5) | CONNECTION ORDER OF INLINE SHEET-PROCESSING APPARATUSES IN SYSTEM 1000: [PRINT APPARATUS → LARGE-VOLUME STACKER → GLUE BINDING APPARATUS → SADDLE-STITCHING APPARATUS] |

3102A

| | SHEET PROCESS TYPE NECESSARY FOR PRECEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES | SHEET PROCESS TYPE NECESSARY FOR SUCCEEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES | DECISION |
|---|---|---|---|
| RULE 1 | SHEET PROCESS BY SADDLE-STITCHING APPARATUS ((1) STAPLING PROCESS, (2) PUNCHING PROCESS, (3) CUTTING PROCESS, (4) SHIFT DELIVERY PROCESS, (5) SADDLE-STITCHING PROCESS, OR (6) FOLDING PROCESS) | SHEET PROCESS BY SADDLE-STITCHING APPARATUS ((1) STAPLING PROCESS, (2) PUNCHING PROCESS, (3) CUTTING PROCESS, (4) SHIFT DELIVERY PROCESS, (5) SADDLE-STITCHING PROCESS, OR (6) FOLDING PROCESS) | INHIBIT EXECUTION OF PRINT OPERATION NECESSARY FOR SUCCEEDING SHEET BUNDLE IN PARALLEL WITH SHEET-PROCESSING OPERATION NECESSARY FOR PRECEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES (INHIBIT START OF PRINT OPERATION FOR SUCCEEDING SHEET BUNDLE DURING EXECUTION OF SHEET-PROCESSING OPERATION FOR PRECEDING SHEET BUNDLE) |

FIG. 31A-2

| | | |
|---|---|---|
| RULE 2 | SHEET PROCESS BY SADDLE-STITCHING APPARATUS ((1) STAPLING PROCESS, (2) PUNCHING PROCESS, (3) CUTTING PROCESS, (4) SHIFT DELIVERY PROCESS, (5) SADDLE-STITCHING PROCESS, OR (6) FOLDING PROCESS) | SHEET PROCESS BY GLUE BINDING APPARATUS ((1) CASE BINDING PROCESS OR (2) PAD BINDING PROCESS) | PERMIT EXECUTION OF PRINT OPERATION NECESSARY FOR SUCCEEDING SHEET BUNDLE IN PARALLEL WITH SHEET-PROCESSING OPERATION NECESSARY FOR PRECEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES (PERMIT START OF PRINT OPERATION FOR SUCCEEDING SHEET BUNDLE DURING EXECUTION OF SHEET-PROCESSING OPERATION FOR PRECEDING SHEET BUNDLE) |
| RULE 3 | SHEET PROCESS BY SADDLE-STITCHING APPARATUS ((1) STAPLING PROCESS, (2) PUNCHING PROCESS, (3) CUTTING PROCESS, (4) SHIFT DELIVERY PROCESS, (5) SADDLE-STITCHING PROCESS, OR (6) FOLDING PROCESS) | SHEET PROCESS BY LARGE-VOLUME STACKER ((1) STACKING PROCESS) | PERMIT EXECUTION OF PRINT OPERATION NECESSARY FOR SUCCEEDING SHEET BUNDLE IN PARALLEL WITH SHEET-PROCESSING OPERATION NECESSARY FOR PRECEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES (PERMIT START OF PRINT OPERATION FOR SUCCEEDING SHEET BUNDLE DURING EXECUTION OF SHEET-PROCESSING OPERATION FOR PRECEDING SHEET BUNDLE) |
| RULE 4 | SHEET PROCESS BY GLUE BINDING APPARATUS ((1) CASE BINDING PROCESS OR (2) PAD BINDING PROCESS) | SHEET PROCESS BY SADDLE-STITCHING APPARATUS ((1) STAPLING PROCESS, (2) PUNCHING PROCESS, (3) CUTTING PROCESS, (4) SHIFT DELIVERY PROCESS, (5) SADDLE-STITCHING PROCESS, OR (6) FOLDING PROCESS) | INHIBIT EXECUTION OF PRINT OPERATION NECESSARY FOR SUCCEEDING SHEET BUNDLE IN PARALLEL WITH SHEET-PROCESSING OPERATION NECESSARY FOR PRECEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES (INHIBIT START OF PRINT OPERATION FOR SUCCEEDING SHEET BUNDLE DURING EXECUTION OF SHEET-PROCESSING OPERATION FOR PRECEDING SHEET BUNDLE) |
| RULE 5 | SHEET PROCESS BY GLUE BINDING APPARATUS ((1) CASE BINDING PROCESS OR (2) PAD BINDING PROCESS) | SHEET PROCESS BY GLUE BINDING APPARATUS ((1) CASE BINDING PROCESS OR (2) PAD BINDING PROCESS) | INHIBIT EXECUTION OF PRINT OPERATION NECESSARY FOR SUCCEEDING SHEET BUNDLE IN PARALLEL WITH SHEET-PROCESSING OPERATION NECESSARY FOR PRECEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES (INHIBIT START OF PRINT OPERATION FOR SUCCEEDING SHEET BUNDLE DURING EXECUTION OF SHEET-PROCESSING OPERATION FOR PRECEDING SHEET BUNDLE) |

| | | | |
|---|---|---|---|
| RULE 6 | SHEET PROCESS BY GLUE BINDING APPARATUS ((1) CASE BINDING PROCESS OR (2) PAD BINDING PROCESS) | SHEET PROCESS BY LARGE-VOLUME STACKER ((1) STACKING PROCESS) | PERMIT EXECUTION OF PRINT OPERATION NECESSARY FOR SUCCEEDING SHEET BUNDLE IN PARALLEL WITH SHEET-PROCESSING OPERATION NECESSARY FOR PRECEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES (PERMIT START OF PRINT OPERATION FOR SUCCEEDING SHEET BUNDLE DURING EXECUTION OF SHEET-PROCESSING OPERATION FOR PRECEDING SHEET BUNDLE) |
| RULE 7 | SHEET PROCESS BY LARGE-VOLUME STACKER ((1) STACKING PROCESS) | SHEET PROCESS BY SADDLE-STITCHING APPARATUS ((1) STAPLING PROCESS, (2) PUNCHING PROCESS, (3) CUTTING PROCESS, (4) SHIFT DELIVERY PROCESS, (5) SADDLE-STITCHING PROCESS, OR (6) FOLDING PROCESS) | INHIBIT EXECUTION OF PRINT OPERATION NECESSARY FOR SUCCEEDING SHEET BUNDLE IN PARALLEL WITH SHEET-PROCESSING OPERATION NECESSARY FOR PRECEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES (INHIBIT START OF PRINT OPERATION FOR SUCCEEDING SHEET BUNDLE DURING EXECUTION OF SHEET-PROCESSING OPERATION FOR PRECEDING SHEET BUNDLE) |
| RULE 8 | SHEET PROCESS BY LARGE-VOLUME STACKER ((1) STACKING PROCESS) | SHEET PROCESS BY GLUE BINDING APPARATUS ((1) CASE BINDING PROCESS OR (2) PAD BINDING PROCESS) | INHIBIT EXECUTION OF PRINT OPERATION NECESSARY FOR SUCCEEDING SHEET BUNDLE IN PARALLEL WITH SHEET-PROCESSING OPERATION NECESSARY FOR PRECEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES (INHIBIT START OF PRINT OPERATION FOR SUCCEEDING SHEET BUNDLE DURING EXECUTION OF SHEET-PROCESSING OPERATION FOR PRECEDING SHEET BUNDLE) |
| RULE 9 | SHEET PROCESS BY LARGE-VOLUME STACKER ((1) STACKING PROCESS) | SHEET PROCESS BY LARGE-VOLUME STACKER ((1) STACKING PROCESS) | INHIBIT EXECUTION OF PRINT OPERATION NECESSARY FOR SUCCEEDING SHEET BUNDLE IN PARALLEL WITH SHEET-PROCESSING OPERATION NECESSARY FOR PRECEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES (INHIBIT START OF PRINT OPERATION FOR SUCCEEDING SHEET BUNDLE DURING EXECUTION OF SHEET-PROCESSING OPERATION FOR PRECEDING SHEET BUNDLE) |

3101B — SYSTEM CONFIGURATION INFORMATION OF PRINT SYSTEM 1000

| | |
|---|---|
| (INFORMATION 1) | CONNECTION/NON-CONNECTION OF INLINE SHEET-PROCESSING APPARATUS IN SYSTEM 1000: [CONNECTED] |
| (INFORMATION 2) | NUMBER OF CONNECTED INLINE SHEET-PROCESSING APPARATUSES IN SYSTEM 1000: [THREE] |
| (INFORMATION 3) | TYPES OF CONNECTED INLINE SHEET-PROCESSING APPARATUSES IN SYSTEM 1000: [LARGE-VOLUME STACKER, GLUE BINDING APPARATUS, AND SADDLE-STITCHING APPARATUS] |
| (INFORMATION 4) | TYPES OF EXECUTABLE SHEET PROCESSES IN SYSTEM 1000: [NINE TYPES (STAPLING, PUNCHING, CUTTING, SHIFT DELIVERY, SADDLE STITCHING, FOLDING, CASE BINDING, PAD BINDING, AND LARGE-VOLUME STACKING)] |
| (INFORMATION 5) | CONNECTION ORDER OF INLINE SHEET-PROCESSING APPARATUSES IN SYSTEM 1000: [PRINT APPARATUS → GLUE BINDING APPARATUS → LARGE-VOLUME STACKER → SADDLE-STITCHING APPARATUS] |

3102B

| | SHEET PROCESS TYPE NECESSARY FOR PRECEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES | SHEET PROCESS TYPE NECESSARY FOR SUCCEEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES | DECISION |
|---|---|---|---|
| RULE 1 | SHEET PROCESS BY SADDLE-STITCHING APPARATUS ((1) STAPLING PROCESS, (2) PUNCHING PROCESS, (3) CUTTING PROCESS, (4) SHIFT DELIVERY PROCESS, (5) SADDLE-STITCHING PROCESS, OR (6) FOLDING PROCESS) | SHEET PROCESS BY SADDLE-STITCHING APPARATUS ((1) STAPLING PROCESS, (2) PUNCHING PROCESS, (3) CUTTING PROCESS, (4) SHIFT DELIVERY PROCESS, (5) SADDLE-STITCHING PROCESS, OR (6) FOLDING PROCESS) | INHIBIT EXECUTION OF PRINT OPERATION NECESSARY FOR SUCCEEDING SHEET BUNDLE IN PARALLEL WITH SHEET-PROCESSING OPERATION NECESSARY FOR PRECEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES |

FIG. 31B-2

| | Sheet Process | Action |
|---|---|---|
| RULE 2 | SHEET PROCESS BY SADDLE-STITCHING APPARATUS ((1) STAPLING PROCESS, (2) PUNCHING PROCESS, (3) CUTTING PROCESS, (4) SHIFT DELIVERY PROCESS, (5) SADDLE-STITCHING PROCESS, OR (6) FOLDING PROCESS) | SHEET PROCESS BY GLUE BINDING APPARATUS ((1) CASE BINDING PROCESS OR (2) PAD BINDING PROCESS) | PERMIT EXECUTION OF PRINT OPERATION NECESSARY FOR SUCCEEDING SHEET BUNDLE IN PARALLEL WITH SHEET-PROCESSING OPERATION NECESSARY FOR PRECEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES |
| RULE 3 | SHEET PROCESS BY SADDLE-STITCHING APPARATUS ((1) STAPLING PROCESS, (2) PUNCHING PROCESS, (3) CUTTING PROCESS, (4) SHIFT DELIVERY PROCESS, (5) SADDLE-STITCHING PROCESS, OR (6) FOLDING PROCESS) | SHEET PROCESS BY LARGE-VOLUME STACKER ((1) STACKING PROCESS) | PERMIT EXECUTION OF PRINT OPERATION NECESSARY FOR SUCCEEDING SHEET BUNDLE IN PARALLEL WITH SHEET-PROCESSING OPERATION NECESSARY FOR PRECEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES |
| RULE 4 | SHEET PROCESS BY GLUE BINDING APPARATUS ((1) CASE BINDING PROCESS OR (2) PAD BINDING PROCESS) | SHEET PROCESS BY SADDLE-STITCHING APPARATUS ((1) STAPLING PROCESS, (2) PUNCHING PROCESS, (3) CUTTING PROCESS, (4) SHIFT DELIVERY PROCESS, (5) SADDLE-STITCHING PROCESS, OR (6) FOLDING PROCESS) | INHIBIT EXECUTION OF PRINT OPERATION NECESSARY FOR SUCCEEDING SHEET BUNDLE IN PARALLEL WITH SHEET-PROCESSING OPERATION NECESSARY FOR PRECEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES |
| RULE 5 | SHEET PROCESS BY GLUE BINDING APPARATUS ((1) CASE BINDING PROCESS OR (2) PAD BINDING PROCESS) | SHEET PROCESS BY GLUE BINDING APPARATUS ((1) CASE BINDING PROCESS OR (2) PAD BINDING PROCESS) | INHIBIT EXECUTION OF PRINT OPERATION NECESSARY FOR SUCCEEDING SHEET BUNDLE IN PARALLEL WITH SHEET-PROCESSING OPERATION NECESSARY FOR PRECEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES |

| | | | |
|---|---|---|---|
| RULE 6 | SHEET PROCESS BY GLUE BINDING APPARATUS ((1) CASE BINDING PROCESS OR (2) PAD BINDING PROCESS) | SHEET PROCESS BY LARGE-VOLUME STACKER ((1) STACKING PROCESS) | INHIBIT EXECUTION OF PRINT OPERATION NECESSARY FOR SUCCEEDING SHEET BUNDLE IN PARALLEL WITH SHEET-PROCESSING OPERATION NECESSARY FOR PRECEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES |
| RULE 7 | SHEET PROCESS BY LARGE-VOLUME STACKER ((1) STACKING PROCESS) | SHEET PROCESS BY SADDLE-STITCHING APPARATUS ((1) STAPLING PROCESS, (2) PUNCHING PROCESS, (3) CUTTING PROCESS, (4) SHIFT DELIVERY PROCESS, (5) SADDLE-STITCHING PROCESS, OR (6) FOLDING PROCESS) | INHIBIT EXECUTION OF PRINT OPERATION NECESSARY FOR SUCCEEDING SHEET BUNDLE IN PARALLEL WITH SHEET-PROCESSING OPERATION NECESSARY FOR PRECEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES |
| RULE 8 | SHEET PROCESS BY LARGE-VOLUME STACKER ((1) STACKING PROCESS) | SHEET PROCESS BY GLUE BINDING APPARATUS ((1) CASE BINDING PROCESS OR (2) PAD BINDING PROCESS) | PERMIT EXECUTION OF PRINT OPERATION NECESSARY FOR SUCCEEDING SHEET BUNDLE IN PARALLEL WITH SHEET-PROCESSING OPERATION NECESSARY FOR PRECEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES |
| RULE 9 | SHEET PROCESS BY LARGE-VOLUME STACKER ((1) STACKING PROCESS) | SHEET PROCESS BY LARGE-VOLUME STACKER ((1) STACKING PROCESS) | INHIBIT EXECUTION OF PRINT OPERATION NECESSARY FOR SUCCEEDING SHEET BUNDLE IN PARALLEL WITH SHEET-PROCESSING OPERATION NECESSARY FOR PRECEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES |

| | | |
|---|---|---|
| SYSTEM CONFIGURATION INFORMATION OF PRINT SYSTEM 1000 | (INFORMATION 1) | CONNECTION/NON-CONNECTION OF INLINE SHEET-PROCESSING APPARATUS IN SYSTEM 1000: [CONNECTED] |
| | (INFORMATION 2) | NUMBER OF CONNECTED INLINE SHEET-PROCESSING APPARATUSES IN SYSTEM 1000: [TWO] |
| | (INFORMATION 3) | TYPES OF CONNECTED INLINE SHEET-PROCESSING APPARATUSES IN SYSTEM 1000: [LARGE-VOLUME STACKER AND SADDLE-STITCHING APPARATUS] |
| | (INFORMATION 4) | TYPES OF EXECUTABLE SHEET PROCESSES IN SYSTEM 1000: [SEVEN TYPES (STAPLING, PUNCHING, CUTTING, SHIFT DELIVERY, SADDLE-STITCHING, FOLDING, AND LARGE-VOLUME STACKING)] |
| | (INFORMATION 5) | CONNECTION ORDER OF INLINE SHEET-PROCESSING APPARATUSES IN SYSTEM 1000: [PRINT APPARATUS → LARGE-VOLUME STACKER → SADDLE-STITCHING APPARATUS] |

3101C

| | | | |
|---|---|---|---|
| | | SHEET PROCESS TYPE NECESSARY FOR PRECEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES | SHEET PROCESS TYPE NECESSARY FOR SUCCEEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES | DECISION |
| RULE 1 | SHEET PROCESS BY SADDLE-STITCHING APPARATUS ((1) STAPLING PROCESS, (2) PUNCHING PROCESS, (3) CUTTING PROCESS, (4) SHIFT DELIVERY PROCESS, (5) SADDLE-STITCHING PROCESS, OR (6) FOLDING PROCESS) | SHEET PROCESS BY SADDLE-STITCHING APPARATUS ((1) STAPLING PROCESS, (2) PUNCHING PROCESS, (3) CUTTING PROCESS, (4) SHIFT DELIVERY PROCESS, (5) SADDLE-STITCHING PROCESS, OR (6) FOLDING PROCESS) | INHIBIT EXECUTION OF PRINT OPERATION NECESSARY FOR SUCCEEDING SHEET BUNDLE IN PARALLEL WITH SHEET-PROCESSING OPERATION NECESSARY FOR PRECEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES |

3102C

F I G. 31C-2

| | | | |
|---|---|---|---|
| RULE 2 | SHEET PROCESS BY SADDLE-STITCHING APPARATUS ((1) STAPLING PROCESS, (2) PUNCHING PROCESS, (3) CUTTING PROCESS, (4) SHIFT DELIVERY PROCESS, (5) SADDLE-STITCHING PROCESS, OR (6) FOLDING PROCESS) | SHEET PROCESS BY LARGE-VOLUME STACKER ((1) STACKING PROCESS) | PERMIT EXECUTION OF PRINT OPERATION NECESSARY FOR SUCCEEDING SHEET BUNDLE IN PARALLEL WITH SHEET-PROCESSING OPERATION NECESSARY FOR PRECEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES |
| RULE 3 | SHEET PROCESS BY LARGE-VOLUME STACKER ((1) STACKING PROCESS) | SHEET PROCESS BY SADDLE-STITCHING APPARATUS ((1) STAPLING PROCESS, (2) PUNCHING PROCESS, (3) CUTTING PROCESS, (4) SHIFT DELIVERY PROCESS, (5) SADDLE-STITCHING PROCESS, OR (6) FOLDING PROCESS) | INHIBIT EXECUTION OF PRINT OPERATION NECESSARY FOR SUCCEEDING SHEET BUNDLE IN PARALLEL WITH SHEET-PROCESSING OPERATION NECESSARY FOR PRECEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES |
| RULE 4 | SHEET PROCESS BY LARGE-VOLUME STACKER ((1) STACKING PROCESS) | SHEET PROCESS BY LARGE-VOLUME STACKER ((1) STACKING PROCESS) | INHIBIT EXECUTION OF PRINT OPERATION NECESSARY FOR SUCCEEDING SHEET BUNDLE IN PARALLEL WITH SHEET-PROCESSING OPERATION NECESSARY FOR PRECEDING SHEET BUNDLE IN SPECIFIC JOB REQUIRING PRINTING OF PLURAL COPIES AND REQUIRING SPECIFIC TYPE OF SHEET PROCESS EVERY DESIGNATED NUMBER OF COPIES |

3102C

PRINT SYSTEM, JOB PROCESSING METHOD, STORAGE MEDIUM AND PROGRAM

BACKGROUND OF THE INVENTION

1. Field of the Invention

The present invention relates to a print system adapted to be able to perform a processing concerning a job to be processed by a print apparatus, a job processing method, a storage medium, and a program.

2. Description of the Related Art

Recently, office-equipment makers and the like are examining new entry into new POD (print-on-demand) market (see Japanese Patent Laid-Open No. 2005-165722). While watching future trends in the market, print apparatus and print systems are closely examined for use in the POD environment assuming use cases and needs different from those in the office environment. In a printing environment such as the POD market, it will be important how to increase productivity in the print system. It will also be important how to facilitate the use of the print system by the operator of the print system while maintaining high productivity.

As described above, in order to enter the POD market, office-equipment makers and the like desirably assume the circumstance of the POD market and cope with any situation which hardly occurs in the office environment. For example, it is necessary to fully study digital print systems suited even to the POD environment toward practical use of products in consideration of points which may be important in the future in the POD environment. To make the print system practicable even in the POD environment, many matters and problems remain unexamined. For example, it is expected that only the functions of an apparatus such as a digital copying machine or digital multifunction peripheral, which is satisfactorily adapted to the office environment, may not always match the POD environment or the like. In the POD environment, an operator must make detailed settings and work in order to create a final product which meets a customer's request. This environment is aware of shortening of the work time and cost reduction. The apparatus is desirably applicable to such an environment.

More specifically, a print apparatus processes many target jobs in a printing environment such as the POD environment, and it is important how many jobs are processible by the print system within a short time. From another viewpoint, it is expected that a client requests various sheet processes (e.g., stapling, punching, saddle-stitching, case binding, and cutting) for a target job. From still another viewpoint, downsizing of the print apparatus and system and reduction of the space may also be important. It is, therefore, desirable to establish a convenient, flexible printing environment capable of coping with use cases and needs assumed in the POD environment. The following demands are desirably met to establish a convenient, flexible printing environment capable of coping with use cases and needs assumed in the POD environment.

For example, in a printing environment capable of various finishings, a customer may request printing of five copies, among which four copies require glue binding and one remaining copy requires punching. In other words, this user need is to execute different finishings with print data of the same contents. To meet this request, the operator must repeat, a plurality of number of times, a series of work operations such as setting of print process conditions, input of print data, and accumulation of print data in the memory for each finishing because finishing changes even with the same print data. This somewhat influences efficiency and productivity. This coping method may require improvements in a printing environment such as the POD environment where how to process a plurality of jobs is expected to be important. However, no improvement is proposed at present, so no concrete solution is proposed, either. In practice, no product is commercially available which can deal with use cases and needs on site in an environment such as the POD environment different from the office environment. There is room for further study in commercializing a print apparatus, print system, and the like adaptable not only to the office environment but also to the POD environment.

SUMMARY OF THE INVENTION

The present invention has been made to overcome the conventional drawbacks, and has as its object to provide a convenient print system adaptable not only to the office environment but also to the POD environment, a job processing method, a storage medium, and a program.

It is another object of the present invention to provide a mechanism of minimizing intervention work by an operator that may occur in the POD environment due to, e.g., the specifications of an image forming apparatus designed in consideration of only the office environment. It is still another object of the present invention to implement efficient work by reducing the workload on the operator.

It is still another object of the present invention to provide a mechanism capable of flexibly coping with various needs from various users as much as possible in consideration of various situations and use environments. It is still another object of the present invention to commercialize a digital print system capable of meeting, at productivity as high as possible, various needs including the following user needs (1) and (2) which may arise in a printing environment such as the POD environment where use cases and user needs are different from those in the office environment and viewpoints such as an increase in productivity of jobs, quality, and cost performance may be important. For example, user need (1) is to meet a request "to perform various types of finishings every designated number of copies with print data of the same contents" at productivity and operability as high as possible. For example, user need (2) is to meet a request "not to execute a specific process, which is desired to be executed for printed materials necessary for a print process by the first specific number of copies, for printed materials necessary for a print process by the second specific number of copies though the two print processes use the same print data" at productivity and operability as high as possible. That is, it is still another object of the present invention to cope with prospective user needs such as user needs (1) and (2) in a printing environment such as the POD environment by one print system or one print apparatus at productivity and operability as high as possible.

According to a first aspect of the present invention there is provided a job processing method for a print system adapted to be able to perform a processing concerning a job to be processed by a print apparatus, the method comprising the steps of:

enabling by using a user interface an input of an instruction for performing both a first operation and a second operation, the first operation being an operation that needs to perform a first print-processing for a first number of sets and needs to perform a first-processing, the second operation being an operation that needs to perform a second print-processing for a second number of sets using print data which is used in the first print-processing and does not needs to perform the first-processing, and enabling both the first operation and the second operation by using the print apparatus after receiving the instruction.

Further features of the present invention will become apparent from the following description of exemplary embodiments with reference to the attached drawings.

BRIEF DESCRIPTION OF THE DRAWINGS

FIG. 6 is a view for explaining an example of display control on the UI unit to be controlled in the embodiment;

FIG. 7 is a view for explaining an example of display control on the UI unit to be controlled in the embodiment;

FIG. 8A is a view for explaining a control example of the print system 1000 to be controlled in the embodiment;

FIG. 9A is a view for explaining a control example of the print system 1000 to be controlled in the embodiment;

FIG. 10A is a view for explaining a control example of the print system 1000 to be controlled in the embodiment;

FIG. 10B is a view for explaining the control example of the print system 1000 to be controlled in the embodiment;

FIG. 15 is a view for explaining a control example when the print system 1000 to be controlled in the embodiment creates a printed material;

FIG. 18A is a view for explaining an example of display control on the UI unit to be controlled in the embodiment;

FIG. 18B is a view for explaining an example of display control on the UI unit to be controlled in the embodiment;

FIG. 18C is a view for explaining an example of display control on the UI unit to be controlled in the embodiment;

FIG. 18D is a view for explaining an example of display control on the UI unit to be controlled in the embodiment;

FIG. 23D is a view for explaining an example of control including display control on the UI unit to be executed in the embodiment;

FIGS. 25A and 25B are flowcharts for explaining an example of control to be executed in the embodiment;

FIG. 26 is a view for explaining an example of control including display control on the UI unit to be executed in the embodiment;

FIG. 27 is a view for explaining an example of control including display control on the UI unit to be executed in the embodiment;

FIG. 28 is a view for explaining an example of control including display control on the UI unit to be executed in the embodiment;

FIGS. 31A-1 to 31A-3 are tables for explaining an example of control to be executed in the embodiment;

FIGS. 31B-1 to 31B-3 are tables for explaining an example of control to be executed in the embodiment; and FIGS. 31C-1 and 31C-2 are tables for explaining an example of control to be executed in the embodiment.

DESCRIPTION OF THE EMBODIMENT

Figure 1:
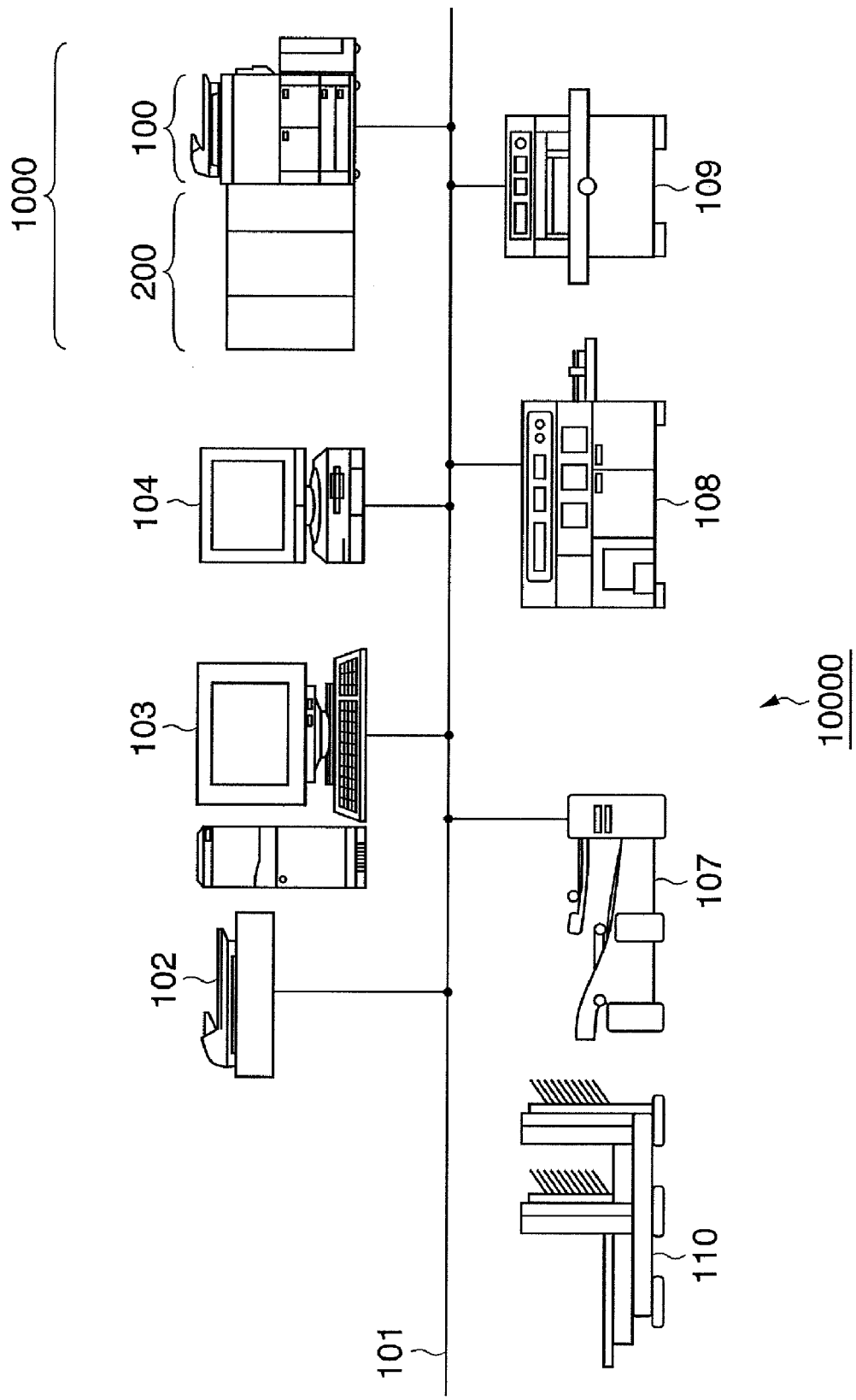
FIG. 1 is a view for explaining an example of the overall configuration of a printing environment 10000 including a print system 1000 to be controlled in an embodiment.

A preferred embodiment of the present invention will be described in detail below with reference to the accompanying drawings.

[Description of System Configuration of Entire Printing Environment 10000 Including Print System 1000]

The embodiment assumes a printing environment such as the POD environment different from the office environment in order to solve problems described in Description of the Related Art. The embodiment will explain the system environment of an entire POD environment site (printing environment 10000 in FIG. 1) including a print system 1000. The printing environment itself is a feature of the embodiment.

In the embodiment, the printing environment 10000 where the print system 1000 is applicable is also suited to the POD environment and is called a POD system 10000 or a POD environment 10000.

The POD system 10000 in FIG. 1 comprises, as building components, one print system 1000 of the embodiment, and a server computer 103 and client computer 104 (to be referred to as PCs hereinafter). The POD system 10000 also comprises a paper folding apparatus 107, cutting apparatus 109, saddle-stitching apparatus 110, case binding apparatus 108, scanner 102, and the like.

One print system 1000 according to the embodiment comprises one print apparatus 100 and a sheet-processing apparatus 200 as building components. As an example of one print apparatus 100 according to the embodiment, the embodiment will explain a multifunction peripheral having a plurality of functions such as the copy function and PC print function. However, the print apparatus 100 may be a single function type print apparatus having only the PC function or copy function. The multi function peripheral will also be called an MFP hereinafter.

The paper folding apparatus 107, cutting apparatus 109, saddle-stitching apparatus 110, and case binding apparatus 108 in FIG. 1 are defined as sheet-processing apparatuses, similar to the sheet-processing apparatus 200 of the print system 1000. This is because these apparatuses can execute sheet processes for sheets of a job printed by the print apparatus 100 of the print system 1000. For example, the paper folding apparatus 107 can fold sheets of a job printed by the print apparatus 100. The cutting apparatus 109 can cut a bundle of sheets printed by the print apparatus 100. The saddle-stitching apparatus 110 can saddle-stitch sheets of a job printed by the print apparatus 100. The case binding apparatus 108 can case-bind sheets of a job printed by the print apparatus 100. To execute various sheet processes by these sheet-processing apparatuses, an operator must take out a printed material of a job printed by the print apparatus 100 from the delivery unit of the print apparatus 100, and set the printed material in a target sheet-processing apparatus.

The use of a sheet-processing apparatus other than the sheet-processing apparatus 200 of the print system 1000 requires intervention work by the operator after the print apparatus 100 executes a print process.

In other words, when the sheet-processing apparatus 200 of the print system 1000 executes a sheet process required for a job printed by the print apparatus 100, no intervention work by the operator is necessary after the print apparatus 100 executes a print process. This is because the print apparatus 100 can directly supply sheets printed by it to the sheet-processing apparatus 200. More specifically, the sheet-feeding path in the print apparatus 100 can couple to that in the sheet-processing apparatus 200. In this manner, the sheet-processing apparatus 200 and print apparatus 100 of the print system 1000 physically connect to each other. In addition, the print apparatus 100 and sheet-processing apparatus 200 comprise CPUs so as to communicate data. That is, the print apparatus 100 and sheet-processing apparatus 200 electrically connect to each other.

In the embodiment, the control unit of the print system comprehensively controls the print apparatus 100 and sheet-processing apparatus 200. For example, in the embodiment, a controller unit 205 in the print apparatus 100 in FIG. 2 performs comprehensive control. The embodiment will call these sheet-processing apparatuses "post-processing apparatuses" or "post-presses". This is because all sheet-processing apparatuses disclosed in the embodiment are apparatuses capable of executing post-print processes (also called post-processes or post-presses) (e.g., a stapling process, punching process, saddle-stitching process, glue binding process, and cutting process) necessary for a job on sheets (printed materials) of the job after a print process necessary for the job by a printer unit 203 of the print apparatus 100. This means that all sheet-processing apparatuses disclosed in the embodiment are incorporated as post-processing apparatuses. Similarly, a "sheet process" disclosed in the embodiment is a post-process (also called finishing) to be executed for printed materials (also called sheets or print media) of a job printed by the printer unit 203. These names make the contents of the invention more understandable, and do not limit the contents of the invention.

All these apparatuses in the POD system 10000 of FIG. 1 except the saddle-stitching apparatus 110 connect to a network 101 so as to communicate data with each other.

For example, the print apparatus 100 prints the print data of a target job whose print execution request is transmitted via the network 101 from an information processing apparatus serving as an example of external apparatuses such as the PCs 103 and 104.

For example, the PC 103 manages all jobs to be processed in the POD environment 10000 by transmitting/receiving data to/from another apparatus by network communication. In other words, the PC 103 functions as a computer which comprehensively manages a series of workflow steps including a plurality of process steps. The PC 103 determines post-process conditions capable of finishing in the environment 10000 based on a job instruction accepted from an operator. In addition, the PC 103 designates a post-process (finishing process) step complying with a request from an end user (client who requests printing in this example). At this time, the PC 103 uses information exchange tools such as JDF to exchange information with respective post-processing devices using commands and statuses in post-presses.

Within the embodiment, the above sheet-processing apparatuses are classified into three categories, defined as follows.

[Definition 1] A sheet-processing apparatus which satisfies both (condition 1) and (condition 2) listed below is defined as an "inline finisher". The embodiment also refers to an apparatus satisfying this definition as an inline type sheet-processing apparatus or inline type post-processing apparatus. The inline type sheet-processing apparatus and inline type post-processing apparatus are synonymous in the embodiment.

(Condition 1) The paper path (sheet-feeding path) physically connects to the print apparatus 100 so as to directly receive sheets conveyed from the print apparatus 100 without any operator intervention.

(Condition 2) A sheet-processing apparatus electrically connects to another apparatus so as to communicate data necessary for an operation instruction, status confirmation, or the like with another apparatus. More specifically, a sheet-processing apparatus electrically connects to the print apparatus 100 so as to communicate data with it, or electrically connects to an apparatus (e.g., the PC 103 or 104) other than the print apparatus 100 via the network 101 so as to communicate data with the apparatus. A sheet-processing apparatus which satisfies either condition meets (condition 2).

More specifically, the sheet-processing apparatus 200 of the print system 1000 corresponds to an "inline finisher". This is because the sheet-processing apparatus 200 physically and electrically connects to the print apparatus 100, as described above.

[Definition 2] A sheet-processing apparatus which satisfies not (condition 1) out of (condition 1) and (condition 2) listed above but (condition 2) is defined as a "near-line finisher". The embodiment also refers to an apparatus satisfying this definition as a near-line type sheet-processing apparatus or near-line type post-processing apparatus. The near-line type sheet-processing apparatus and near-line type post-processing apparatus are synonymous in the embodiment.

For example, the paper path does not connect to the print apparatus 100, and a sheet-processing apparatus requires intervention on the part of an operator such as carrying of printed material. However, the sheet-processing apparatus can electrically exchange information such as an operation instruction or status confirmation via a communication means such as the network 101. A sheet-processing apparatus which meets these conditions will be defined as a "near-line finisher".

More specifically, the paper folding apparatus 107, cutting apparatus 109, saddle-stitching apparatus 110, and case binding apparatus 108 in FIG. 1 correspond to "near-line finishers". This is because these sheet-processing apparatuses do not physically connect to the print apparatus 100, but electrically connect to another apparatus such as the PC 103 or 104 via the network 101 so as to communicate data.

[Definition 3] A sheet-processing apparatus which satisfies neither (condition 1) nor (condition 2) listed above is defined as an "offline finisher". The embodiment also refers to an apparatus satisfying this definition as an offline type sheet-processing apparatus or offline type post-processing apparatus. The offline type sheet-processing apparatus and offline type post-processing apparatus are synonymous in the embodiment.

For example, the paper path does not connect to the print apparatus 100, and a sheet-processing apparatus requires intervention on the part of an operator such as carrying of printed material. Further, the sheet-processing apparatus does not comprise a communication unit necessary for receipt of operation instructions or status confirmation, and cannot communicate with another apparatus. Thus, the operator carries output material, sets it, manually inputs an operation, and manually gives a status report from the device.

More specifically, the saddle-stitching apparatus 110 in FIG. 1 corresponds to "offline finishers". This is because this sheet-processing apparatus is one which does not physically connect to the print apparatus 100, cannot connect to the network 101, cannot send or receive data and does not electrically connect to another apparatus.

Various sheet processes are executable in the POD environment 10000 having various sheet-processing apparatuses classified into these three categories.

For example, printed media of a job printed by the print apparatus 100 can undergo various sheet processes such as a cutting process, saddle-stitching process, case binding process, sheet folding process, punching process, sealing process, and collating process. A sheet process is possible in a bookbinding printing style desired by an end user (client).

Near-line finishers and offline finishers managed by the PC 103 include various finishers such as a dedicated stapler, dedicated puncher, inserter, and collator. The PC 103 obtains a device status and job status from near-line finishers via the network 101 by sequential polling or the like using a predetermined protocol. In addition, the PC 103 manages the execution statuses (progresses) of many jobs to be processed in the environment 10000.

In the embodiment, different sheet-processing apparatuses may execute a plurality of print sheet processes, or one sheet-processing apparatus may execute multiple types of print sheet processes. The system may comprise any sheet-processing apparatuses.

Here, another point of the embodiment will be explained.

The print system 1000 in FIG. 1 comprises the print apparatus 100, and the sheet-processing apparatus 200 detachable from the print apparatus 100. The sheet-processing apparatus 200 can directly receive, via the sheet-feeding path, sheets of a job printed by the print apparatus 100. The sheet-processing apparatus 200 executes the sheet-processing requested by a user together with a print execution request via a user interface unit for sheets of a job printed by a printer unit 203 of the print apparatus 100. This is apparent from the fact that the sheet-processing apparatus 200 is an inline type sheet-processing apparatus, as described above.

It should be noted that the sheet-processing apparatus 200 in the embodiment is also definable as a group of sheet-processing apparatuses 200. This is because in the embodiment, a plurality of sheet-processing apparatuses, which are independent housings and independently available, couple to the print apparatus 100 and are available as the sheet-processing apparatus 200. For example, the print system 1000 shown in FIG. 1 comprises the print apparatus 100 and three sheet-processing apparatuses. In other words, in the print system 1000 in FIG. 1, three sheet-processing apparatuses connect to the print apparatus 100 in daisy chain. In this example, an arrangement in which a plurality of sheet-processing apparatuses connect to the print apparatus 100 is called a cascade connection. The embodiment handles, as inline finishers, all sheet-processing apparatuses contained in a group of sheet-processing apparatuses 200 cascade-connected to the print apparatus 100. The controller unit 205 in FIG. 2 serving as an example of the control unit of the system 1000 comprehensively controls the print apparatus 100 and a plurality of inline type sheet-processing apparatuses, and executes various control examples to be described below in the embodiment. The embodiment also has this feature. This arrangement will be described later with reference to FIG. 3 and the like.

[Internal Configuration (Mainly Software Configuration) of System 1000]

The internal configuration (mainly software configuration) of the print system 1000 will be explained with reference to the system block diagram of FIG. 2. In this example, the print apparatus 100 incorporates all the units of the print system 1000 shown in FIG. 2 except the sheet-processing apparatus 200 (strictly speaking, a group of sheet-processing apparatuses configurable by a plurality of inline type sheet-processing apparatuses). The sheet-processing apparatus 200 is detachable from the print apparatus 100, and is providable as an option of the print apparatus 100. This configuration aims to provide a necessary number of inline finishers in the POD environment. For this purpose, the embodiment adopts the following configuration.

The print apparatus 100 comprises a nonvolatile memory such as a hard disk 209 (also referred to as an HDD, hereinafter) capable of storing a plurality of job data to be processed in the print apparatus 100. The print apparatus 100 includes a copy function of printing, using the printer unit 203 via the HDD, job data accepted from a scanner unit 201 built into the print apparatus 100. The print apparatus 100 also includes a print function of printing, using the printer unit 203 via the HDD, job data accepted from an external apparatus such as the PC 103 or 104 via an external I/F 202 serving as an example of a communication unit. The print apparatus 100 is an MFP type print apparatus (also referred to as image forming apparatus) having a plurality of functions.

The print apparatus according to the embodiment can take any configuration of a color or monochrome print apparatus as long as it can execute various control examples described in the embodiment.

The print apparatus 100 according to the embodiment comprises the scanner unit 201 which scans an original document image and processes the scanned image data. The print apparatus 100 also comprises the external I/F 202 which transmits/receives image data to/from a facsimile device, network connection device, or external dedicated device. The print apparatus 100 comprises the hard disk 209 capable of storing image data of jobs to be printed that are accepted from either the scanner unit 201 or external I/F 202. The print apparatus 100 comprises the printer unit 203 which prints target job data stored in the hard disk 209 on a print medium. The print apparatus 100 further comprises an operation unit 204 which has a display unit and serves as an example of the user interface unit of the print system 1000. Other examples of the user interface unit provided by the print system 1000 are the display unit, keyboard, and mouse of an external apparatus such as the PC 103 or 104.

The controller unit (also referred to as a control unit or CPU) 205 serving as an example of the control unit of the print system 1000 comprehensively controls the processes, operations, and the like of various units of the print system 1000. A ROM 207 stores various control programs required in the embodiment including programs for executing the various processes of a flowchart shown in FIGS. 24A and 24B (to be described later) and the like. The ROM 207 also stores a display control program for displaying various UI windows on the display unit of the operation unit 204 including user interface windows (referred to as UI windows hereinafter) shown in the accompanying drawings. The control unit 205 reads out and executes programs from the ROM 207 to cause the print apparatus to execute various operations described in the embodiment. The ROM 207 also stores, for example, a program for executing an operation to analyze PDL (Page Description Language) code data received from an external apparatus (e.g., the PC 103 or 104) via the external I/F 202, and expand the PDL code data into raster image data (bitmap image data). Software processes these programs.

The ROM 207 is a read-only memory, and stores programs (e.g., a boot sequence and font information) and various programs (e.g., the above-mentioned programs) in advance. A RAM 208 is a readable/writable memory, and stores image data, various programs, and setting information sent from the scanner unit 201 or external I/F 202 via the controller unit 205.

The HDD (hard disk) 209 is a large-capacity storage device which stores image data compressed by a compression/decompression unit 210. The HDD 209 can hold a plurality of data such as print data of a job to be processed. The control unit 205 makes printing on the printer unit 203 possible by controlling target job data input from various input units such as the scanner unit 201 and external I/F 202 via the HDD 209. The control unit 205 also controls job data transmission to an external apparatus via the external I/F 202. In this fashion, the controller unit 205 controls the execution of various output processes for target job data stored in the HDD 209. The compression/decompression unit 210 compresses/decompresses image data and the like stored in the RAM 208 and HDD 209 in accordance with various compression schemes such as JBIG and JPEG.

With the above configuration, the control unit 205 serving as an example of the control unit of the print system controls even the operation of the inline type sheet-processing apparatus 200, as shown in FIG. 1. The mechanical structure of the print system 1000 including a description of this operation will be explained with reference to FIG. 3 and the like.

[Apparatus Configuration (Mainly Mechanical Structure) of System 1000]

The configuration (mainly mechanical structure) of the print system 1000 will be explained with reference to the view of FIG. 3 for explaining the apparatus configuration.

As described above, in the print system 1000, a plurality of inline type sheet-processing apparatuses cascade-connect to the print apparatus 100. An arbitrary number of inline type sheet-processing apparatuses connectable to the print apparatus 100 can be installed in accordance with the use environment in order to enhance the effects of the embodiment under specific limitations.

Figure 2:
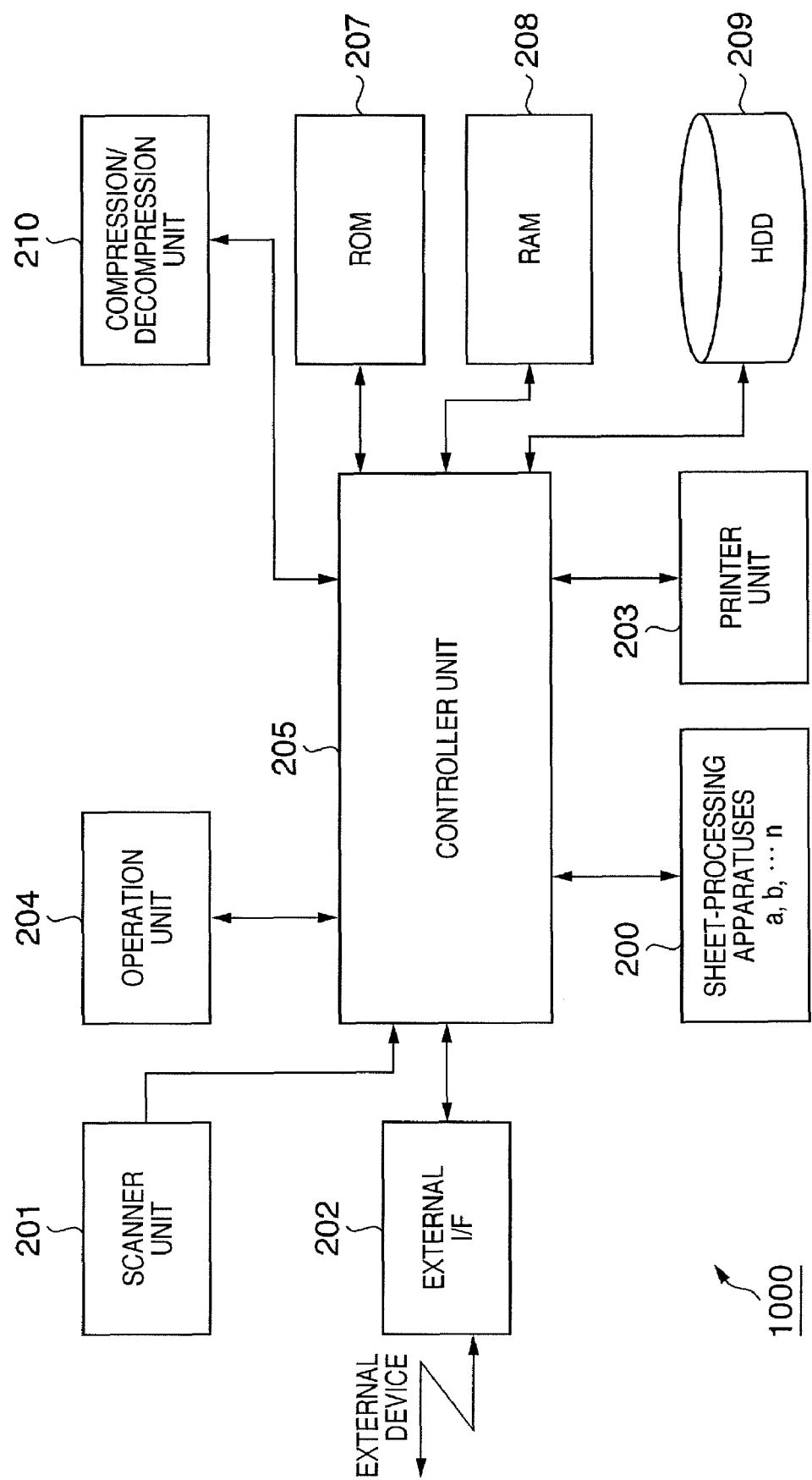
FIG. 2 is a block diagram for explaining an example of the configuration of the print system 1000 to be controlled in the embodiment.
Figure 3:
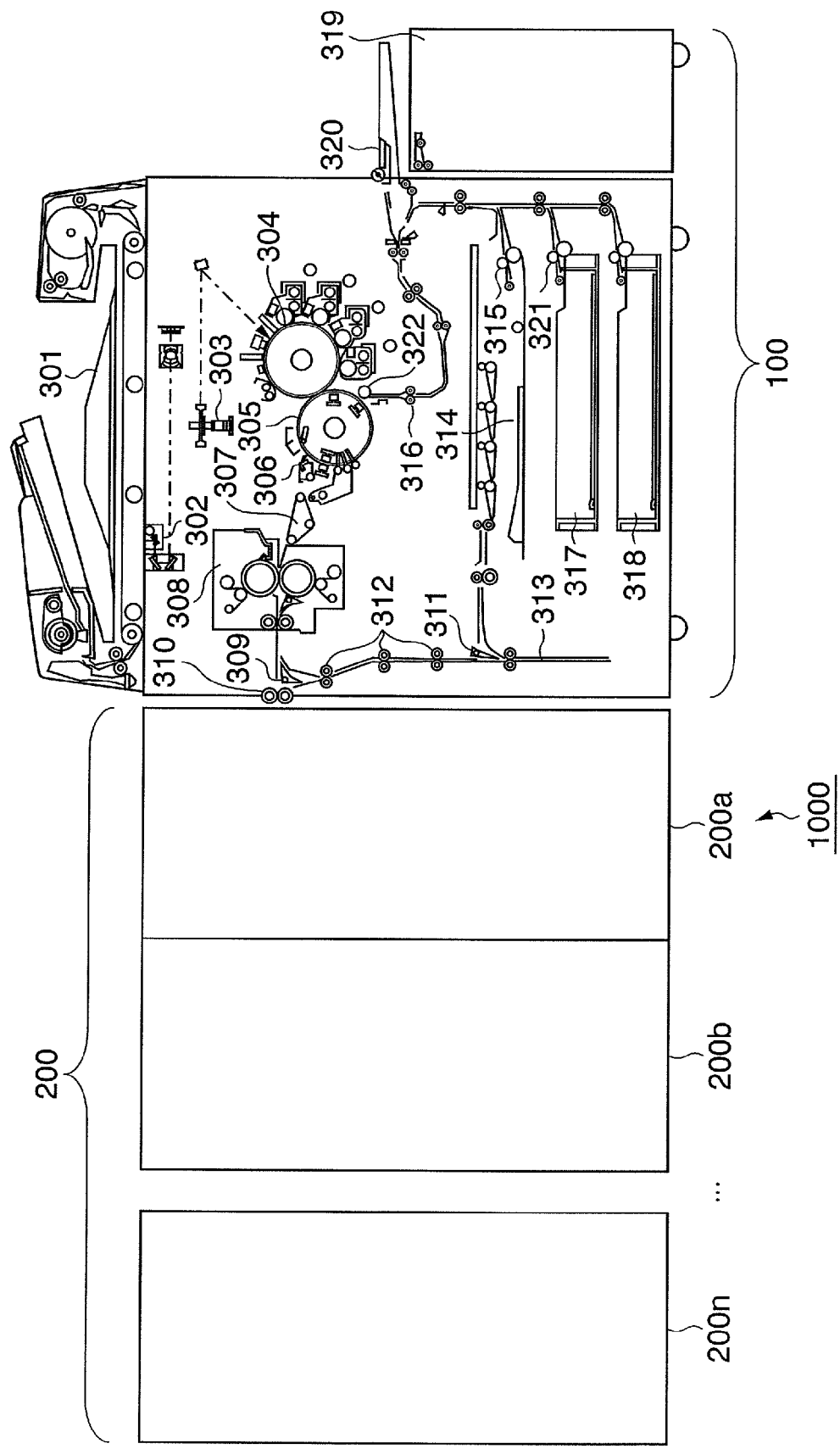
FIG. 3 is a view for explaining an example of the configuration of the print system 1000 to be controlled in the embodiment.

To make the description clearer, as shown in FIGS. 2 and 3, N sheet-processing apparatuses 200 are connectable as a group of sheet-processing apparatuses. Sheet-processing apparatuses are defined as sheet-processing apparatuses 200a, 200b, . . . sequentially from the first sheet-processing apparatus, and the Nth sheet-processing apparatus is sheet-processing apparatus 200n. For descriptive convenience, each sheet-processing apparatus 200 has a shape as shown in FIGS. 1 to 3, but has an original appearance to be described later.

Of reference numerals 301 to 322 shown in FIG. 3, reference numeral 301 corresponds to the mechanical structure of the scanner unit 201 in FIG. 2. Reference numerals 302 to 322 correspond to the mechanical structure of the printer unit 203 in FIG. 2. The embodiment will describe the structure of a 1D type color MFP. A 4D type color MFP and monochrome MFP are also examples of the print apparatus according to the embodiment, but a description of these will be omitted.

The automatic document feeder (ADF) 301 in FIG. 3 separates the first and subsequent original document sheets in the order of pages from an original document bundle set on the support surface of the document tray, and feeds each original document sheet to the document table glass in order to scan the original document sheet using the scanner 302. The scanner 302 scans the image of the original document sheet fed onto the document table glass, and converts the image into image data using a CCD. The rotary polygon mirror 303 receives a light ray (e.g., a laser beam) modulated in accordance with the image data, and irradiates the photosensitive drum 304 with the scan beam reflected via a reflecting mirror. A latent image formed by the laser beam on the photosensitive drum 304 is developed with toner, and the toner image is transferred onto sheet material which is placed in contact with the transfer drum 305. A series of image forming processes is executed sequentially with yellow (Y), magenta (M), cyan (C), and black (K) toners, forming a full-color image. After four image forming processes, the sheet material bearing the full-color image is separated by the separation gripper 306 from the transfer drum 305, and conveyed to the fixing unit 308 by the pre-fixing conveyor 307.

The fixing unit 308 comprises a combination of rollers and belts, and incorporates a heat source such as a halogen heater. The fixing unit 308 fuses and fixes, using heat and pressure, toner onto sheet material bearing a toner image. The delivery flapper 309 is rotatable about the swing shaft, and regulates the sheet material conveyance direction. When the delivery flapper 309 swings clockwise in FIG. 3, sheet material is conveyed straight, and discharged outside the apparatus by the delivery rollers 310. To form images on both sides of a sheet material, the delivery flapper 309 swings counterclockwise in FIG. 3, and the course of the sheet material changes downward to supply the sheet material to the double-sided conveyor. The double-sided conveyor comprises the reverse flapper 311, reverse rollers 312, reverse guide 313, and double-sided tray 314.

The reverse flapper 311 is rotatable about the swing shaft, and regulates the sheet material conveyance direction. To process a double-sided print job, the control unit 205 causes the reverse flapper 311 to swing counterclockwise in FIG. 3 and supply a sheet having the first surface printed by the printer unit 203 to the reverse guide 313 via the reverse rollers 312. While the reverse rollers 312 clamp the trailing end of the sheet material, the reverse rollers 312 temporarily stop, the reverse flapper 311 swings clockwise in FIG. 3, and the reverse rollers 312 rotate backward. The sheet is switched back to replace its trailing and leading ends, and then the sheet is guided to the double-sided tray 314.

The double-sided tray 314 temporarily supports the sheet material, and the refeed roller 315 supplies the sheet material again to the registration rollers 316. At this time, the sheet material is sent with a surface opposite its initial surface in the transfer step facing the photosensitive drum. The second image is formed on the second surface of the sheet by the same process as that described above. After the images are formed on the two surfaces of the sheet material, the sheet undergoes the fixing step and is discharged from the print apparatus main body to outside the apparatus via the delivery rollers 310. The control unit 205 executes this double-sided print sequence, and causes the print apparatus to execute double-sided printing of target job data on the first and second surfaces of a sheet.

The sheet feed/conveyance unit comprises the sheet feed trays 317 and 318 (each capable of storing, for example, 500 sheets), the paper deck 319 (capable of storing, for example, 5,000 sheets), and the manual feed tray 320, serving as sheet feed means storing sheets necessary for a print process. Means for feeding sheets stored in these sheet feed units are the sheet feed rollers 321, registration rollers 316, and the like. The sheet feed trays 317 and 318 and the paper deck 319 can set sheets of various materials at various sheet sizes so as to discriminate these sheets in these sheet feed units.

The manual feed tray 320 can also set various print media including a special sheet such as an OHP sheet. The sheet feed trays 317 and 318, the paper deck 319, and the manual feed tray 320 respectively have the sheet feed rollers 321 so as to successively feed sheets one by one. For example, a pickup roller sequentially picks up stacked sheet materials, a separation roller facing the sheet feed rollers 321 prevents overlapping feed, and sheet materials are supplied one by one to the conveyance guide. The separation roller receives, via a torque limiter (not shown), a driving force for driving the separation roller in a direction opposite to the conveyance direction. When only a single piece of sheet material enters a nip portion formed between the separation roller and the sheet feed roller, the separation roller rotates in the conveyance direction following the sheet material.

If overlapping feed occurs, the separation roller rotates in the direction opposite the conveyance direction to set back the overlapping-fed sheet material and supply only one top sheet material. The supplied sheet material is guided between the conveyance guides, and conveyed to the registration rollers 316 by a plurality of conveyance rollers. At this time, the registration rollers 316 stop, the leading end of the sheet material abuts against the nip portion formed between the pair of registration rollers 316. Then, the sheet material forms a loop to correct skew. The registration rollers 316 start rotating to convey the sheet material in synchronism with the timing of a toner image formed on the photosensitive drum 304 in the image forming unit. The attraction roller 322 electrostatically attracts the sheet material sent by the registration rollers 316 onto the surface of the transfer drum 305. The sheet material discharged from the fixing unit 308 is introduced into the sheet-feeding path in the sheet-processing apparatus 200 via the delivery rollers 310.

Through the print process described above, the control unit 205 processes a job to be printed.

The control unit 205 causes the printer unit 203 using the above-described method to print job print data stored in the HDD 209 from a data generation source on the basis of a print execution request accepted from a user via the UI unit.

For example, the data generation source of a job whose print execution request is accepted from the operation unit 204 corresponds to the scanner unit 201. The data generation source of a job whose print execution request is accepted from a host computer corresponds to the host computer.

The control unit 205 stores print data of a job to be processed sequentially from the start page in the HDD 209, and reads out the print data sequentially from the start page from the HDD 209 to form the image of the print data on a sheet. The control unit 205 performs this start page process. In addition, the control unit 205 supplies printed sheets sequentially from the start page to the sheet-feeding path in the sheet-processing apparatus 200 with the image surfaces of the sheets facing down. For this purpose, immediately before the delivery rollers 310 introduce a sheet into the sheet-processing apparatus 200, the control unit 205 causes the delivery flapper 309, reverse rollers 312, and the like to execute a switchback operation to reverse the direction of the sheet traveling from the fixing unit 308. The control unit 205 also executes paper handling control for the start page process.

The arrangement of the inline type sheet-processing apparatus 200 of the print system 1000 also having the print apparatus 100 will be explained next.

As shown in FIG. 3, the system 1000 according to the embodiment comprises a total of n inline type sheet-processing apparatuses cascade-connectable to the print apparatus 100. The number of installed inline type sheet-processing apparatuses is as arbitrary as possible. However, the system 1000 must utilize at least a sheet-processing apparatus which can supply a sheet printed by the printer unit 203 to an internal sheet-processing unit without any intervention work by an operator. In other words, the system 1000 must utilize a sheet-processing apparatus having a sheet-feeding path (paper path) capable of conveying, within the apparatus, a print medium discharged from the printer unit 203 via the delivery rollers 310 of the print apparatus 100. The system 1000 follows this restriction.

However, the print system 1000 is flexibly configurable as long as it follows this restriction, as one mechanism of enhancing the effects of the embodiment.

For example, the number of connected inline type sheet-processing apparatuses is arbitrary such as three or five. In order to increase the use efficiency of an offline type sheet-processing apparatus, the embodiment also assumes a POD environment where an administrator determines that no inline type sheet-processing apparatus is necessary. For example, even when no inline type sheet-processing apparatus is used (i.e., the number of inline type sheet-processing apparatuses is 0), the print apparatus 100 of the embodiment is available.

When cascade-connecting a plurality of inline type sheet-processing apparatuses to the print apparatus 100, a specific user (e.g., the administrator) can arbitrarily change and determine their connection order under the restriction.

The above mechanism aims to improve user friendliness, and is not an indispensable constituent feature. In other words, the present invention is not limited to this arrangement. For example, the present invention is applicable to a system configuration which uniformly defines the number of inline type sheet-processing apparatuses available in the print system 1000 and their connection order. The present invention incorporates any system configuration and apparatus configuration as long as at least one of various job control examples (to be described later) is executable.

How many and what types of inline type sheet-processing apparatuses are connectable to the print apparatus 100 in the print system 1000, how to connect them, and what kinds of sheet processes they can execute will be described later.

[Arrangement of Operation Unit 204 as Example of UI Unit of System 1000]

Figure 4:
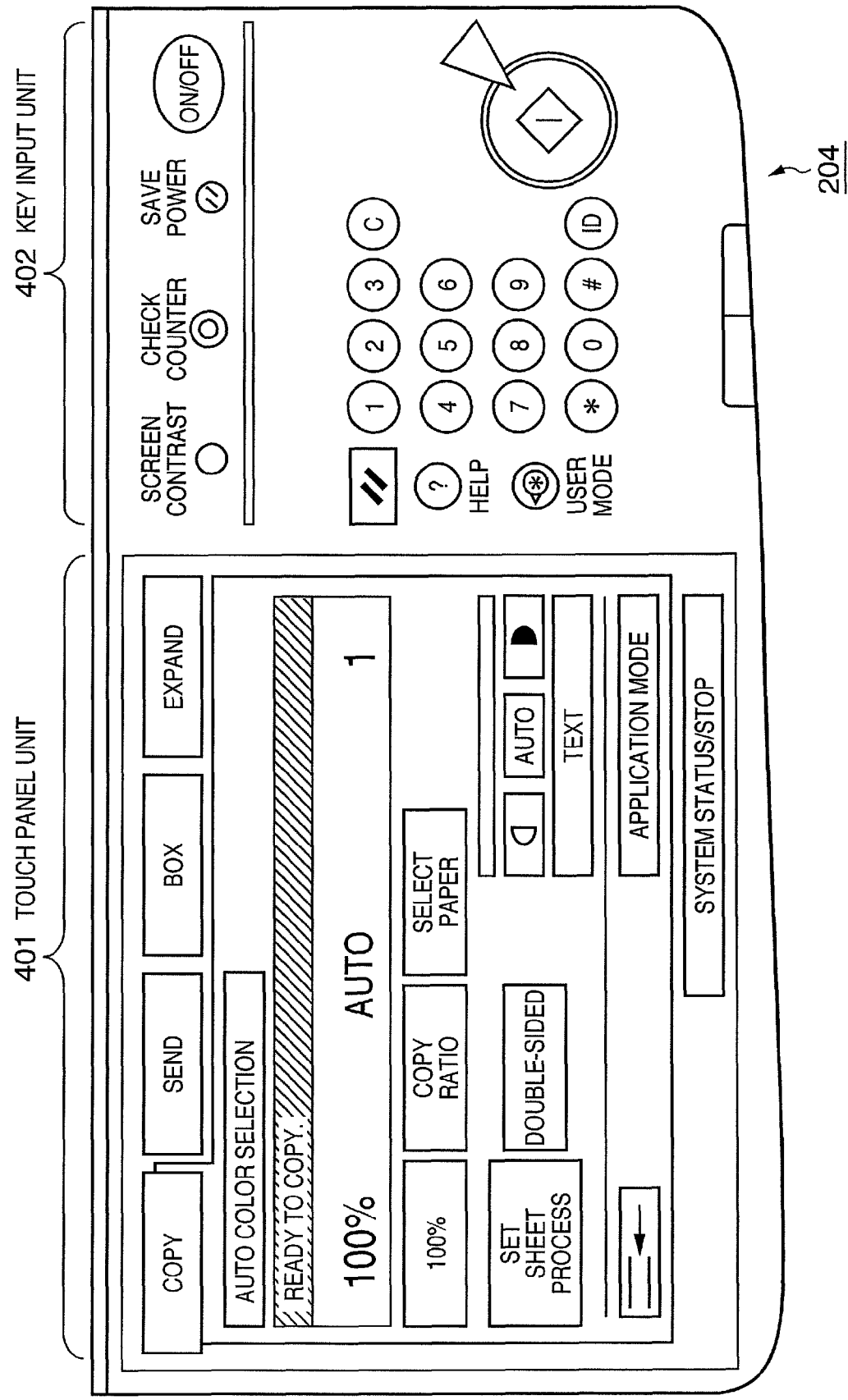
FIG. 4 is a view for explaining an example of a UI unit to be controlled in the embodiment.

The operation unit 204 serving as an example of the user interface unit (to be referred to as a UI unit hereinafter) of the print apparatus 100 in the system 1000 will be explained with reference to FIG. 4 and the like.

The operation unit 204 comprises a key input unit 402 capable of accepting a user operation with hard keys, and a touch panel unit 401 serving as an example of a display unit capable of accepting a user operation with soft keys (display keys).

Figure 5:
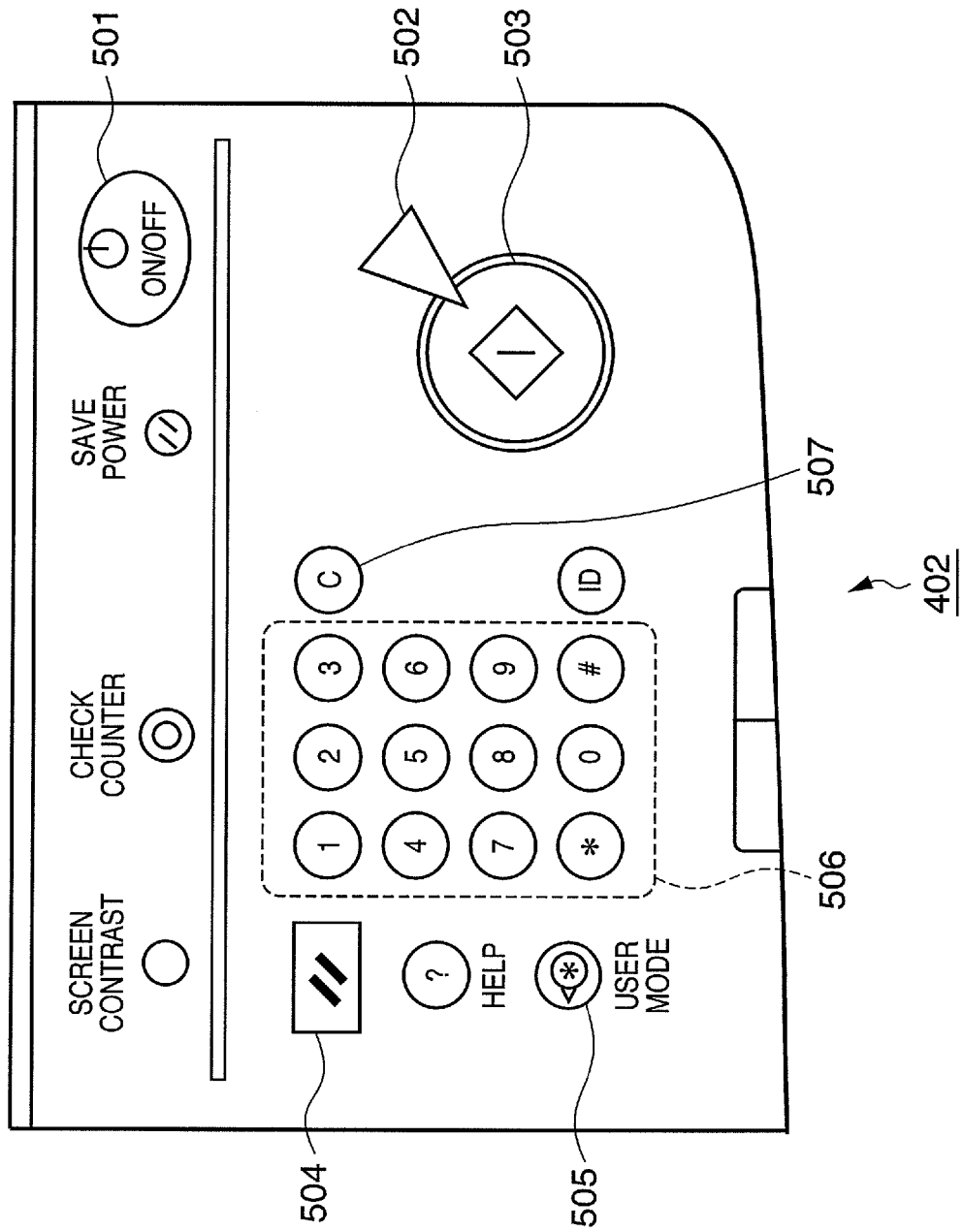
FIG. 5 is a view for explaining an example of the UI unit to be controlled in the embodiment.

As shown in FIG. 5, the key input unit 402 comprises an operation unit power switch 501. In response to a user operation to the switch 501, the control unit 205 controls selective switching between the standby mode (normal operation state) and the sleep mode (state in which the program stops in wait for an interrupt by network printing, facsimile transmission, or the like, suppressing power consumption). The control unit 205 controls acceptance of a user operation to the switch 501 while a main power switch (not shown) for supplying power to the whole system is ON.

A start key 503 enables accepting, from a user, an instruction to cause the print apparatus to start a kind of job process designated by the user, such as copying or transmission of a job to be processed. A stop key 502 enables accepting, from the user, an instruction to cause the print apparatus to interrupt the process of an accepted job. A ten-key pad 506 allows the user to configure various settings. A clear key 507 is used to cancel various parameters such as entries set by the user via the pad 506. A reset key 504 is used to accept, from the user, an instruction to invalidate various settings of a job to be processed by the user and restore the setting values to defaults. A user mode key 505 is used to shift to a system setup window for each user.

FIG. 6 is a view for explaining the touch panel unit (to be also referred to as a display unit) 401 serving as an example of a user interface means provided by the print system. The touch panel unit 401 has an LCD (Liquid Crystal Display), and a touch panel display formed from a transparent electrode adhered onto the LCD. The unit 401 has both a function of accepting various settings from an operator and a function of presenting information to the operator. For example, when it is detected that a user presses a portion corresponding to an effective display key on the LCD, the control unit 205 causes display of an operation window corresponding to the key operation on the display unit 401 in accordance with a display control program stored in advance in the ROM 207. FIG. 6 shows an example of an initial window displayed on the display unit 401 when the print apparatus is in the standby mode (state in which there is no job to be processed by the print apparatus).

When the user presses a copy tab 601 on the display unit 401 shown in FIG. 6, the control unit 205 causes the display unit 401 to display the operation window of the copy function provided by the print apparatus. When the user presses a send tab 602, the control unit 205 causes the display unit 401 to display the operation window of the data send function (e.g., FAX transmission or E-mail sending) provided by the print apparatus. When the user presses a box tab 603, the control unit 205 causes the display unit 401 to display the operation window of the box function provided by the print apparatus.

The box function uses a plurality of data storage boxes (to be referred to as boxes hereinafter) which are virtually ensured in the HDD 209 in advance and are available discriminately for respective users. With the box function, the control unit 205 allows a user to select a desired one of boxes via the user interface unit, and accepts a desired operation from the user. For example, the control unit 205 responds to an instruction input from the user via the operation unit 204, and controls the HDD 209 to store document data of a job accepted from the scanner unit 201 of the print apparatus in a box selected by the user. The control unit 205 also makes it possible to store, e.g., text data of a job accepted from an external apparatus (e.g., the PCs 103 or 104) via the external I/F 202 in a box designated by the user in accordance with an instruction designated by the user of the external apparatus via the user interface unit of the external apparatus. The control unit 205 controls, e.g., the printer unit 203 to print job data stored in a box in the desired output form of a user in accordance with a user instruction from the operation unit 204, or controls the external I/F 202 to transmit the job data to an external apparatus desired by the user.

To allow the user to execute various box operations, the control unit 205 controls the display unit 401 to display the box function operation window in response to press of the box tab 603 by the user. When the user presses an expand tab 604 on the display unit 401 of FIG. 6, the control unit 205 causes the display unit 401 to display a window for setting expansion functions such as scanner setting. When the user presses a system monitor key 617, the control unit 205 causes the display unit 401 to display a display window for notifying the user of the MFP state or status.

A color selection setting key 605 allows the user to select color copying, monochrome copying, or auto selection in advance. A copy ratio setting key 608 causes the display unit 401 to display a setup window which allows the user to set a copy ratio such as equal magnification, enlargement, or reduction.

When the user presses a double-sided key 614, the control unit 205 causes the display unit 401 to display a window which allows the user to set which of single-sided printing and double-sided printing is executed in the print process of a target job. In response to press of a sheet selection key 615 by the user, the control unit 205 causes the display unit 401 to display a window which allows the user to set a sheet feed unit, sheet size, and sheet type (medium type) necessary for the print process of a target job. In response to press of a key 612 by the user, the control unit 205 causes the display unit 401 to display a window which allows the user to select an image process mode (e.g., a text mode or photo mode) suited to an original document image. By operating a density setting key 611, the user can adjust the density of the output image of a job to be printed.

Referring to FIG. 6, the control unit 205 causes a status display field 606 of the display unit 401 to display the operation state (e.g., standby, warm-up, printing, jam, or error) of a current event in the print apparatus in order to confirm it by the user. The control unit 205 causes a display field 607 to display information for prompting the user to confirm the copy ratio of a job to be processed. The control unit 205 causes a display field 616 to display information for prompting the user to confirm the sheet size and sheet feed mode of a job to be processed. The control unit 205 causes a display field 610 to display information for prompting the user to confirm the number of copies of a job to be processed, and information for prompting the user to confirm the sheet number during printing. In this manner, the control unit 205 causes the display unit 401 to display various types of information to be announced to the user.

When a user presses an interrupt key 613, the control unit 205 stops printing a current job by the print apparatus, and executes printing of a job from the user. When the user presses an application mode key 618, the control unit 205 causes the display unit 401 to display a window for setting various image processes and layouts, such as two-page separation, cover sheet/slip sheet setting, reduction layout, and image movement.

Still another point of the embodiment will be described.

As a setting for a job to be processed, the control unit 205 causes the UI unit to execute a display for accepting a request from a user to execute a sheet process by the sheet-processing unit of the inline type sheet-processing apparatus 200 of the print system 1000. The control unit 205 also causes the UI unit to execute a display for accepting an instruction from the user to cause the UI unit to execute this display.

For example, the control unit 205 causes the display unit 401 to display a sheet process setting key 609 in FIG. 6. Assume that the user presses the sheet process setting key 609. Then, the control unit 205 causes the display unit 401 to execute a display for allowing the user to specify a desired sheet process among sheet process selection candidates executable using the inline type sheet-processing apparatus of the system 1000. The "sheet process setting key 609" illustrated in the display of FIG. 7 will also be referred to as a "finishing key" in FIG. 19 and subsequent drawings. That is, the "sheet process setting key 609" and "finishing key" mean the same function button. In the following description, a "sheet process" will also be referred to as "finishing". As for a "punching process", needs for various punching processes (processes to punch a printed sheet) are assumable in the POD environment.

Figure 19:
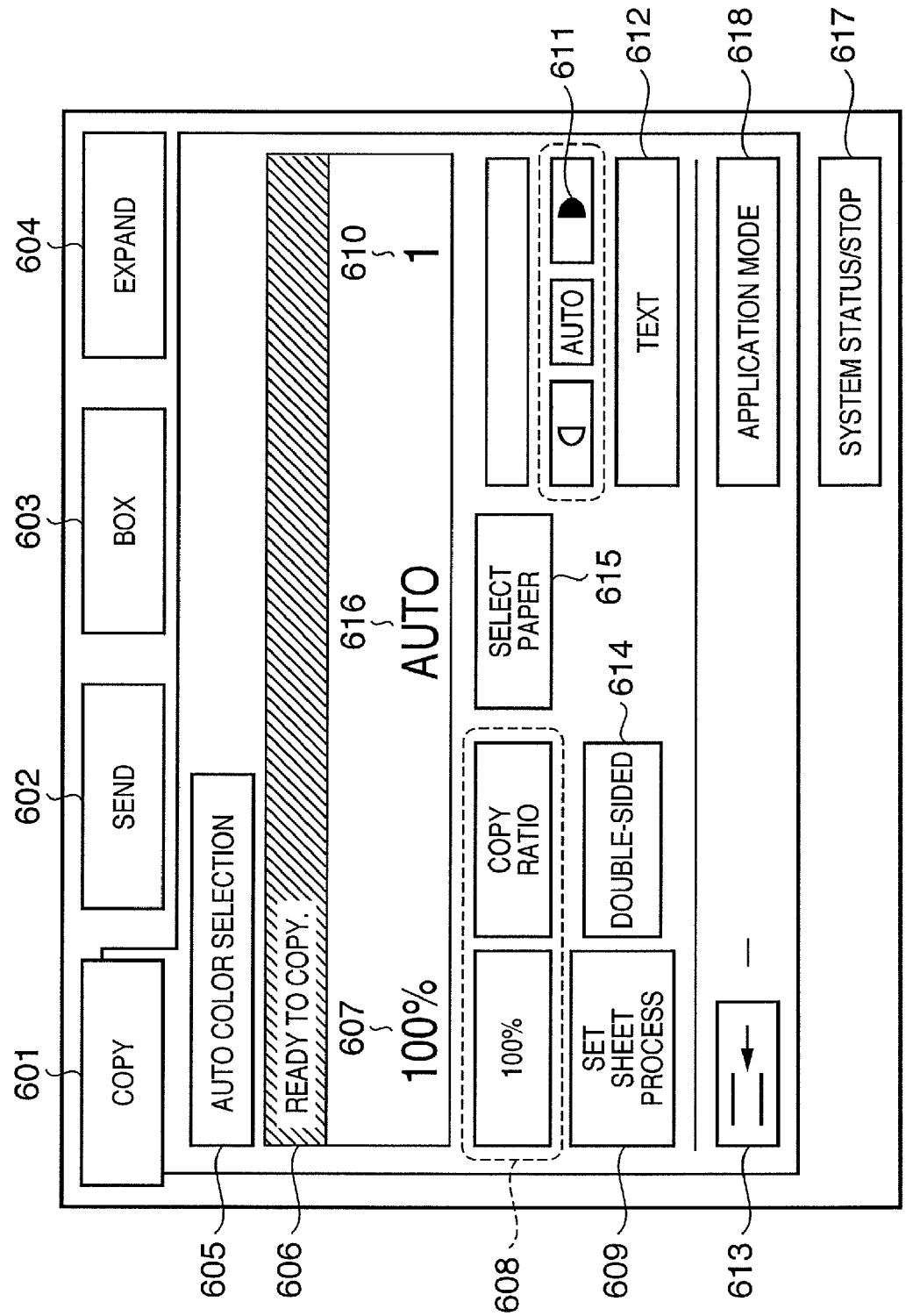
FIG. 19 is a view for explaining an example of control including display control on the UI unit to be executed in the embodiment.

Thus, FIG. 19 and subsequent drawings illustrate "two-hole punching (process to form two holes at a sheet end corresponding to a sheet binding edge)" and "multi-hole punching (process to form many holes such as 30 holes at a sheet end)" as a plurality of types of punching processes. These processes are executable by the punching unit of the saddle-stitching apparatus shown in FIGS. 8A to 10B in correspondence with the above configuration. Another apparatus or unit may execute these punching processes. However, as described above, the use of an apparatus which satisfies the definition of an inline finisher in the system 1000 is permitted, and the use of a different type of apparatus in the system 1000 is inhibited.

In this example, the control unit 205 causes the display unit 401 to execute a display in FIG. 7 in response to press of the key 609 by the user. The control unit 205 controls to accept, via the display of FIG. 7, a request to execute a sheet process by the inline sheet-processing apparatus 200 for a printed sheet of a job to be processed.

The control unit 205 determines sheet-processing apparatus candidates selectable via the display of FIG. 7 in accordance with the kind of sheet-processing apparatus attached to the system 1000 and the mounting status of the sheet-processing apparatus. For example, the display of FIG. 7 permits accepting a request from a user to execute any type of sheet process (also called a post-process or finishing) among types of sheet processes listed below for a sheet (also called a print medium or printed material) printed by the printer unit 203:

(1) a stapling process,
(2) a punching process,
(3) a folding process,
(4) a shift delivery process,
(5) a cutting process,
(6) a saddle-stitching process,
(7) a case binding process as an example of glue binding process,
(8) a pad binding process as another example of glue binding process, and
(9) a large-volume stacking process.

In the UI control example of FIG. 7, the control unit 205 controls the operation unit 204 to set these nine sheet processes as selection candidates. This is because the inline type sheet-processing apparatuses of the print system 1000 can be used to selectively execute these nine sheet processes.

In other words, the control unit 205 controls the UI unit to exclude a sheet process unexecutable by the system 1000 from selection candidates in the display of FIG. 7. For example, when the system 1000 does not comprise one sheet-processing apparatus capable of selectively executing a case binding process and pad binding process, or this sheet-processing apparatus is out of order, the control unit 205 controls to invalidate keys 707 and 708. For example, the control unit 205 grays out and hatches the keys 707 and 708. With this setting, the control unit 205 controls not to accept a request from a user to execute corresponding sheet processes. Further, when the system 1000 comprises a sheet-processing apparatus capable of executing a sheet process different from the above-mentioned nine candidates, the control unit 205 controls the display of FIG. 7 to validate a display key for accepting a request from a user to execute the different sheet process. With this display key, the control unit 205 permits accepting a request from a user to execute the sheet process. The embodiment can execute this display control together with job process control (to be described later), preventing any user operation error.

In executing this control, the control unit 205 acquires system configuration information for specifying what kind of sheet-processing apparatus the system 1000 comprises as the sheet-processing apparatus 200. In this control, the control unit 205 also uses, e.g., status information for specifying whether an error occurs in the sheet-processing apparatus 200. The control unit 205 acquires these pieces of information by manually inputting them by a user via the UI unit, or automatically on the basis of a signal output from the sheet-processing apparatus 200 via a signal line when the sheet-processing apparatus 200 connects to the print apparatus 100. On the premise of this configuration, the control unit 205 causes the display unit 401 to execute the display of FIG. 7 with display contents based on the acquired information.

The system 1000 can accept, from an external apparatus such as the PC 103 or 104, a request to print a target job and a request to execute a sheet process necessary for the job. When inputting a job from the external apparatus, the control unit 205 controls the display unit of the external apparatus serving as a print data transmission source to display the same functions as those of the display in FIG. 7. In this example, the control unit 205 causes the display unit of a computer such as the PC 103 or 104 to display a printer driver setup window (to be described later). When the UI of the external apparatus executes the display, the control unit of the external apparatus executes the above control. For example, when the display unit of the PC 103 or 104 displays a printer driver UI window (to be described later), the control entity is the CPU of the PC.

[Concrete Example of Configuration of Print System 1000 Controlled in Embodiment]

A system configuration representing how many and what kinds of inline type sheet-processing apparatuses are connectable to the print apparatus 100 in the print system 1000, how to connect them, and what kinds of sheet processes they can execute will be explained with reference to FIGS. 8A and 8B and the like in association of a feature of the embodiment.

Figure 8B:
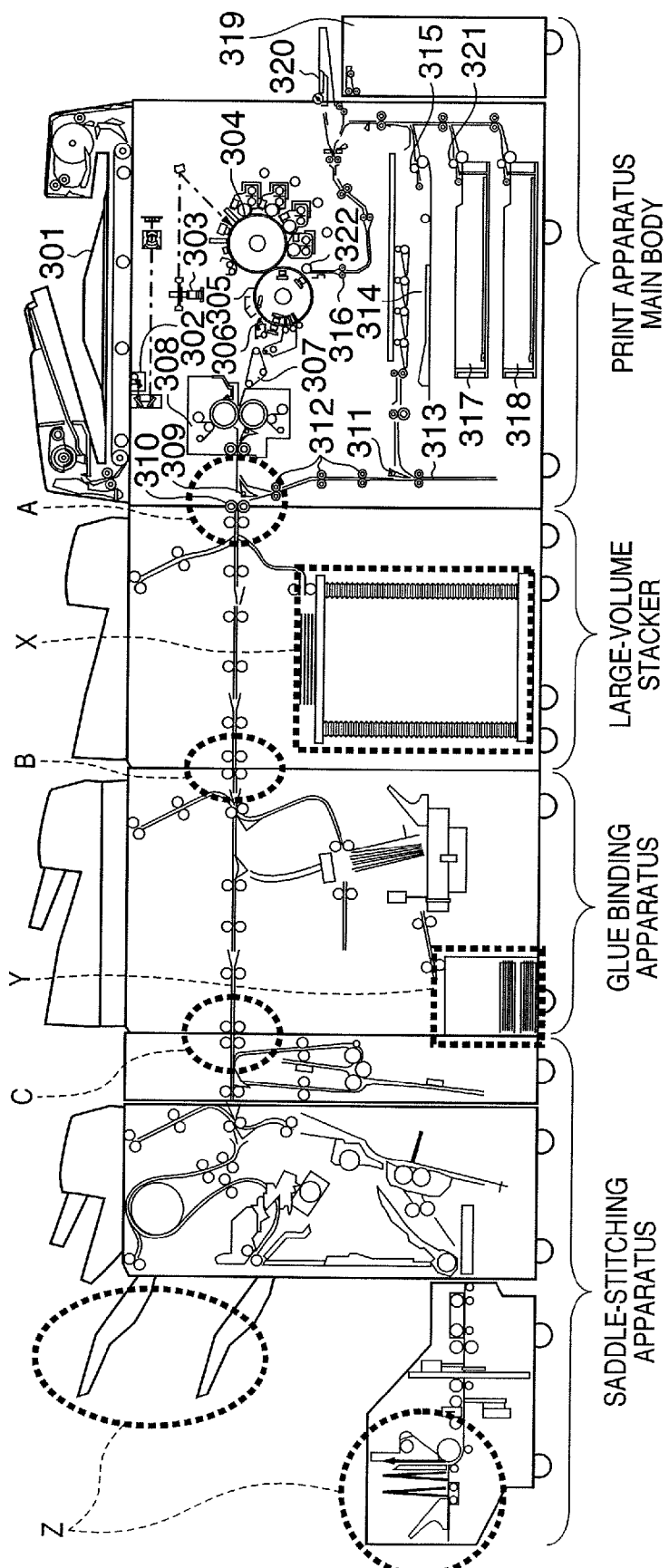
FIG. 8B is a view for explaining the control example of the print system 1000 to be controlled in the embodiment.

The embodiment can implement, for example, a system configuration as shown in FIGS. 8A and 8B as the system 1000 shown in FIGS. 1 to 3.

In the system configuration example of FIG. 8A, the system 1000 comprises a total of three inline type sheet-processing apparatuses, i.e., a large-volume stacker, glue binding apparatus, and saddle-stitching apparatus as a group of sheet-processing apparatuses 200. In the configuration example of FIG. 8A, the large-volume stacker, glue binding apparatus, and saddle-stitching apparatus connect in the order to the print apparatus 100 of the system 1000. The control unit 205 serving as an example of the control unit of the system 1000 comprehensively controls the print system 1000 having the system configuration as shown in FIGS. 8A and 8B.

In this example, the large-volume stacker is a sheet-processing apparatus capable of stacking a large number (e.g., 5,000) of sheets from the printer unit 203.

The glue binding apparatus in this example is a sheet-processing apparatus capable of executing a case binding process requiring a sheet gluing process when attaching a cover and binding a bundle of sheets printed by the printer unit 203. The glue binding apparatus can also execute a pad binding process corresponding to a sheet process to glue and bind a bundle of sheets without attaching any cover. The glue binding apparatus is also called a case binding apparatus because it is a sheet-processing apparatus capable of executing at least a case binding process.

The saddle-stitching apparatus is a sheet-processing apparatus capable of selectively executing a stapling process, punching process, cutting process, shift delivery process, saddle-stitching process, and folding process for sheets from the printer unit 203.

In the embodiment, the control unit 205 registers, in a specific memory, various types of system configuration information on these sheet-processing apparatuses as management information necessary for various control examples. For example, when the system 1000 has the system configuration as shown in FIG. 8A, the control unit 205 registers the following pieces of information in the HDD 209.

(Information 1) Apparatus presence/absence information which allows the control unit 205 to confirm that the system 1000 comprises an inline type sheet-processing apparatus. This information corresponds to information which allows the control unit 205 to specify whether the system 1000 comprises an inline type sheet-processing apparatus.

(Information 2) Inline sheet-processing apparatus count information which allows the control unit 205 to confirm that the system 1000 comprises three inline type sheet-processing apparatuses 200. This information corresponds to information which allows the control unit 205 to specify the number of inline type sheet-processing apparatuses of the system 1000.

(Information 3) Inline sheet-processing apparatus type information which allows the control unit 205 to specify that the system 1000 comprises the large-volume stacker, glue binding apparatus, and saddle-stitching apparatus. This information corresponds to information which allows the control unit 205 to confirm the types of inline type sheet-processing apparatuses of the system 1000.

(Information 4) Information which allows the control unit 205 to confirm that one of the three inline type sheet-processing apparatuses 200 is a large-volume stacker capable of stacking sheets from the printer unit 203. Apparatus performance information which allows the control unit 205 to confirm that another inline type sheet-processing apparatuses is a glue binding apparatus capable of executing a glue binding process (case binding process and/or pad binding process) for sheets from the printer unit 203. Information which allows the control unit 205 to confirm that the remaining inline type sheet-processing apparatuses is a saddle-stitching apparatus capable of selectively executing stapling, punching, cutting, shift delivery, saddle-stitching, and folding for sheets from the printer unit 203. In other words, information which allows the control unit 205 to specify that sheet processes executable by the system are a total of nine processes: stapling, punching, cutting, shift delivery, saddle-stitching, folding, case binding, pad binding, and large-volume stacking. This information corresponds to information which allows the control unit 205 to confirm performance information of sheet processes executable by the inline type sheet-processing apparatuses of the system 1000.

(Information 5) Information which allows the control unit 205 to confirm that the three sheet-processing apparatuses 200 cascade-connect to the print apparatus 100 in the order of the large-volume stacker, glue binding apparatus, and saddle-stitching apparatus. This information corresponds to connection order information of these sheet-processing apparatuses in the system when a plurality of inline finishers are connected.

The control unit 205 registers, in the HDD 209, various types of information as represented by (information 1) to (information 5) as system configuration information necessary for various control examples. The control unit 205 utilizes the information as criterion information necessary for job control (to be described later).

On the premise of the above configuration, for example, the print system 1000 has the system configuration as shown in FIG. 8A. Control executed by the control unit 205 in this system configuration will be exemplified.

For example, when the system 1000 has the system configuration in FIGS. 8A and 8B, it can execute all the nine sheet processes. The control unit 205 recognizes this on the basis of the criteria of (information 1) to (information 5). Based on the recognition result, the control unit 205 controls the UI unit so as to set all the nine sheet processes in the display of FIG. 7 as selection candidates. In addition, the control unit 205 executes the following control in response to a user operation.

For example, the control unit 205 accepts, from a user, a stapling process execution request for a target job via the UI unit in response to press of a key 701 by the user in the display of FIG. 7 executed by the UI unit under the control of the control unit 205. In response to this request, the control unit 205 causes the saddle-stitching apparatus serving as the sheet-processing apparatus 200*c* in FIG. 8A to staple printed sheets of the job.

For example, the control unit 205 accepts, from the user, a (sheet) punching process execution request for a target job via the UI unit in response to press of a key 702 by the user in the display of FIG. 7 executed by the UI unit under the control of the control unit 205. In response to this request, the control unit 205 causes the saddle-stitching apparatus serving as the sheet-processing apparatus 200*c* in FIG. 8A to punch printed sheets of the job.

For example, the control unit 205 accepts, from the user, a cutting process execution request for a target job via the UI unit in response to press of a key 703 by the user in the display of FIG. 7 executed by the UI unit under the control of the control unit 205. In response to this request, the control unit 205 causes the saddle-stitching apparatus serving as the sheet-processing apparatus 200c in FIG. 8A to cut printed sheets of the job.

For example, the control unit 205 accepts, from the user, a cutting process execution request for a target job via the UI unit in response to press of a key 704 by the user in the display of FIG. 7 executed by the UI unit under the control of the control unit 205. In response to this request, the control unit 205 causes the saddle-stitching apparatus serving as the sheet-processing apparatus 200c in FIG. 8A to cut printed sheets of the job.

For example, the control unit 205 accepts, from the user, a saddle-stitching process execution request for a target job via the UI unit in response to press of a key 705 by the user in the display of FIG. 7 executed by the UI unit under the control of the control unit 205. In response to this request, the control unit 205 causes the saddle-stitching apparatus serving as the sheet-processing apparatus 200c in FIG. 8A to saddle-stitch printed sheets of the job.

For example, the control unit 205 accepts, from the user, a folding process execution request for a target job via the UI unit in response to press of a key 706 by the user in the display of FIG. 7 executed by the UI unit under the control of the control unit 205. In response to this request, the control unit 205 causes the saddle-stitching apparatus serving as the sheet-processing apparatus 200c in FIG. 8A to fold (e.g., Z-fold) printed sheets of the job.

For example, the control unit 205 accepts, from the user, a case binding process execution request for a target job via the UI unit in response to press of the key 707 by the user in the display of FIG. 7 executed by the UI unit under the control of the control unit 205. In response to this request, the control unit 205 causes the glue binding apparatus serving as the sheet-processing apparatus 200b in FIG. 8A to case-bind printed sheets of the job.

For example, the control unit 205 accepts, from the user, a pad binding process execution request for a target job via the UI unit in response to press of the key 708 by the user in the display of FIG. 7 executed by the UI unit under the control of the control unit 205. In response to this request, the control unit 205 causes the glue binding apparatus serving as the sheet-processing apparatus 200b in FIG. 8A to pad-bind printed sheets of the job.

For example, the control unit 205 accepts, from the user, a large-volume stacking process execution request for a target job via the UI unit in response to press of a key 709 by the user in the display of FIG. 7 executed by the UI unit under the control of the control unit 205. In response to this request, the control unit 205 causes the large-volume stacker serving as the sheet-processing apparatus 200a in FIG. 8A to stack a large number of printed sheets of the job.

As described above, the control unit 205 controls to accept, via the UI unit together with a print execution request, a request to execute a sheet process desired by the user among selection candidates corresponding to sheet processes executable by the sheet-processing apparatuses of the system 1000. In response to accepting a request from the user via the UI unit provided by the embodiment to print a target job, the control unit 205 causes the printer unit 203 to execute a print process necessary for the job. Further, the control unit 205 causes a sheet-processing apparatus of the system 1000 to execute a sheet process necessary for printed sheets of the job.

As another feature of the embodiment, the control unit 205 executes the following control in the system 1000.

For example, the system 1000 has the system configuration as shown in FIG. 8A. That is, the print system 1000 is built by connecting the print apparatus 100→the large-volume stacker→the glue binding apparatus→the saddle-stitching apparatus in the order. The internal system configuration in this case is as shown in FIG. 8B.

FIG. 8B is a sectional view of the apparatuses of the whole print system 1000 when the print system 1000 has the system configuration in FIG. 8A. The apparatus configuration in FIG. 8B corresponds to that in FIG. 8A.

As is apparent from the internal apparatus configuration in FIG. 8B, a sheet printed by the printer unit 203 of the print apparatus 100 is suppliable into the respective sheet-processing apparatuses. More specifically, as shown in FIG. 8B, the respective sheet-processing apparatuses comprise sheet-feeding paths capable of feeding a sheet via points A, B, and C in the apparatuses.

Each inline type sheet-processing apparatus such as the sheet-processing apparatus 200a or 200b in FIG. 8B has a function of receiving a sheet from a preceding apparatus connected to the input side of the sheet-processing apparatus even if a target job does not require a sheet process executable by the sheet-processing apparatus. Each inline type sheet-processing apparatus has a function of transferring a sheet received from the preceding apparatus to a succeeding apparatus connected to the output side of the sheet-processing apparatus.

As described above, in the print system 1000 of the embodiment, a sheet-processing apparatus, which executes a sheet process different from sheet processes necessary for a target job, has a function of conveying sheets of the target job from a preceding apparatus to a succeeding apparatus. This configuration is also a feature of the embodiment.

On the premise of the above system configuration, for example, when the print system 1000 has the system configuration shown in FIGS. 8A and 8B, the control unit 205 executes the following control for the system 1000 for a job for which the user issues a print execution request via the UI unit according to the above-described method. A control example called (case 1) in FIG. 8B, a control example called (case 2) in FIG. 8B, and a control example called (case 3) in FIG. 8B will be sequentially explained as control examples executed by the control unit 205 for the system 1000 on condition that the system 1000 has the system configuration shown in FIGS. 8A and 8B.

The control example (case 1) in FIG. 8B will be explained which is control executed by the control unit 205 for the system 1000 on condition that the system 1000 has the system configuration illustrated in FIGS. 8A and 8B. For example, when the system 1000 has the system configuration in FIGS. 8A and 8B, a target job whose print execution request is accepted from a user requires a sheet process (e.g., a stacking process) by the large-volume stacker after a print process. This job is called a "stacker job".

A case will be explained in which the system 1000 processes the stacker job when the system 1000 has the system configuration shown in FIGS. 8A and 8B. In this case, the control unit 205 makes job sheets printed by the print apparatus 100 pass through point A in FIG. 8B, and causes the large-volume stacker to execute the sheet process. The control unit 205 holds the print result of the stacker job having undergone the sheet process (e.g., the stacking process) by the large-volume stacker, at a delivery destination X inside the large-volume stacker shown in FIG. 8B without conveying the print result to another apparatus (e.g., an inline finisher positioned on the output side of the large-volume stacker in the system of FIG. 8B).

An operator can directly take out, from the delivery destination X, the printed material of the stacker job held at the delivery destination X in FIG. 8B. In other words, this configuration can omit a series of apparatus operations and operator operations to convey sheets to a most downstream delivery destination Z in the sheet conveyance direction in FIG. 8B and take out the printed material of the stacker job from the delivery destination Z.

A series of control operations executed by the control unit 205 when the print system 1000 has the system configuration in FIGS. 8A and 8B corresponds to the control example (case 1) in FIG. 8B.

The control example (case 2) in FIG. 8B will be explained which is control executed by the control unit 205 for the system 1000 on condition that the system 1000 has the system configuration illustrated in FIGS. 8A and 8B. For example, when the system 1000 has the system configuration in FIGS. 8A and 8B, a target job whose print execution request is accepted from a user requires a sheet process (e.g., a case binding process or pad binding process) by the glue binding apparatus after a print process. This job is called a "glue binding job".

A case will be explained in which the system 1000 processes the glue binding job when the system 1000 has the system configuration shown in FIGS. 8A and 8B. In this case, the control unit 205 makes job sheets printed by the print apparatus 100 pass through points A and B in FIG. 8B, and causes the glue binding apparatus to execute the sheet process. The control unit 205 holds the print result of the glue binding job having undergone the sheet process (e.g., the case binding process or pad binding process) by the glue binding apparatus, at a delivery destination Y inside the glue binding apparatus shown in FIG. 8B without conveying the print result to another apparatus (e.g., an inline finisher positioned on the output side of the glue binding apparatus in the system of FIG. 8B).

The operator can directly take out, from the delivery destination Y, the printed material of the glue binding job held at the delivery destination Y in FIG. 8B. In other words, this configuration can omit a series of apparatus operations and operator operations to convey sheets to the most downstream delivery destination Z in the sheet conveyance direction in FIG. 8B and take out the printed material of the glue binding job from the delivery destination Z.

A series of control operations executed by the control unit 205 when the print system 1000 has the system configuration in FIGS. 8A and 8B corresponds to the control example (case 2) in FIG. 8B.

The control example (case 3) in FIG. 8B will be explained which is control executed by the control unit 205 for the system 1000 on condition that the system 1000 has the system configuration illustrated in FIGS. 8A and 8B. For example, when the system 1000 has the system configuration in FIGS. 8A and 8B, a target job whose print execution request is accepted from a user requires a sheet process (e.g., a saddle-stitching process, punching process, cutting process, shift delivery process, or folding process) by the saddle-stitching apparatus after a print process. This job is called a "saddle-stitching job".

A case will be explained in which the system 1000 processes the saddle-stitching job when the system 1000 has the system configuration shown in FIGS. 8A and 8B. In this case, the control unit 205 makes job sheets printed by the print apparatus 100 pass through points A, B, and C in FIG. 8B, and causes the saddle-stitching apparatus to execute the sheet process. The control unit 205 holds the print result of the saddle-stitching job having undergone the sheet process by the saddle-stitching apparatus, at the delivery destination Z of the saddle-stitching apparatus shown in FIG. 8B without conveying the print result to another apparatus.

The delivery destination Z in FIG. 8B has a plurality of delivery destination candidates. This is because the saddle-stitching apparatus of the embodiment can execute a plurality of sheet processes and the delivery destination changes in each sheet process, which will be described with reference to FIG. 13.

A series of control operations executed by the control unit 205 when the print system 1000 has the system configuration in FIGS. 8A and 8B corresponds to the control example (case 3) in FIG. 8B.

As described above, the control unit 205 serving as an example of the control unit of the embodiment also executes paper handling control based on system configuration information of the system 1000 that is stored in the HDD 209.

Information corresponding to the system configuration information contains information representing whether the system comprises an inline finisher, and when the system comprises an inline finisher, information on the number of inline finishers and their performance information. When the system comprises a plurality of inline finishers, their connection order information is also contained in the system configuration information.

As shown in FIGS. 1 to 3, 8A, 8B, and the like, the print system 1000 according to the embodiment enables connecting a plurality of inline type sheet-processing apparatuses to the print apparatus 100. As is apparent from a comparison between FIGS. 8A and 8B and FIGS. 9A, 9B, 10A, and 10B (to be described later), a plurality of inline type sheet-processing apparatuses can be independently connected or disconnected, or a free combination of them can be attached to the print apparatus 100. The connection order of the inline type sheet-processing apparatuses is arbitrary as long as they are physically connectable. However, the embodiment imposes restrictions on the system configuration.

For example, an apparatus permitted to be adopted as an inline type sheet-processing apparatus in the system 1000 must satisfy the following constituent components.

A sheet-processing apparatus can execute a sheet process for sheets of a job requiring a sheet process executable by the sheet-processing apparatus, and has a sheet conveyance function of receiving, from a preceding apparatus, sheets of a job requiring no sheet process by the sheet-processing apparatus and transferring them to a succeeding apparatus. In this example, this sheet-processing apparatus corresponds to the large-volume stacker and glue binding apparatus shown in the system configuration of FIGS. 8A and 8B and that of FIGS. 9A and 9B (to be described later).

The embodiment also permits the use of a sheet-processing apparatus, which does not meet the above configuration, as an inline type sheet-processing apparatus in the system 1000. For example, this apparatus satisfies the following components.

A sheet-processing apparatus can execute a sheet process for sheets of a job requiring a sheet process executable by the sheet-processing apparatus, but does not have the sheet conveyance function of receiving, from a preceding apparatus, sheets of a job requiring no sheet process by the sheet-processing apparatus and transferring them to a succeeding apparatus. In this example, this sheet-processing apparatus corresponds to the saddle-stitching apparatus shown in the system configuration of FIGS. 8A and 8B, that of FIGS. 9A and 9B, and that of FIGS. 10A and 10B (to be described later). The embodiment imposes restrictions on an apparatus of this type.

For example, when the print system 1000 employs an inline finisher (e.g., the saddle-stitching apparatus in FIGS. 8A and 8B) having no function of conveying sheets to a succeeding apparatus, the number of apparatuses of this type is limited to one. However, the embodiment permits simultaneous use of inline finishers of another type.

For example, the embodiment permits the use of the large-volume stacker and glue binding apparatus together with the saddle-stitching apparatus, as represented by the system configuration of FIGS. 8A and 8B and that of FIGS. 9A and 9B (to be described later). When a plurality of sheet-processing apparatuses are cascade-connected and used, an inline type sheet-processing apparatus having no function of conveying sheets to a succeeding apparatus is installed at the most downstream position in the sheet conveyance direction.

For example, the saddle-stitching apparatus is connected last in the system 1000, as represented by the system configuration of FIGS. 8A and 8B and that of FIGS. 9A and 9B (to be described later). That is, it is inhibited to configure the system by interposing the saddle-stitching apparatus between the large-volume stacker and the glue binding apparatus, as a system configuration different from that of FIGS. 8A and 8B and that of FIGS. 9A and 9B (to be described later).

The control unit 205 of the system 1000 comprehensively controls the system 1000 so as to operate under the above-described restrictions.

For example, if inline type sheet-processing apparatuses are connected in a connection order which violates the restrictions, the control unit 205 causes the UI unit to display a warning. For example, when a user inputs the connection order of sheet-processing apparatuses via the UI unit, as represented by the above-mentioned configuration, the control unit 205 controls to invalidate a user setting which violates the restrictions. For example, the control unit 205 executes gray-out display or hatching display to inhibit any improper connection setting.

By employing the above configuration, any user operation error, apparatus malfunction, and the like can be prevented in the configuration of the embodiment. That is, this configuration further enhances effects described in the embodiment.

On the premise of this configuration, the embodiment can freely build the system configuration of the system 1000 under the restrictions.

For example, the operator of the POD system 10000 can arbitrarily determine and change the connection order of inline type sheet-processing apparatuses and the number of connected inline type sheet-processing apparatuses under the restrictions. The system 1000 executes control corresponding to the system configuration status. An example of this control will be described.

The print system 1000 can also take the system configuration in FIG. 9A, as an example of a system configuration in which the connection order of inline type sheet-processing apparatuses changes from that in the system configuration of FIG. 8A.

Figure 9B:
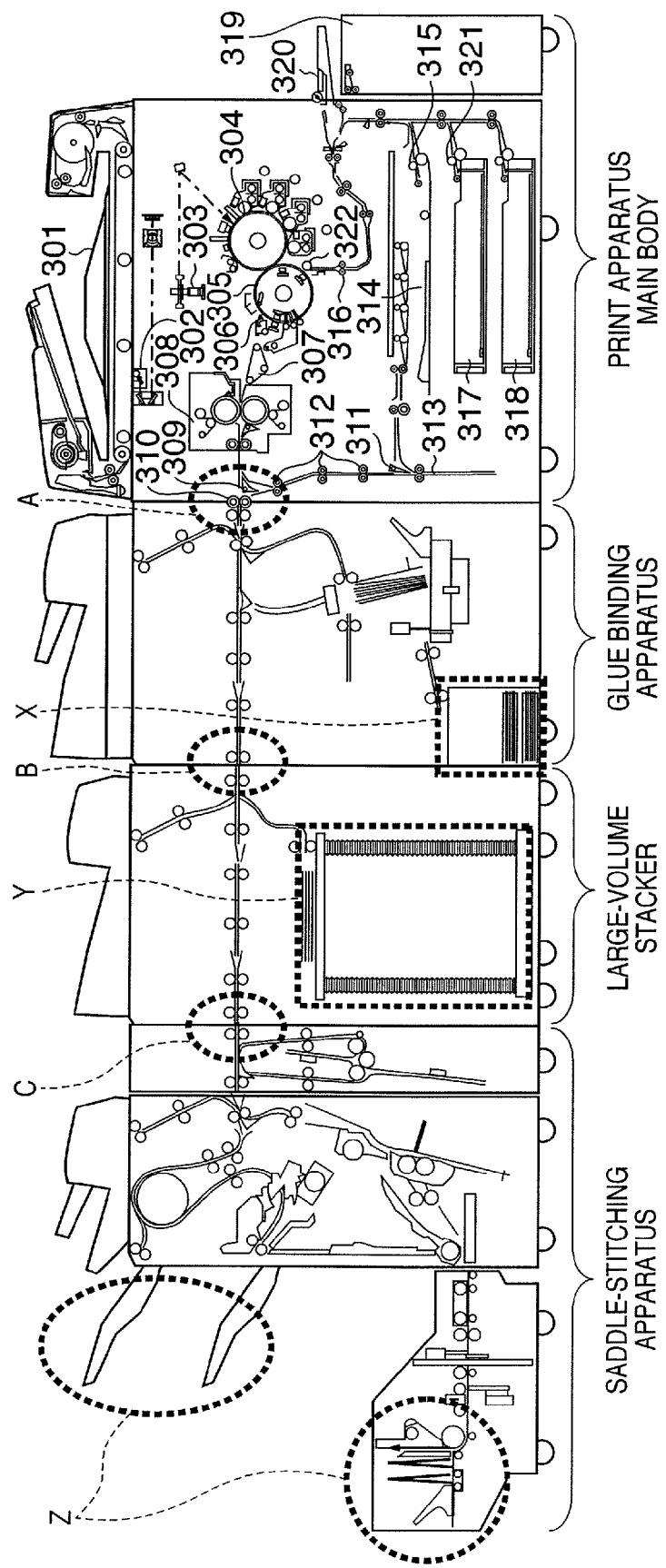
FIG. 9B is a view for explaining the control example of the print system 1000 to be controlled in the embodiment.

The system configuration of FIG. 9A is different from that of FIG. 8A in the connection order of inline sheet-processing apparatuses of the system 1000. More specifically, the print system 1000 is built by connecting the print apparatus 100 the glue binding apparatus the large-volume stacker the saddle-stitching apparatus in the order named. The internal system configuration in this case is as shown in FIG. 9B.

FIG. 9B is a sectional view of the apparatuses of the whole print system 1000 when the print system 1000 has the system configuration in FIG. 9A. The system configuration in FIG. 9B corresponds to the internal system configuration in FIG. 9A.

Similar to the above-described system configuration example, the internal system configuration in FIG. 9B can also supply a sheet printed by the printer unit 203 of the print apparatus 100 into the respective sheet-processing apparatuses. More specifically, as shown in FIG. 9B, the respective sheet-processing apparatuses comprise sheet-feeding paths capable of feeding a sheet from the printer unit 203 via points A, B, and C in the apparatuses.

The system configuration in FIGS. 9A and 9B also follows the above restrictions. For example, the sheet-processing apparatuses cascade-connect to the print apparatus 100 so as to install the saddle-stitching apparatus at the most downstream position in the sheet conveyance direction.

On the premise of the above system configuration, for example, when the print system 1000 has the system configuration shown in FIGS. 9A and 9B, the control unit 205 executes the following control for a job for which the user issues a print execution request via the UI unit according to the above-described method. A control example called (case 1) in FIG. 9B, a control example called (case 2) in FIG. 9B, and a control example called (case 3) in FIG. 9B will be sequentially explained as control examples executed by the control unit 205 for the system 1000 on condition that the system 1000 has the system configuration shown in FIGS. 9A and 9B.

The control example (case 1) in FIG. 9B will be explained which is control executed by the control unit 205 for the system 1000 on condition that the system 1000 has the system configuration illustrated in FIGS. 9A and 9B. For example, when the system 1000 has the system configuration in FIGS. 9A and 9B, a target job whose print execution request is accepted from a user requires a sheet process (e.g., a stacking process) by the large-volume stacker after a print process. This job is called a "stacker job".

A case will be explained in which the system 1000 processes the stacker job when the system 1000 has the system configuration shown in FIGS. 9A and 9B. In this case, the control unit 205 makes job sheets printed by the print apparatus 100 pass through points A and B in FIG. 9B, and causes the large-volume stacker to execute the sheet process. The control unit 205 holds the print result of the stacker job having undergone the sheet process (e.g., the stacking process) by the large-volume stacker, at the delivery destination Y inside the large-volume stacker shown in FIG. 9B without conveying the print result to another apparatus (e.g., an inline finisher positioned on the output side of the large-volume stacker in the system of FIG. 9B).

An operator can directly take out, from the delivery destination Y, the printed material of the stacker job held at the delivery destination Y in FIG. 9B. In other words, this configuration can omit a series of apparatus operations and operator operations to convey sheets to the most downstream delivery destination Z in the sheet conveyance direction in FIG. 9B and take out the printed material of the stacker job from the delivery destination Z.

A series of control operations executed by the control unit 205 when the print system 1000 has the system configuration in FIGS. 9A and 9B corresponds to the control example (case 1) in FIG. 9B.

The control example (case 2) in FIG. 9B will be explained which is control executed by the control unit 205 for the system 1000 on condition that the system 1000 has the system configuration illustrated in FIGS. 9A and 9B. For example, when the system 1000 has the system configuration in FIGS. 9A and 9B, a target job whose print execution request is accepted from a user requires a sheet process (e.g., a case binding process or pad binding process) by the glue binding apparatus after a print process. This job is called a "glue binding job".

A case will be explained in which the system 1000 processes the glue binding job when the system 1000 has the system configuration shown in FIGS. 9A and 9B. In this case, the control unit 205 makes job sheets printed by the print apparatus 100 pass through point A in FIG. 9B, and causes the glue binding apparatus to execute the sheet process. The control unit 205 holds the print result of the glue binding job having undergone the sheet process (e.g., the case binding process or pad binding process) by the glue binding apparatus, at the delivery destination X inside the glue binding apparatus shown in FIG. 9B without conveying the print result to another apparatus (e.g., an inline finisher positioned on the output side of the glue binding apparatus in the system of FIG. 9B).

The operator can directly take out, from the delivery destination X, the printed material of the glue binding job held at the delivery destination X in FIG. 9B. In other words, this configuration can omit a series of apparatus operations and operator operations to convey sheets to the most downstream delivery destination Z in the sheet conveyance direction in FIG. 9B and take out the printed material of the glue binding job from the delivery destination Z.

A series of control operations executed by the control unit 205 when the print system 1000 has the system configuration in FIGS. 9A and 9B corresponds to the control example (case 2) in FIG. 9B.

The control example (case 3) in FIG. 9B will be explained which is control executed by the control unit 205 for the system 1000 on condition that the system 1000 has the system configuration illustrated in FIGS. 9A and 9B. For example, when the system 1000 has the system configuration in FIGS. 9A and 9B, a target job whose print execution request is accepted from a user requires a sheet process (e.g., a saddle-stitching process, punching process, cutting process, shift delivery process, or folding process) by the saddle-stitching apparatus after a print process. This job is called a "saddle-stitching job".

A case will be explained in which the system 1000 processes the saddle-stitching job when the system 1000 has the system configuration shown in FIGS. 9A and 9B. In this case, the control unit 205 makes job sheets printed by the print apparatus 100 pass through points A, B, and C in FIG. 9B, and causes the saddle-stitching apparatus to execute the sheet process. The control unit 205 holds the print result of the saddle-stitching job having undergone the sheet process by the saddle-stitching apparatus, at the delivery destination Z of the saddle-stitching apparatus shown in FIG. 9B without conveying the print result to another apparatus.

The delivery destination Z in FIG. 9B has a plurality of delivery destination candidates. This is because the saddle-stitching apparatus of the embodiment can execute a plurality of sheet processes and the delivery destination changes in each sheet process, which will be described with reference to FIG. 13.

A series of control operations executed by the control unit 205 when the print system 1000 has the system configuration in FIGS. 9A and 9B corresponds to the control example (case 3) in FIG. 9B.

As illustrated in FIGS. 8A, 8B, 9A, and 9B, the print system 1000 can flexibly change the connection order of sheet-processing apparatuses permitted to be used as inline sheet-processing apparatuses under the restrictions. The present invention provides many mechanisms for maximizing the above-described effects of the embodiment.

From this viewpoint, in the embodiment, the system 1000 can properly employ a configuration other than the system configurations as shown in FIGS. 8A, 8B, 9A, and 9B. An example of this configuration will be explained below.

For example, the system configurations in FIGS. 8A, 8B, 9A, and 9B each comprise three inline type sheet-processing apparatuses. In the embodiment, a user can arbitrarily determine the number of inline type sheet-processing apparatuses under the restrictions.

For example, the print system 1000 can also adopt the system configuration in FIG. 10A.

The system configuration of FIG. 10A is different from those of FIGS. 8A and 9A in the number of connected sheet-processing apparatuses. More specifically, the print system 1000 is built by connecting two sheet-processing apparatuses in the order of the print apparatus 100→the large-volume stacker→the saddle-stitching apparatus. The internal system configuration in this case is as shown in FIG. 10B.

FIG. 10B is a sectional view of the system configuration of the overall print system 1000 when the print system 1000 has the system configuration in FIG. 10A. The apparatus configuration of FIG. 10B corresponds to that of FIG. 10A.

Similar to the above-described system configuration examples, the internal apparatus configuration in FIG. 10B can also supply a sheet printed by the printer unit 203 of the print apparatus 100 into the respective sheet-processing apparatuses. More specifically, as shown in FIG. 10B, the respective sheet-processing apparatuses comprise sheet-feeding paths capable of feeding a sheet via points A and B in the apparatuses. This system configuration also follows the above restrictions. For example, the sheet-processing apparatuses are connected so as to install the saddle-stitching apparatus at the most downstream position in the sheet conveyance direction.

On the premise of the above system configuration, for example, when the print system 1000 has the system configuration as shown in FIGS. 10A and 10B, the control unit 205 executes the following control for a job for which the user issues a print execution request via the UI unit according to the above-described method. A control example called (case 1) in FIG. 10B, a control example called (case 2) in FIG. 10B, and a control example called (inhibition control) in FIG. 10B will be sequentially explained as control examples executed by the control unit 205 for the system 1000 on condition that the system 1000 has the system configuration shown in FIGS. 10A and 10B.

The control example (case 1) in FIG. 10B will be explained which is control executed by the control unit 205 for the system 1000 on condition that the system 1000 has the system configuration illustrated in FIGS. 10A and 10B. For example, when the system 1000 has the system configuration in FIGS. 10A and 10B, a target job whose print execution request is accepted from a user requires a sheet process (e.g., a stacking process) by the large-volume stacker after a print process. This job is called a "stacker job".

A case will be explained in which the system 1000 processes the stacker job when the system 1000 has the system configuration shown in FIGS. 10A and 10B. In this case, the control unit 205 makes job sheets printed by the print apparatus 100 pass through point A in FIG. 10B, and causes the large-volume stacker to execute the sheet process. The control unit 205 holds the print result of the stacker job having undergone the sheet process (e.g., the stacking process) by the large-volume stacker, at the delivery destination X inside the large-volume stacker shown in FIG. 10B without conveying the print result to another apparatus (e.g., an inline finisher positioned on the output side of the large-volume stacker in the system of FIG. 10B).

An operator can directly take out, from the delivery destination X, the printed material of the stacker job held at the delivery destination X in FIG. 10B. In other words, this configuration can omit a series of apparatus operations and operator operations to convey sheets to the most downstream delivery destination Y in the sheet conveyance direction in FIG. 10B and take out the printed material of the stacker job from the delivery destination Y.

A series of control operations executed by the control unit 205 when the print system 1000 has the system configuration in FIGS. 10A and 10B corresponds to the control example (case 1) in FIG. 10B.

The control example (case 2) in FIG. 10B will be explained which is control executed by the control unit 205 for the system 1000 on condition that the system 1000 has the system configuration illustrated in FIGS. 10A and 10B. For example, when the system 1000 has the system configuration in FIGS. 10A and 10B, a target job whose print execution request is accepted from a user requires a sheet process (e.g., a saddle-stitching process, punching process, cutting process, shift delivery process, or folding process) by the saddle-stitching apparatus after a print process. This job is called a "saddle-stitching job".

A case will be explained in which the system 1000 processes the saddle-stitching job when the system 1000 has the system configuration shown in FIGS. 10A and 10B. In this case, the control unit 205 makes job sheets printed by the print apparatus 100 pass through points A and B in FIG. 10B, and causes the saddle-stitching apparatus to execute the sheet process. The control unit 205 holds the print result of the saddle-stitching job having undergone the sheet process by the saddle-stitching apparatus, at the delivery destination Y of the saddle-stitching apparatus shown in FIG. 10B without conveying the print result to another apparatus.

The delivery destination Y in FIG. 10B has a plurality of delivery destination candidates. This is because the saddle-stitching apparatus of the embodiment can execute a plurality of sheet processes and the delivery destination changes in each sheet process, which will be described with reference to FIG. 13.

A series of control operations executed by the control unit 205 when the print system 1000 has the system configuration in FIGS. 10A and 10B corresponds to the control example (case 2) in FIG. 10B.

In the system configuration of FIGS. 10A and 10B, the control unit 205 inhibits accepting a request from the user to execute a sheet process (e.g., a case binding process or pad binding process) by the glue binding apparatus. This control is (inhibition control) in FIG. 10B which is control executed by the control unit 205 for the system 1000 on condition that the system 1000 has the system configuration illustrated in FIGS. 10A and 10B. A detailed example of (inhibition control) in FIG. 10B will be described.

For example, when the print system has the system configuration as in FIGS. 10A and 10B, the control unit 205 controls the UI unit to hatch or gray out the display keys 707 and 708 in causing the UI unit to execute the display of FIG. 7. In other words, the control unit 205 invalidates user operations to the keys 707 and 708.

When the system 1000 has the system configuration as shown in FIGS. 10A and 10B, as described above, the control unit 205 inhibits the system 1000 from executing the glue binding process.

Control executed by the control unit 205 when the print system 1000 has the system configuration in FIGS. 10A and 10B corresponds to (inhibition control) in FIG. 10B.

As described above, the control unit 205 executes various control examples depending on the number of connected inline type sheet-processing apparatuses in the print system 1000. That is, the control unit 205 executes various control examples corresponding to sheet process types executable by the system 1000.

As is apparent from the description of FIGS. 8A to 10B and the like, the control unit 205 of the print system 1000 causes the system 1000 to execute various control examples corresponding to system configuration statuses (the number of connected inline sheet-processing apparatuses and the connection order) of the system 1000.

The embodiment flexibly changes the connection order of inline sheet-processing apparatuses and the number of connected inline sheet-processing apparatuses in the print system 1000 so as to meet user needs because the embodiment considers all user merits.

The reason why each inline type sheet-processing apparatus permitted to be used in the system 1000 is an independent housing and is detachable from the print apparatus will be described.

As one reason, this mechanism considers a company or the like which does not require any case binding process but wants to perform a large-volume stacking process, as a POD company which is the delivery destination of the system 1000.

In the system use environment, a need to implement all the nine sheet processes by inline sheet-processing apparatuses is expected. A need to implement only a specific sheet process by an inline sheet-processing apparatus may also arise. The embodiment provides a mechanism coping with various needs from respective POD companies serving as delivery destinations.

The reason why inline type sheet-processing apparatuses permitted to be used in the system 1000 can be arbitrarily changed in connection order and combined under the restrictions will be explained. This reason is also a reason for setting a delivery destination at which an operator can take out a printed material from each inline sheet-processing apparatus, as shown in FIGS. 8A, 8B, 9A, and 9B.

As one reason, user friendliness of the system 1000 improves by flexibly building the system in accordance with the use frequencies of sheet processes requested in the print system 1000.

For example, a POD company having the POD system 10000 in FIG. 1 tends to receive a relatively large number of print jobs requiring a case binding process for a user manual, guidebook, and the like, as print form needs from customers. In this use environment, it is more convenient to build the system 1000 not in the connection order as shown in FIGS. 8A and 8B but in the connection order as shown in FIGS. 9A and 9B.

In other words, it is more convenient to connect the glue binding apparatus at a portion closer to the print apparatus 100. This is because a shorter sheet conveyance distance in the apparatus necessary to execute a case binding process for a case binding job is effective.

For example, as the sheet conveyance distance is longer, the time taken to complete a printed material as the final product of the job is longer. As the sheet conveyance distance is longer, the jam generation rate in the apparatus during a sheet conveyance operation is likely to be higher. These are reasons for the flexible connection order.

For a POD company which receives many case binding jobs as user needs, not the system configuration of FIGS. 8A and 8B but that of FIGS. 9A and 9B can shorten the sheet conveyance distance necessary to create a printed material of a case binding job, and allows quickly taking out the printed material.

Assume that another POD company tends to receive many jobs requiring large-volume sheet stacking. For this POD company, not the system configuration of FIGS. 9A and 9B but that of FIGS. 8A and 8B can shorten the sheet conveyance distance necessary to create a printed material of a stacker job, and allows quickly taking out the printed material.

In this fashion, the embodiment pays attention to an increase in productivity of jobs in the print system 1000 with an efficient, flexible system configuration suited to the use environment. In addition, the embodiment can provide many mechanisms which pursue friendliness to a user who utilizes the system 1000.

Concrete examples of the internal structures of various inline type sheet-processing apparatuses available in the system 1000 illustrated in FIGS. 8A to 10B will be described for each sheet-processing apparatus.

[Internal Structure of Large-Volume Stacker]

Figure 11:
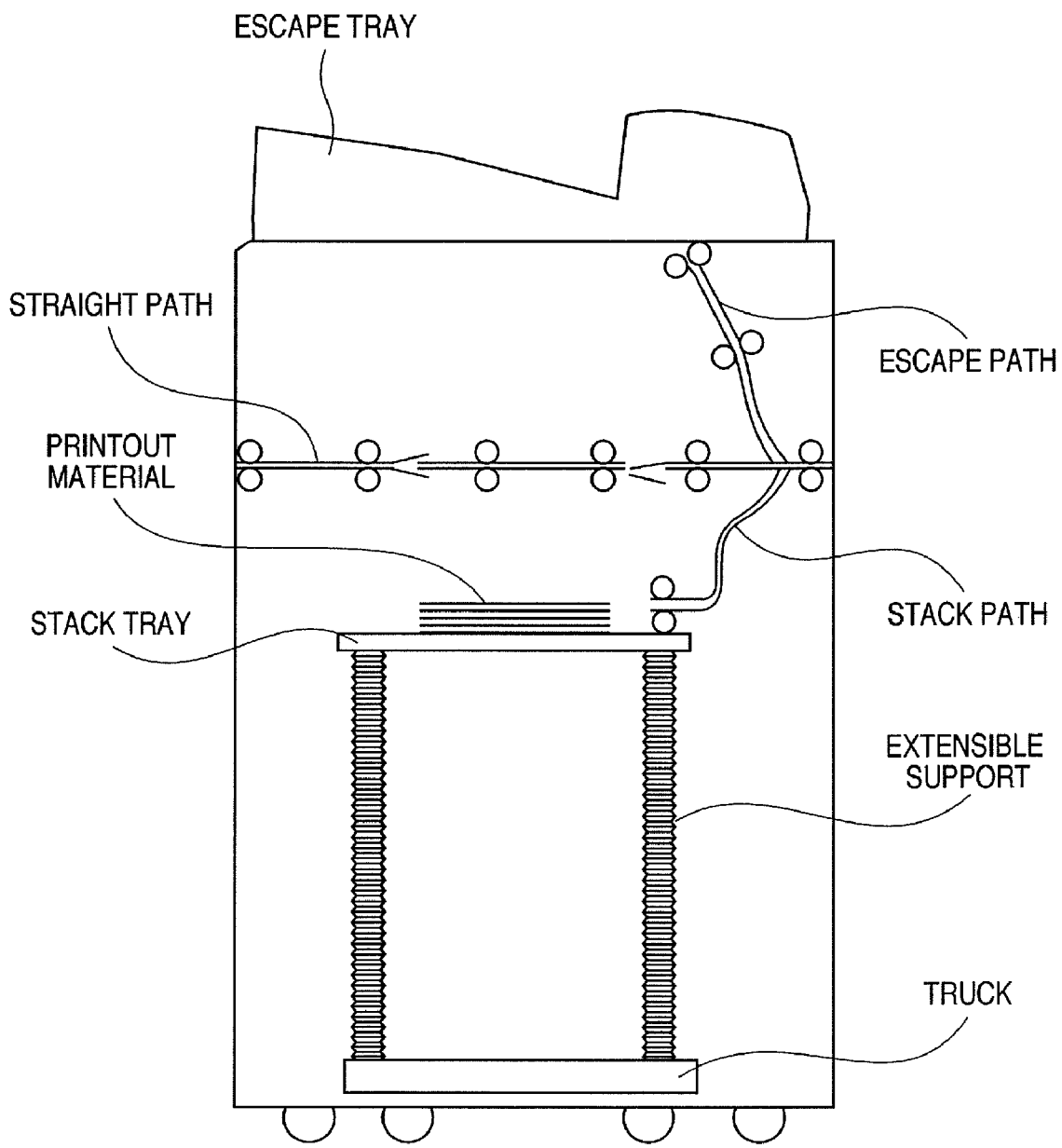
FIG. 11 is a sectional view for explaining an example of the internal structure of an inline finisher to be controlled in the embodiment.

FIG. 11 is a sectional view showing an example of the internal structure of the large-volume stacker in FIGS. 8A to 10B controlled by the control unit 205 in the embodiment.

In the large-volume stacker, the sheet-feeding path extending from the print apparatus 100 is roughly divided into three: a straight path, escape path, and stack path, as shown in FIG. 11. The large-volume stacker incorporates these three sheet-feeding paths.

Figure 12:
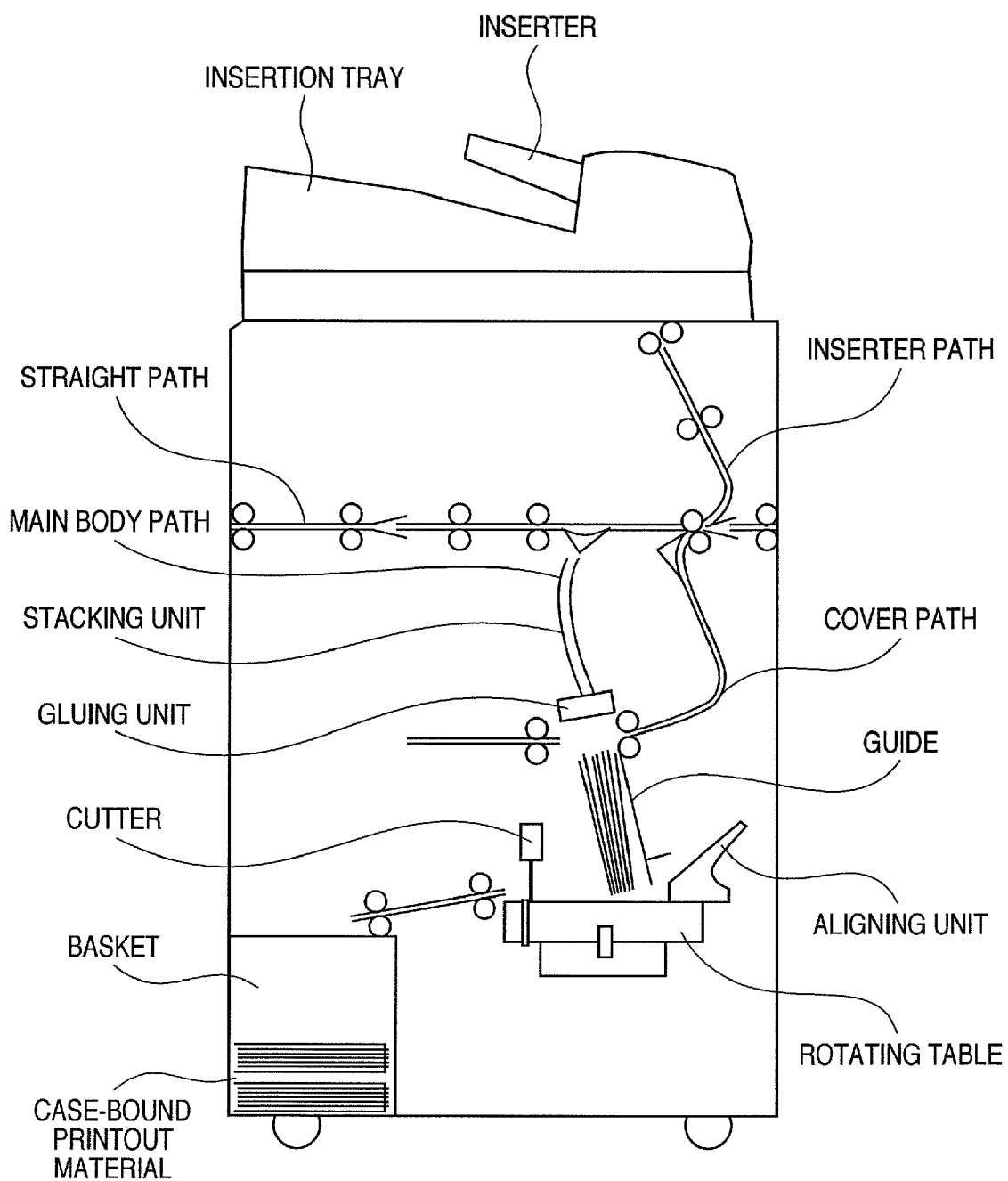
FIG. 12 is a sectional view for explaining an example of the internal structure of an inline finisher to be controlled in the embodiment.

The straight path of the large-volume stacker in FIG. 11 and that of the glue binding apparatus in FIG. 12 function to transfer sheets received from a preceding apparatus to a succeeding apparatus, and are also called through paths in inline sheet-processing apparatuses in this example.

The straight path in the large-volume stacker is a sheet-feeding path for transferring, to a succeeding apparatus, sheets of a job requiring no sheet stacking process by the stacking unit of the stacker. In other words, the straight path is a unit for conveying sheets of a job requiring no sheet process by the sheet-processing apparatus from an upstream apparatus to a downstream apparatus.

The escape path in the large-volume stacker is used to output sheets without stacking them. For example, when no succeeding sheet-processing apparatus is connected, a printed material is conveyed to the escape path and taken out from the stack tray so as to quickly take out the printed material from the stack tray for the purpose of output confirmation work (proof print) or the like.

The sheet-feeding path in the large-volume stacker comprises a plurality of sheet sensors necessary to detect the sheet conveyance status and jam.

The CPU (not shown) of the large-volume stacker notifies the control unit 205 of sheet detection information from each sensor via a signal line (signal line shown in FIG. 2 for electrically connecting the sheet-processing apparatus 200 and control unit 205) for communicating data with the control unit 205. On the basis of the information from the large-volume stacker, the control unit 205 grasps the sheet conveyance status and jam in the large-volume stacker. When the print system 1000 is configured by cascade-connecting another sheet-processing apparatus between the large-volume stacker and the print apparatus 100, the CPU of the large-volume stacker notifies the control unit 205 via the CPU of the sheet-processing apparatus of sensor information of the large-volume stacker. As described above, the large-volume stacker comprises an arrangement unique to an inline finisher.

The stack path in the large-volume stacker is a sheet-feeding path for causing the large-volume stacker to stack sheets of a job requiring a sheet stacking process by the stacking unit of the stacker.

For example, the system 1000 comprises the large-volume stacker shown in FIGS. 8A to 10B. In this system configuration status, the control unit 205 accepts a request from a user via the UI unit by a key operation to the key 709 in the display of FIG. 7 to execute a sheet stacking process executable by the stacker for a target job. The control unit 205 controls to convey sheets to the stack path of the large-volume stacker. The sheets conveyed to the stack path are delivered to the stack tray.

The stack tray in FIG. 11 is a stacking unit mounted on an extensible support. A shock absorber or the like is attached to the joint between the support and the stack tray. The control unit 205 controls the large-volume stacker to stack printed sheets of a target job using the stack tray. A truck supports the extensible support from below it. When attaching a handle (not shown) to the truck, the truck can carry stacked outputs on it to another offline finisher.

When the front door of the stacker is kept closed, the extensible support moves up to a position where outputs are easily stacked. If an operator opens the front door (or issues an opening instruction), the stack tray moves down.

Outputs can be stacked by flat stacking or shift stacking. Flat stacking means always stacking sheets at the same position. Shift stacking means stacking sheets with a shift in a far/near direction every number of copies or jobs so as to divide outputs and easily handle them.

The large-volume stacker permitted to be used as an inline type sheet-processing apparatus in the system 1000 can execute a plurality of stacking methods when stacking sheets from the printer unit 203. The control unit 205 controls such various operations for the stacker.

[Internal Structure of Glue Binding Apparatus]

FIG. 12 is a sectional view showing an example of the internal structure of the glue binding apparatus in FIGS. 8A to 10B controlled by the control unit 205 in the embodiment.

In the glue binding apparatus, the sheet-feeding path extending from the print apparatus 100 is roughly divided into three: a straight path, main body path, and cover path, as shown in FIG. 12. The glue binding apparatus incorporates these three sheet-feeding paths.

The straight path (through path) of the glue binding apparatus in FIG. 12 is a sheet-feeding path functioning to transfer, to a succeeding apparatus, sheets of a job requiring no sheet glue binding process by the glue binding unit of the apparatus. In other words, the straight path is a means for conveying sheets of a job requiring no sheet process by the sheet-processing apparatus from an upstream apparatus to a downstream apparatus.

The sheet-feeding path in the glue binding apparatus comprises a plurality of sheet sensors necessary to detect the sheet conveyance status and jam.

The CPU (not shown) of the glue binding apparatus notifies the control unit 205 of sheet detection information from each sensor via a signal line (signal line shown in FIG. 2 for electrically connecting the sheet-processing apparatus 200 and control unit 205) for communicating data with the control unit 205. On the basis of the information from the glue binding apparatus, the control unit 205 grasps the sheet conveyance status and jam in the glue binding apparatus. When the print system is configured by cascade-connecting another sheet-processing apparatus between the glue binding apparatus and the print apparatus 100, the CPU of the glue binding apparatus notifies the control unit 205 via the CPU of the sheet-processing apparatus of sensor information of the glue binding apparatus. In this manner, the glue binding apparatus comprises an arrangement unique to an inline finisher.

The main body path and cover path in the glue binding apparatus in FIG. 12 are sheet-feeding paths for creating a case-bound printed material.

For example, according to the embodiment, the printer unit 203 prints the print data of a body by a case binding print process. Printed sheets are used as the body of an output material corresponding to a case-bound printed material of one bundle. In case binding, a sheet bundle of a body on which print data corresponding to the body (contents) is printed is called a "main body" in this example. A process to wrap the main body with one cover sheet is executed in the case binding process. The control unit 205 executes various sheet conveyance control examples to convey a cover sheet through the cover path, and convey sheets of the main body printed by the printer unit 203 to the main body path.

In this configuration, the control unit 205 accepts a request from a user via the UI unit by a key operation to the key 707 in the display of FIG. 7 to execute a case binding process executable by the glue binding apparatus for a target job. The control unit 205 controls the apparatus as follows.

For example, the control unit 205 sequentially accumulates sheets printed by the printer unit 203 on the stacking unit via the main body path in FIG. 12. After the stacking unit accumulates sheets of all pages on which body data necessary for sheets of one bundle for a job to be processed are printed, the control unit 205 conveys a cover sheet necessary for the job via the cover path.

Case binding has a matter associated with a feature of the embodiment. In a case binding process as an example of a glue binding process in this example, the number of sheets processible as one sheet bundle is much larger than the number of sheets processible as one sheet bundle by a sheet process different from the glue binding process. For example, the case binding process can process a maximum of 200 sheets as one sheet bundle of the body. To the contrary, the stapling process or the like can process a maximum of 20 print sheets as one sheet bundle, and the saddle-stitching process can process a maximum of 15 print sheets. The allowable number of print sheets to be processed as one sheet bundle is greatly different between the glue binding process and other sheet processes.

In the embodiment, the control unit 205 can control an inline type sheet-processing apparatus to execute the case binding process as a glue binding process. Further, the embodiment can provide new finishing which is not requested in the office environment and is executable by an inline type sheet-processing apparatus. In other words, the above arrangement is one mechanism assuming the POD environment, and is associated with control to be described later.

Case binding can use a cover data pre-printed sheet conveyed from the inserter tray of the inserter of the glue binding apparatus, as shown in FIG. 12. Case binding can also use a sheet bearing a cover image printed by the print apparatus 100. Either sheet is conveyed as a cover sheet to the cover path. Conveyance of the cover sheet is suspended below the stacking unit.

In parallel with this operation, the glue binding apparatus executes a gluing process for a main body of sheets which bear all the pages of the body and are stacked on the stacking unit. For example, the gluing unit applies a predetermined amount of glue to the lower portion of the main body. After the glue spreads sufficiently, the pasted portion of the main body is attached to the center of the cover, covered, and joined. In joining, the main body is pushed down, and the covered main body slides onto a rotating table along the guide. The guide moves so that the covered main body falls onto the rotating table.

The aligning unit aligns the covered main body laid on the rotating table, and the cutter cuts an edge. The rotating table rotates through 90°, the aligning unit aligns the main body, and the cutter cuts the top edge. The rotating table rotates through 180°, the aligning unit aligns the main body, and the cutter cuts the tail edge.

After cutting, the aligning unit pushes the main body to an inner portion, putting the completed covered main body into a basket.

After the glue is satisfactorily dried in the basket, an operator can take out the completed case-bound bundle.

The glue binding apparatus comprises a gluing unit which executes a glue binding process for sheets of a target job for which the user issues a glue binding process execution request together with a print execution request via the UI unit.

As described above with reference to the configuration, the glue binding process executable by an inline type sheet-processing apparatus in the embodiment has many process steps, compared to other sheet processes. The glue binding process requires many preparations before actually gluing a sheet bundle. For example, to glue a sheet bundle, a process to fuse the glue itself is necessary as a preparation. The glue binding process is a sheet process different in configuration from sheet processes such as stapling and saddle-stitching which may be used in the office environment. The process time of the glue binding process taken to complete a sheet process requested by a user is likely to be longer than those of other finishings. The embodiment also pays attention to this point.

As is apparent from merely the glue binding function, the embodiment adopts a mechanism which applies not only to the office environment but also to a new printing environment such as the POD environment, pursues user friendliness and productivity, and puts a print system and product into practical use. For example, new functions such as the case binding function and large-volume stacking function which are not supported in the office environment are provided as constituent features available even in the POD environment. As illustrated in FIGS. 8A to 10B, system configurations capable of connecting a plurality of inline type sheet-processing apparatuses are also mechanisms for achieving this purpose.

It should be noted that the embodiment not only provides the above-described new functions and system configurations, but also finds out and examines problems to be tackled, such as use cases and user needs assumed in the use of the function configurations. One feature is to provide constituent features serving as solutions to the problems. In this way, the embodiment finds out and examines in advance market demands and the like as problems to newly equipped functions and system configurations, and employs mechanisms as configurations considering solutions to the problems when an office-equipment maker finds and enters a new market. This is also a feature of the embodiment. As an example of the constituent features, the control unit 205 executes various control examples in the embodiment.

[Internal Structure of Saddle-stitching Apparatus]

Figure 13:
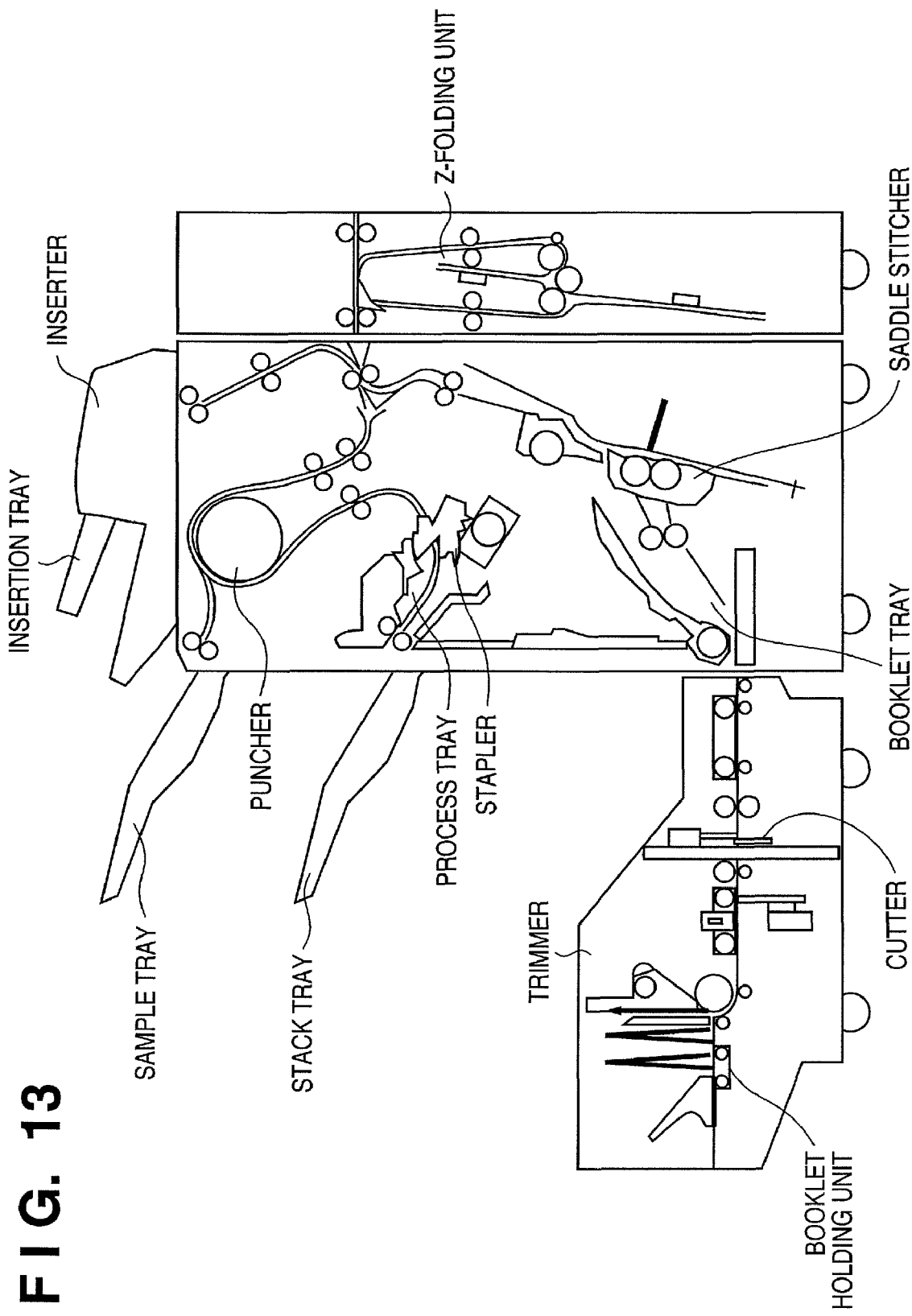
FIG. 13 is a sectional view for explaining an example of the internal structure of an inline finisher to be controlled in the embodiment.

FIG. 13 is a sectional view showing an example of the internal structure of the saddle-stitching apparatus in FIGS. 8A to 10B controlled by the control unit 205 in the embodiment.

The saddle-stitching apparatus incorporates various units for selectively executing a stapling process, cutting process, punching process, folding process, shift delivery process, and the like for sheets from the print apparatus 100. As described in the restrictions, the saddle-stitching apparatus does not have a through path serving as the function of conveying sheets to a succeeding apparatus.

The sheet-feeding path in the saddle-stitching apparatus comprises a plurality of sheet sensors necessary to detect the sheet conveyance status and jam.

The CPU (not shown) of the saddle-stitching apparatus notifies the control unit 205 of sheet detection information from each sensor via a signal line (signal line shown in FIG. 2 for electrically connecting the sheet-processing apparatus 200 and control unit 205) for communicating data with the control unit 205. On the basis of the information from the saddle-stitching apparatus, the control unit 205 grasps the sheet conveyance status and jam in the saddle-stitching apparatus. When the print system is configured by cascade-connecting another sheet-processing apparatus between the saddle-stitching apparatus and the print apparatus 100, the CPU of the saddle-stitching apparatus notifies the control unit 205 via the CPU in the sheet-processing apparatus of sensor information of the saddle-stitching apparatus. The saddle-stitching apparatus comprises an arrangement unique to an inline finisher.

As shown in FIG. 13, the saddle-stitching apparatus comprises a sample tray, stack tray, and booklet tray. The control unit 205 controls to switch the unit for use in accordance with the job type and the number of discharged print sheets.

For example, the control unit 205 accepts, from a user via the UI unit by a key operation to the key 701 in the display of FIG. 7, a request to execute a stapling process by the saddle-stitching apparatus for a target job. The control unit 205 controls to convey sheets from the printer unit 203 to the stack tray. Before discharging print sheets to the stack tray, they are sequentially accumulated on the process tray in the saddle stitcher for each job, and bound by a stapler on the process tray to discharge the print sheet bundle onto the stack tray. According to this method, the control unit 205 causes the saddle-stitching apparatus to staple sheets printed by the printer unit 203.

The saddle-stitching apparatus further comprises a Z-folding unit for folding a sheet in three (Z shape), and a puncher for forming two (or three) holes for filing. The saddle-stitching apparatus executes a process corresponding to each job type. For example, when the user sets the Z-folding process via the operation unit as a setting associated with a print sheet process for a job to be output, the control unit 205 controls the Z-folding unit to fold print sheets of the job. Then, the control unit 205 controls to make the print sheets pass through the apparatus, and deliver them onto a discharge tray such as the stack tray or sample tray. For example, when the user sets the punching process via the operation unit as a setting associated with a print sheet process for a job to be output, the control unit 205 controls the puncher to punch print sheets of the job. Then, the control unit 205 controls to make the print sheets pass through the apparatus, and deliver them onto a discharge tray such as the stack tray or sample tray.

The saddle stitcher performs a saddle-stitching process to bind print sheets at two center portions, pinch the print sheets at their center by rollers, fold them in half, and create a booklet like a pamphlet.

Print sheets bound by the saddle stitcher are discharged onto the booklet tray. Whether a print sheet-processing operation such as a bookbinding process by the saddle stitcher is executable is also based on print sheet process settings made by the user for a job to be output.

The inserter sends print sheets set on the inserter tray to a discharge tray such as the stack tray or sample tray without supplying the print sheets to the printer. The inserter can insert a print sheet set on the inserter between print sheets (sheets printed by the printer unit) sent into the saddle stitcher. The user sets print sheets on the inserter tray of the inserter while the print sheets face up. The pickup roller sequentially feeds print sheets from the top. A print sheet from the inserter is directly conveyed to the stack tray or sample tray, and discharged while facing down. To send a print sheet to the saddle stitcher, the print sheet is fed to the puncher once, and then switched back and fed to adjust the face orientation.

Whether a print sheet-processing operation such as a print sheet insertion process by the inserter is executable is also based on print sheet process settings made by the user for a job to be output.

In the embodiment, for example, the saddle-stitching apparatus also incorporates a cutter (trimmer), which will be described below.

A (saddle-stitched) booklet output from the saddle stitcher enters the trimmer. At this time, the booklet output is fed by a predetermined length by the roller, and cut by a predetermined length by the cutter to align uneven edges between pages of the booklet. The resultant booklet is stored in a booklet holding unit. Whether a print sheet-processing operation such as a cutting process by the trimmer is executable is also based on print sheet process settings made by the user for a job to be output.

As described above, the saddle-stitching apparatus comprises a saddle stitcher which executes a saddle-stitching process for sheets of a target job for which the user issues a saddle-stitching process execution request together with a print execution request via the UI unit.

Figure 14:
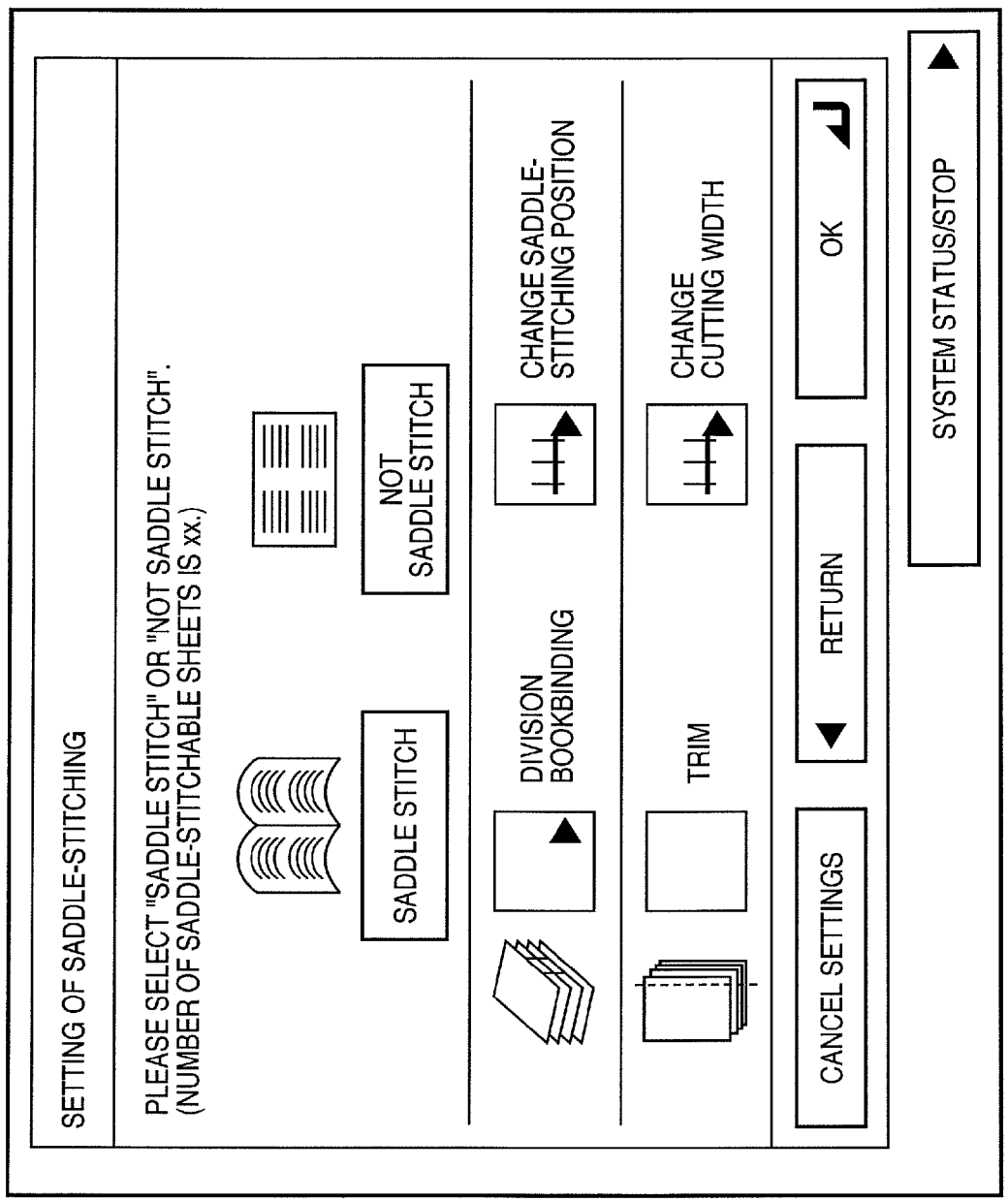
FIG. 14 is a view for explaining an example of display control on the UI unit to be controlled in the embodiment.

For example, when a user selects saddle-stitching with the key 705 in the display of FIG. 7, the control unit 205 causes the UI unit to execute a display in FIG. 14. The control unit 205 controls to accept detailed settings of saddle-stitching via the display in FIG. 14. For example, the control unit 205 determines whether to actually saddle-stitch sheets near their center with staples. The control unit 205 can also accept a setting such as division bookbinding, change of the saddle-stitching position, execution/non-execution of cutting, or change of the cutting width from the user.

Assume that the user sets "saddle-stitch" and "cut" via the display in FIG. 14 executed by the UI unit under the control of the control unit 205. In this case, the control unit 205 controls the operation of the system 1000 to form a target job into a print style as shown in FIG. 15 as the print result of saddle-stitching. As represented by the print result of saddle-stitching in FIG. 15, saddle stitches are put, and the edge is cut. By setting the positions of the saddle stitch and cutting edge in advance, they can be changed to desired positions.

Figure 16:
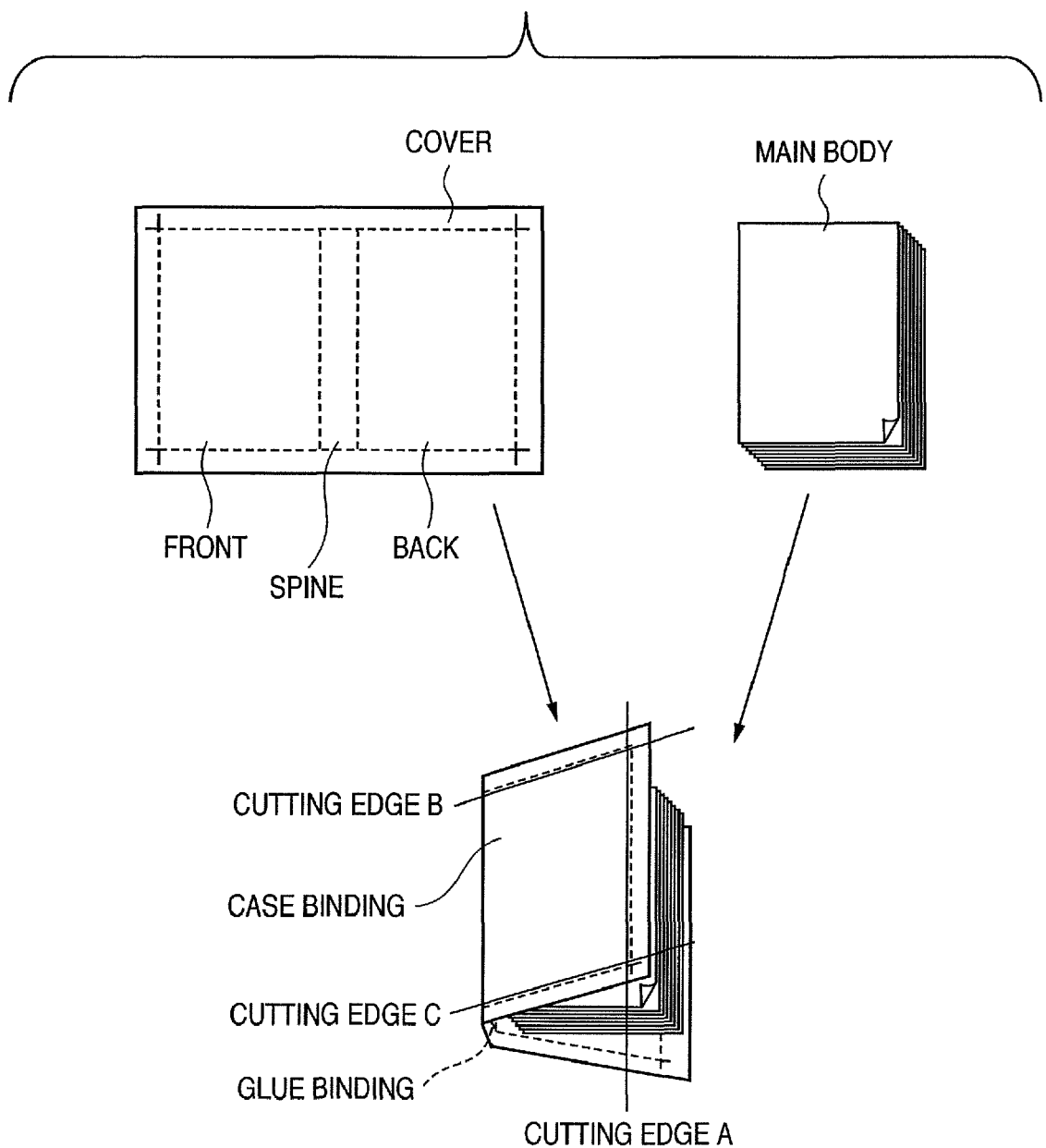
FIG. 16 is a view for explaining a control example when the print system 1000 to be controlled in the embodiment creates a printed material.

When the user requests execution of a case binding process with the key 707 in the display of FIG. 7, the control unit 205 controls the system 1000 so as to form a target job into a print style as shown in FIG. 16 as the print result of case binding. As represented by the example in FIG. 16, the cutting widths of cutting edges A, B, and C can be set for a printed material subjected to case binding.

The print system 1000 can accept a target job print execution request and sheet process execution request even from an information processing apparatus serving as an example of an external apparatus. An example when a host computer uses the print system 1000 will be described.

For example, the system 1000 is controlled as follows when operated by a host computer (e.g., the PC 103 or 104 in FIG. 1) which downloads program data for various processes and control examples in the embodiment from a data supply source (e.g., a WEB) or a specific storage medium. The control entity is the control unit of the PC 103 or 104.

Figure 17A:
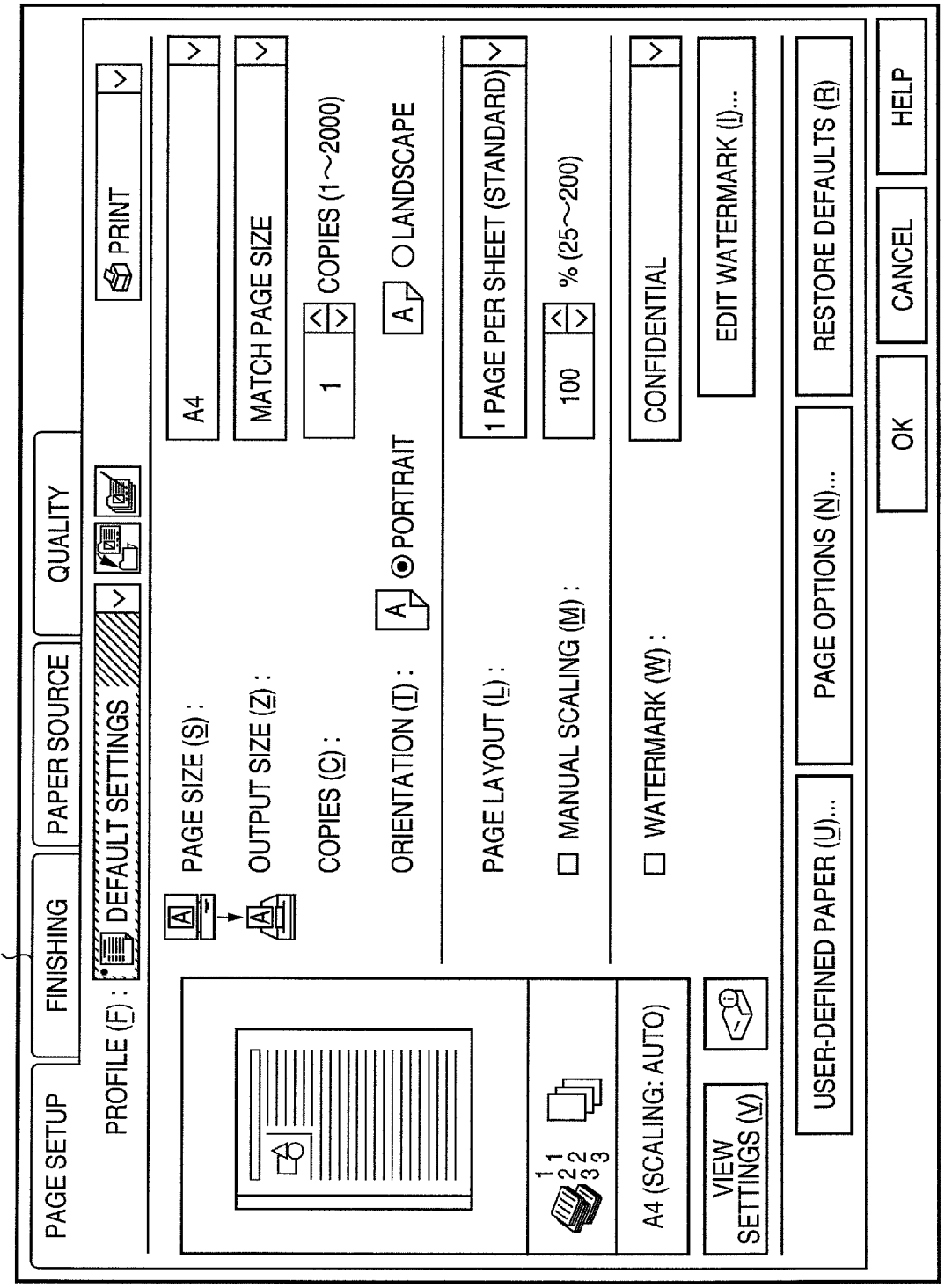
FIG. 17A is a view for explaining an example of display control on the UI unit to be controlled in the embodiment.
Figure 17B:
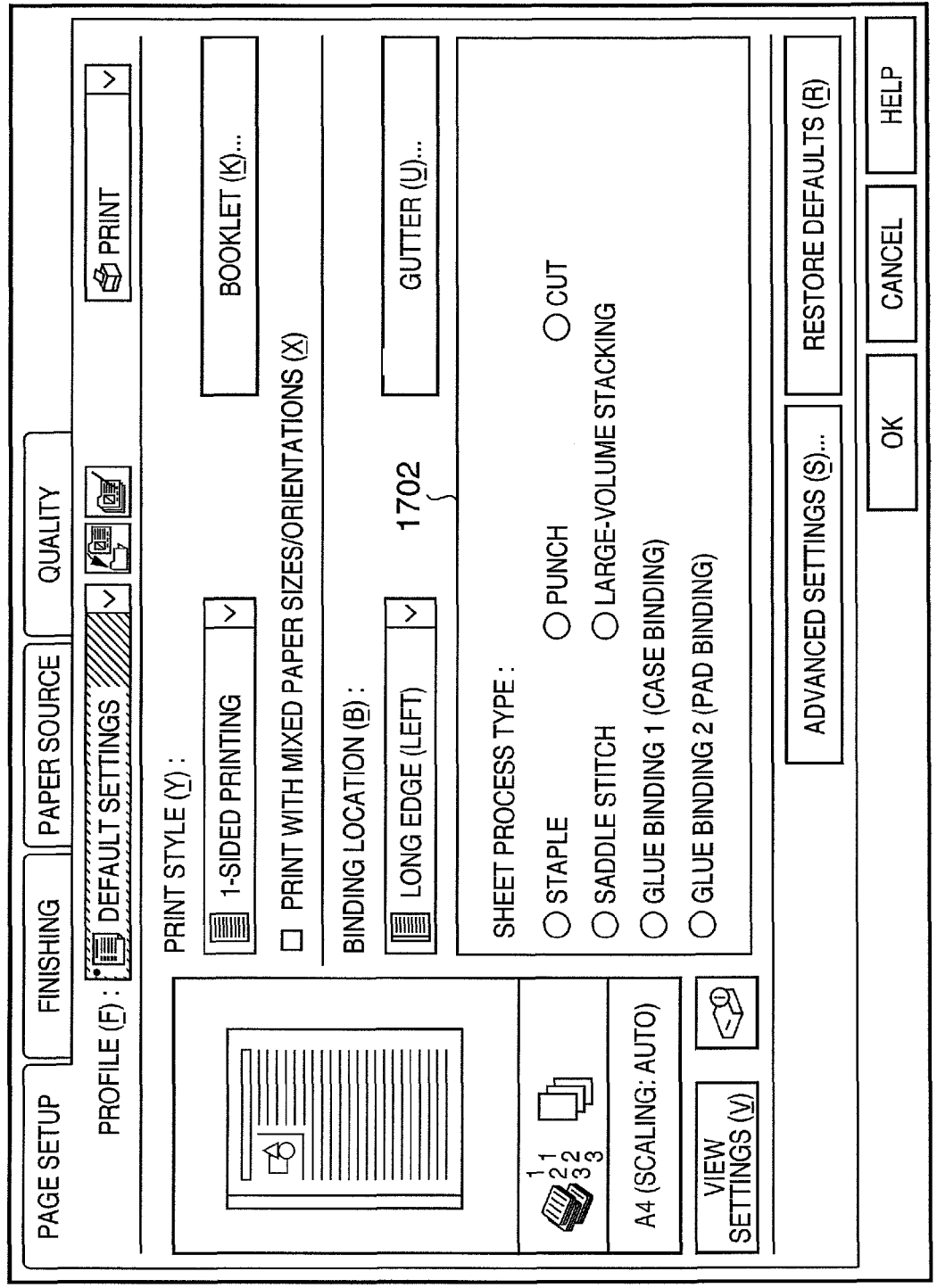
FIG. 17B is a view for explaining an example of display control on the UI unit to be controlled in the embodiment.

Assume that an instruction to activate a printer driver for operating the print apparatus 100 of the system 1000 is issued in response to a mouse or keyboard operation by a user. In response to the instruction, the CPU of the host computer displays a print setup window shown in FIG. 17A on the display unit of the host computer. FIGS. 17A and 17B are views showing examples of user interface windows controlled in the embodiment.

For example, the user presses a finishing key 1701 with the mouse on the operation window of FIG. 17A. Then, the CPU of the host computer controls the display unit to switch the print setup window to one as shown in FIG. 17B.

The CPU of the host computer allows the user to select a sheet process type to be executed by the inline type sheet-processing apparatus 200 of the system 1000 via a sheet process setting item 1702 on the print setup window of FIG. 17B.

Although not shown, the external apparatus including the host computer displays, as windows other than those in FIGS. 17A and 17B, display windows capable of inputting instructions equivalent to those inputtable via various display windows described in detail in the embodiment. In other words, the external apparatus can execute the same processes and control examples as those described in the embodiment.

The user selects a desired sheet process via the sheet process setting item 1702, and returns to the window in FIG. 17A to press the OK key.

In response to this, the CPU of the host computer associates, as one job, commands representing various printing conditions set by the user via the print setup window with a series of data to be printed by the printer unit 203, and transmits the job to the system 1000 via the network 101.

After the external I/F 202 of the system 1000 receives the job from the computer, the control unit 205 of the system 1000 controls the system 1000 to process the job from the host computer on the basis of process components set by the user on the host computer.

The above configuration can obtain various effects described in the embodiment even for a job from an external apparatus or the like, and can further increase the use efficiency of the system 1000.

The control unit of the print system 1000 according to the embodiment executes various control examples to be described below on the premise of the above-described constituent features.

The configurations described with reference to FIGS. 1 to 17B correspond to constituent features common to all examples in the embodiment. For example, various control examples described in the embodiment correspond to constituent features based on these configurations.

As described with reference to FIGS. 1 to 17B, the print system 1000 according to the embodiment can construct a printing environment suitable not only for the office environment but also for the POD environment.

For example, the system 1000 employs a mechanism capable of coping with use cases and user needs which are assumed not in the office environment but in the POD environment.

For example, a POD company can receive orders of various print forms from customers in the POD environment.

More specifically, an inline sheet-processing apparatus can implement finishing (e.g., a glue binding process or large-volume stacking process) which is not requested as a user need in the office environment. In other words, the embodiment can deal with even user needs other than needs (e.g., for stapling) in the office environment in consideration of the POD environment. For example, the print system 1000 can flexibly cope with the business form of a POD company which does business in the POD environment where the print system 1000 is delivered.

For example, a plurality of inline sheet-processing apparatuses are connectable to the print apparatus 100, and each inline sheet-processing apparatus can independently operate as an independent housing, as described above. The number of connected sheet-processing apparatuses is arbitrary, and the print system 1000 can flexibly add or change an inline sheet-processing apparatus.

The embodiment designs the print system 1000 while paying attention to the operability of the user of the print system 1000. For example, the embodiment allows an operator to manually register the system configuration of the print system 1000 in the HDD 209. This configuration will be exemplified.

For example, a POD company wants to build the system configuration shown in FIGS. 8A and 8B as the system configuration of the print system 1000. In this case, the operator of the POD company connects three sheet-processing apparatuses in FIGS. 8A and 8B purchased together with the print apparatus 100 to the print apparatus 100 in the connection order shown in FIGS. 8A and 8B. Then, the operator presses the user mode key 505 of the operation unit 204. In response to this key operation, the control unit 205 causes the display unit 401 to execute a display in FIG. 18A.

The display in FIG. 18A allows the operator to manually input system configuration information of the print system 1000. The control unit 205 allows the operator via displays in FIGS. 18A to 18D to determine the types of inline type sheet-processing apparatuses to be connected to the print apparatus 100. In addition, the control unit 205 allows the operator via the displays in FIGS. 18A to 18D to determine the connection order of inline type sheet-processing apparatuses to be connected to the print apparatus 100.

If the operator presses an "advanced settings" key set for each setting item in the display of FIG. 18A, the control unit 205 displays a window (not shown). This window enables specifying sheet-processing apparatuses used in the print system 1000 one by one. In the embodiment, since the print system 1000 follows the above-mentioned restrictions, the control unit 205 also notifies the operator of this information as guidance information. For example, the control unit 205 notifies the operator of a guidance "please register the types of sheet-processing apparatuses to be connected to the print apparatus, and their connection order. You can connect a maximum of five apparatuses. Please connect a saddle-stitching apparatus as a last apparatus", as shown in FIG. 18A. In this case, the maximum number of connected inline sheet-processing apparatuses is five, but is not limited to this.

The control unit 205 controls the display unit 401 to determine sheet-processing apparatuses for use one by one from the top setting item in FIG. 18A. The control unit 205 determines that the setting order itself from the top setting item is an actual apparatus connection order.

In this configuration, when the print system 1000 has the system configuration shown in FIGS. 8A and 8B, the control unit 205 prompts the operator to register the types of sheet-processing apparatuses and their connection order, like the display in FIG. 18B. More specifically, the control unit 205 prompts the operator to set "large-volume stacker ⇒glue binding apparatus ⇒saddle-stitching apparatus" sequentially from the top setting item, like the display in FIG. 18B. The control unit 205 determines that this setting order is an actual connection order, as shown in FIGS. 8A and 8B.

When the print system 1000 has the system configuration shown in FIGS. 9A and 9B, the control unit 205 prompts the operator to register the types of sheet-processing apparatuses and their connection order, like the display in FIG. 18C. More specifically, the control unit 205 prompts the operator to set "glue binding apparatus ⇒large-volume stacker ⇒saddle-stitching apparatus" sequentially from the top setting item, like the display in FIG. 18C. The control unit 205 determines that this setting order is an actual connection order, as shown in FIGS. 9A and 9B.

When the print system 1000 has the system configuration shown in FIGS. 10A and 10B, the control unit 205 prompts the operator to register the types of sheet-processing apparatuses and their connection order, like the display in FIG. 18D. More specifically, the control unit 205 prompts the operator to set "large-volume stacker ⇒saddle-stitching apparatus" sequentially from the top setting item, like the display in FIG. 18D. The control unit 205 determines that this setting order is an actual connection order, as shown in FIGS. 10A and 10B.

This UI control to improve user friendliness assuming use cases on site is also a feature of the embodiment.

As described with reference to FIGS. 1 to 18D, the system 1000 comprises various mechanisms toward practical use of a product capable of flexibly coping with various use cases and user needs in the POD environment and the like that are different from use cases and user needs in the office environment.

The print system 1000 does not merely have new functions and new configurations as described above. To maximize the effects of the print system 1000, the system 1000 can execute various control examples as follows.

For example, the control unit 205 of the print system 1000 causes the print system 1000 to execute the following control.

Various control examples to be described below are mainly problems arising from the following situation assumed in the system 1000, and solutions to the problems.

For example, the configuration considers even a printing environment capable of various finishings, such as the printing environment of the POD system 10000 in FIG. 1 where the system 1000 is available. In the environment of the POD system 10000, the system 1000 may receive a request from a customer to print five copies, among which four copies require glue binding and one remaining copy requires punching.

In this use case, the system 1000 assumes a user need to execute, e.g., different finishings with print data of the same contents. The system 1000 may meet this request by the following method because finishing changes for the same print data. For example, the system 1000 repeats, a plurality of number of times, a series of work operations such as setting of print process conditions, input of print data, and accumulation of print data in the memory for each finishing. However, this coping method may influence efficiency and productivity in the print system 1000 having a mechanism of maximizing productivity and efficiency, as described above. In other words, this coping method may require improvements in a printing environment such as the POD environment where how to process a plurality of jobs is expected to be important. However, no improvement is proposed at present, so no concrete solution is proposed, either. In practice, no product is commercially available which can deal with use cases and needs on site in an environment such as the POD environment different from the office environment. There is room for further study in commercializing a print apparatus, print system, and the like adaptable not only to the office environment but also to the POD environment.

In order to meet the use environment of the system 1000, use cases, and user needs as described above, the embodiment configures the print system 1000 to execute the following control. This example can provide a printing environment suited even to the POD environment different in use cases and needs from the office environment. For example, the system 1000 can satisfy various needs to perform, e.g., various types of finishings every designated number of copies with print data of the same contents while maintaining high productivity.

In this example, the control unit 205 serving as an example of the control unit of the system 1000 executes various control examples to be described below (e.g., various job control examples of the processes of flowcharts, and display control examples for displaying various UI windows to be described below on the UI unit).

The control unit 205 of the system 1000 controls the system 1000 to execute a series of control operations to be described with reference to FIGS. 24A, 24B, 25A, 25B, 29, and the like and also execute a series of control operations as follows.

For example, the control unit 205 controls to accept a necessary number of copies to be processed from a user via the display of FIG. 6 by a user operation with the ten-key pad 506. The control unit 205 causes the printer unit 203 to print by the number of copies set via the display of FIG. 6. The control unit 205 causes the sheet-processing apparatus 200 to execute a type of sheet process whose execution request is issued from the user, for sheets of a job printed by the printer unit 203 among nine types of sheet processes selectable by the user via the display of FIG. 7.

On the premise of this configuration, assume that the control unit 205 accepts a plurality of copies from a user via the display of FIG. 6 as a process condition of a job to be processed. In this case, the control unit 205 causes the printer unit 203 to print the set number of copies of the job. When executing a sheet process for sheets of the printed job, the control unit 205 executes the sheet process of the printed job for each copy.

In this control, the control unit 205 causes the sheet-processing apparatus 200 to execute finishing for each of sheet bundles of copies to be processed. When a job to be processed requires printing of a plurality of copies, the control unit 205 controls to execute the same type of sheet process for all sheet bundles which are printed materials of the copies. In other words, the control unit 205 allows the sheet-processing apparatus 200 to execute the same type of finishing for each sheet bundle of a job requiring printing of a plurality of copies.

Assume that a target job whose print request is issued from a user via the UI unit provided by the embodiment requires printing of a plurality of copies and different finishings every designated number of copies, like the above-described use cases. In this case, the user sets the number of copies and finishing via the displays of FIGS. 6 and 7 for each sheet process (i.e., for each type) out of his desired types of sheet processes. The control unit 205 stores print data necessary for printing in the HDD 209, and causes the printer unit 203 to print. The control unit 205 causes the sheet-processing apparatus 200 to execute finishing. The control unit 205 causes the system 1000 to execute a series of user settings and a series of apparatus operations repetitively by the number of user-desired finishing types.

Assume that a target job whose print request is issued from a user via the UI unit of the embodiment requires printing of a plurality of copies and a specific type of sheet process every printing of a specific number of copies in printing the plurality of copies, as described above. In this case, the control unit 205 of the embodiment controls the print system 1000 to execute the above-mentioned series of control operations.

For example, as described above, the control unit 205 accepts a series of user operations including receptions of the number of copies subjected to one type of sheet process individually from the user via the display of FIG. 6, the settings of one type of finishing from the user via the display of FIG. 7, and a print start request with the key 503. In response to these user operations, the control unit 205 executes a series of apparatus operations including storage of print data of the job in the HDD 209, printing by the printer unit 203, and a sheet process by the sheet-processing apparatus 200. The control unit 205 executes the series of user operations and the series of apparatus operations for each type of sheet process repetitively the number of times necessary to complete all types of sheet processes requested by the user.

The system 1000 can execute the series of control operations and cope with the above-described use cases.

The embodiment defines the series of control operations executable by the control unit 205 in the system 1000 capable of coping with the use cases, as "control by the standard finishing sequence in printing a plurality of copies".

It should be noted that the embodiment configures the system 1000 to execute a different series of control operations independently in distinction from "control by the standard finishing sequence in printing a plurality of copies". For example, the control unit 205 of the system 1000 can execute the following control example.

This series of control operations is also a mechanism capable of dealing with the use cases, similar to "control by the standard finishing sequence in printing a plurality of copies". However, this series of control operations is a mechanism capable of minimizing intervention work by an operator of the system 1000 necessary for coping with the use cases using "control by the standard finishing sequence in printing a plurality of copies".

In addition, this series of control operations is a mechanism capable of increasing the productivity of jobs in the system 1000 and that of the overall system more than those when coping with the use cases using "control by the standard finishing sequence in printing a plurality of copies". In other words, this series of control operations is an example of a mechanism which achieves an effect capable of satisfying various needs to perform, e.g., various types of finishings every designated number of copies with print data of the same contents on the assumption of a printing environment such as the POD environment. Further, this series of control operations is an example of a mechanism which achieves an effect capable of satisfying various needs arising in a printing environment such as the POD environment while maintaining high productivity of the print system 1000 as much as possible. As an example of the mechanism which can provide these effects, the system 1000 can execute this series of control operations.

The embodiment defines this series of control operations as "control by the high-productivity finishing sequence in printing a plurality of copies".

The embodiment configures the system 1000 to selectively execute "control by the standard finishing sequence in printing a plurality of copies" and "control by the high-productivity finishing sequence in printing a plurality of copies".

For example, the control unit 205 of the system 1000 allows a user to determine, via the UI unit of the system 1000, which of the sequences is executed by the system 1000. For example, the control unit 205 causes the operation unit 204 to execute a display (not shown) which allows the user to determine which of the sequences is executed by the system 1000. The control unit 205 controls the print system 1000 to execute control corresponding to a sequence selected by the user via the display (not shown). The print system 1000 also comprises this constituent feature.

The embodiment configures the system 1000 to selectively execute the two control sequences in order to maximize the effects of the embodiment. However, the embodiment is also applicable even to a configuration incapable of executing "control by the standard finishing sequence in printing a plurality of copies". A configuration capable of executing at least "control by the high-productivity finishing sequence in printing a plurality of copies" can obtain the same effects as those described in the embodiment. In this manner, the present invention incorporates various configurations.

Figure 24A:
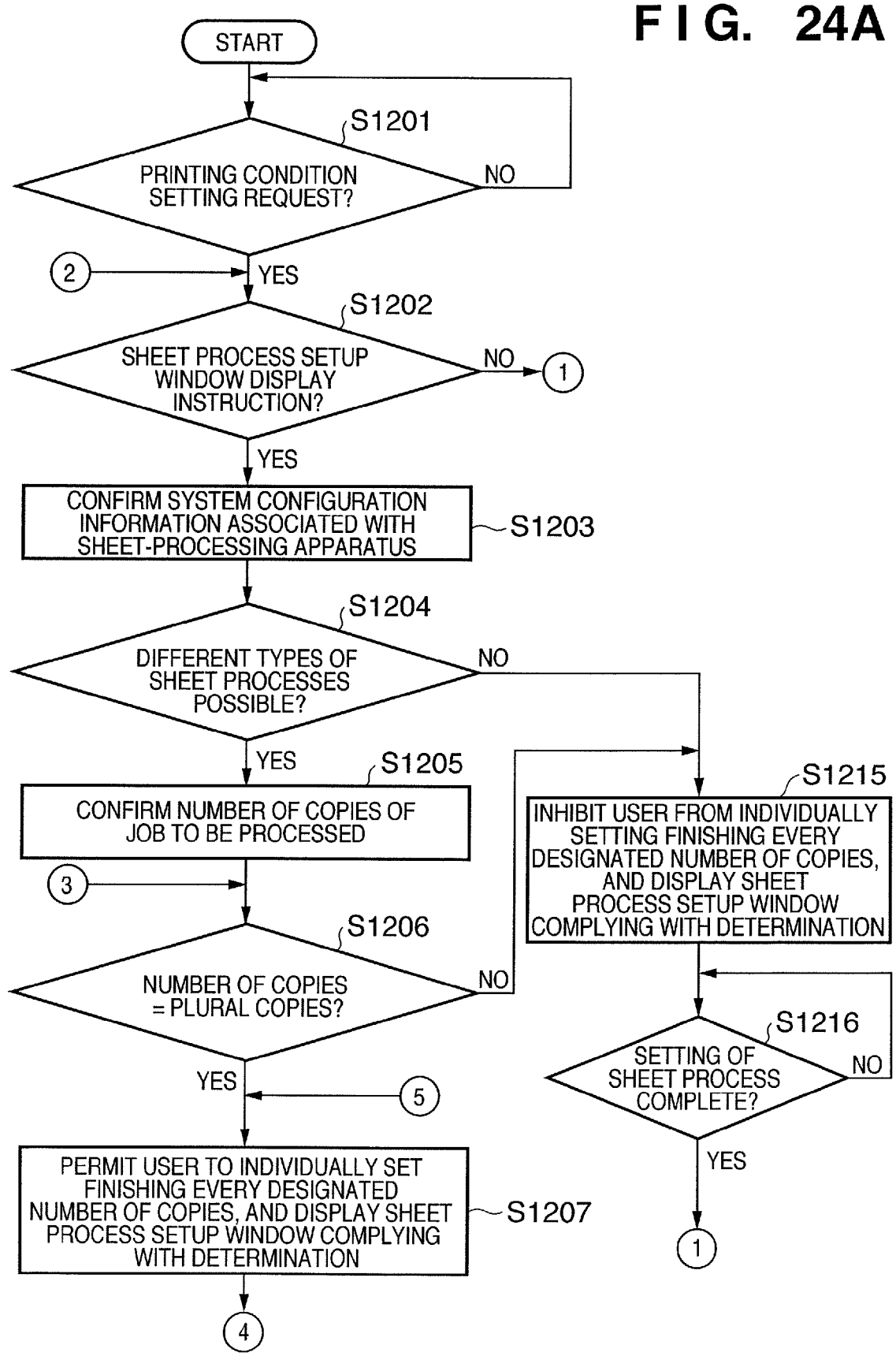
FIGS. 24A and 24B are flowcharts for explaining an example of control to be executed in the embodiment.
Figure 24B:
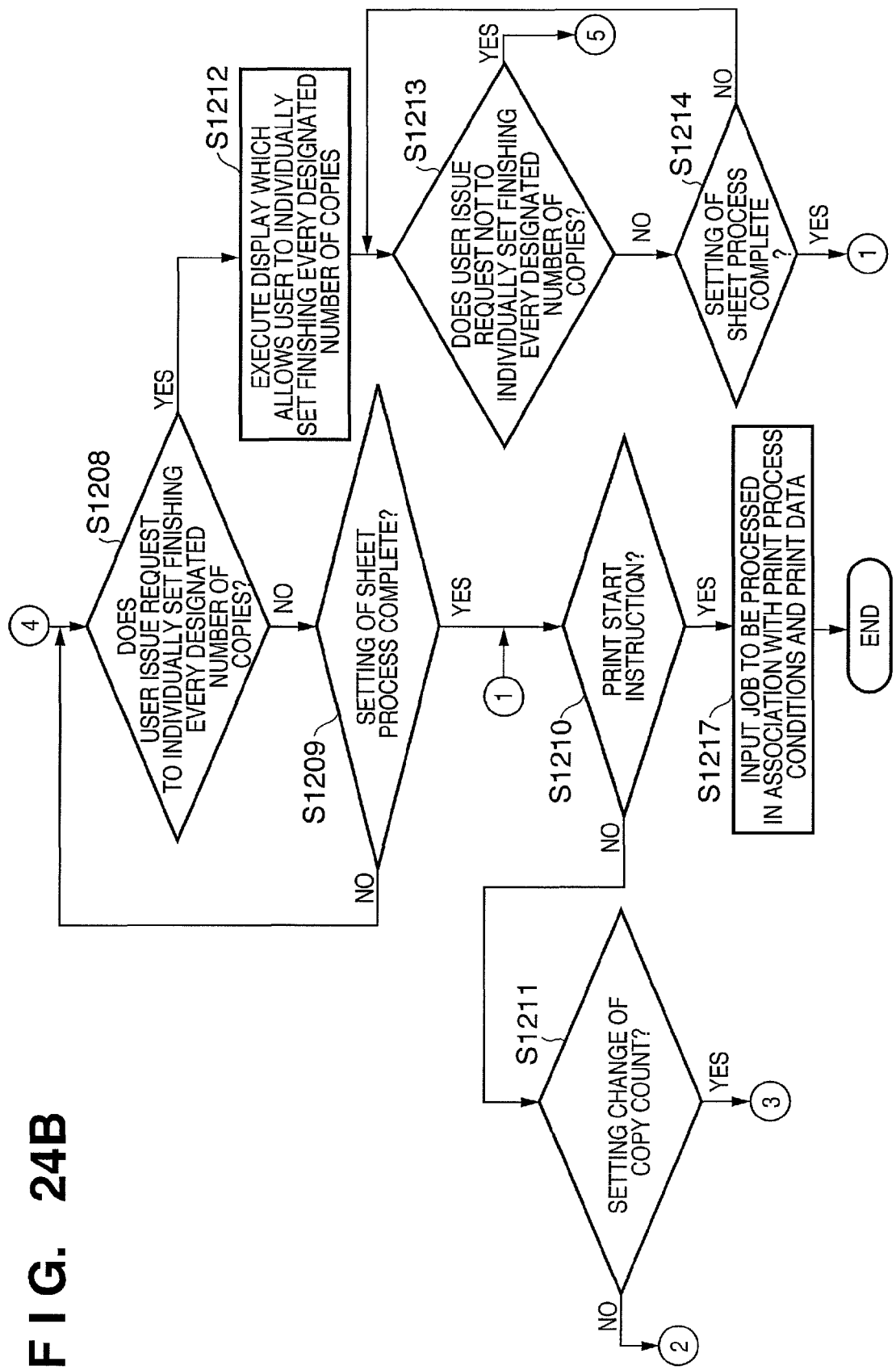

[Description of Control Example (Control Example When Accepting Print Execution Request of Job to be Processed via UI Unit of Print Apparatus 100) Using Process of Flowchart Shown in FIGS. 24A and 24B]

Based on the above description, the process of the flowchart in FIGS. 24A and 24B will be explained which is contained in "control by the high-productivity finishing sequence in printing a plurality of copies". For example, the control unit 205 executes this process by reading out computer-readable program data for executing the process of FIGS. 24A and 24B from the HDD 209. The control unit 205 executes this process when accepting the print execution request of a user-desired job to be printed and the execution requests of user-desired types of sheet processes from the user via the operation unit 204 serving as an example of the UI unit in the embodiment.

Assume that the control unit 205 accepts a print execution request from the user by an operation to the key 503 when executing an operation in the copy mode of the print apparatus 100 in response to selection of the copy tab 601 in the display of FIG. 6 by the user. In this case, the control unit 205 causes the scanner unit 201 of the print apparatus 100 to input a print data string of pages of a job to be processed. The control unit 205 stores the print data string input from the scanner unit 201 in the HDD 209. The control unit 205 causes the printer unit 203 via the HDD 209 to print the print data string stored in the HDD 209 by the number of copies set by the user.

When the type of job to be processed is a job in the copy mode, the control unit 205 controls to execute processes in steps S1201 to S1217 illustrated in FIGS. 24A and 24B.

Assume that the control unit 205 is to execute a print operation using the box mode of the print apparatus 100 in response to selection of the box tab 603 in the display of FIG. 6 by the user. In this case, the control unit 205 accepts the print start request of print data of a job saved in the HDD 209 via a print start key in a box window (not shown) displayed on the display unit 401 upon selecting the box mode. The data to be printed is job data saved in the HDD 209. Data savable in the HDD 209 in the box mode includes a print data string input via the scanner unit 201 and a print data string input via the external I/F 202.

When reading out data saved in the HDD 209 from the HDD 209 using the box mode and printing the data by the printer unit 203, as described above, the control unit 205 accepts the following operations from the user via the operation unit 204. These operations include a box selection operation to select one of data box areas (to be referred to as boxes) ensured in the HDD 209 by the user, and a box document selection operation to select one or a plurality of user-desired jobs to be printed from a plurality of jobs which are stored in the selected box and are to be printed. Through the series of box operations, the control unit 205 has accepted a print execution request with the print start key (not shown) via the operation unit 204. Then, the control unit 205 reads out print data of the requested job to be printed from the HDD 209 and causes the printer unit 203 to print.

Even when the type of job to be processed is a job in the box mode, the control unit 205 controls to execute the process of FIGS. 24A and 24B. As is apparent from a comparison between the operation examples of the two modes in the process flow of a job in the copy mode and that of a job in the box mode, data to be processed in the box mode has already been stored in the HDD 209, so the control unit 205 need not execute processes to, e.g., input print data from the scanner unit 201 after accepting a print execution request.

Before accepting a print execution request from the user via the operation unit 204, the control unit 205 of the system 1000 controls to accept the following user request via the UI unit regardless of whether a job is in the copy mode or box mode.

For example, the control unit 205 accepts, from the user using the ten-key pad 506 or the like via the operation unit 204, a copy count setting for specifying the number of print operations to be executed by the print apparatus 100 for a job to be processed. In addition, the control unit 205 accepts, from the user via the operation unit 204, the type of sheet process to be executed by the sheet-processing apparatus 200 of the system 1000 for the job to be processed.

In this example, the settings of the process conditions are called the settings of print process conditions (simply process conditions) of a job to be processed. In this example, the control unit 205 can accept printing conditions (various print process conditions such as the paper size, copy ratio, print density, and print layout) other than the above process conditions from the user via the UI unit for the job to be processed before the print execution request.

After the user issues, via the operation unit 204 of the print apparatus 100, a user request to specify various print process conditions as described above, the control unit 205 accepts a print execution request from the user via the operation unit 204 by the above-described method. In response to this request, the control unit 205 of the system 1000 controls the system 1000 to execute the process of FIGS. 24A and 24B. For example, the control unit 205 causes the printer unit 203 to execute a print process by the number of copies set via the UI unit for a job to be processed. The control unit 205 causes the sheet-processing apparatus 200 of the system 1000 to execute a sheet process set, printed by the printer unit 203, via the UI unit for the job to be processed.

In the embodiment, the system 1000 having these constituent features can execute the process of FIGS. 24A and 24B, and those of FIGS. 25A, 25B, and 29 (to be described later). Together with control for executing these processes, the system 1000 can also execute display control for displaying various UI windows by the UI unit of the system 1000. The process of FIGS. 24A and 24B will be explained.

The process of FIGS. 24A and 24B is a control example executed by the control unit 205 when accepting a user request including the print request (print start instruction) of a job to be processed, via the operation unit 204 of the print apparatus 100 serving as an example of the UI unit of the embodiment. In other words, a job to be processed in the control example of FIGS. 24A and 24B is a job in the copy mode that is input from the scanner unit 201, or a job in the box mode that is stored in the HDD 209. Steps in FIGS. 24A and 24B will be explained.

In S1201 of FIG. 24A, the control unit 205 confirms whether the user has set the process conditions of a job to be processed via the UI unit of the embodiment. For example, the control unit 205 determines, on the basis of information from the touch panel sensor, whether it has accepted various print process conditions for the job to be processed via the display of FIG. 6 executed by the display unit 401. In this way, the control unit 205 determines in S1201 whether a user operation is done to the operation unit 204 serving as an example of the UI unit of the embodiment.

If YES in S1201, the control unit 205 shifts to the process in S1202. If NO in S1201, the control unit 205 repeats the process in S1201 without shifting to the process in S1202. If the process shifts to S1202, the control unit 205 executes the following process as the process in S1202.

For example, the control unit 205 determines whether the user has input, via the UI unit of the embodiment, a user instruction to display, on the UI unit, a setup window which allows the user to set a sheet process type to be executed in the job to be processed.

For example, in S1202, the control unit 205 determines whether the user has pressed the sheet process setting key 609 in the display of FIG. 6 executed by the display unit 401. In the embodiment, the "sheet process" means a finishing process by the inline finisher of the system 1000.

In this example, the key 609 is a display key necessary for the user to make settings of executing a sheet process by the sheet-processing apparatus 200 of the system 1000, and has a notation as shown in the display example of FIG. 6. In other words, the key 609 is a display key for executing finishing by the inline finisher of the system 1000. Thus, the key 609 may also be called a "finishing" key.

If NO in S1202, the control unit 205 advances the process to S1210. If YES in S1202, the control unit 205 advances the process to S1203. After the process shifts to S1203, the control unit 205 executes the following process as the process in S1203.

For example, in S1203, the control unit 205 reads out system configuration information of the print system 1000 from the HDD 209. The control unit 205 makes the following confirmations as confirmation items of the system configuration information.

(Confirmation 1) The control unit 205 confirms whether the system 1000 comprises an inline type sheet-processing apparatus.

(Confirmation 2) When the system 1000 comprises an inline type sheet-processing apparatus, the control unit 205 confirms the number of inline type sheet-processing apparatuses.

(Confirmation 3) When the system 1000 comprises an inline type sheet-processing apparatus, the control unit 205 confirms what kind of sheet process (finishing) is executable using the inline type sheet-processing apparatus.

(Confirmation 4) When the system 1000 comprises a plurality of inline type sheet-processing apparatuses, the control unit 205 confirms performance information of each of the inline type sheet-processing apparatuses of the system 1000, i.e., confirms which sheet-processing apparatus can execute what kind of sheet process.

(Confirmation 5) When the system 1000 comprises a plurality of inline type sheet-processing apparatuses, the control unit 205 confirms which sheet-processing apparatuses connect to the print apparatus 100, and their connection order.

In the process of S1203, the control unit 205 executes these confirmations. In the embodiment, an "inline type sheet-processing apparatus" is also called an inline finisher, as described above.

In making these confirmations, the control unit 205 reads out system configuration information of the print system 1000 that is registered in the HDD 209 in advance. For example, the control unit 205 utilizes, as criterion information in the process of FIGS. 24A and 24B, system configuration information of the print system 1000 containing various types of information as represented by (information 1) to (information 5) described at the beginning of DESCRIPTION OF THE EMBODIMENT.

After the process of S1203, the control unit 205 shifts the process to S1204. After the process shifts to S1204, the control unit 205 executes the following process as the process in S1204.

Based on the system configuration information of the system 1000 confirmed in S1203, the control unit 205 determines whether the print system 1000 can execute different types of sheet processes. For example, the control unit 205 confirms, on the basis of the system configuration information registered in the HDD 209, whether the system 1000 can execute a plurality of types of finishings using inline finishers of the print system 1000. The pieces of system configuration information are, e.g., 3101A, 3101B, and 3101C illustrated in FIGS. 31A-1 to 31C-2 (to be described later).

If YES in S1204, the control unit 205 advances the process to S1205. If NO in S1204, the control unit 205 advances the process to S1215.

For example, when the print system 1000 has one of the system configurations shown in FIGS. 8A to 10B, the control unit 205 determines YES in S1204. This is because the print system 1000 comprises a plurality of inline sheet-processing apparatuses capable of executing different types of sheet processes in any of the system configuration examples illustrated in FIGS. 8A to 10B. In other words, in the system configurations as illustrated in FIGS. 8A to 10B, the print system 1000 can execute different types of finishings. In such a system configuration, the control unit 205 advances the process from S1204 to S1205.

Even when the print system 1000 comprises only one saddle-stitching apparatus illustrated in FIG. 13 as an inline finisher illustrated in FIGS. 8A to 10B, the control unit 205 determines YES in S1204. This is because the saddle-stitching apparatus according to the embodiment is an inline finisher capable of executing a plurality of types of sheet processes by itself. In other words, when the system 1000 has a system configuration having only one "large-volume stacker" as an inline finisher, the control unit 205 determines NO in S1204.

This is because the large-volume stacker can execute only one type of sheet process. To the contrary, when the system 1000 has a system configuration with only one "glue binding apparatus" as an inline finisher, the control unit 205 determines YES in S1204.

This is because the glue binding apparatus can execute two types of sheet processes "case binding process" and "pad binding process". However, these sheet processes are merely examples, and the embodiment is not limited to them.

If the process shifts from S1204 to step S1205, the control unit 205 executes the following process as the process in S1205.

For example, in S1205, the control unit 205 confirms the number of copies of the job to be processed on the basis of the process conditions of the job that are set by the user via the UI unit provided by the embodiment. For example, the control unit 205 acquires various types of information from the touch panel sensor of the display unit 401 or the ten-key pad 506. Based on the operation instruction information, the control unit 205 specifies the number of copies (sets) to be printed by the print process of print data of the target job for which the user sets the number of copies.

After the process in S1205, the control unit 205 shifts the process to S1206. In the process of S1206, the control unit 205 executes the following process on the basis of process condition information of the job that is confirmed in S1204 and contains the copy count setting of the job to be processed.

For example, the control unit 205 confirms, on the basis of a user request from the UI unit, whether the job to be processed requires printing of a plurality of copies.

Assume that the user sets a copy count "1" via the operation unit 204 as a copy count setting corresponding to a user setting for specifying the process conditions of a 50-page job (to be referred to as job A hereinafter). In this case, for example, the user makes settings as shown in the display example of FIG. 6 via the operation unit 204. Under the process conditions, the control unit 205 determines that the job to be processed does not require printing of a plurality of copies. In other words, the control unit 205 determines that the job is a "job requiring printing of one copy".

To print job A by one copy, the control unit 205 causes the printer unit 203 to print data of all 50 pages of job A via the HDD 209. The control unit 205 causes the printer unit 203 to execute the series of print operations only once. That is, the control unit 205 inhibits the printer unit 203 from executing an operation to repetitively read out the same page from the HDD 209 and print it. In other words, job A is a "job requiring a series of print operations to cause the printer unit 203 to execute once a print process necessary to print data of all pages contained in a print data string to be printed". In this example, this job is defined as a "job requiring printing of one copy".

If the job to be processed is a "job requiring printing of one copy", like job A with the settings as shown in the display example of FIG. 6, the control unit 205 shifts the process from S1206 to S1215.

In contrast, assume that the user sets a copy count "10" via the operation unit 204 as a copy count setting corresponding to a user setting for specifying the process conditions of a 40-page job (to be referred to as job B hereinafter). In this case, for example, the user makes settings as shown in the display example of FIG. 19 via the operation unit 204. Under the process conditions, the control unit 205 determines that the job to be processed requires printing of a plurality of copies. In this case, the control unit 205 determines YES in S1206 and advances the process from S1206 to S1207.

To print job B by a plurality of copies, the control unit 205 causes the printer unit 203 to print data of all 40 pages of job B via the HDD 209. The control unit 205 causes the printer unit 203 to execute the series of print operations 10 times. That is, the control unit 205 causes the printer unit 203 to execute an operation to repetitively read out the same page from the HDD 209 and print it a plurality of number of times.

In other words, job B is a "job requiring a series of print operations to cause the printer unit 203 to execute a plurality of number of times a print process necessary to print data of all pages contained in a print data string to be printed". In this example, this job is defined as a "job requiring printing of a plurality of copies".

If the job to be processed is a "job requiring printing of a plurality of copies", like job B having the settings as shown in the display example of FIG. 19, the control unit 205 shifts the process from S1206 to S1207.

If the process shifts to S1207, the control unit 205 of the embodiment executes the following process as the process in S1207.

For example, the control unit 205 executes the following control for job B for which the user sets a total copy count of "10".

The control unit 205 permits the user to individually set a desired type of finishing every designated number of copies in printing a total of 10 copies necessary for job B. This process is a control example when the control unit 205 permits accepting the execution request of a specific job from the user via the UI unit of the embodiment in S1207. The "execution request of a specific job" means the "execution request of a job requiring printing of a plurality of copies and requiring a specific type of sheet process every printing of a specific number of copies in printing a plurality of copies". In other words, the control unit 205 controls to permit accepting a specific user request from the user via the UI unit of the embodiment in S1207. The "specific user request" is an especially significant request in the embodiment.

In the embodiment, this request is a "specific user request to cause the sheet-processing apparatus 200 of the system 1000 to execute a specific type of sheet process every printing of a specific number of copies in printing a plurality of copies of a job requiring printing of a plurality of copies".

As described above, if YES in both S1204 and S1206, the control unit 205 permits accepting the specific request from the user via the operation unit 204 serving as an example of the UI unit provided by the embodiment. The specific request is the "execution request of a specific job" and is the "specific user request", as described above.

In S1207, the control unit 205 permits accepting the specific request from the user via the UI unit. Also in S1207, the control unit 205 executes display control of the operation unit 204 so that the operation unit 204 displays a sheet process setup window complying with the permissive determination. In the embodiment, the display executed by the operation unit 204 in S1207 is a "specific display" especially significant in the embodiment.

For example, in S1207, the control unit 205 causes the UI unit to execute a "specific display capable of accepting a user request to cause the system 1000 to execute a specific type of sheet process every printing of a specific number of copies in printing a plurality of copies".

An example of display control by the control unit 205 of the system 1000 to cause the UI unit of the system 1000 to execute a display as the specific display in step S1207 will be described with reference to FIGS. 20 to 22C. This control example will be explained using job B as a control target.

Job B requires printing of a plurality of copies, and its total copy count is "10 copies". In the above control example, the control unit 205 controls to accept the process conditions of job B from the user of job B via the display unit 401 of the operation unit 204.

Assume that the user sets "10 copies" as a total copy count necessary for job B via the display of FIG. 19 executed by the display unit 401. Also assume that the user presses the sheet process setting key 609 in the display of FIG. 19. Then, the control unit 205 controls the display unit 401 to execute a display illustrated in FIG. 20 in response to the series of user operations.

Figure 20:
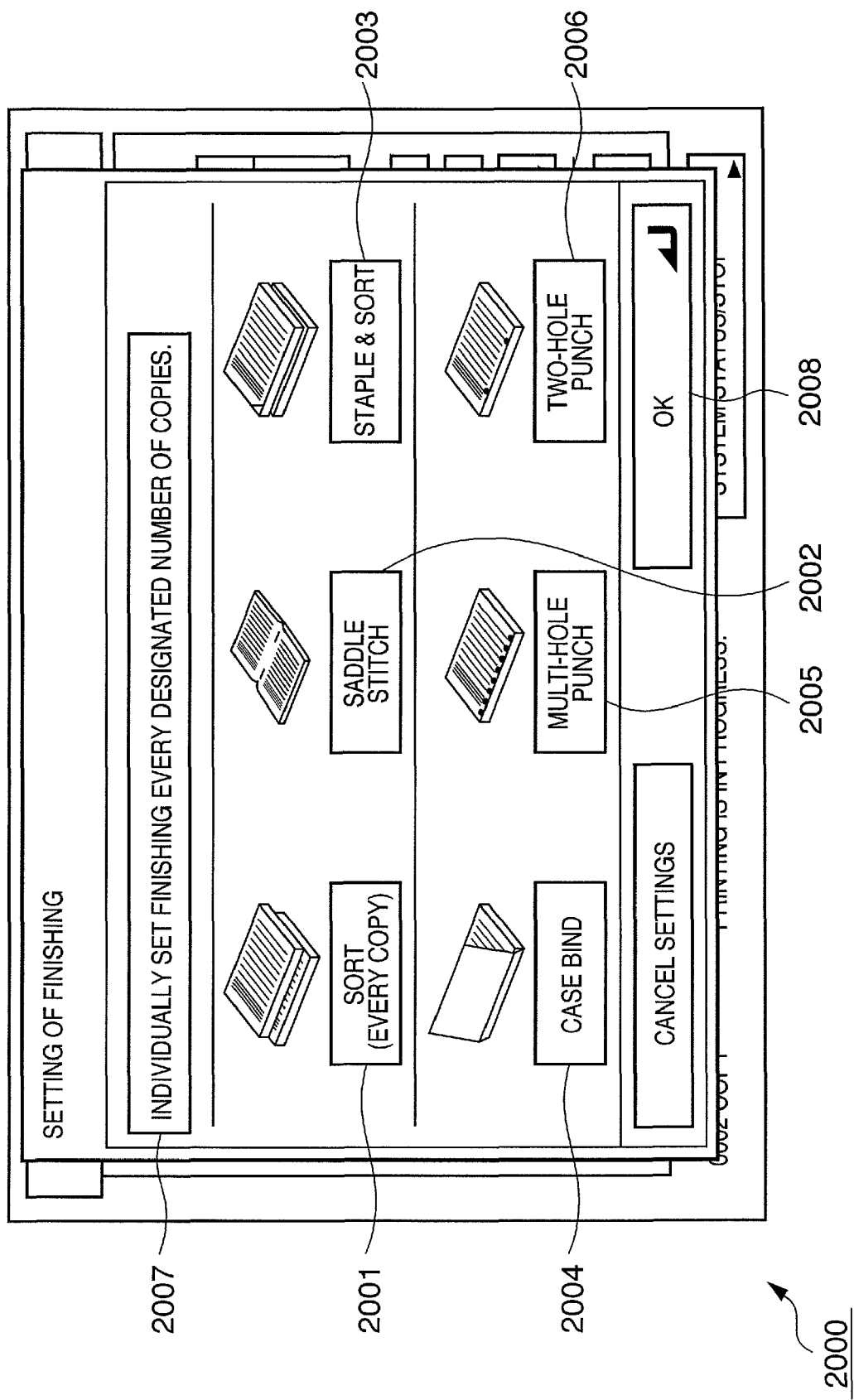
FIG. 20 is a view for explaining an example of control including display control on the UI unit to be executed in the embodiment.

The display of FIG. 20 executed by the display unit 401 under the control of the control unit 205 has, e.g., the following display keys.

(1) A key 2001 for accepting, from a user, an instruction to cause the inline finisher of the system 1000 to execute a sorting process for a sheet bundle of a printed job supplied from the printer unit 203.

(2) A key 2002 for accepting, from a user, an instruction to cause the inline finisher of the system 1000 to execute a saddle-stitching process for a sheet bundle of a printed job supplied from the printer unit 203.

(3) A key 2003 for accepting, from a user, an instruction to cause the inline finisher of the system 1000 to execute a stapling process for a sheet bundle of a printed job supplied from the printer unit 203.

(4) A key 2004 for accepting, from a user, an instruction to cause the inline finisher of the system 1000 to execute a case binding process for a sheet bundle of a printed job supplied from the printer unit 203.

(5) A key 2005 for accepting, from a user, an instruction to cause the inline finisher of the system 1000 to execute a multi-hole punching process for a sheet bundle of a printed job supplied from the printer unit 203.

(6) A key 2006 for accepting, from a user, an instruction to cause the inline finisher of the system 1000 to execute a two-hole punching process for a sheet bundle of a printed job supplied from the printer unit 203.

These keys have a function of allowing a user to determine a finishing type necessary for a job to be processed among a plurality of types of finishing candidates executable by the inline finisher of the system 1000.

Multi-hole punching and two-hole punching are finishings as examples of the punching process. The display of FIG. 20 shows six finishing type selection candidates. The display example of FIG. 7 described above shows nine finishing type selection candidates. The display example changes only for descriptive convenience, and this does not mean a mismatch between the display examples of FIGS. 7 and 20. In other words, the control unit 205 controls the operation unit 204 to follow the following restrictions regardless of whether the display unit 401 executes the display of FIG. 7 or that of FIG. 20.

For example, the control unit 205 inhibits the display unit 401 from displaying a sheet process key corresponding to a finishing type unexecutable by the system 1000. Alternatively, even if the control unit 205 permits display of such a sheet process key, it controls the display unit 401 to gray out or hatch the sheet process key. Like this control example, the control unit 205 inhibits accepting at least the execution request of a finishing type unexecutable even using the inline finisher of the system 1000 from a user via the UI unit.

On the premise of this configuration, the control unit 205 permits the display unit 401 to display a sheet process key corresponding to a finishing type executable by the system 1000. For example, the control unit 205 controls the display unit 401 to validate the key so that the user can select it.

Like this control example, the control unit 205 permits accepting at least the execution request of a finishing type executable by the system 1000 using the inline finisher of the system 1000 from a user via the UI unit.

The control unit 205 follows the above restrictions. When performing the above UI control, the control unit 205 of the embodiment uses system configuration information of the print system 1000 that is registered in the HDD 209.

In step S1207, the control unit 205 causes the display unit 401 to display various sheet process keys described above in the window 2000 of FIG. 20, and further causes the display unit 401 to display a key 2007 in the window 2000.

If YES in both S1204 and S1206 of FIG. 24A, the control unit 205 permits the display unit 401 to display the key 2007. The control unit 205 also controls the display unit 401 to validate the key 2007 in the window 2000 and permit accepting a user request from the user via the key 2007. The key 2007 displayed in the window 2000 of FIG. 20 serves as a display function key capable of accepting a specific request from a user in the embodiment.

For example, the control unit 205 causes the display unit 401 to display the key 2007 as a "display capable of accepting a request from a user via the UI unit to cause the inline finisher of the system 1000 to execute a specific type of sheet process designated by the user every printing of a specific number of copies designated by the user in printing of a plurality of copies necessary for a job for which the user sets printing of a plurality of copies via the UI unit". In the embodiment, the key 2007 is a "display capable of accepting a request from a user to individually execute finishing designated by the user every printing of a designated number of copies for a job requiring printing of a plurality of copies".

In this configuration, the control unit 205 causes the display unit 401 to display the window 2000 of FIG. 20 having the keys 2001 to 2007 in step S1207. In this state, in step S1208, the control unit 205 checks whether the user has pressed the key 2007 in the window 2000 of FIG. 20. If the control unit 205 determines in S1208 that the user has pressed the key 2007, it advances the process from S1208 to S1212 in FIG. 24B. If the control unit 205 determines in S1208 that the user has not pressed the key 2007, it advances the process from S1208 to S1209 in FIG. 24B.

That is, in step S1208, the control unit 205 determines whether the user has issued a request to individually set finishing every designated number of copies. If the control unit 205 accepts the request from the user in S1208, it shifts the process from S1208 to S1212. If the control unit 205 does not accept the request from the user in S1208, it shifts the process from S1208 to S1209.

For example, the process shifts from S1208 to S1209 when the user executes the following operation via the window of FIG. 20.

Assume that the user presses any of the keys 2001 to 2006 in the window 2000 without pressing the key 2007 in the window 2000 of FIG. 20, and then presses a key 2008. This case corresponds to a condition that the control unit 205 shifts the process from S1208 to S1209.

How to process a job satisfying the condition of shifting the process to step S1209 by the control unit 205 in the system 1000 in the above example will be exemplified. This process will be explained using job B having a total copy count "10 copies" set by the user via the display of FIG. 19 and having a 40-page print data string in total.

Assume that the user presses the key 2004 as a process condition setting for job B having the setting "10 copies" in the display of FIG. 19, and then presses the OK key 2008 in S1207 without pressing the key 2007 in the window 2000 of FIG. 20. Under this condition, the control unit 205 determines job B as follows. For example, the control unit 205 determines "Job B is a job requiring printing of a plurality of copies.

However, if the user performs the above key operation, the control unit 205 determines that "job B is not a job for which the user issues the execution request of a specific type of sheet process every printing of a specific number of copies in printing a plurality of copies. In addition, job B is a job requiring execution of a case binding process for printed sheets as the same type of sheet process every printing of one copy of job B requiring printing of 10 copies in total." The control unit 205 makes this determination for the current job B In this example, the control unit 205 determines YES in S1210 in accordance with a print execution request from the user for job B for which the control unit 205 determines NO in S1208. In this case, the control unit 205 controls the system 1000 to execute the following series of job processing operations as a series of job processing operations for job B.

Assume that the user presses the key 503 for job B for which the user sets "10 copies" via the display of FIG. 19, presses the key 2004 via the display of FIG. 20 without pressing the key 2007, and presses the key 2008. In response to this, the control unit 205 determines that the user has issued the print execution request of job B. In response to this request, the control unit 205 executes the following process for job B for which the user does not press the key 2007.

For example, the control unit 205 receives, from the scanner unit 201, print data of job B having a 40-page print data string in total, and stores all the pages sequentially from the start page in the HDD 209. This storage operation is executed when job B is in the copy mode. When job B is in the box mode, the HDD 209 has already saved print data of all pages of job B in advance, and the storage operation is unnecessary.

After the HDD 209 stores print data of job B, the control unit 205 reads out the print data of job B sequentially from the start page, and causes the printer unit 203 to print. After printing of one bundle (printing of one set requiring printing of 40-page print data in total) is executed as printing of job B, the control unit 205 causes the inline finisher of the system 1000 to execute a "case binding process" for one printed sheet bundle. This process is executed by the "glue binding apparatus" illustrated in FIGS. 8A to 10B and 12 corresponding to an inline finisher capable of executing the case binding process.

In this manner, the control unit 205 causes the printer unit 203 to print the print data of job B. The control unit 205 also executes the case binding process for one bundle of sheets on which 40-page print data of job B are printed in the page order by the print process. The control unit 205 controls to repeat the series of operations by the total copy count of job B, i.e., 10 times. Accordingly, the control unit 205 executes the same type of finishing, i.e., the case binding process for each of printed bundles of 10 copies.

The control unit 205 executes the above-described series of operations in the sequence of "NO in S1208 through the process in S1207→YES in S1209→YES in S1210→S1217", for job B.

On the contrary, if the process advances from S1208 not to S1209 but to S1212 in FIG. 24B, the control unit 205 executes the following process in S1212.

Figure 21:
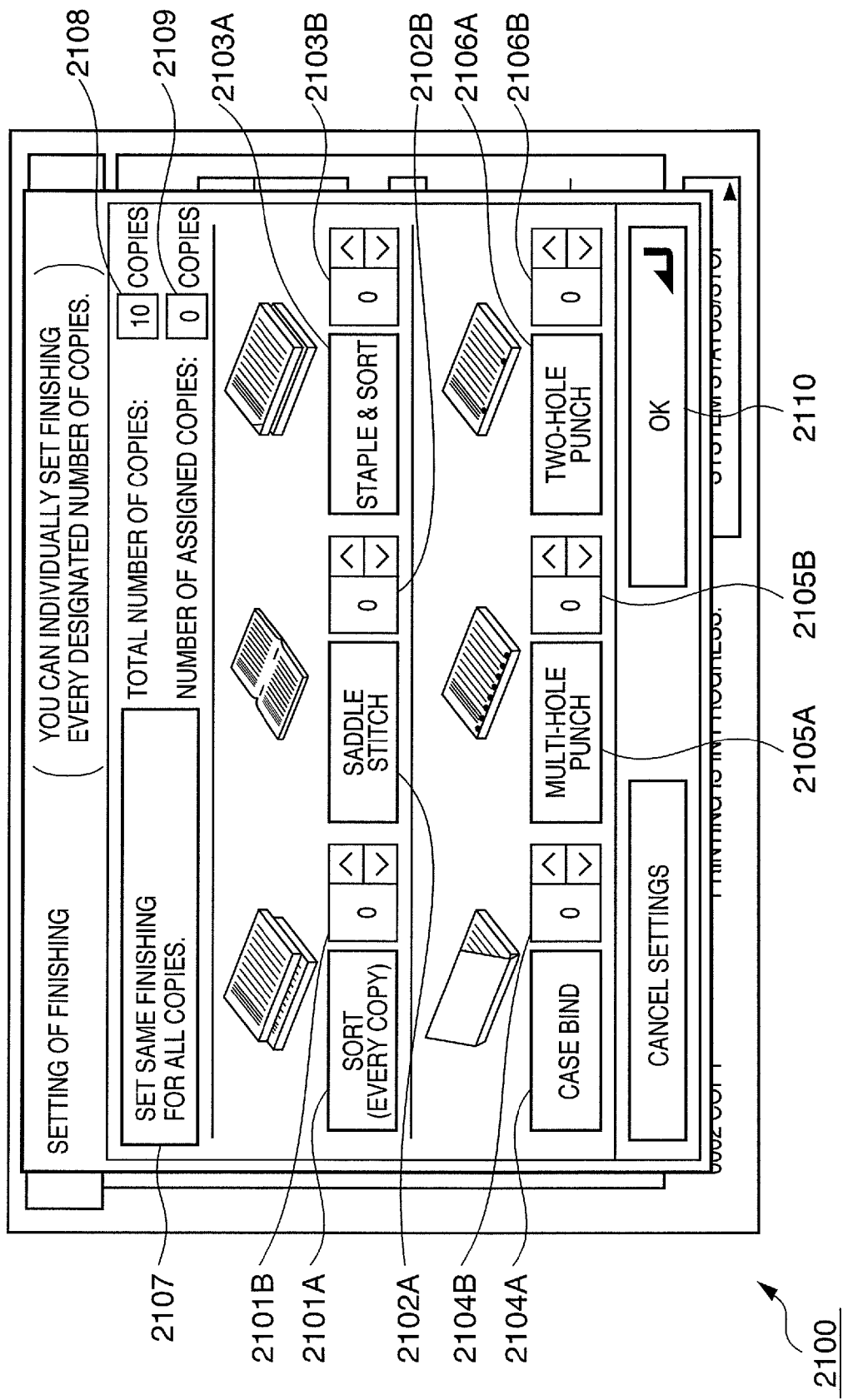
FIG. 21 is a view for explaining an example of control including display control on the UI unit to be executed in the embodiment.

In S1212, the control unit 205 causes the display unit 401 to display a window 2100 illustrated in FIG. 21. The control unit 205 also controls the display unit 401 to accept, from the user via the window 2100, a "setting for causing the sheet-processing apparatus 200 to execute a specific type of sheet process designated by the user every printing of a specific number of copies designated by the user for a job requiring printing of a plurality of copies". In other words, the control unit 205 allows the user to individually set, via the window 2100, a user-desired type of finishing (synonymous with a sheet process and post-process in the embodiment) every printing of a user-desired number of copies in printing a plurality of copies of a job requiring printing of a plurality of copies. The control unit 205 executes this process in S1212.

The display of FIG. 21 executed by the display unit 401 in S1212 under the control of the control unit 205 has, e.g., the following display constituent components in the embodiment.

[Display Constituent Component 1: Display Field 2108]

A display field 2108 is a "display with which the control unit 205 allows a user to confirm, before the display unit 401 displays the window 2100, a total number of copies accepted from the user via the operation unit 204 for a job for which the user currently sets print process conditions". In this example, this display is explained using job C in distinction from job B. For job C, the user has already set a total copy count "10 copies" via the display of FIG. 19. Hence, the display field 2108 in FIG. 21 displays "10 copies" as information of currently set job C.

In the embodiment, the control unit 205 can accept a change of a set copy count from the user in response to a user operation to the display field 2108. For example, the control unit 205 flickers the display of the display field 2108 in response to press of the display field 2108 by the user. During this period, the user can change the setting of the copy count of the job via the ten-key pad 506.

[Display Constituent Component 2: Key 2101A and Display Field 2101B]

A key 2101A is a "display key capable of accepting a request from a user to execute a sorting process for a bundle of sheets bearing a print data string of a job by an inline finisher capable of executing the sorting process in the system 1000 every printing of one copy in printing a designated number of copies set by the user via a display field 2101B in printing a plurality of copies of the job requiring printing of a plurality of copies".

Assume that the user wants "to finish a printed bundle of one copy (sheet bundle of one set) by the sorting process in printing a plurality of copies for job C requiring printing of 10 copies in total". In this case, the user presses the key 2101A. In response to this, the control unit 205 flickers the display of the display field 2101B associated with the key 2101A. During this period, the user can set "one copy" as a designated number of copies in the display field 2101B using an up/down key arranged on the right of the display field 2101B. When accepting this setting, the control unit 205 controls to execute the sorting process for only a sheet bundle of one set for job C requiring printing of sheet bundles of 10 sets in total.

By the above method, the control unit 205 completes the individual settings of the sorting process for printed bundles by a designated number of copies accepted from the user via the display field 2101B out of a total number of copies of a job that is displayed in the display field 2108.

[Display Constituent Component 3: Key 2102A and Display Field 2102B]

A key 2102A is a "display key capable of accepting a request from a user to execute a saddle-stitching process for a bundle of sheets bearing a print data string of a job by an inline finisher capable of executing the saddle-stitching process in the system 1000 every printing of one copy in printing a designated number of copies set by the user via a display field 2102B in printing a plurality of copies of the job requiring printing of a plurality of copies".

Assume that the user wants "to finish printed bundles of two copies (sheet bundles of two sets) by the saddle-stitching process in printing a plurality of copies for job C requiring printing of 10 copies in total". In this case, the user presses the key 2102A. In response to this, the control unit 205 flickers the display of the display field 2102B associated with the key 2102A. During this period, the user can set "two copies" as a designated number of copies in the display field 2102B using an up/down key arranged on the right of the display field 2102B. When accepting this setting, the control unit 205 controls to execute the saddle-stitching process every set for only sheet bundles of two sets for job C requiring printing of sheet bundles of 10 sets in total.

By the above method, the control unit 205 completes the individual settings of the saddle-stitching process for printed bundles by a designated number of copies accepted from the user via the display field 2102B out of a total number of copies of a job that is displayed in the display field 2108.

[Display Constituent Component 4: Key 2103A and Display Field 2103B]

A key 2103A is a "display key capable of accepting a request from a user to execute a stapling process for a bundle of sheets bearing a print data string of a job by an inline finisher capable of executing the stapling process in the system 1000 every printing of one copy in printing a designated number of copies set by the user via a display field 2103B in printing a plurality of copies of the job requiring printing of a plurality of copies".

Assume that the user wants "to finish printed bundles of three copies (sheet bundles of three sets) by the stapling process in printing a plurality of copies for job C requiring printing of 10 copies in total". In this case, the user presses the key 2103A. In response to this, the control unit 205 flickers the display of the display field 2103B associated with the key 2103A. During this period, the user can set "three copies" as a designated number of copies in the display field 2103B using an up/down key arranged on the right of the display field 2103B. When accepting this setting, the control unit 205 controls to execute the stapling process every set for only sheet bundles of three sets for job C requiring printing of sheet bundles of 10 sets in total.

By the above method, the control unit 205 completes the individual settings of the stapling process for printed bundles by a designated number of copies accepted from the user via the display field 2103B out of a total number of copies of a job that is displayed in the display field 2108.

[Display Constituent Component 5: Key 2104A and Display Field 2104B]

A key 2104A is a "display key capable of accepting a request from a user to execute a case binding process for a bundle of sheets bearing a print data string of a job by an inline finisher capable of executing the case binding process in the system 1000 every printing of one copy in printing a designated number of copies set by the user via a display field 2104B in printing a plurality of copies of the job requiring printing of a plurality of copies".

Assume that the user wants "to finish printed bundles of four copies (sheet bundles of four sets) by the case binding process in printing a plurality of copies for job C requiring printing of 10 copies in total". In this case, the user presses the key 2104A. In response to this, the control unit 205 flickers the display of the display field 2104B associated with the key 2104A. During this period, the user can set "four copies" as a designated number of copies in the display field 2104B using an up/down key arranged on the right of the display field 2104B. When accepting this setting, the control unit 205 controls to execute the case binding process every set for only sheet bundles of four sets for job C requiring printing of sheet bundles of 10 sets in total.

By the above method, the control unit 205 completes the individual settings of the case binding process for printed bundles by a designated number of copies accepted from the user via the display field 2104B out of a total number of copies of a job that is displayed in the display field 2108.

[Display Constituent Component 6: Key 2105A and Display Field 2105B]

A key 2105A is a "display key capable of accepting a request from a user to execute a multi-hole punching process for a bundle of sheets bearing a print data string of a job by an inline finisher capable of executing the multi-hole punching process in the system 1000 every printing of one copy in printing a designated number of copies set by the user via a display field 2105B in printing a plurality of copies of the job requiring printing of a plurality of copies".

Assume that the user wants "to finish printed bundles of five copies (sheet bundles of five sets) by the multi-hole punching process in printing a plurality of copies for job C requiring printing of 10 copies in total". In this case, the user presses the key 2105A. In response to this, the control unit 205 flickers the display of the display field 2105B associated with the key 2105A. During this period, the user can set "five copies" as a designated number of copies in the display field 2105B using an up/down key arranged on the right of the display field 2105B.

When accepting this setting, the control unit 205 controls to execute the multi-hole punching process every set for only sheet bundles of five sets for job C requiring printing of sheet bundles of 10 sets in total.

By the above method, the control unit 205 completes the individual settings of the multi-hole punching process for printed bundles by a designated number of copies accepted from the user via the display field 2105B out of a total number of copies of a job that is displayed in the display field 2108.

[Display Constituent Component 7: Key 2106A and Display Field 2106B]

A key 2106A is a "display key capable of accepting a request from a user to execute a two-hole punching process for a bundle of sheets bearing a print data string of a job by an inline finisher capable of executing the two-hole punching process in the system 1000 every printing of one copy in printing a designated number of copies set by the user via a display field 2106B in printing a plurality of copies of the job requiring printing of a plurality of copies".

Assume that the user wants "to finish printed bundles of six copies (sheet bundles of six sets) by the two-hole punching process in printing a plurality of copies for job C requiring printing of 10 copies in total". In this case, the user presses the key 2106A. In response to this, the control unit 205 flickers the display of the display field 2106B associated with the key 2106A. During this period, the user can set "six copies" as a designated number of copies in the display field 2106B using an up/down key arranged on the right of the display field 2106B.

When accepting this setting, the control unit 205 controls to execute the two-hole punching process every set for only sheet bundles of six sets for job C requiring printing of sheet bundles of 10 sets in total.

By the above method, the control unit 205 completes the individual settings of the two-hole punching process for printed bundles by a designated number of copies accepted from the user via the display field 2106B out of a total number of copies of a job that is displayed in the display field 2108.

The control unit 205 allows the user to execute various user settings as described above using the keys 2101A to 2106A and the display fields 2101B to 2106B.

[Display Constituent Component 8: Display Field 2109]

A display field 2109 synchronizes with individual settings of a finishing type and a designated number of copies by a user via the displays of the keys 2101A to 2106A and the display fields 2101B to 2106B executed by the display unit 401 under the control of the control unit 205. More specifically, the display field 2109 displays display contents which allow a user to confirm, as an assigned copy count, the sum of designated copy counts individually set by the user for respective finishing types via the display of FIG. 21.

In this example, job C is exemplified. When the display of FIG. 21 is executed, the user does not make any individual settings of finishing for job C. When the display unit 401 executes the display of FIG. 21, the control unit 205 also displays "0 copies" in the display field 2109 of FIG. 21, as shown in the display example of FIG. 21. If the individual settings of all finishings for job C are complete, the control unit 205 displays "10 copies" in the display field 2109, as shown in the display examples of FIGS. 22A and 22B.

[Display Constituent Component 9: Key 2110]

An OK key 2110 is a display key pressed by a user when completing "a series of sheet process settings to execute a specific type of finishing designated by the user every specific number of copies designated by the user". In response to press of the OK key 2110 by the user, the control unit 205 determines that it has received a user request corresponding to the settings.

For example, when the user presses the OK key 2110 after making various settings in the display of FIG. 21, the control unit 205 determines YES in S1214 of FIG. 24B.

[Display Constituent Component 10: Key 2107]

Even when a user inputs a request "to individually set finishing every designated number of copies" by pressing the key 2007 in the display of FIG. 20, he uses a key 2107 to cancel the request.

Assume that the user presses the key 2107. In this case, even if a job to be processed requires printing of a plurality of copies, the control unit 205 inhibits execution of a specific type of finishing every specific number of copies in printing a plurality of copies. The control unit 205 controls the display unit 401 to return its display contents from those of FIG. 21 to those of FIG. 20. Under this control, the control unit 205 inhibits the user from setting and requesting execution of the operation. Instead of returning to the window of FIG. 20, the control unit 205 causes the display unit 401 to invalidate a total of six display fields 2101B to 2106B in the window 2100 of FIG. 21. For example, the display unit 401 grays out or hatches all these keys.

In this example, the control unit 205 determines that the user presses the key 2107 to issue a "request not to individually set finishing every designated number of copies". In this case, the control unit 205 inhibits the system 1000 from executing a specific type of finishing every specific number of copies for a job requiring printing of a plurality of copies. When the user presses the key 2107, the control unit 205 determines YES in S1213 of FIG. 24B.

In S1212 of FIG. 24B, the control unit 205 causes the display unit 401 to execute the display of FIG. 21 having various display constituent components including the above display constituent components 1 to 10.

When individually setting finishing every designated number of copies via the displays of the keys 2101A to 2106A and the display fields 2101B to 2106B executed by the display unit 401 under the control of the control unit 205, the control unit 205 may accept various instructions from the user by a method different from the above-described one.

For example, the user directly operates the up/down key of the display field 2101B without pressing the key 2101A. In response to this, the control unit 205 determines that it has accepted a request to execute a sorting process for printed bundles by a designated number of copies set with the up/down key.

No key operation is required for any of a total of six keys 2101A to 2106A corresponding to a plurality of types of finishings executable by the print system 1000. The control unit 205 accepts a user direct operation to an up/down key arranged in a designated copy count display field for user-desired finishing among a plurality of types of finishings. In this manner, the user can make the same settings as those described above.

The control unit 205 may also accept a numerical input setting by the user with the ten-key pad 506 without using any up/down key in the window 2100 of FIG. 21 while flickering a designated copy count display field for user-desired finishing. The user can also make the same settings as those described above.

As described above, the system 1000 may be configured to provide a UI environment corresponding to the use environment of a user. However, the control unit 205 controls the UI unit while following the following restrictions.

For example, a rule is set which is common to all the designated copy count setting fields of the display fields 2101B to 2106B. For example, the control unit 205 controls the maximum value of a designated copy count settable by a user to be equal to or smaller than the total copy count of a job to be processed regardless of the display fields 2101B to 2106B. In the case of job B, for example, if the user sets a designated copy count in any of the display fields 2101B to 2106B, the control unit 205 accepts the designated copy count from the user within a range of "one copy to nine copies" so as not to exceed the total copy count "10 copies". The control unit 205 inhibits the user from executing a setting/request which does not satisfy this condition. Further, the following rule is also set.

In the control example of FIG. 21, the following rule is set for a user request to execute a specific type of finishing every designated number of copies for a job requiring printing of a plurality of copies. For example, the control unit 205 controls to permit execution of up to six types of finishings every designated number of copies for one job. The limit value is "6" because the number of finishing types executable by the inline finishers of the system 1000 is six in this example.

The limit value is defined by the number of finishing types executable by the system 1000. The control unit 205 inhibits the user from executing a setting/request which does not satisfy this condition. In this way, even if the control unit 205 permits execution of different types of finishings in one job, it limits the number of permitted finishings. In addition, the following rule is also set.

In the above example, the control unit 205 permits execution of different finishings every printed bundle of one job requiring printing of a plurality of copies within a maximum of six sheet process types corresponding to the total number of sheet processes executable by the system 1000. The control unit 205 executes display control to inhibit execution of a larger number of sheet process types in one job, and also inhibit execution of this setting/request by the user. Under this restriction, the following rule is set when the user individually sets finishing every designated number of copies.

For example, the control unit 205 controls to prevent the sum of designated copy counts at individual finishing settings from exceeding a total copy count necessary for a job to be processed at the settings. In the case of job C, the control unit 205 controls to set a plurality of types of finishings for job C via the keys 2101A to 2106A and the display fields 2101B to 2106B and execute processes complying with the settings by the system 1000. The control unit 205 inhibits the sum of designated copy counts individually set at specific types of finishings from exceeding "10 copies".

In other words, the control unit 205 controls to make the sum of designated copy counts accepted from a user via the display fields 2101B to 2106B in FIG. 21 coincide with a value displayed in the display field 2108. The control unit 205 inhibits accepting the process execution request of job C at inconsistent settings from the user.

Assume that the user sets a designated copy count "nine copies" and "case binding process" in the display of FIG. 21 with the key 2104A and the display field 2104B as individual settings of job C requiring printing of 10 copies in total. In addition, assume that the user sets a designated copy count "one copy" as the remaining copy count of job C, and "multi-hole punching process" with the key 2105A and the display field 2105B as individual settings of job C. In this case, the control unit 205 controls the display of FIG. 21 on the display unit 401 to display contents illustrated in FIG. 22A.

Further, the control unit 205 inhibits the user from executing other individual settings with another key after the user makes the series of settings. For example, the control unit 205 causes the display unit 401 to invalidate (gray out or hatch) four keys 2101A, 2102A, 2103A, and 2106A, and four display fields 2101B, 2102B, 2103B, and 2106B. When the sum of copy counts reaches the total copy count, the control unit 205 inhibits accepting a further setting/request from the user for a specific type of sheet process for printing of a specific number of copies.

The control unit 205 executes display control of the operation unit 204 so as to follow various restrictions described above. The control unit 205 controls to flexibly accept user-desired settings via the window 2100 of FIG. 21, as shown in the displays of FIGS. 22A and 22B, as long as these restrictions are followed.

Figure 22A:
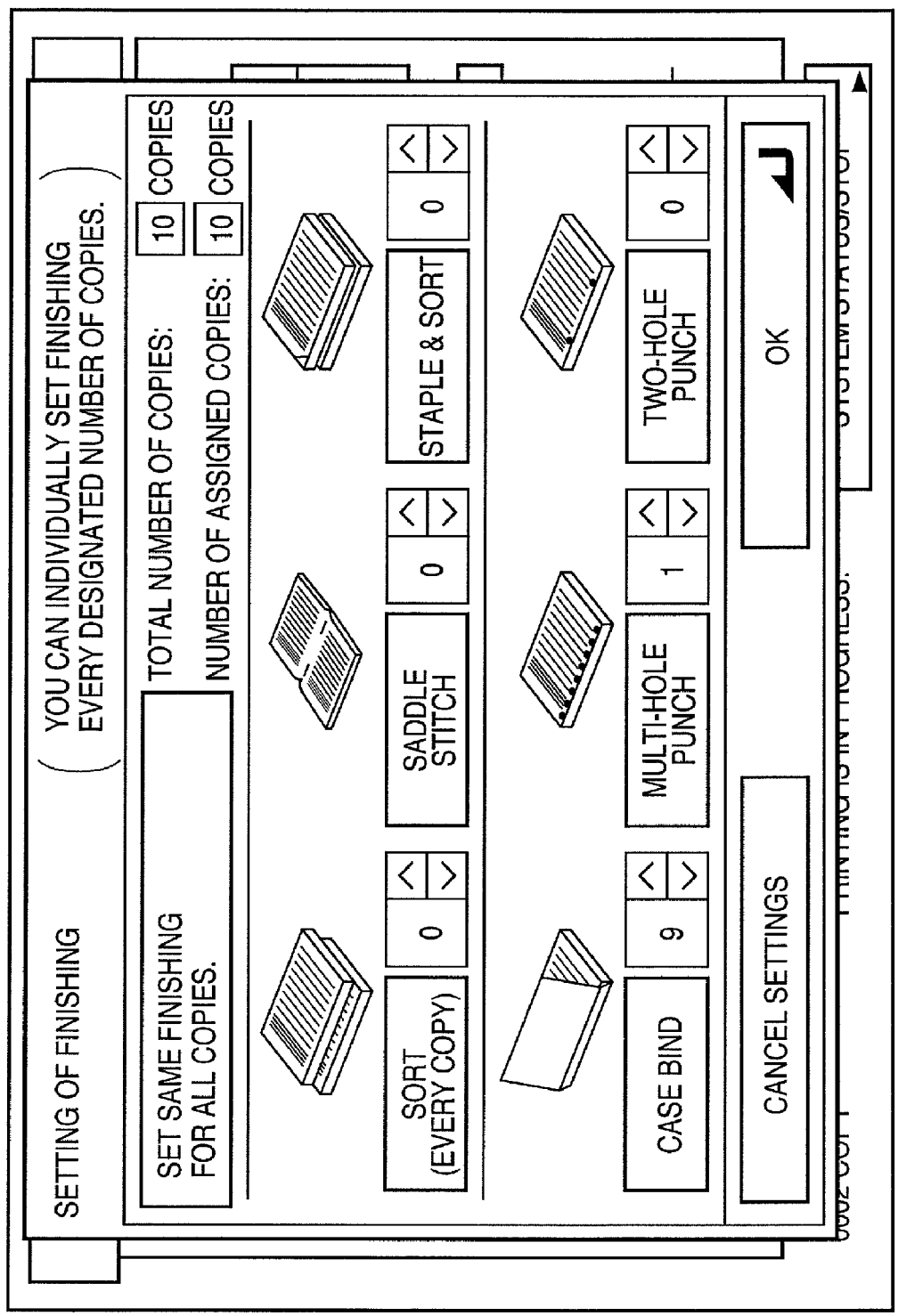
FIG. 22A is a view for explaining an example of control including display control on the UI unit to be executed in the embodiment.
Figure 22B:
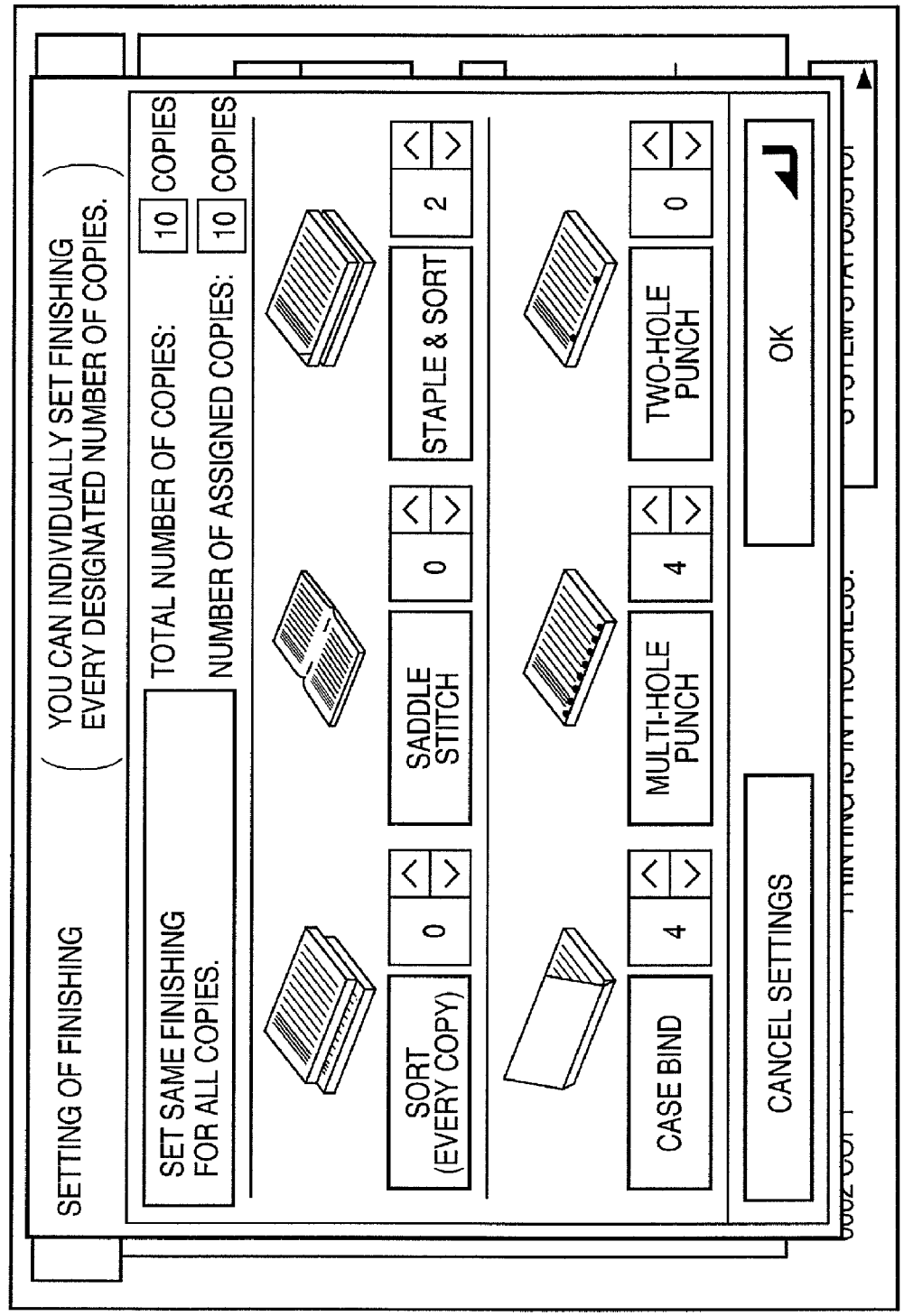
FIG. 22B is a view for explaining an example of control including display control on the UI unit to be executed in the embodiment.

[Control Example Executed by Control Unit 205 when Accepting User Request as Shown in Display Example of FIG. 22A from User via UI Unit for Job Requiring Printing of Copies]

A control example executed by the control unit 205 of the embodiment when accepting a specific user request via the display of FIG. 21, as described above, will be described with reference to FIG. 22A.

For example, the user makes user settings as shown in the display example of FIG. 22A for job C via the display of FIG. 21 executed by the display unit 401 under the control of the control unit 205. Job C also has a 40-page print data string in total.

In this case, the control unit 205 determines that job C is a "job requiring printing of 10 copies in total, requiring execution of a case binding process for each of printed bundles of nine sets out of printed bundles of 10 sets, and requiring execution of a multi-hole punching process for a printed bundle of one remaining set". In this case, the control unit 205 controls the system 1000 to execute the following operations as a series of operations for job C through a process sequence of S1212→NO in S1213→YES in S1214→YES in S1210→S1217 in FIG. 24B.

For example, the control unit 205 causes the printer unit 203 to execute a series of print operations for a total of 40-page print data as printing of one set. The control unit 205 causes the printer unit 203 to repetitively execute the series of print processes for the 40 pages of job C by 10 sets. While the printer unit 203 prints bundles of nine sets out of bundles of 10 sets, the control unit 205 executes a case binding process for sheets of each bundle every time the printer unit 203 prints one set.

Further, the control unit 205 causes the printer unit 203 to print one remaining set necessary for job C, and executes a multi-hole punching process for the printed bundle of this set. The series of operations will be described in detail below.

Assume that the system 1000 has the system configuration in FIG. 8B. In this case, the control unit 205 causes the glue binding apparatus in FIG. 8B to execute a case binding process for each of printed bundles of nine sets of job C. The control unit 205 delivers and holds all the case-bound printed bundles of nine sets at the delivery destination of the glue binding apparatus, i.e., the delivery destination Y in FIG. 8B. As a result, creation of the case-bound bundles of nine sets which are output bundles serving as part of the final product of job C is complete.

In addition, the control unit 205 causes the saddle-stitching apparatus in FIG. 8B to execute a multi-hole punching process for a printed bundle of one remaining set of job C. The control unit 205 delivers and holds the multi-hole-punched printed bundle of one set at the delivery destination of the saddle-stitching apparatus, i.e., the delivery destination Z in FIG. 8B. Consequently, creation of the multi-hole-punched printed bundle of one set which is an output bundle serving as the remaining part of the final product of job C is complete.

By the series of operations, creation of all the printed materials as the final product of job C requiring the print process of a 40-page print data string by a total of 10 copies is complete.

That is, printout materials are obtained which have undergone a case binding process for each of printed bundles of nine sets bearing 40-page print data of job C. In addition, a printout material is obtained which has undergone a multi-hole punching process for a printed sheet bundle of one remaining set bearing 40-page print data of job C. A total of 10 sets including the case-bound printed materials of nine sets and the multi-hole-punched printed material of one set are obtained as the final product of job C.

The control unit 205 controls the system 1000 to execute the above-described series of operations in response to accepting a user request as shown in the display example of FIG. 22A as a specific request for job C from the user via the display of the window 2100.

Job C is a "job requiring printing of a plurality of copies and requiring execution of a specific type of sheet process every printing of a specific number of copies in printing the plurality of copies". Each of sheet bundles of 10 sets serving as the final product of job C bears 40-page print data of job C. In other words, print data of the same contents are printed on each of sheet bundles of 10 sets.

Target print data have the same contents between sheet bundles of sets subjected to different finishings in a series of operations for job C. This constituent feature means execution of the following control.

Assume that, before inputting a print execution request using the key 503, the user sets "single-sided printing" via the display of FIG. 6 as a print setting for job C.

In this case, one-page print data of job C is printed on one print sheet. To print one set of job C, the control unit 205 controls to execute the following operation.

For example, the control unit 205 reads out a print data string of job C containing a total of 40-page print data sequentially from print data of the start page via the HDD 209. The control unit 205 causes the printer unit 203 to print the print data sequentially from the print data of the start page on print sheets one by one. The control unit 205 keeps the printer unit 203 printing until print data of the final page of job C is printed. That is, the number of print sheets necessary to print one set of job C is 40.

After printing the first set of the print data string of job C, the control unit 205 causes the printer unit 203 to print the second set of the print data string of job C. The control unit 205 repeats this work by a total of 10 sets. In other words, the 40-page print data string of job C is printed regardless of which set is to be printed in the print process for the print data string of job C.

More specifically, the control unit 205 causes the printer unit 203 to print the print data of the same contents for each set regardless of which of the first to 10th sets is to be printed by the printer unit 203 in the print process for the print data string of job C. For this purpose, the control unit 205 controls the HDD 209 to repeat 10 times "work to read out a print data string of job C from the HDD 209 sequentially from the start page to the final page".

It is also a feature of the embodiment to execute the above-described print control by the control unit 205 in the process of a "job requiring printing of a plurality of copies and requiring execution of a specific type of sheet process every printing of a specific number of copies in printing the plurality of copies".

In the above control example, the user makes settings as shown in the control example of FIG. 22A as settings of job C via the window 2100. Then, the user presses the start key 503, and the control unit 205 accepts the execution request of job C. In response to accepting the print execution request of job C from the UI unit, the control unit 205 automatically executes the above-described series of operations necessary to complete creation of the final product of job C. This means the following control.

For example, the control unit 205 accepts an instruction "to individually set finishing every designated number of copies" from the user upon pressing the key 2007 via the display of FIG. 20 as a user request for job C. This corresponds to an example of determining YES in S1208 of FIG. 24B. In response to press of the key 2007 by the user, the control unit 205 accepts the user request via the window 2000 of FIG. 20 executed by the display unit 401 under the control of the control unit 205.

More specifically, the control unit 205 accepts a request from the user "to execute a case binding process for each of printed bundles of nine copies in printing a total of 10 copies, and execute a multi-hole punching process for a printed bundle of one copy". Then, a series of user settings for job C is complete. This corresponds to an example of determining YES in S1214 of FIG. 24B. After that, the user of job C presses the start key 503. At this time, the control unit 205 accepts the print execution request of job C from the user via the UI unit. This is an example of determining YES in S1210 of FIG. 24B.

In response to accepting the print execution request from the user of job C, the control unit 205 controls the system 1000 to automatically execute all the following operations as operations necessary to complete creation of the final product of job C.

(Operation 1) The control unit 205 stores a 40-page print data string of job C in the HDD 209.

(Operation 2) The control unit 205 reads out the 40-page print data string of job C from the HDD 209, and causes the printer unit 203 to start printing. A series of print steps to print all the pages of print data once from the start to final pages of the print data string of job C is defined as printing of one set. In operation 2, the control unit 205 causes the printer unit 203 to repetitively execute the series of print steps nine times as a print operation necessary to create case-bound printed bundles of nine sets. That is, the control unit 205 causes the printer unit 203 to print nine copies designated by the user in order to execute the case binding process in printing the print data string of job C by a total of 10 copies.

(Operation 3) The control unit 205 causes the inline finisher of the system 1000 to execute the case binding process for the sheet bundles printed by the printer unit 203 in printing the nine copies. The control unit 205 causes the inline finisher of the system 1000 to execute the case binding process for each of the printed bundles of the nine copies.

(Operation 4) The control unit 205 reads out data of the same contents as those of data repetitively read out nine times from the HDD 209 in printing nine sets in operation 2, i.e., reads out the print data string of job C again from the HDD 209. In addition, the control unit 205 causes the printer unit 203 to execute, as printing of one set, a series of print steps to print all the pages of print data once from the start to final pages of the print data string of job C that are read out from the HDD 209. In operation 4, the control unit 205 causes the printer unit 203 to execute the series of print steps once as a print operation necessary to create a multi-hole-punched printed bundle of one set. That is, the control unit 205 causes the printer unit 203 to print one copy designated by the user in order to execute the multi-hole punching process in printing the print data string of job C by a total of 10 copies.

(Operation 5) The control unit 205 causes the inline finisher of the system 1000 to execute the multi-hole punching process for the sheet bundle printed by the printer unit 203 in printing one copy. The control unit 205 causes the inline finisher of the system 1000 to execute the multi-hole punching process for each sheet bundle. In operation 5, the execution count of multi-hole punching is one.

Note that the control unit 205 receives a print execution request only once for job C from the user via the key 503 after accepting a user request as shown in the display example of FIG. 22A for job C from the user via the window 2100 of FIG. 21.

After accepting only one print execution request from the user, the control unit 205 starts (operation 1) for job C, and successively, automatically executes all (operation 1) to (operation 5) for job C.

(Operation 1 ) is necessary for a job in the copy mode. (Operation 1 ) is unnecessary for a job in the box mode. When job C is in the box mode, the control unit 205 starts (operation 2), and successively, automatically executes all (operation 2) to (operation 5).

The control unit 205 controls the system 1000 to automatically execute the entire series of operations in response to press of the start key 503 after the user of job C makes settings as shown in the display example of FIG. 22A. That is, the control unit 205 starts executing the series of operations without accepting the print execution request of job C a plurality of number of times from the user.

In other words, the control unit 205 executes all (operation 1) to (operation 5) after accepting the print execution request of job C once before the start of (operation 1), without accepting the print execution request of job C again from the user during the period of the series of operations including the start time of (operation 1) to the end time of (operation 5).

Further, the control unit 205 controls to simultaneously accept both a "case binding process" execution request and "multi-hole punching process" execution request before the start of (operation 1) via a display executed by the UI unit, like the display of FIG. 22A. After accepting the execution requests of the two different types of sheet processes before the start of (operation 1), the control unit 205 executes all (operation 1) to (operation 5) without accepting from the user the "multi-hole punching process" execution request during the period of the series of operations including the start time of (operation 1) to the end time of (operation 5).

The control unit 205 executes (operation 1) only once before (operation 2).

In other words, the control unit 205 executes all (operation 1) to (operation 5) without executing the data storage operation of job C in (operation 2) twice in order to achieve printing in (operation 2) and printing in (operation 4).

The control unit 205 controls the system 1000 to execute only minimum user settings and apparatus operations and inhibit further operations.

The system 1000 executes (operation 1) to (operation 5) in response to accepting a print execution request once from the user. Control to execute the series of operations is a control example executed by the control unit 205 in the sequence illustrated in FIG. 29.

Assume that the user presses the key 503 after issuing a user request as shown in the display example of FIG. 22A. In response to the press of the key 503, the control unit 205 determines YES for job C in S1301 of FIG. 29. Then, the control unit 205 executes (operation 1) in S1302 of FIG. 29. The control unit 205 determines YES for job C in S1304 of FIG. 29 because job C is a "job requiring printing of a plurality of copies". The control unit 205 determines YES in S1305 of FIG. 29 because job C is a "job requiring execution of different types of sheet processes every designated number of copies", as a user request using the display example of FIG. 22A. The control unit 205 makes these determinations for job C in the process of FIG. 29.

Figure 29:
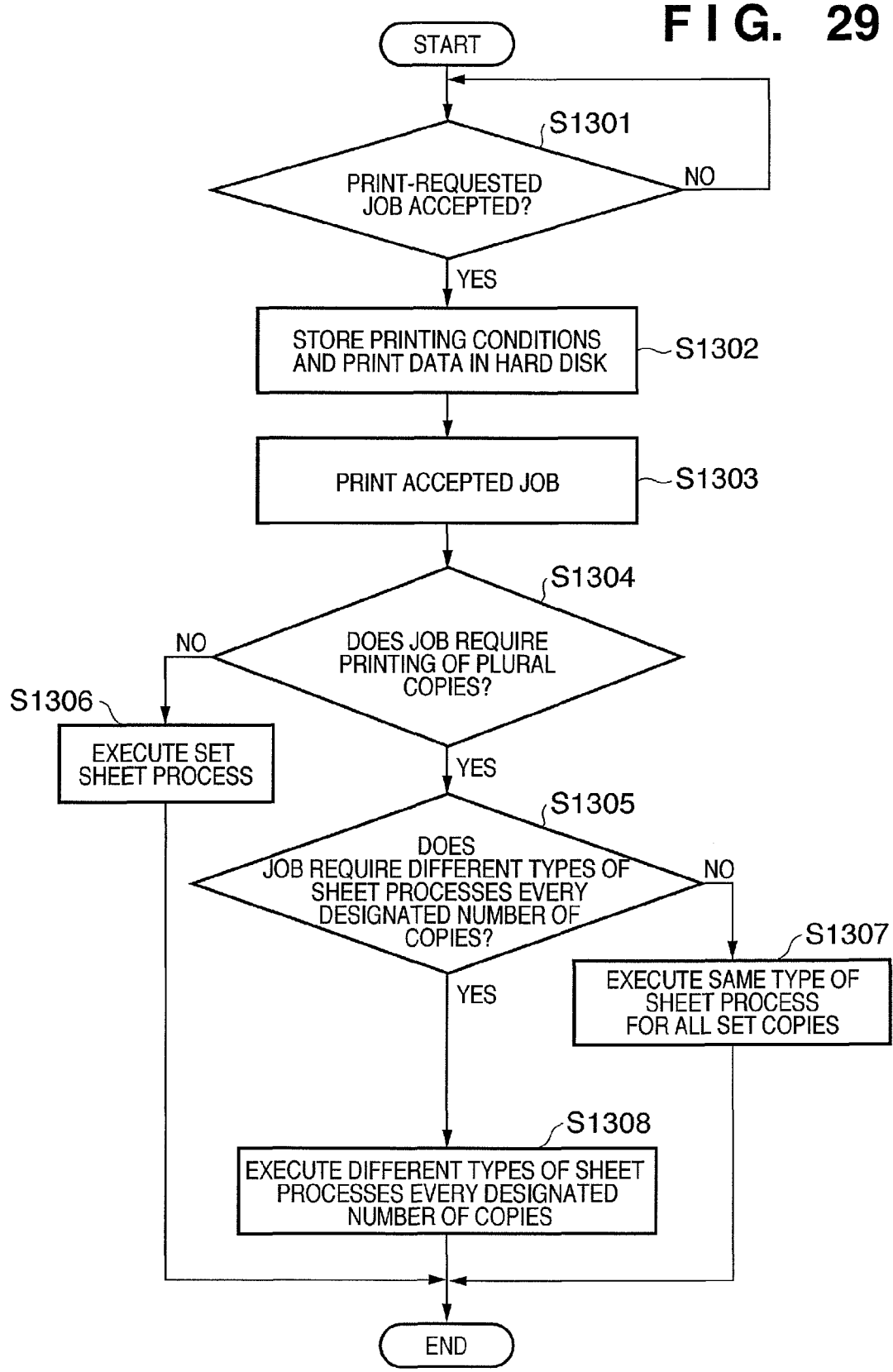
FIG. 29 is a flowchart for explaining an example of control to be executed in the embodiment.

Since YES in S1301 of FIG. 29, the control unit 205 causes the system 1000 to successively, automatically execute (operation 2) to (operation 5) in the processes of S1302, S1303, S1308, and the like, as described above. The above series of operations corresponds to the process of FIG. 29 in this way.

The control unit 205 of the embodiment allows the system 1000 to execute various control examples as described above.

The above constituent features can solve problems and the like assumed in Description of the Related Art. Especially, the embodiment can provide a mechanism of maximizing productivity even in a printing environment such as the POD environment where use cases and user needs different from those in the office environment are expected to arise. This control is also one of important features in the embodiment.

FIG. 22A shows one control example when there are "two" finishing types executed every printed bundles by a designated number of copies in accordance with a user request for job C requiring printing of a plurality of copies with print data of the same contents. As described above, the embodiment can individually set two or more different types of finishings as long as the system 1000 can execute them. This control will be described below.

[Control Example Executed by Control Unit 205 when Accepting User Request as Shown in Display Example of FIG. 22B from User via UI Unit for Job Requiring Printing of Copies]

Another control example executed by the control unit 205 of the embodiment when accepting a specific user request via the display of FIG. 21, as described above, will be described with reference to FIG. 22B. A 20-page job (to be referred to as job D hereinafter) will be explained in distinction from job C controlled in the display example of FIG. 22A.

For example, the user makes user settings as shown in the display example of FIG. 22B for the job D via the display of FIG. 21 executed by the display unit 401 under the control of the control unit 205.

In this case, the control unit 205 determines that job D is a "job requiring printing of 10 copies in total, requiring execution of a stapling process for each of printed bundles of two sets out of printed bundles of 10 sets, requiring execution of a case binding process for each of printed bundles of four sets, and requiring execution of a multi-hole punching process for each of printed bundles of four remaining sets".

Assume that the user issues a user request as shown in the display example of FIG. 22B via the display of the window 2100, and then presses the start key 503. The control unit 205 determines that it has accepted the execution request of job D from the user. After making this determination, the control unit 205 controls the print system 1000 to successively, automatically execute the following series of operations.

(Operation 1 ) The control unit 205 stores a 20-page print data string of job D in the HDD 209.

(Operation 2 ) The control unit 205 reads out the 20-page print data string of job D from the HDD 209, and causes the printer unit 203 to start printing. A series of print steps to print all the pages of print data once from the start to final pages of the print data string of job D is defined as printing of one set. In operation 2, the control unit 205 causes the printer unit 203 to repetitively execute the series of print steps twice as a print operation necessary to create stapled printed bundles of two sets. That is, the control unit 205 causes the printer unit 203 to print two copies designated by the user in order to execute the stapling process in printing the print data string of job D by a total of 10 copies.

(Operation 3 ) The control unit 205 causes the inline finisher of the system 1000 to execute the stapling process for the sheet bundles printed by the printer unit 203 in printing the two copies. The control unit 205 causes the inline finisher of the system 1000 to execute the stapling process for each of the printed bundles of the two copies.

(Operation 4 ) The control unit 205 reads out data of the same contents as those of data repetitively read out two times from the HDD 209 in printing two sets in operation 2, i.e., reads out the print data string of job D again from the HDD 209. In addition, the control unit 205 causes the printer unit 203 to execute, as printing of one set, a series of print steps to print all the pages of print data once from the start to final pages of the print data string of job D that are read out from the HDD 209. In operation 4, the control unit 205 causes the printer unit 203 to execute the series of print steps four times as a print operation necessary to create case-bound printed bundles of four sets. That is, the control unit 205 causes the printer unit 203 to print four copies designated by the user in order to execute the case binding process in printing the print data string of job D by a total of 10 copies.

(Operation 5 ) The control unit 205 causes the inline finisher of the system 1000 to execute the case binding process for the sheet bundles printed by the printer unit 203 in printing the four copies. The control unit 205 causes the inline finisher of the system 1000 to execute the case binding process for each sheet bundle. In operation 5, the execution count of the case binding process is four.

(Operation 6) The control unit 205 reads out data of the same contents as those of data repetitively read out four times from the HDD 209 in printing four sets in operation 2, i.e., reads out the print data string of job D again from the HDD 209. In addition, the control unit 205 causes the printer unit 203 to execute, as printing of one set, a series of print steps to print all the pages of print data once from the start to final pages of the print data string of job D that are read out from the HDD 209. In operation 6, the control unit 205 causes the printer unit 203 to execute the series of print steps four times as a print operation necessary to create multi-hole-punched printed bundles of four sets. That is, the control unit 205 causes the printer unit 203 to print four copies designated by the user in order to execute the multi-hole punching process in printing the print data string of job D by a total of 10 copies.

(Operation 7) The control unit 205 causes the inline finisher of the system 1000 to execute the multi-hole punching process for the sheet bundles printed by the printer unit 203 in printing the four copies. The control unit 205 causes the inline finisher of the system 1000 to execute the multi-hole punching process for each sheet bundle. In operation 7, the execution count of the multi-hole punching process is four.

Note that the control unit 205 receives a print execution request only once for job D from the user via the key 503 after accepting a user request as shown in the display example of FIG. 22B from the user via the window 2100 of FIG. 21.

After accepting only one print execution request from the user, the control unit 205 starts (operation 1) for job D, and successively, automatically executes all (operation 1) to (operation 7) for job D.

(Operation 1 ) is necessary for a job in the copy mode. (Operation 1 ) is unnecessary for a job in the box mode. When job D is in the box mode, the control unit 205 starts (operation 2), and successively, automatically executes all (operation 2) to (operation 7).

The control unit 205 controls the system 1000 to automatically execute the entire series of operations in response to press of the start key 503 after the user of job D makes settings as shown in the display example of FIG. 22B. That is, the control unit 205 starts executing the series of operations without accepting the print execution request of job D a plurality of number of times from the user.

In other words, the control unit 205 executes all (operation 1) to (operation 7) after accepting the print execution request of job D once before the start of (operation 1), without accepting the print execution request of job D again from the user during the period of the series of operations including the start time of (operation 1) to the end time of (operation 7).

Further, the control unit 205 controls to simultaneously accept the execution requests of three types of sheet processes: "stapling process", "case binding process", and "multi-hole punching process" from the user via a display executed by the UI unit, like the display in FIG. 22B, before the start of (operation 1) via a display executed by the UI unit, like the display of FIG. 22B. After accepting the execution requests of the three different types of sheet processes before the start of (operation 1), the control unit 205 executes all (operation 1) to (operation 7) without accepting the "case binding process" and "multi-hole punching process" execution requests from the user during the period of the series of operations including the start time of (operation 1) to the end time of (operation 7).

The control unit 205 executes (operation 1) only once before (operation 2).

In other words, the control unit 205 executes all (operation 1) to (operation 7) without executing the data storage operation of job D in (operation 2) three times in order to achieve printing in (operation 2), printing in (operation 4), and printing in (operation 3).

The control unit 205 controls the system 1000 to execute only minimum user settings and apparatus operations and inhibit further operations. The control unit 205 can simultaneously set and execute a plurality of types of sheet processes for a single job within the number of sheet processes (a maximum of six types in the example of FIG. 21) corresponding to the total number of sheet process types executable by the system 1000.

The control unit 205 inhibits the user from setting the number of copies exceeding the total number of copies displayed in the display field 2108 when the user individually sets finishing every designated number of copies for a job requiring printing of a plurality of copies. However, the user may change the total number of copies via the display of FIG. 21. This control will be explained below.

Figure 22C:
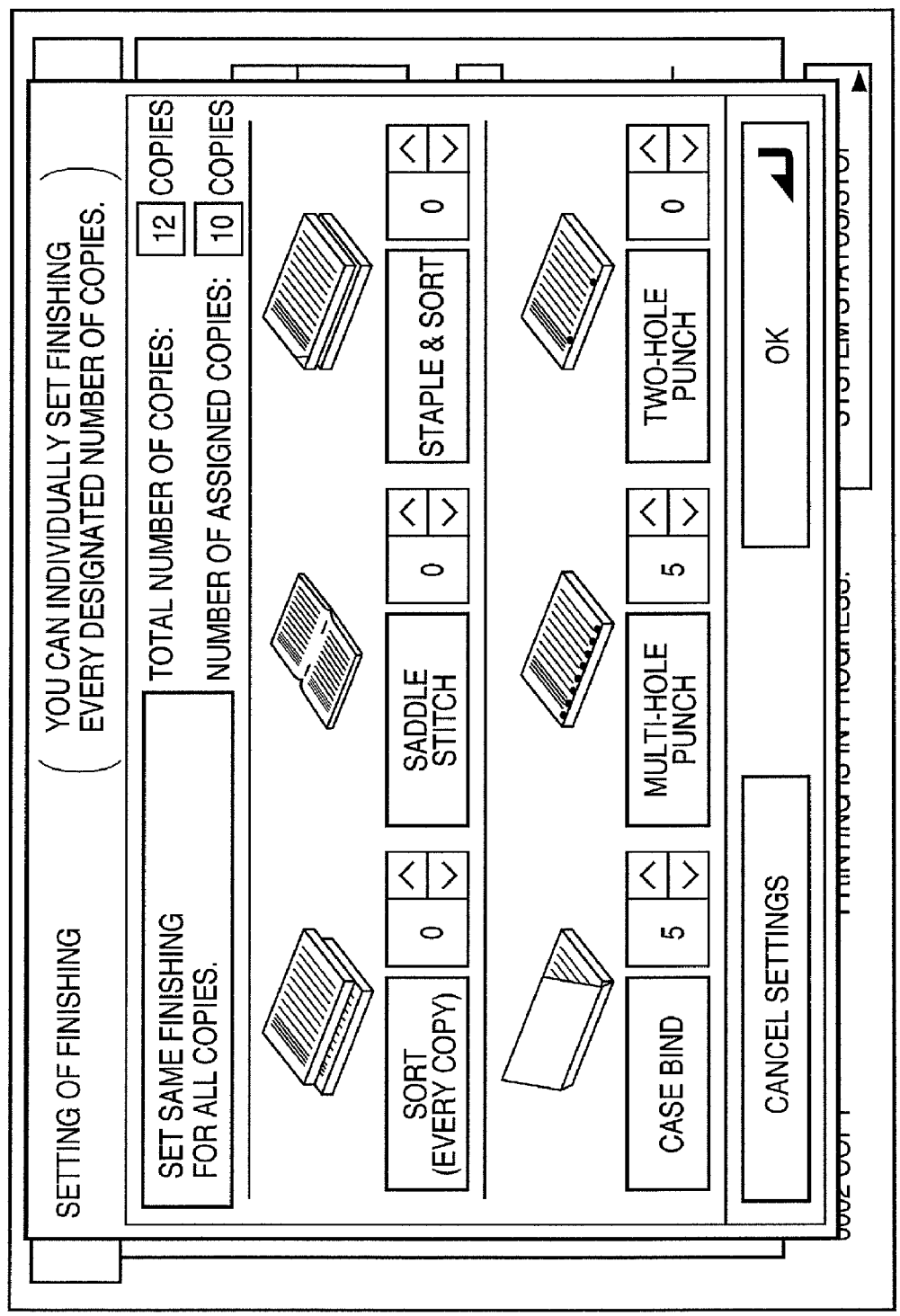
FIG. 22C is a view for explaining an example of control including display control on the UI unit to be executed in the embodiment.

Assume that the control unit 205 causes the display unit 401 to execute the display of FIG. 21, and then the user presses the display field 2108 in FIG. 21. In response to this, the control unit 205 flickers the display of the display field 2108, and accepts a total copy count change request from the user during the flicking period. For example, to change the total copy count from "10 copies" to "12 copies", the user may input "12" with the ten-key pad 506. In response to accepting this setting, the control unit 205 controls the display contents of FIG. 21 to reflect the setting change. For example, the control unit 205 causes the display unit 401 to execute a display as shown in FIG. 22C.

This configuration further improves operability. However, the embodiment is not limited to this configuration. For example, after closing the window 2100 of FIG. 21, the control unit 205 causes the display unit 401 to execute again a display which allows the user to set the total copy count of a job to be processed, as illustrated in FIGS. 6 and 19. The control unit 205 allows the user to change the total copy count setting of the job to be processed via the display. Although any operation control is applicable, the control unit 205 is configured to accept at least a request when the user requests a change of the copy count as a change of the process condition setting of a job to be processed.

When the copy count setting changes, for example, the control unit 205 determines YES in S1211 of FIG. 24B and shifts to the process in S1206 of FIG. 24A.

Operation control to the UI unit illustrated in FIGS. 20, 21, and 22A to 22C means execution of the following control by the control unit 205.

Assume that the control unit 205 determines NO in at least either of S1204 and S1206 of FIG. 24A for a job for which the user currently sets print process conditions. This situation is either of the following cases.

(Case 1) The system 1000 cannot execute different types of sheet processes. For example, the number of inline finishers in the system 1000 is 0, i.e., there is no inline finisher. Alternatively, the system 1000 comprises one inline finisher, but the inline finisher cannot execute different types of finishings. This situation is case 1.

(Case 2) The total copy count requested by a user via a display capable of accepting a copy count setting from the user, like the displays illustrated in FIGS. 6 and 19, is "one copy". In other words, the job to be processed is a "job requiring printing of one copy", and is not a "job requiring printing of a plurality of copies". This situation is case 2.

Assume that the control unit 205 determines that the current situation is either of the above-described (case 1) and (case 2). Then, the control unit 205 controls the operation unit 204 to inhibit it from accepting a specific request illustrated in FIGS. 20, 21, or 22A to 22C from the user of the job.

For example, the control unit 205 controls the display unit 401 to invalidate the display of the key 2007 in FIG. 20. For example, the control unit 205 controls the display unit 401 not to display the key 2007, or to gray out or hatch the key 2007. In this way, any display control method is applicable. In either of (case 1) and (case 2), the control unit 205 controls the operation unit 204 to inhibit it from at least "accepting a user request from a user to individually set a specific type of sheet process every designated number of copies for a job to be processed".

In either of (case 1) and (case 2), the control unit 205 also inhibits the display unit 401 from displaying the window 2100 illustrated in FIGS. 21 to 22C. The control unit 205 also inhibits the display unit 401 from accepting a specific request from a user "to execute a specific type of sheet process by an inline finisher every printing of a specific number of copies in printing a plurality of copies" via the display of window 2100 shown in FIG. 21.

This inhibition control prevents a user from mistaking the configuration of the system 1000 and generating a user operation error or the like due to the mistake. This inhibition control itself is a mechanism of improving user operability, and a mechanism of further enhancing the effects of the embodiment.

This inhibition control is the process in S1215 of FIG. 24A. More specifically, if the process shifts from S1204 to S1215 or from S1206 to S1215, the control unit 205 inhibits the user from individually setting finishing every designated number of copies. The control unit 205 causes the display unit 401 to display a sheet process setup window complying with the determination.

In the process of S1215 of FIG. 24A, the control unit 205 causes the display unit 401 to execute the following display.

For example, in S1215, the control unit 205 causes the display unit 401 to display a sheet process setup window which invalidates the display of the key 2007 in the window 2000 of FIG. 20 and validates the keys 2001 to 2008. Alternatively, in S1215, the control unit 205 causes the display unit 401 to display a sheet process setup window which invalidates at least a total of six display fields 2101B to 2106B in the window 2100 of FIG. 21 and validates at least a total of six keys 2101A to 2106A.

In S1212, the control unit 205 causes the display unit 401 to execute this display. By this control, the control unit 205 inhibits the user from individually setting finishing every designated number of copies for a job requiring printing of a plurality of copies. The control unit 205 also inhibits accepting the setting request from the user via the UI unit. This configuration provides the following effects.

For example, the configuration can prevent problems such as confusion of a user who considers that he can individually set different types of finishings every designated number of copies though the control unit 205 determines NO in S1204 or S1206. The configuration can prevent problems such as a user operation error and a creation error of a final product not originally desired by a user because the user does not grasp the configuration of the print system even in either of (case 1) and (case 2).

When the above-described inhibition control is not applied, the following configuration is also assumable.

Assume that the user requests a plurality of types of finishings for a job requiring printing of a plurality of copies, but the system cannot execute any type of finishing process. In this case, unexecutable finishing is not executed but is changed to another executable finishing, executing forced output. This configuration is also one design idea. However, the embodiment does not employ this configuration of executing an alternative process to automatically perform forced output by a system or apparatus at its discretion. This is because the embodiment considers the following use case.

For example, in the POD environment, a user who operates the print system 1000 and a user who desires a final produce created by the print system 1000 may be different. The user who operates the system 1000 is an operator who works in the POD environment and is engaged in print services. The user who desires a final produce is a customer who requests printing of the company.

If the above-mentioned configuration of performing an alternative process is employed without executing the inhibition control of the embodiment, the system executes a process different from one desired by a user (customer) who desires a final product. Such a system is useless in the POD environment. The embodiment prevents this trouble when introducing the system into the POD environment. As a configuration for this purpose, the system 1000 can execute the inhibition control.

As described above, the embodiment assumes various use cases and needs, and can execute the process in S1215 if NO in S1204 or S1206 of FIG. 24A, in order to achieve various effects as described above. It is also a feature of the embodiment to employ this control.

However, assume that a job to be processed requires printing of a plurality of copies when the UI unit executes the above-described display in the process of S1215. In this case, if the system 1000 satisfies a specific condition, the control unit 205 permits execution of the same type of sheet process for each of printed bundles of the plurality of copies of the job. In other words, the process in S1215 does not always inhibit execution of finishing.

Assume that the control unit 205 determines in S1204 that a plurality of types of finishings are unexecutable but only one of six types of finishings illustrated in FIG. 20 is executable. In this case, the process shifts from S1204 to S1215. In S1215, the control unit 205 causes the display unit 401 to execute a display which invalidates the key 2007 in FIG. 20 and validates a key corresponding to this type of finishing among the keys 2001 to 2006. If the user requests at least this finishing via the key, the control unit 205 controls to execute it in printing a plurality of copies. That is, if the user requests the finishing, the control unit 205 executes this type of finishing designated by the user for each of printed bundles of a plurality of copies for a job requiring printing of a plurality of copies. The control unit 205 executes this control.

This control corresponds to one control example executed in a process sequence of NO in S1204→S1215→YES in S1216→YES in S1210 in FIGS. 24A and 24B ... (skipped) ... YES in S1304→NO in S1305→S1307 in FIG. 29. In S1215, the control unit 205 copes with even the following case other than the above specific condition.

Assume that the control unit 205 determines NO in S1206. In other words, the job to be processed is a "job not requiring printing of a plurality of copies", i.e., a "job requiring printing of one copy", like job A. In this case, the process shifts to S1215. If the system 1000 has a system configuration capable of executing a plurality of types of sheet processes, the control unit 205 performs the following control.

For example, the system 1000 has a system configuration capable of executing six types of finishings as illustrated in FIG. 20. When the system 1000 has this system configuration, it is assumed that the process shifts from S1206 to S1215. In the case, the control unit 205 then executes the above-described display control.

More specifically, in S1215, the control unit 205 causes the display unit 401 to display a sheet process setup window which invalidates the key 2007 in FIG. 20 and validates the keys 2001 to 2008. Alternatively, in S1215, the control unit 205 causes the display unit 401 to execute a display which invalidates a total of six display fields 2101B to 2106B in FIG. 21 and validates a total of six keys 2101A to 2106A.

The control unit 205 controls to permit accepting only one type of finishing desired by the user among the six types of finishings. In response to the request from the user, the control unit 205 executes this type of finishing for a printed bundle of a job requiring printing of one copy by the user.

This control is one control example executed in a process sequence of YES in S1204 ... NO in S1206→S1215→YES in S1216→YES in S1210 in FIGS. 24A and 24B ... (skipped) ... NO in S1304→S1306 in FIG. 29.

Jobs B and C to be processed in the control examples illustrated in FIGS. 22A and 22B are jobs processed in the following sequences. The control unit 205 controls to process jobs B and C in the following process sequences.

For example, the control unit 205 processes jobs B and C in a process sequence of YES in S1204→S1205→YES in S1206→S1207 YES in S1208→S1212→NO in S1213→YES in S1214→YES in S1210→S1217 in FIGS. 24A and 24B. In addition, the control unit 205 processes jobs B and C in a process sequence of YES in S1301→S1302→S1303→YES in S1304→YES in S1305→S1308 in FIG. 29.

The control unit 205 executes various process examples described above in the process shown in the flowchart of FIGS. 24A and 24B.

When the user completes all user settings for a job to be processed and presses the start key 503 of the operation unit 204, the control unit 205 determines YES in S1210 and shifts to S1217. In S1217, the control unit 205 executes the following process.

For example, the control unit 205 registers various settings accepted from the user via the operation unit 204 for the job to be processed, as a series of print process condition data in the HDD 209 in association with a print data string of the job to be printed.

By this method, the control unit 205 accepts the print execution request of a job to be processed and various process conditions (including the execution request of a sheet process by an inline finisher) of the job from the user via the operation unit 204.

Various control examples executed by the control unit 205 of the system 1000 described mainly in FIGS. 19 to 24B are incorporated in an example of "control by the high-productivity finishing sequence in printing a plurality of copies" according to the embodiment.

The print system 1000 according to the embodiment can also achieve the same configuration and effects as those described above even from a UI unit other than the operation unit 204 serving as an example of the UI unit. An example of this configuration will be described with reference to FIGS. 25A to 28.

Figure 25B:
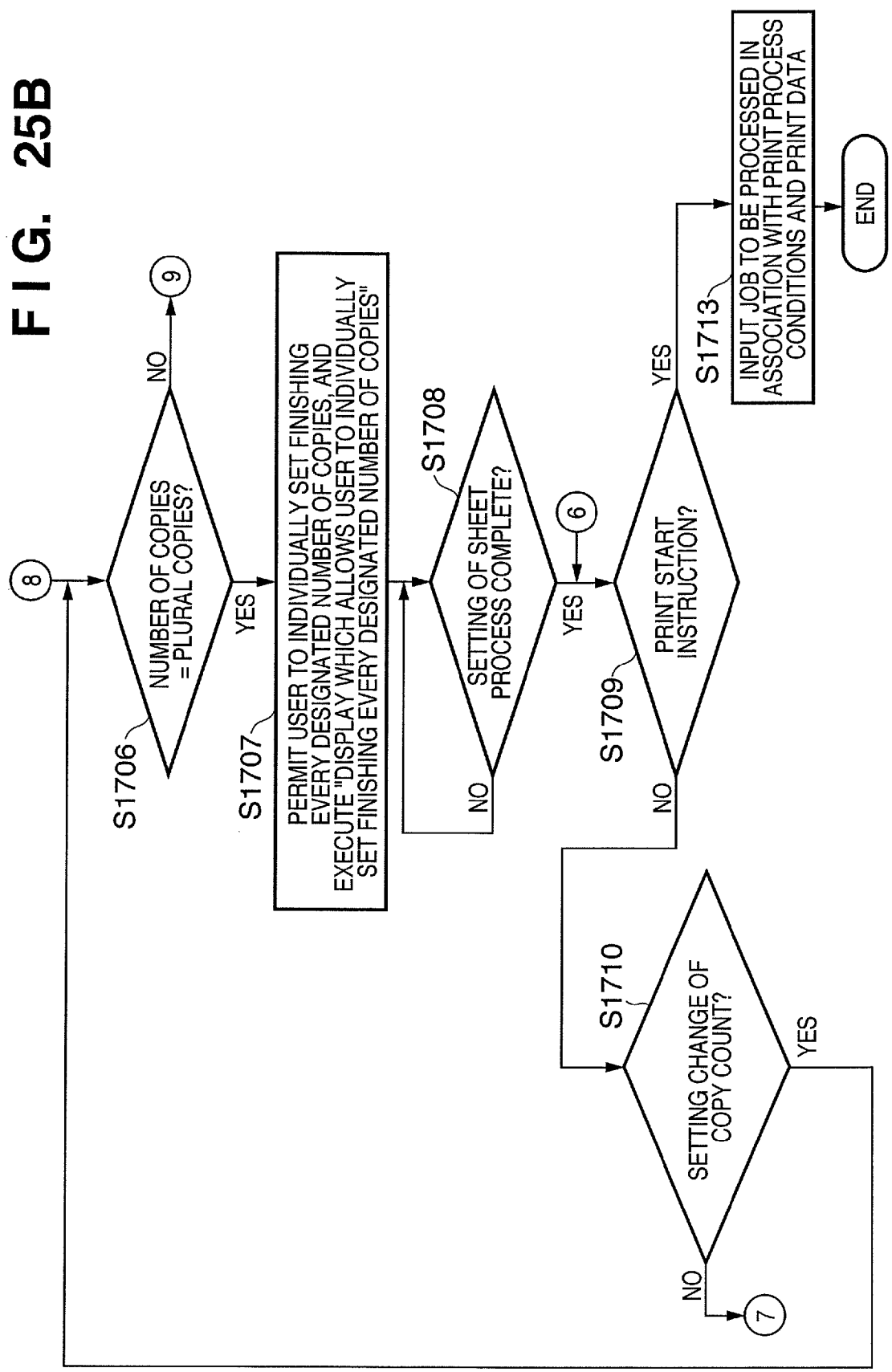

[Description of Control Example (Control Example when Accepting Print Execution Request of Job to be Processed via UI Unit of External Apparatus for Print Apparatus 100) Using Process of Flowchart Shown in FIGS. 25A and 25B]

The process of the flowchart in FIGS. 25A and 25B is also a process example incorporated in "control by the high-productivity finishing sequence in printing a plurality of copies" according to the embodiment.

A series of processes in FIGS. 25A and 25B is executed by a remote external apparatus which includes an information processing apparatus such as the PC 103 or 104 illustrated in FIG. 1 and can communicate data with the print apparatus 100. The control unit (e.g., the CPU of the PC 103) of the external apparatus executes control associated with the process of FIGS. 25A and 25B. In this example, the PC 104 executes the process of FIGS. 25A and 25B.

For example, the control unit of the PC 104 executes this process by reading out computer-readable program data for executing the process of FIGS. 25A and 25B from the memory of the PC 104. The program data may be incorporated as printer driver data of the print apparatus 100. Alternatively, the program data may be downloaded from WEB or the like via the Internet, or downloaded from a storage medium (e.g., CD-ROM) detachable from the PC 104. In any case, the control unit of the external apparatus such as the PC 104 reads out and executes the program data capable of executing the process of FIGS. 25A and 25B. In addition, the UI unit of the external apparatus can control to execute displays in FIGS. 26 to 28 (to be described below).

On the premise of this configuration, a method of inputting a job to be processed by the system 1000 in accordance with a user request acceptable via the UI unit of the external apparatus serving as another example of the UI unit of the embodiment will be explained with reference to FIGS. 25A to 28.

A process to input, from the PC 104 to the print apparatus 100 in FIG. 1, a job to be processed including a "job requiring printing of a plurality of copies and requiring different types of sheet processes every designated number of copies" will be explained including processes in steps S1701 to S1713 illustrated in FIGS. 25A and 25B.

Assume that the user of the PC 104 issues an instruction concerning the print execution request of file data created by specific application software such as document data creation software. While opening the data file in the PC 104, the user of the PC 104 uses the operation unit (not shown) of the PC 104 to input from the PC 104 an instruction to activate the printer driver of the print apparatus 100. The operation unit of the PC 104 is, e.g., the mouse or keyboard of the PC 104 or the monitor (display unit) of the PC 104.

Figure 26:
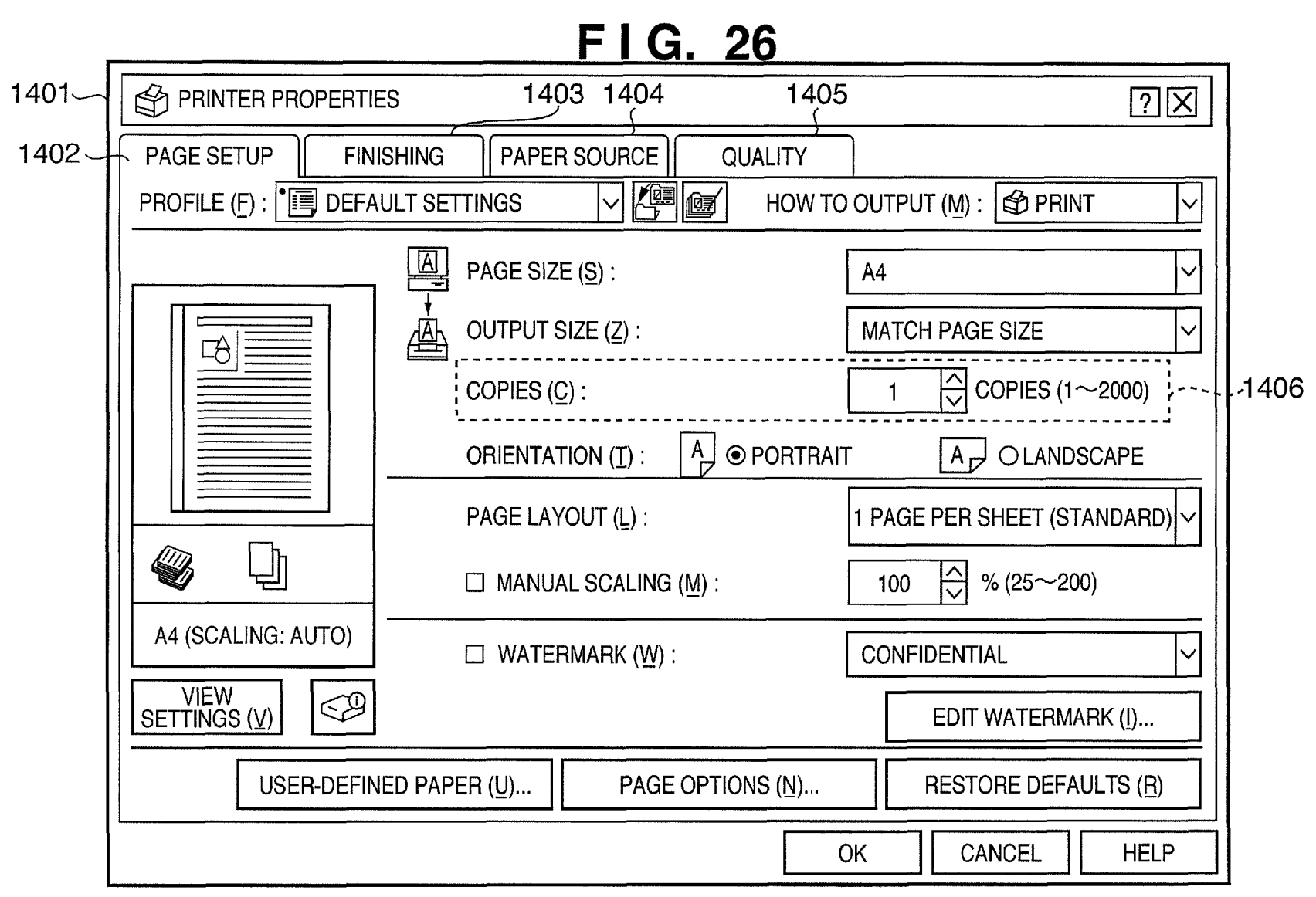

When the PC 104 accepts the instruction to activate the printer driver of the print apparatus 100, the control unit of the PC 104 causes the display unit of the PC 104 to display the print setup window of the print apparatus 100. FIG. 26 shows an example of this window. The display in FIG. 26 is a display example of a window 1401 for designating printer properties.

The display of FIG. 26 executed by the display unit of the PC 104 under the control of the control unit of the PC 104 has a page setup tab 1402 for causing the PC 104 to execute a display which allows a user to make various page settings of data of a job to be printed. The display of FIG. 26 has a page setup window displayed on the display unit of the PC 104 by the control unit of the PC 104 when the user of the PC 104 presses the tab 1402. The display of FIG. 26 also has a finishing tab 1403 for accepting an instruction from the user to cause the PC 104 to execute a display which allows the user of the PC 104 to make finishing settings of a job to be printed.

The display of FIG. 26 also has a paper feed tab 1404 for accepting an instruction from the user to cause the PC 104 to execute a display which allows the user to designate a paper feed method. The display of FIG. 26 also has a print quality tab 1405 which allows the user to set the print quality. The display of FIG. 26 also has a copy count designation field 1406 which allows the user to designate the number of copies of a job to be printed.

When the PC 104 is to transmit a job to be printed to the print apparatus 100, the control unit of the PC 104 accepts various print process conditions of the job from the user of the PC 104 via the display of FIG. 26.

When the user of the PC 104 inputs the instruction to activate the printer driver of the print apparatus 100, the control unit of the PC 104 causes the display unit of the PC 104 to execute the display of FIG. 26. Further, when the user of the PC 104 inputs the instruction to activate the printer driver of the print apparatus 100, the control unit of the PC 104 reads out program data for executing the flowchart of FIGS. 25A and 25B from the memory of the PC 104. The control unit of the PC 104 causes the PC 104 to execute the readout program and thereby execute a series of processes in FIGS. 25A and 25B. In other words, when the display unit of the PC 104 executes the display of FIG. 26, the control unit of the PC 104 controls the PC 104 to start executing the process of the flowchart in FIGS. 25A and 25B.

In response to a key operation by the user in the display of FIG. 26, the control unit of the PC 104 causes the display unit of the PC 104 to execute a display capable of accepting print process conditions from the user of the PC 104 except for print process conditions acceptable in the display of FIG. 26. Based on the above description, the process of FIGS. 25A and 25B will be explained.

The control unit of the PC 104 causes the display unit of the PC 104 to execute the display of FIG. 26 serving as an example of the print setup window of the print apparatus 100. Then, the control unit of the PC 104 determines whether the user of the PC 104 requests display of a sheet process setup window. This process is an example of the process in S1701 of FIG. 25A.

For example, in S1701, the control unit of the PC 104 checks whether the user of the PC 104 has executed any key operation in the display of FIG. 26. If the user of the PC 104 has executed any key operation in the display of FIG. 26, the control unit 205 determines YES in S1701, and shifts to the process in S1702. If the control unit 205 has not accepted any key operation via the display of FIG. 26, it determines NO in S1701 and repeats the process in S1701.

If the process shifts to S1702, the control unit of the PC 104 determines whether the instruction requested by the user of the PC 104 in S1701 is an "instruction to display a sheet process setup window for a job to be processed". In other words, in S1702, the control unit of the PC 104 determines whether it has accepted an "instruction to cause the PC 104 to execute a display which allows the user of the PC 104 to designate a sheet process necessary for a job to be printed by the print apparatus 100".

For example, in S1702, the control unit of the PC 104 checks whether the user of the PC 104 clicks the finishing tab 1403 in the display of FIG. 26 with the mouse. If the user of the PC 104 clicks the tab 1403 in the display of FIG. 26, the control unit of the PC 104 determines YES in S1702, and advances the process from S1702 to S1703. If the request accepted from the user of the PC 104 in S1701 is not a request to the tab 1403 in the display of FIG. 26, the control unit of the PC 104 determines NO in S1702, and advances the process from S1702 to S1709.

In S1703, the control unit of the PC 104 confirms system configuration information of the print system 1000 having the print apparatus 100. The system configuration information contains (information 1) to (information 5) described above with reference to FIGS. 8A to 10B and the like. In other words, the control unit of the PC 104 confirms the following items in S1703.

(1) Confirmation of whether an inline finisher connects to the print apparatus 100, i.e., confirmation of whether the system 1000 comprises an inline finisher.

(2) When an inline finisher connects to the print apparatus 100, confirmation of the number of connected inline finishers, i.e., confirmation of how many inline finishers the system 1000 comprises.

(3) When an inline finisher connects to the print apparatus 100, confirmation of the type of connected inline finisher capable of executing any type of finishing.

(4) When an inline finisher connects to the print apparatus 100, confirmation of what kind of finishing is executable and supported by the system 1000.

(5) When the system 1000 comprises a plurality of inline finishers, confirmation of the order in which the inline finishers each capable of executing any type of finishing cascade-connect to the print apparatus 100, i.e., confirmation of the connection order of the inline finishers of the system 1000 to the print apparatus 100.

In S1703, the control unit of the PC 104 makes these confirmations. The control unit of the PC 104 makes these confirmations by checking system configuration information of the print system 1000. In this example, the control unit of the PC 104 acquires and refers to the system configuration information by either of the following methods.

(1) In response to press of the tab 1403 in FIG. 26 by the user of the PC 104, the control unit of the PC 104 transmits a request command to the print apparatus 100 via the network 101 to request system configuration information of the system 1000. When the print apparatus 100 receives the request command, the control unit 205 of the print apparatus 100 sends back the system configuration information held in the HDD 209 from the print apparatus 100 to the PC 104 via the network 101. When the PC 104 receives the system configuration information transmitted from the print apparatus 100, the control unit of the PC 104 executes the process in S1703 on the basis of the system configuration information. In this fashion, the control unit of the PC 104 confirms system configuration information from the print apparatus 100 in real time in response to a user request to the PC 104.

(2) System configuration information of the print system 1000 is registered in the memory of the PC 104 in advance. For example, when installing the printer driver of the print apparatus 100 in the PC 104, the control unit of the PC 104 causes the display unit of the PC 104 to display a setup window (not shown). The user of the PC 104 registers the settings of the system 1000 including the print apparatus 100 via the setup window (not shown). At this time, the user of the PC 104 registers the above-mentioned (information 1) to (information 5) as registration information. The memory of the PC 104 registers and holds the information. Before executing the process in S1703, the control unit of the PC 104 reads out the information from the memory of the PC 104, and then executes the process in S1703 on the basis of the information. In this manner, the control unit of the PC 104 makes confirmations based on system configuration information registered in the memory of the PC 104 in advance.

By either of the above methods, the control unit of the PC 104 confirms system configuration information of the print system 1000 having the print apparatus 100 in S1703. Although either method is applicable, the control unit of the PC 104 desirably confirms in S1703 system configuration information at the current timing when the PC 104 transmits a job to be processed to the print apparatus 100.

After confirming the system configuration information of the print system 1000 in S1703, the control unit of the PC 104 advances the process from S1703 to S1704. In S1704, the control unit of the PC 104 determines, on the basis of the confirmed result of the system configuration information confirmed in S1703, whether the print system 1000 can execute different types of sheet processes. That is, in S1704, the control unit of the PC 104 confirms whether different types of finishings are executable using inline finishers for sheets of a job to be transmitted from the PC 104.

If the control unit of the PC 104 confirms in S1704 that the print system 1000 can execute different types of sheet processes, it advances the process from S1704 to S1705. For example, when the print system 1000 has one of the system configurations illustrated in FIGS. 8A to 10B, the control unit of the PC 104 determines YES in S1704 and advances the process from S1704 to S1705. This is because any of the system configurations in FIGS. 8A to 10B can execute different types of finishings for printed sheets of a job to be processed, as described above.

If the print system 1000 has a system configuration incapable of executing different types of finishings, the control unit of the PC 104 determines NO in S1704 and advances the process from S1704 to S1711. For example, when the print system 1000 does not comprise even one inline finisher, the control unit of the PC 104 advances the process from S1704 to S1711. Even when the system 1000 comprises one or a plurality of inline finishers, if the system configuration can execute only one type of finishing, the control unit of the PC 104 advances the process from S1704 to S1711. When the system 1000 has a system configuration incapable of executing different types of finishings, like these examples, the control unit of the PC 104 advances the process from S1704 to S1711.

In S1705, the control unit of the PC 104 confirms the copy count of print data of the job to be transmitted from the PC 104 to the print apparatus 100. For example, the control unit of the PC 104 confirms a copy count accepted from the user of the PC 104 via the copy count designation field 1406 in the display of FIG. 26 executed by the display unit of the PC 104. The copy count set in the designation field 1406 is the total copy count of a job to be processed. In the control example of FIG. 26, the range within which the user of the PC 104 can set the total copy count of a job to be processed is "one to 2,000 copies". The user can set an arbitrary copy count within this range for a desired job to be printed by the print apparatus 100.

In the process of S1706, the control unit of the PC 104 determines whether the user of the PC 104 sets a plurality of copies for the job to be printed by the print apparatus 100. In other words, in S1706, the control unit of the PC 104 confirms whether the job to be transmitted from the PC 104 to the print apparatus 100 requires printing of a plurality of copies.

Assume that the user of the PC 104 sets two or more copies via the copy count designation field 1406 in the display of FIG. 26, and presses the tab 1403 in FIG. 26. Under this condition, the job is a "job requiring printing of a plurality of copies". In this case, the control unit of the PC 104 determines YES in S1706 and advances the process from S1706 to S1707.

To the contrary, assume that the user of the PC 104 presses the tab 1403 in FIG. 26 when the copy count set in the copy count designation field 1406 in the display of FIG. 26 is "one copy". Under this condition, the job is not a "job requiring printing of a plurality of copies", but a "job requiring printing of one copy". In this case, the control unit of the PC 104 determines NO in S1706 and advances the process from S1706 to S1711.

If the process advances to S1707, the control unit of the PC 104 permits "the user of the PC 104 to individually set finishing every designated number of copies" for the job to be transmitted from the PC 104 to the print apparatus 100. In other words, in S1707, the control unit of the PC 104 permits accepting a "user request to cause the inline finisher of the system 1000 to execute a specific type of finishing designated by the user every printing of a specific number of copies designated by the user in printing a plurality of copies for a job requiring printing of a plurality of copies" from the user of the PC 104 via the UI unit of the PC 104. In S1707, the control unit of the PC 104 causes the display unit of the PC 104 to execute a specific display based on the determination in S1707.

The "specific display" executed by the display unit of the PC 104 under the control of the control unit of the PC 104 in S1707 is a "display which allows the user of the PC 104 to set a sheet process for a job to be processed". Also, the "specific display" in S1707 is a "display which allows the user of the PC 104 to individually set finishing every number of copies designated by the user of the PC 104 for a job requiring printing of a plurality of copies". What kind of display the control unit of the PC 104 causes the display unit of the PC 104 to execute as the "specific display" in S1707 will be exemplified.

Assume that the control unit of the PC 104 causes the display unit of the PC 104 to execute the display of FIG. 26, and the user of the PC 104 sets "copy count: 10 copies" via the copy count designation field 1406 in the display of FIG. 26 for a job to be printed. Then, assume that the user presses the tab 1403 in the display of FIG. 26. The job for which the user sets the total copy count "10 copies" via the UI of the PC 104 will be referred to as "job E". Job E is a job for which the printer unit 203 executes 10 times a series of print operations to print a print data string of all pages.

In other words, job E is a "job requiring printing of a plurality of copies". Hence, the control unit of the PC 104 determines YES in S1706 and advances to S1707 to make the above-described determination as a process for job E. The control unit of the PC 104 causes the display unit of the PC 104 to execute a display in FIG. 27 as the "specific display" for job E in S1707.

After the user sets "copy count: 10 copies" via the designation field 1406 in the display of FIG. 26 for job E, and requests setting of a sheet process for job E by a key operation to the tab 1403 in FIG. 26. In response to this, the control unit of the PC 104 causes the display unit of the PC 104 to execute the display of FIG. 27. The precondition of this display control is YES in S1704, i.e., that "the print system 1000 can execute different types of finishings".

The display in FIG. 27 has the following constituent features.

[Display Constituent Component 1: Print Style Designation Field]

The control unit of the PC 104 allows the user of the PC 104 to set, via a "print style designation field" in the display of FIG. 27, a print style to be executed by the print apparatus 100 for a job to be processed.

For example, the control unit of the PC 104 can present a plurality of print style selection candidates such as "single-sided printing" and "double-sided printing" in the "print style designation field" in the display of FIG. 27, and allows the user of the PC 104 to designate one print style. The control unit of the PC 104 controls the print apparatus 100 to print data of a job to be transmitted from the PC 104 by the print style designated by the user of the PC 104.

[Display Constituent Component 2: Binding Method Designation Field]

The control unit of the PC 104 allows the user of the PC 104 to set, via a "binding location designation field" in the display of FIG. 27, the binding location (which edge is to be bound) of a printed document when the print apparatus 100 prints a job to be processed.

By setting the binding location, for example, the image orientation is controlled to correctly lay out images in accordance with the binding edge in double-sided printing.

[Display Constituent Component 3: Sheet Process Type Designation Field 2701]

A designation field 2701 in the display of FIG. 27 is a display for accepting a user request from a user "to cause the print system 1000 to execute a specific type of finishing requested by a user every printing of a specific number of copies requested by the user for a job requiring printing of a plurality of copies". The "specific display" executed by the display unit of the PC 104 under the control of the control unit of the PC 104 in S1707 includes at least the display of the designation field 2701. Finishing is individually settable via the designation field 2701 every number of copies designated by the user of the PC 104.

The embodiment can provide the user of the PC 104 via the designation field 2701 with the same functions and effects as those providable via the display of FIG. 21. The embodiment can accept the print execution request of a job to be processed from the user via the UI unit of the print apparatus 100, similar to the control examples illustrated in the display examples of FIGS. 19 to 22C. When the job is a "job requiring printing of a plurality of copies", the user can individually set a user-desired type of finishing via the UI unit of the print apparatus 100 every number of copies designated by the user.

The embodiment can implement the same configuration as this one via the UI unit of an external apparatus such as the PC 104. More specifically, the embodiment can accept the print execution request of a job to be processed from the user via the UI unit of an external apparatus capable of communicating data with the print apparatus 100. When the job is a "job requiring printing of a plurality of copies", the user can individually set his desired type of finishing via the UI unit of the external apparatus every number of copies designated by the user.

For example, in S1707 of FIG. 25B, the control unit of the PC 104 causes the display unit of the PC 104 to execute the display of FIG. 27 having the designation field 2701. The control unit of the PC 104 permits accepting the following requests from the user of the PC 104 via the designation filed 2701 for a job which is to be processed and requires printing of a plurality of copies.

The designation field 2701 in FIG. 27 has a function of presenting all finishing types executable by the print system 1000 to the user of the PC 104. For example, the display example of FIG. 27 notifies the user of the PC 104 that the print system 1000 can execute a total of six types of finishings, as illustrated in FIG. 21, as different types of finishings. In other words, the control unit of the PC 104 causes the display unit of the PC 104 to execute a display which allows the user of the PC 104 to confirm via the designation field 2701 that the system 1000 can execute a plurality of types of finishings, and confirm kinds of the finishings. In executing this display, the control unit of the PC 104 utilizes system configuration information of the print system 1000 acquired by the above method.

The designation field 2701 in FIG. 27 has designation fields 1502 to 1513 arranged for respective selection of finishing types (six types in this example) selectable by a user. The roles and functions of these designation fields will be described.

[Designation Fields 1502 and 1503 in Display of FIG. 27]

The designation field 1502 is a "display capable of accepting a request from the user of the PC 104 to execute a sorting process for one sheet bundle bearing a print data string of a job by an inline finisher capable of executing the sorting process in the system 1000 every printing of one copy in printing a designated number of copies set by the user via the designation field 1503 in printing a plurality of copies for the job requiring printing of a plurality of copies".

Assume that the user of the PC 104 wants "to finish a printed bundle of one copy (sheet bundle of one set) by the sorting process in printing a plurality of copies for job E requiring printing of 10 copies in total". In this case, the user selects the designation field 1502 (checks the designation field 1502 with the mouse). In response to this, the control unit of the PC 104 validates the display of the designation field 1503 associated with the designation field 1502. Then, the user can set "one copy" as a designated number of copies in the designation field 1503. When accepting this setting from the user of the PC 104, the control unit of the PC 104 causes the system 1000 to execute the sorting process for only a sheet bundle of one set for job E requiring printing of sheet bundles of 10 sets in total.

By the above method, the control unit of the PC 104 completes the individual settings of the sorting process for printed bundles by a designated number of copies accepted from the user of the PC 104 via the designation field 1503 out of a total number of copies of a job that is set in the designation field 1406 of FIG. 26.

[Designation Fields 1504 and 1505 in Display of FIG. 27]

The designation field 1504 is a "display capable of accepting a request from the user of the PC 104 to execute a saddle-stitching process for one sheet bundle bearing a print data string of a job by an inline finisher capable of executing the saddle-stitching process in the system 1000 every printing of one copy in printing a designated number of copies set by the user via the designation field 1505 in printing a plurality of copies for the job requiring printing of a plurality of copies".

Assume that the user of the PC 104 wants "to finish a printed bundle of one copy (sheet bundle of one set) by the saddle-stitching process in printing a plurality of copies for job E requiring printing of 10 copies in total". In this case, the user selects the designation field 1504 (checks the designation field 1504 with the mouse).

In response to this, the control unit of the PC 104 validates the display of the designation field 1505 associated with the designation field 1504. Then, the user can set "one copy" as a designated number of copies in the designation field 1505. When accepting this setting from the user of the PC 104, the control unit of the PC 104 causes the system 1000 to execute the saddle-stitching process for only a sheet bundle of one set for job E requiring printing of sheet bundles of 10 sets in total.

By the above method, the control unit of the PC 104 completes the individual settings of the saddle-stitching process for printed bundles by a designated number of copies accepted from the user of the PC 104 via the designation field 1505 out of a total number of copies of a job that is set in the designation field 1406 of FIG. 26.

[Designation Fields 1506 and 1507 in Display of FIG. 27]

The designation field 1506 is a "display capable of accepting a request from the user of the PC 104 to execute a stapling process for one sheet bundle bearing a print data string of a job by an inline finisher capable of executing the stapling process in the system 1000 every printing of one copy in printing a designated number of copies set by the user via the designation field 1507 in printing a plurality of copies for the job requiring printing of a plurality of copies".

Assume that the user of the PC 104 wants "to finish printed bundles of two copies (sheet bundles of two sets) by the stapling process in printing a plurality of copies for job E requiring printing of 10 copies in total". In this case, the user selects the designation field 1506 (checks the designation field 1506 with the mouse).

In response to this, the control unit of the PC 104 validates the display of the designation field 1507 associated with the designation field 1506. Then, the user can set "two copies" as a designated number of copies in the designation field 1507. When accepting this setting from the user of the PC 104, the control unit of the PC 104 causes the system 1000 to execute the stapling process for only sheet bundles of two sets for job E requiring printing of sheet bundles of 10 sets in total.

By the above method, the control unit of the PC 104 completes the individual settings of the stapling process for printed bundles by a designated number of copies accepted from the user of the PC 104 via the designation field 1507 out of a total number of copies of a job that is set in the designation field 1406 of FIG. 26.

[Designation Fields 1508 and 1509 in Display of FIG. 27]

The designation field 1508 is a "display capable of accepting a request from the user of the PC 104 to execute a case binding process for one sheet bundle bearing a print data string of a job by an inline finisher capable of executing the case binding process in the system 1000 every printing of one copy in printing a designated number of copies set by the user via the designation field 1509 in printing a plurality of copies for the job requiring printing of a plurality of copies".

Assume that the user of the PC 104 wants "to finish printed bundles of two copies (sheet bundles of two sets) by the case binding process in printing a plurality of copies for job E requiring printing of 10 copies in total". In this case, the user selects the designation field 1508 (checks the designation field 1508 with the mouse).

In response to this, the control unit of the PC 104 validates the display of the designation field 1509 associated with the designation field 1508. Then, the user can set "two copies" as a designated number of copies in the designation field 1509. When accepting this setting from the user of the PC 104, the control unit of the PC 104 causes the system 1000 to execute the case binding process for only sheet bundles of two sets for job E requiring printing of sheet bundles of 10 sets in total.

By the above method, the control unit of the PC 104 completes the individual settings of the case binding process for printed bundles by a designated number of copies accepted from the user of the PC 104 via the designation field 1509 out of a total number of copies of a job that is set in the designation field 1406 of FIG. 26.

[Designation Fields 1510 and 1511 in Display of FIG. 27]

The designation field 1510 is a "display capable of accepting a request from the user of the PC 104 to execute a multi-hole punching process for one sheet bundle bearing a print data string of a job by an inline finisher capable of executing multi-hole punching in the system 1000 every printing of one copy in printing a designated number of copies set by the user via the designation field 1511 in printing a plurality of copies for the job requiring printing of a plurality of copies".

Assume that the user of the PC 104 wants "to finish printed bundles of two copies (sheet bundles of two sets) by the multi-hole punching process in printing a plurality of copies for job E requiring printing of 10 copies in total". In this case, the user selects the designation field 1510 (checks the designation field 1510 with the mouse).

In response to this, the control unit of the PC 104 validates the display of the designation field 1511 associated with the designation field 1510. Then, the user can set "two copies" as a designated number of copies in the designation field 1511. When accepting this setting from the user of the PC 104, the control unit of the PC 104 causes the system 1000 to execute the multi-hole punching process for only sheet bundles of two sets for job E requiring printing of sheet bundles of 10 sets in total.

By the above method, the control unit of the PC 104 completes the individual settings of the multi-hole punching process for printed bundles by a designated number of copies accepted from the user of the PC 104 via the designation field 1511 out of a total number of copies of a job that is set in the designation field 1406 of FIG. 26.

[Designation Fields 1512 and 1513 in Display of FIG. 27]

The designation field 1512 is a "display capable of accepting a request from the user of the PC 104 to execute a two-hole punching process for one sheet bundle bearing a print data string of a job by an inline finisher capable of executing two-hole punching in the system 1000 every printing of one copy in printing a designated number of copies set by the user via the designation field 1513 in printing a plurality of copies for the job requiring printing of a plurality of copies".

Assume that the user of the PC 104 wants "to finish printed bundles of two copies (sheet bundles of two sets) by the two-hole punching process in printing a plurality of copies for job E requiring printing of 10 copies in total". In this case, the user selects the designation field 1512 (checks the designation field 1512 with the mouse).

In response to this, the control unit of the PC 104 validates the display of the designation field 1513 associated with the designation field 1512. Then, the user can set "two copies" as a designated number of copies in the designation field 1513. When accepting this setting from the user of the PC 104, the control unit of the PC 104 causes the system 1000 to execute the two-hole punching process for only sheet bundles of two sets for job E requiring printing of sheet bundles of 10 sets in total.

By the above method, the control unit of the PC 104 completes the individual settings of the two-hole punching process for printed bundles by a designated number of copies accepted from the user of the PC 104 via the designation field 1513 out of a total number of copies of a job that is set in the designation field 1406 of FIG. 26.

The control unit of the PC 104 executes the above control in S1707.

The rule of a setting, execution of which is permitted to the user of the PC 104 in the designation field 2701 of FIG. 27, is the same as that of a setting, execution of which is permitted to the user of the print apparatus 100 via the display of FIG. 21. For example, the control unit of the PC 104 limits a user operation so that the sum of the designated copy counts of finishings whose execution requests are individually permitted to be accepted in the designation fields 1502 to 1513 becomes equal to a value set in the designation field 1406 of FIG. 26.

For example, the total copy count of job E is 10. Even when permitting individual settings of finishing in the display of FIG. 27, the control unit of the PC 104 invalidates all setting requests except for a setting with which the sum of designated copy counts of respective finishings equals 10 copies. According to this method, in the display example of FIG. 27, "case binding" is already set for sheet bundles of nine sets for job E requiring printing of 10 sets in total, and "multi-hole punching" is already set for a sheet bundle of one remaining set.

For this reason, the control unit of the PC 104 inhibits the user of the PC 104 from subsequently setting another type of finishing for job E while keeping the setting state in the display example of FIG. 27 unchanged. The control unit of the PC 104 invalidates (e.g., grays out or hatches) the displays of all the remaining designation fields 1502, 1504, 1506, and 1512 unless the user of the PC 104 cancels the checks of the designation fields 1508 and 1510.

However, this is merely a control example, and another control is also executable. For example, when the value of a copy count set in the designation field 1406 in the display of FIG. 26 is different from the sum of designated copy counts individually set in the designation field 2701 of FIG. 27, the settings in the display of FIG. 27 may be determined as final settings. In other words, the value of the total copy count set in the display of FIG. 26 may change to the sum of designated copy counts set in the display of FIG. 27.

The embodiment does not adopt a configuration which prompts the user of the PC 104 to always set a specific type of finishing every specific number of copies via the designation field 2701 of FIG. 27.

Assume that the user of the PC 104 checks the designation field 1508 in the display of FIG. 27 and sets "10 copies" in the designation field 1509 as settings of a given job (to be referred to as job F hereinafter). In this case, the control unit of the PC 104 causes the system 1000 to execute a case binding process for each of all sheet bundles of 10 sets for job F having a total copy count of 10.

Even when executing the display of FIG. 27, as described above, the control unit of the PC 104 controls to execute the same type of finishing for each of all sheet bundles of a plurality of sets for a job requiring printing of a plurality of copies in accordance with a request from the user. In other words, even when executing the process in S1711, the control unit of the PC 104 allows the user to select whether to individually set finishing every designation number of copies or set one common type of finishing.

Various control examples described above in an external apparatus also implement a mechanism capable of providing by the UI unit of the external apparatus the same services as those providable by the UI unit of the print apparatus 100 illustrated in FIG. 21.

The control unit of the PC 104 makes the determination in S1708 of FIG. 25B on the basis of whether the user of the PC 104 has pressed an OK key 1514 in the display of FIG. 27. In other words, the control unit of the PC 104 waits in S1708 until the user of the PC 104 completes finishing settings via the display of FIG. 27. Upon completion of the settings, the control unit of the PC 104 advances the process from S1708 to S1709.

Assume that "individual settings of finishing every designated number of copies" are complete for job E requiring printing of a plurality of copies, as shown in the display example of FIG. 27. The control unit of the PC 104 recognizes this from press (mouse clicking) of the OK key 1514 in the display of FIG. 27 by the user of the PC 104. In this case, the control unit of the PC 104 determines YES in S1708 and advances the process from S1708 to S1709.

After that, the display unit of the PC 104 returns to the display of FIG. 26 or the like, and the user of the PC 104 presses a print execution key (not shown) in the printer driver setup window of the print apparatus 100. In this case, the control unit of the PC 104 determines that it has accepted the print execution request of job E in response to the press of the print execution key. That is, the control unit of the PC 104 determines YES in S1709 and advances the process from S1709 to S1713.

In S1713, the control unit of the PC 104 associates print data (e.g., a 40-page document data string) of job E with a print process condition data string including various print process conditions for job E that are accepted from the user of the PC 104 via various displays including FIGS. 26 and 27. In S1713, the control unit of the PC 104 transmits the associated data as data of job E from the PC 104 to the print apparatus 100 via the network 101.

The print apparatus 100 receives the data of job E via the external I/F 202. Then, the control unit 205 of the print apparatus 100 stores the data of job E in the HDD 209. The control unit 205 causes the printer unit 203 to print the print data of job E stored in the HDD 209.

The control unit 205 causes the sheet-processing apparatus 200 to finish a printed sheet bundle of job E. The control unit 205 controls the system 1000 so that a series of operations including the print process and sheet process for job E complies with a user request issued from the user of the PC 104 via the UI unit of the PC 104.

More specifically, job E is a job for which the user of the PC 104 requests a total copy count of 10 via the display of FIG. 26. Also, job E is a job for which the user of the PC 104 requests "to execute case binding for each of printed bundles of nine copies out of printed bundles of 10 copies, and execute multi-hole punching for a printed bundle of one copy" via the designation field 2701 in the display of FIG. 27 executed by the display unit of the PC 104. Thus, the control unit 205 causes the print system 1000 to execute operations complying with the user request for job E as a series of operations for job E.

The control unit 205 confirms what user request is issued, by analyzing the print process condition data string of job E stored in the HDD 209 together with the print data (a 40-page document data string) of job E. For example, the control unit 205 controls the print system 1000 to automatically execute all the following operations. "To automatically execute operations" means "to successively, automatically execute the following operations without newly accepting any print execution request or sheet process setting from the user of the PC 104 via the UI unit of the PC 104 or print apparatus 100 after the PC 104 transmits data of job E to the print apparatus 100".

[Operation 1] The control unit 205 stores a 40-page print data string of job E in the HDD 209. The control unit 205 also stores a printing condition data string of job E in the HDD 209 in association with the print data in the HDD 209.

[Operation 2] The control unit 205 reads out the 40-page print data string of job E from the HDD 209, and causes the printer unit 203 to start printing. A series of print steps to print all the pages of print data once from the start to final pages of the print data string of job E is defined as printing of one set. In operation 2, the control unit 205 causes the printer unit 203 to repetitively execute the series of print steps nine times as a print operation necessary to create case-bound printed bundles of nine sets. That is, the control unit 205 causes the printer unit 203 to print nine copies designated by the user in order to execute the case binding process in printing the print data string of job E by a total of 10 copies.

[Operation 3] The control unit 205 causes the inline finisher (the sheet-processing apparatus 200*b* when the system 1000 has the system configuration in FIGS. 8A and 8B) of the system 1000 to execute the case binding process for the sheet bundles printed by the printer unit 203 in printing the nine copies. The control unit 205 causes the inline finisher of the system 1000 to execute the case binding process for each of the printed bundles of the nine copies.

[Operation 4] The control unit 205 reads out data of the same contents as those of data repetitively read out nine times from the HDD 209 in printing nine sets in operation 3, i.e., reads out the print data string of job E again from the HDD 209. In addition, the control unit 205 causes the printer unit 203 to execute, as printing of one set, a series of print steps to print all the pages of print data once from the start to final pages of the print data string of job E that are read out from the HDD 209. In operation 4, the control unit 205 causes the printer unit 203 to execute the series of print steps once as a print operation necessary to create a multi-hole-punched printed bundle of one set. That is, the control unit 205 causes the printer unit 203 to print one copy designated by the user in order to execute the multi-hole punching process in printing the print data string of job E by a total of 10 copies.

[Operation 5] The control unit 205 causes the inline finisher (the sheet-processing apparatus 200*c* when the system 1000 has the system configuration in FIGS. 8A and 8B) of the system 1000 to execute the multi-hole punching process for the sheet bundle printed by the printer unit 203 in printing one copy. The control unit 205 causes the inline finisher of the system 1000 to execute the multi-hole punching process for each sheet bundle. In operation 5, the execution count of the multi-hole punching process is one.

The control unit 205 controls the HDD 209, printer unit 203, and sheet-processing apparatus 200 so that the print system 1000 successively, automatically executes all [operation 1] to [operation 5] for job E in accordance with a user request accepted from the user of the PC 104 via the display of FIG. 26 or 27 before [operation 1] without any intervention operation by the user during the period of [operation 1] and subsequent operations.

A series of operations complying with a user request accepted via the display of FIG. 26 or 27 for job E will be explained with reference to the flowchart of FIGS. 25A and 25B and that of FIG. 29 (to be described later). The control unit (including both the control unit of the PC 104 and the control unit 205 of the print apparatus 100) of the system 1000 controls the system 1000 to process job E in the following process sequence.

The process sequence is YES in S1701→YES in S1702→S1703→YES in S1704→S1705→YES in S1706→S1707→YES in S1708→YES in S1709→S1713 (they are a series of processes by the PC 104) in FIGS. 25A and 25B→YES in S1301→S1302→S1303→YES in S1304→YES in S1305→S1308 (they are a series of processes by the print apparatus 100) in FIG. 29.

The system 1000 can execute the series of control operations when the process advances to S1707 of FIG. 25B.

If NO in S1704 or NO in S1706, the control unit of the PC 104 advances the process to S1711. In this case, in S1711, the control unit of the PC 104 inhibits "the user of the PC 104 from executing individually setting finishing every designated number of copies". In S1711, the control unit of the PC 104 causes the display unit of the PC 104 to display a sheet process setup window complying with this determination. A control example concerning the display executed by the display unit of the PC 104 under the control of the control unit of the PC 104 in S1711 will be described.

Assume that the system 1000 cannot execute different types of finishings. In this case, the process shifts from S1704 to S1711. Even if the system 1000 can execute different types of finishings, when the job to be processed is not a "job requiring printing of a plurality of copies", the process shifts from S1706 to S1711.

If the process advances to S1711, the control unit of the PC 104 inhibits the display unit of the PC 104 from executing the above-mentioned "specific display" illustrated in the display of FIG. 27 that is to be executed by the display unit of the PC 104 in S1707. In other words, in S1711, the control unit of the PC 104 causes the display unit of the PC 104 to execute a "specific display different from the display of FIG. 27" so as to discriminate functions from those providable in the display of FIG. 27. For example, in S1711, the control unit of the PC 104 causes the display unit of the PC 104 to execute a display illustrated in FIG. 28.

The control unit of the PC 104 controls the display unit of the PC 104 so that the display of FIG. 28 has the same constituent features as those in the displays of the [print style designation field] and [binding location designation field] in FIG. 27. In other words, when the PC 104 displays the display of FIG. 28, the control unit of the PC 104 controls the display unit of the PC 104 to permit accepting, from the user via the display of FIG. 28, a user request which is permitted to be accepted via the displays of the [print style designation field] and [binding location designation field] in FIG. 27.

However, the control unit of the PC 104 controls the display unit of the PC 104 so as not to allow the display of FIG. 28 to have the display constituent components of [display constituent component 3: sheet process type designation field 2701] in the display of FIG. 27.

In other words, when the PC 104 displays the display of FIG. 28, the control unit of the PC 104 controls the display unit of the PC 104 to inhibit accepting, from the user via the display of FIG. 28, a user request which is permitted to be accepted via the display of the designation field 2701 in FIG. 27.

When executing the display of FIG. 28, the control unit of the PC 104 inhibits the display unit of the PC 104 from displaying the designation field 2701 in FIG. 27, but causes the display unit of the PC 104 to display a designation field 2801 instead of the designation field 2701.

For example, the control unit of the PC 104 permits accepting a user request "to execute the same type of finishing for all printed bundles of copies for a job requiring printing of a plurality of copies" from the user of the PC 104 via the display of the designation field 2801. The control unit of the PC 104 allows the user of the PC 104 to select only one type of finishing desired by the user of the PC 104 from a plurality of types of finishing selection candidates executable by the print system 1000 via the display of the designation field 2801.

For example, the control unit of the PC 104 allows the user of the PC 104 to select only one type of finishing from six types of finishings via the designation field 2801. There are six types of selection candidates because this description is based on a system configuration example when the print system 1000 can execute six types of finishings by inline finishers.

In S1711, the control unit of the PC 104 causes the display unit of the PC 104 to execute the display of FIG. 28. The designation field 2801 in FIG. 28 has designation fields 1602 to 1607. The control unit of the PC 104 allows the user of the PC 104 to select one desired type of finishing via one of the designation fields 1602 to 1607. In the example of FIG. 28, the PC 104 checks the designation field 1606 contained in the designation field 2801. That is, the user of the PC 104 requests execution of a multi-hole punching process for a printed sheet bundle of a job to be processed.

The display example of FIG. 28 is one when the process advances from S1706 to S1711. When the process advances from S1704 to S1711, the control unit of the PC 104 causes the display unit of the PC 104 in S1711 to execute still another specific display different from the display of the designation field 2701 in FIG. 27 and that of the designation field 2801 in FIG. 28.

The precondition of a sequence of advancing the process from S1706 to S1711 is YES in S1704. That is, the process advances to S1711 through NO in S1706 on the premise that the system 1000 can execute different types of sheet processes. The display of the designation field 2801 in FIG. 28 is an example of display contents reflecting this sequence. In S1711, the control unit of the PC 104 causes the display unit of the PC 104 to display the designation field 2801 in FIG. 28 on condition that the control unit of the PC 104 confirms that the system 1000 can execute six types of finishings (YES in S1704) and that the job to be processed is not a job requiring printing of a plurality of copies (NO in S1706). In this case, a request, which the control unit of the PC 104 permits to accept from the user of the PC 104, is at least either of the following requests.

(1) A request to execute the same type of finishing for each of all printed bundles of copies for a job requiring printing of a plurality of copies. A request to allow a user to designate which type of finishing is to be executed among six types of finishings.

(2) A request to execute one of six types of finishings for one printed bundle of one copy for a job requiring printing of one copy. A request to allow a user to designate which type of finishing is to be executed among the six types of finishings.

If the process advances from S1706 to S1711, the control unit of the PC 104 causes the print system 1000 to execute an operation corresponding to a request (e.g., request (1) or (2)) from the user of the PC 104 for a job to be processed.

Assume that the user of the PC 104 issues request (1) in S1711, and issues a print execution request with a print execution key (not shown) in the printer driver setup window displayed on the display unit of the PC 104. This means S1711→YES in S1712→YES in S1709→S1713 in FIGS. 25A and 25B. In this case, the control unit 205 of the print apparatus 100 executes the process in S1307 of FIG. 29 (to be described later) for a requested job to be processed.

Assume that the user of the PC 104 issues request (2) in S1711, and issues a print execution request with the print execution key (not shown) in the printer driver setup window displayed on the display unit of the PC 104. This also means S1711→YES in S1712→YES in S1709→S1713 in FIGS. 25A and 25B. In this case, the control unit 205 of the print apparatus 100 executes the process in S1306 of FIG. 29 (to be described later) for a requested job to be processed.

A sequence of advancing the process from S1704 to S1711, unlike a sequence of advancing the process from S1706 to S1711, is a process sequence based on the condition that the system 1000 cannot execute different types of sheet processes. This situation is a "case in which the system 1000 cannot execute any finishing" or a "case in which the system 1000 can execute only one type of finishing". In the former case (in which the system 1000 cannot execute any finishing), the control unit of the PC 104 does not execute the display illustrated by the designation field 2801 of FIG. 28 in S1711, and executes display contents which inhibits the user from selecting any type of finishing in the sheet process type setting field.

In this case, the control unit of the PC 104 permits accepting a "print style" request and "binding location" request, but inhibits accepting a request concerning a "sheet process type" setting. In the latter case (in which the system 1000 can execute only one type of finishing), the control unit of the PC 104 executes a display having only an item for determining whether to execute one type of finishing, instead of the display of the designation field 2801. In this case, the control unit of the PC 104 permits accepting a "print style" request and "binding location" request, and permits accepting a request concerning a "sheet process type" setting for only one type of finishing.

In the embodiment, the "case in which the system 1000 cannot execute any finishing" is a specification considered by way of precaution, and does not occur in the print system 1000 in principle. Finishing "sort" described in the embodiment among the six types of finishings requires only an operation to shift printed bundles one by one so that the user can recognize a break between printed bundles stacked on the delivery unit. "Sort" does not require any special mechanism, and the print apparatus 100 is highly likely to have the sorting function as standard equipment. Considering this situation, the embodiment basically assumes a system configuration capable of executing at least one type of finishing (e.g., sorting).

The flowchart in FIG. 29 (to be described later) also considers the circumstances. For example, when an external apparatus executes the process in S1711 of FIG. 25A, the control unit 205 of the print apparatus 100 allows the print system 1000 to execute at least either of the processes in S1306 and S1307 of FIG. 29. However, when the external apparatus executes the process in S1711 of FIG. 25A, the control unit 205 of the print apparatus 100 inhibits the system 1000 from executing the process in S1308 of FIG. 29. These processes are adoptable as exemplary configurations, and the embodiment is not limited to them.

In S1711, the control unit of the PC 104 executes the above-described process. More specifically, in S1711, the control unit of the PC 104 inhibits the user from individually setting the finishing of every designated number of copies. In other words, in S1711, the control unit of the PC 104 inhibits the display unit of the PC 104 from displaying, allowing the user to individually set finishing every designated number of copies, the designation field 2701 illustrated in FIG. 27. The control unit of the PC 104 permits the display unit of the PC 104 to display a sheet process setup window complying with the determination. In S1711, the control unit of the PC 104 can accept a sheet process execution request from the user of the PC 104 as long as the request is permitted via the display.

In S1708 or S1712, the control unit of the PC 104 waits until the user of the PC 104 sets a sheet process. Upon completion of the setting, the control unit of the PC 104 advances the process to S1709.

In S1709, based on press of the print execution key of the printer driver, the control unit of the PC 104 confirms whether it has accepted the print execution instruction of a job to be processed from the user of the PC 104, as described above.

If NO in S1709, the control unit of the PC 104 advances the process to S1710. In S1710, the control unit of the PC 104 confirms whether the user of the PC 104 has changed the number of copies via the copy count designation field 1406 in the display of FIG. 26 executed by the display unit of the PC 104. If YES in S1710, the process returns to S1706 and restarts from S1706. If NO in S1710, the process returns to S1702 and restarts from S1702.

If YES in S1709, the control unit of the PC 104 advances the process to S1713. In S1713, the control unit of the PC 104 associates a printing condition data string accepted via the UI of the PC 104 from the user of the PC 104 until the process reaches S1713, with print data of a job to be transmitted from the PC 104 to the print apparatus 100. In S1713, the control unit of the PC 104 transmits these data as data of the job from the PC 104 to the print apparatus 100 via the network 101. The print apparatus 100 causes the print system 1000 to execute a print process and finishing corresponding to the request accepted from the user of the PC 104. In this way, the above control is executed.

The system 1000 can execute the above control described with reference to FIGS. 25A to 28 and the like, providing the same functions and services as those of control described with reference to FIGS. 19 to 24B and the like. The same configuration and effects as those of the embodiment can be provided regardless of which UI unit (e.g., the operation unit 204 of the print apparatus 100 or the operation unit of a remote external apparatus such as PC 104) capable of accepting a user request concerning the apparatus and system of the embodiment accepts a user request. The effects obtained by the embodiment can be further enhanced.

The embodiment executes special control when accepting a specific user request from the user via the above-mentioned UI unit including the print execution request of a job to be processed by the system 1000 and the execution request of finishing.

For example, according to the embodiment, the control unit of the embodiment confirms whether a specific condition concerning at least either of system configuration information of the system 1000 and information of a job itself is satisfied at the timing when accepting a print execution request. If the control unit confirms that no specific condition is satisfied, it inhibits the system from executing a series of operations to execute a specific type of finishing for printed bundles by a specific number of copies for a job to be processed. In other words, the control unit inhibits a relevant print operation by the printer unit 203 and a relevant finishing operation by the sheet-processing apparatus 200. When no specific condition is satisfied, the embodiment inhibits the system from executing an actual operation, as described above.

In addition, when no specific condition is satisfied, the embodiment inhibits not only the system from executing an actual operation, and but also accepting a user request from the user via the UI unit to execute a specific type of finishing every specific number of copies. For example, the embodiment executes display control on the UI unit illustrated in S1215 of FIG. 24A and display control illustrated in S1711 of FIG. 25A.

[Description of Control Example Using Process of Flow-chart Shown in FIG. 29]

Similar to the processes in FIGS. 24A to 25B, and the like, the process in FIG. 29 is also incorporated in "control by the high-productivity finishing sequence in printing a plurality of copies". The process in FIG. 29 is a process example executed by the print system 1000 under the control of the control unit of the embodiment in response to accepting the print execution request of a job to be processed by the system 1000 via the UI unit of the embodiment.

Similar to control illustrated in FIGS. 24A and 24B, the system 1000 of the embodiment can accept the print execution request of a job to be processed from the user via the operation unit 204 of the print apparatus 100. In this case, the job to be processed is in the copy mode or box mode, as described above. In other words, target print data is print data scanned and input from the scanner unit 201 of the print apparatus 100, or print data already saved in the box area of the HDD 209.

Similar to control illustrated in FIGS. 25A and 25B, the system 1000 of the embodiment can accept the print execution request of a job to be processed from the user via the operation unit of a remote external apparatus different from the print apparatus 100. In this case, the job to be processed is a job to be transmitted from the external apparatus, and target print data is print data transmitted from the external apparatus.

In the process of FIG. 29, therefore, jobs accepted from these data input paths are handled as jobs to be processed.

For example, the control unit 205 serving as an example of the control unit of the embodiment executes control associated with the process of FIG. 29. In this example, the control unit 205 executes the process of FIG. 29 by reading out computer-readable program data for executing the process of FIG. 29 from the HDD 209, similar to the process of FIGS. 24A and 24B. Processes in steps S1301 to S1308 illustrated in FIG. 29 will be described.

In S1301 of FIG. 29, the control unit 205 confirms whether it has received a job whose print execution request has been issued from the user. For example, in S1301, the control unit 205 confirms, on the basis of a signal (e.g., a control signal necessary to confirm the reception status of external data) acquired from the external I/F 202, whether it has accepted the print execution request of a job to be processed from an external apparatus such as the PC 104. In S1301, the control unit 205 confirms, on the basis of information (e.g., a signal necessary to specify the user key operation status of the key 503 or the like on the operation unit 204) from the operation unit 204, whether it has accepted the print execution request of a job to be processed by the print apparatus 100. If the control unit 205 determines in S1301 that it has accepted the print execution request, it advances the process from S1301 to S1302.

In S1302, the control unit 205 stores print data and a print process condition data string in the HDD 209 in association with each other as data of the job to be processed for which acceptance of the print execution request was confirmed in S1301.

In storing print data in the HDD 209, the control unit 205 stores a print data string of all pages to be printed in the HDD 209 from the start to final pages. For a job requiring printing of a plurality of copies, the control unit 205 causes the HDD 209 to hold the print data so as to repetitively utilize the stored data by a designated number of copies.

Print data of a job in the box mode has already been saved in the HDD 209. Hence, when accepting the print execution request of a job in the box mode, the control unit 205 stores only print process condition data of the job in a proper memory such as the HDD 209, and uses data saved in the HDD 209 as print data of the job.

In S1303, the control unit 205 causes the printer unit 203 to execute a print process necessary for the print execution-requested job with print a print data string of the job stored in the HDD 209 in accordance with a request from the user. The process in S1303 is executed until printing is complete by the total number of copies requested by the user for the job.

For example, when the job to be processed requires printing of one copy, the control unit 205 causes the printer unit 203 to print the print data string of the job once (for one set) in S1303. When the job to be processed requires printing of 10 copies in total, the control unit 205 causes the printer unit 203 to print the print data string of the job 10 times (for 10 sets) in S1303.

After the printer unit 203 performs the print process, the control unit 205 executes control to perform finishing requested by the user for a sheet bundle bearing the print data of the job in S1304.

For example, in S1304, the control unit 205 confirms whether the job is a "job requiring printing of a plurality of copies". To confirm this, the control unit 205 checks the print process condition data of the job held in the HDD 209 in association with the print data of the job.

Assume that the control unit 205 confirms in S1304 that the job to be processed is not a "job requiring printing of a plurality of copies" but a "job requiring printing of one copy". As a result of this confirmation, the control unit 205 advances the process from S1304 to S1306 as the process for this job. In S1306, the control unit 205 causes the inline finisher of the system 1000 to execute a type of sheet process requested by the user of the job for a sheet bundle bearing the print data of the job.

The job controlled by the control unit 205 in S1306 is job A illustrated in the process of FIGS. 24A and 24B. In other words, the job processed in S1306 is a job requiring printing of one copy through NO in S1206→S1215→YES in S1216 in FIG. 24A. Alternatively, the job processed in S1306 is a job requiring printing of one copy through NO in S1204→S1215→YES in S1216. Alternatively, the job processed in S1306 is a job requiring printing of one copy through NO in S1706→S1711→YES in S1712 in FIGS. 25A and 25B. Alternatively, the job processed in S1306 is a job requiring printing of one copy through NO in S1704→S1711→YES in S1712 in FIG. 25A.

Assume that the control unit 205 confirms in S1304 that the job to be processed is a "job requiring printing of a plurality of copies". As a result of this confirmation, the control unit 205 advances the process from S1304 to S1305 as the process for this job. In S1305, the control unit 205 confirms whether the job requiring printing of a plurality of copies is a "job requiring different types of finishings every designated number of copies". To confirm this, the control unit 205 also checks the print process condition data of the job held in the HDD 209 in association with the print data of the job.

Assume that the control unit 205 confirms in S1305 that the job requiring printing of a plurality of copies is not a "job requiring different types of finishings every designated number of copies". As a result of this confirmation, the control unit 205 advances the process from S1305 to S1307 as the process for this job. In S1307, the control unit 205 causes the inline finisher of the system 1000 to execute the same type of finishing for each of all printed bundles of the job requiring printing of a plurality of copies.

Finishing executed in S1307 is a type of sheet process designated by the user for the job. To confirm what kind of finishing is requested, the control unit 205 also checks the print process condition data of the job held in the HDD 209 in association with the print data of the job.

The job controlled by the control unit 205 in S1307 is job B illustrated in the process of FIGS. 24A and 24B or job F illustrated in the process of FIGS. 25A and 25B. In other words, the job controlled by the control unit 205 in S1307 is a job through a process sequence of YES in S1213→S1207→NO in S1208→YES in S1209→YES in S1210 in FIGS. 24A and 24B. Alternatively, the job processed in S1307 is a job requiring printing of a plurality of copies through NO in S1204→S1215→YES in S1216 in FIG. 24A.

Alternatively, the job processed in S1307 is a "job requiring printing of a plurality of copies and requiring the same type of finishing for all printed bundles" through YES in S1707→S1708 in FIG. 25B. This job is a job requiring printing of a plurality of copies through NO in S1704→S1711→YES in S1712 in FIG. 25A.

Assume that the control unit 205 confirms in S1305 that the job requiring printing of a plurality of copies is a "job requiring different types of finishings every designated number of copies". As a result of this confirmation, the control unit 205 advances the process from S1305 to S1308 as the process for this job. In S1308, the control unit 205 causes the inline finisher of the system 1000 to execute, for each bundle, different types of finishings individually designated by the user every number of copies designated by the user of the job out of a plurality of printed bundles of the job.

In S1308, the control unit 205 specifies the number of copies and their finishing type every printing in a series of operations for the job requiring printing of a plurality of copies. To specify information on the designated number of copies and a finishing type requested every designated number of copies, the control unit 205 also checks the print process condition data of the job held in the HDD 209 in association with the print data of the job.

The job controlled by the control unit 205 in S1308 is job C or job D illustrated in the process of FIGS. 24A and 24B or job E illustrated in the process of FIGS. 25A and 25B. In other words, the job controlled by the control unit 205 in S1308 is a job through a process sequence of S1207→YES in S1208→S1212→NO in S1213→YES in S1214 in FIGS. 24A and 24B. Alternatively, the job processed in S1308 is a "job requiring printing of a plurality of copies and requiring different types of finishings individually every designated number of copies" through S1707→YES in S1708 in FIG. 25B.

The system 1000 can execute the above process as illustrated in FIG. 29 as an example of "control by the high-productivity finishing sequence in printing a plurality of copies". As for control to be executed by the control unit of the system 1000 other than one described with reference to FIG. 29, the control unit executes control illustrated in FIGS. 19 to 28 and the like. This control has already been explained with reference to FIGS. 19 to 28 and the like, and a description thereof will be omitted in FIG. 29.

Effects achievable by the print system 1000 according to the embodiment will be described.

For example, the embodiment can solve problems as assumed in Description of the Related Art. The embodiment can build a convenient printing environment adaptable not only to the office environment but also to the POD environment. The embodiment can provide a mechanism of minimizing intervention work by an operator that may occur in the POD environment due to, e.g., the specifications of a print apparatus. The embodiment can implement efficient work by reducing the workload on the operator.

The embodiment can provide a mechanism capable of flexibly coping with various needs from various users as much as possible in consideration of various situations and use environments. The embodiment can obtain the following effects when building a convenient, flexible printing environment capable of coping with use cases and needs in the POD environment assumed in Description of the Related Art.

For example, when the system 1000 receives a request to execute different types of finishings with print data of the same contents, it can efficiently meet this request while maintaining high productivity.

In other words, even if the system 1000 receives this request, it need not perform work to, e.g., perform a plurality of number of times a series of work operations such as setting of print process conditions, input of print data, and accumulation of print data in the memory for each finishing because finishing changes even with the same print data. The embodiment can provide a mechanism of minimizing setting complexity and the user workload.

The print system 1000 can flexibly meet the above-described proposals for improvements in a printing environment such as the POD environment where how to process a plurality of jobs is expected to be important. The embodiment can provide a mechanism for practical use of a product capable of coping with use cases and needs on site in an environment such as the POD environment different from the office.

The embodiment can execute another special control in "control by the high-productivity finishing sequence in printing a plurality of copies" in order to maximize the effects achievable by the system 1000. This control will be exemplified with reference to FIGS. 23A to 23D and the like.

[Description of FIGS. 23A to 23D]

Control illustrated in FIGS. 23A to 23D is one executed by the control unit 205 serving as an example of the control unit of the embodiment. The control unit 205 executes the control according to FIGS. 23A to 23D after setting a "job requiring printing of a plurality of copies and requiring different types of finishings every designated number of copies" in the print queue of the HDD 209. This control is a control example executed in response to accepting the print execution request of a job to be processed by the system 1000 from the user.

In the embodiment, when the user presses the key 617 in the display of FIG. 19, the control unit 205 controls the display unit 401 to execute the displays of FIGS. 23A to 23D. The displays of FIGS. 23A to 23D include a job status display field 2301. The control unit 205 executes display control on the display unit 401 so that the user can confirm the following contents via the display of the job status display field 2301.

(Content 1) Information which allows the user to confirm what kind of job is in process by the system 1000.

(Content 2) Information which allows the user to confirm what kind of job waits for the process by the system 1000.

(Content 3) Information which allows the user to confirm the order in which a plurality of uncompleted jobs including a job in process and a job waiting for the process are processed by the system 1000.

(Content 4) Information which allows the user to confirm various types of job information such as "acceptance number, acceptance time (time when a print execution request is accepted), job name (job type when no document name is set), job group, finishing type, and current status" for each job.

Figure 23A:
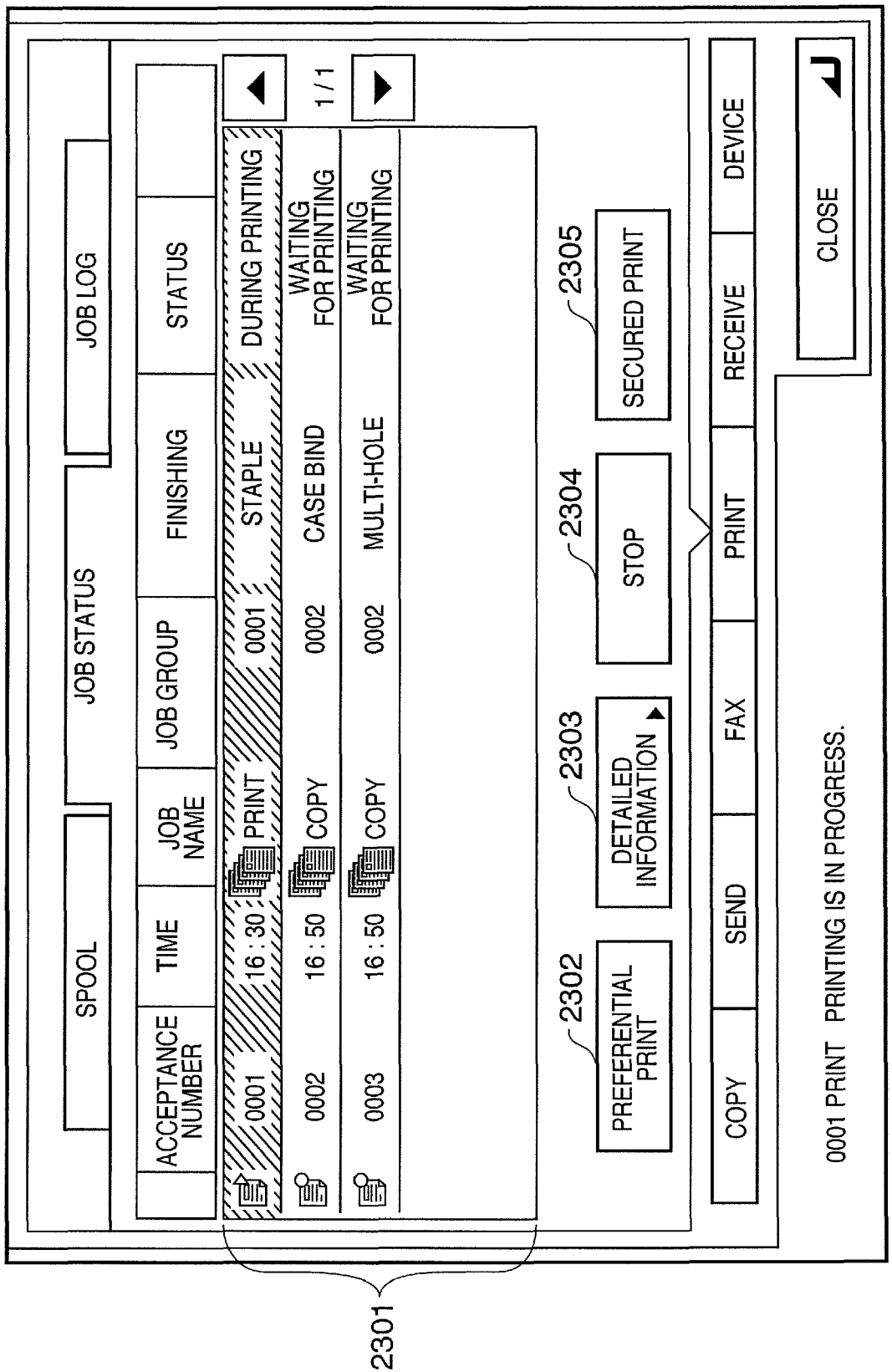
FIG. 23A is a view for explaining an example of control including display control on the UI unit to be executed in the embodiment.

The display example of the display field 2301 of FIG. 23A shows that there are three jobs to be processed by the system 1000 at present.

Jobs whose job information is displayed in the display field 2301 are to be processed by the print system 1000 in response to accepting a print execution request from the user.

In the display example of FIG. 23A, three jobs to be processed by the system 1000 exist in the HDD 209 at present. A job of acceptance number 0001 is "during printing" by the printer unit 203 at present, and both jobs of acceptance numbers 0002 and 0003 are "waiting for printing".

The control unit 205 controls the system 1000 to process a plurality of jobs whose job information is displayed in the display field 2301 in the display order of the jobs in the display field 2301.

In the display example of FIG. 23A, the display field 2301 displays a job of acceptance number 0001, that of acceptance number 0002, and that of acceptance number 0003 sequentially from the top of the list. In the display order of FIG. 23A, the control unit 205 controls the system 1000 to first complete the job of acceptance number 0001 during printing. Upon completion of printing the job, the control unit 205 causes the printer unit 203 to start printing the job of acceptance number 0002.

Upon completion of printing the job of acceptance number 0002, the control unit 205 causes the printer unit 203 to start printing the job of acceptance number 0003. In this fashion, when the display field 2301 exhibits the display order of jobs in FIG. 23A, the control unit 205 causes the system 1000 to process these three jobs in an order of the job of acceptance number 0001→the job of acceptance number 0002→the job of acceptance number 0003.

The control unit 205 also executes display control synchronized with control on an actual operation of a job whose print execution request is issued.

When the control unit 205, which performs the above-described display control, causes the display unit 401 to execute the displays of FIGS. 23A to 23D, it also executes display control associated with "control by the high-productivity finishing sequence in printing a plurality of copies".

In the display example of FIG. 23A, there are three jobs to be processed. In the display example of FIG. 23A, the control unit 205 controls to assign a job group "0001" to the job of acceptance number 0001. The control unit 205 controls to assign a job group "0002" to the job of acceptance number 0002. The control unit 205 controls to assign the same job group "0002" as that of the job of acceptance number 0002 to the job of acceptance number 0003.

In the embodiment, the control unit 205 groups a plurality of jobs, and controls to assign a job group number to each job. In the embodiment, jobs having the same job group number means that they are "jobs requiring printing of a plurality of copies and requiring different types of finishings every designated number of copies" which originally come from one job when accepting a print execution request from the user.

In the display example of FIG. 23A, the job group number of the job of acceptance number 0001 is "0001". This job is given a job group number different from those of the two remaining jobs. In the embodiment, the job of acceptance number 0001 means that the user does not request this job as a "job requiring printing of a plurality of copies and requiring different types of finishings every designated number of copies" when accepting the print execution request of the job from the user. In the control examples using FIGS. 24A, 24B, 25A, 25B, and the like, the job of acceptance number 0001 is "job A", "job B", "job F", or the like.

On the contrary, both the jobs of acceptance numbers 0002 and 0003 in FIG. 23A have the job group number "0002". In the embodiment, the jobs of acceptance numbers 0002 and 0003 mean that the user requests them as "jobs requiring printing of a plurality of copies and requiring different types of finishings every designated number of copies" when accepting print execution requests from the user. Moreover, these jobs come from one job when accepting a print execution request.

In other words, the jobs of acceptance numbers 0002 and 0003 in FIG. 23A are jobs whose print targets are a print data string of the same contents. However, the job of acceptance number 0002 requests the inline finisher of the system 1000 to execute a "case binding process" for a sheet bundle bearing a print data string.

The job of acceptance number 0003 requests the inline finisher of the system 1000 to execute "multi-hole punching" for a sheet bundle bearing a print data string. In the control examples using FIGS. 24A, 24B, 25A, 25B, and the like, the jobs of acceptance numbers 0002 and 0003 are "job C" whose sheet process execution request is accepted from the user via the UI unit of the print apparatus 100, as shown in the display example of FIG. 22A.

The jobs of acceptance numbers 0002 and 0003 are not "job E" whose user request is accepted from the PC 104 via the display of FIG. 27 because the types of these jobs are jobs in the "copy mode" in the display example of FIG. 23A. If the display field 2301 displays a job name "print" as information for specifying the types of these jobs, the jobs of acceptance numbers 0002 and 0003 are "job E" whose sheet process execution request is accepted from the user via the UI unit of the PC 104, as shown in the display example of FIG. 27. In this way, the control unit 205 executes more accurate UI control.

As described above, the control unit 205 causes the display unit 401 to display, in a display form as shown in the display example of FIG. 23A, job C for which the control unit 205 accepts a sheet process execution request from the user via the UI unit of the print apparatus 100, as illustrated in FIG. 22A, and a print execution request from the user upon press of the key 503. The control unit 205 executes this control because of the following reason.

"Job C" illustrated in FIG. 22A is a "job requiring printing of a 40-page print data string". Job C is a "job having a total copy count of 10 and requiring a "case binding process" for each of printed bundles of nine copies and "multi-hole punching" for a printed bundle of one remaining copy".

According to this user request, the control unit 205 divides job C into two jobs: a job (to be referred to as job C-1 hereinafter) of acceptance number 0002 and a job (to be referred to as job C-2 hereinafter) of acceptance number 0003, as illustrated in FIG. 23A. However, printed bundles obtained by the process of job C-1 and those obtained by the process of job C-2 should originally belong to printed bundles of the final product of job C. Hence, the control unit 205 assigns the same job group number 0002 commonly to jobs C-1 and C-2 in order to handle them as relevant jobs.

By the above-described job management method, the control unit 205 registers, in the print queue of the HDD 209, job C serving as an example of a "job requiring printing of a plurality of copies and requiring types of finishings requested by the user every designated number of copies requested by the user".

The control unit 205 divides job C into two relevant jobs C-1 and C-2. The control unit 205 determines the division count of job C in accordance with whether how many finishings the user requests for job C. In other words, the control unit 205 determines the division count of job C on the basis of the total number of different finishing types requested by the user for job C.

For example, finishing types requested for job C via the display of FIG. 22A are two types "case binding" and "multi-hole punching". Thus, the control unit 205 determines "2" as the division count of job C in order to create divided jobs equal in number to the total number "2" of finishing types necessary for job C. The control unit 205 controls to create two jobs C-1 and C-2 as a plurality of jobs at the determined division count, and enter them as jobs to be processed in the print queue of the HDD 209.

Since the control unit 205 executes this control, the job of acceptance number 0002 serving as job C-1 and the job of acceptance number 0003 serving as job C-2 in FIG. 23A have the same job acceptance time ("16:50" in the display example of FIG. 23A). Further, the jobs of acceptance numbers 0002 and 0003 have the same job name (in the example of FIG. 23A, no document name is registered, so "copy" for specifying a job type is displayed).

For example, when the HDD 209 stores a 40-page print data string of job C, the control unit 205 enters two jobs C-1 and C-2 as jobs to be processed in the print queue. The control unit 205 may enter these two jobs when the HDD 209 stores the first page out of the 40-page print data string of job C. Alternatively, the control unit 205 may enter these two jobs in the print queue when the HDD 209 stores all the pages of the 40-page print data string of job C. In either case, the control unit 205 controls to set jobs C-1 and C-2 in the print queue after the user finalizes finishing settings necessary for job C and the control unit 205 accepts a print execution request from the user via the UI unit.

A series of operations necessary for job C after the control unit 205 accepts a print execution request from the user includes (operation 1) to (operation 5) as illustrated in FIG. 22A.

Both jobs C-1 and C-2 utilize "a 40-page print data string of job C held in the HDD 209" obtained by executing (operation 1) by the print apparatus 100 for job C. That is, the control unit 205 controls the print apparatus 100 so that the printer unit 203 prints "print data of the same contents" in both the print processes of jobs C-1 and C-2. However, the control unit 205 changes the remaining operations between jobs C-1 and C-2.

For example, the control unit 205 controls to execute the above-described (operation 2) and (operation 3) necessary for job C as operations to be executed for job C-1. More specifically, the control unit 205 executes the following series of operations as the process of job C-1.

[Operations to be Executed by System 1000 as Process of Job C-1]

The control unit 205 causes the printer unit 203 to print nine copies designated by the user in order to execute a case binding process in printing a print data string of job C by a total of 10 copies. In this print step, the control unit 205 repetitively reads out, nine times, the print data string of job C held in the HDD 209.

The control unit 205 causes the inline finisher of the system 1000 to execute the case binding process for sheet bundles printed by the printer unit 203 in printing nine copies. The control unit 205 causes the inline finisher of the system 1000 to execute the case binding process for each of the printed bundles of the nine copies.

The control unit 205 causes the system 1000 to execute the series of operations necessary for job C-1. After executing the series of operations, the control unit 205 determines that the process of job C-1 is complete. Then, the control unit 205 erases, from the display field 2301, the display of job information of acceptance number 0002 corresponding to job C-1 displayed in the job status display field 2301 of FIG. 23A. After the process of job C-1 ends, the control unit 205 starts processing job C-2.

The control unit 205 controls to execute the above-described (operation 4) and (operation 5) necessary for job C as operations to be executed for job C-2. More specifically, the control unit 205 executes the following series of operations as the process of job C-2.

[Operations to be Executed by System 1000 as Process of Job C-2]

The control unit 205 causes the printer unit 203 to print one copy designated by the user in order to execute a multi-hole punching process in printing a print data string of job C by a total of 10 copies. In this print step, the control unit 205 reads out once the print data string of job C held in the HDD 209. The print data read out from the HDD 209 in this print step is the same as that read out from the HDD 209 in the print step of job C-1.

The control unit 205 causes the inline finisher of the system 1000 to execute the multi-hole punching process for a sheet bundle printed by the printer unit 203 in printing one copy. The control unit 205 causes the inline finisher of the system 1000 to execute the multi-hole punching process for each sheet bundle. The execution count of multi-hole punching in operation 5 is one.

The control unit 205 causes the system 1000 to execute the series of operations necessary for job C-2. After executing the series of operations, the control unit 205 determines that the process of job C-2 is complete. Then, the control unit 205 erases, from the display field 2301, the display of job information of acceptance number 0003 corresponding to job C-2 displayed in the job status display field 2301 of FIG. 23A.

The control unit 205 controls the system 1000 to independently execute these operations for jobs C-1 and C-2 in distinction from each other.

In addition, the control unit 205 causes the display unit 401 to independently execute, in different display forms, the displays of jobs C-1 and C-2 whose print targets are print data of the same contents. For example, as shown in the display example of FIG. 23A, the control unit 205 causes the display unit 401 to display a list of the job statuses and job information of jobs C-1 and C-2 in the job status display field 2301 in distinction from each other.

By executing this display control, the embodiment achieves the following effects.

For example, the control unit 205 controls the UI unit of the embodiment to execute a display as shown in the display example of FIG. 23A. This display allows the user to easily confirm the status of each job when the print apparatus 100 accepts a plurality of jobs whose print execution requests are issued and a plurality of jobs wait for processes.

Particularly in the embodiment, the control unit 205 issues a unique job group number to only one "job not requiring execution of a specific type of finishing individually every designated number of copies", and reflects and displays the unique job group number, as shown in the display example of FIG. 23A. In the example of FIG. 23A, the control unit 205 issues "0001" as the job group number of the job of acceptance number 0001, which is different from the job group number of another job, and reflects and displays the job group number in the window. The control unit 205 regards "jobs requiring execution of a specific type of finishing every designated number of copies" as jobs relevant to each other. The control unit 205 issues the same job group number to all the divided jobs of the job, and reflects and displays the same job group number.

In the example of FIG. 23A, the control unit 205 issues the same number "0002" as the job group numbers of the jobs of acceptance numbers 0002 and 0003 obtained by dividing job C into two in accordance with a user request. The control unit 205 reflects and displays the same number "0002".

This display allows the user to easily identify and confirm which of jobs in wait for processes is a "job not requiring execution of a specific type of finishing individually every designated number of copies" and which of jobs is a "job requiring execution of a specific type of finishing individually every designated number of copies". The above-described effects on whole grasp and visibility of the statuses of jobs by the user can be further enhanced.

According to the embodiment, the display of the display field 2301 illustrated in FIG. 23A have not only the function of announcing the job status but also other functions.

In the embodiment, the user can select a desired job via the display field 2301 from a plurality of jobs displayed in it. The user can execute a desired specific process among a plurality of specific processes by controlling display keys 2302 to 2305 available for a job selected by the user via the display of the display field 2301. The display illustrated in FIG. 23A also has various operation instruction functions to a job. Since the display unit 401 of the operation unit 204 in the embodiment can display a touch panel type window, the following operation is possible.

Assume that the user touches the display line of the job (corresponding to job C-2) of acceptance number 0003 via the display of the display field 2301 in FIG. 23A. In response to this, the control unit 205 controls to change the display of the job status window to display contents reflecting the user operation. For example, the control unit 205 causes the display unit 401 to execute a display illustrated in FIG. 23B in response to the job selection operation by the user.

The control unit 205 allows the user to individually select each job via the display of the display field 2301.

When the user selects a job via the display of the display field 2301, the control unit 205 allows the user to select a process, execution of which is permitted for the selected job.

In the display example of FIG. 23A, a job at the top in the display field 2301, i.e., the job of acceptance number 0001 during printing is selected as a default. As processes for the job, processes whose requests are permitted to be accepted from the user are two processes: a process to display details of the job on the display unit 401 and a process to stop processing the job during printing.

To selectively accept the execution requests of these processes from the user, the control unit 205 validates the displays of the two keys 2303 and 2304 in the selection state as shown in FIG. 23A.

Assume that the user presses the key 2303 while selecting the job of acceptance number 0001, as shown in the display of FIG. 23A. In response to the key operation, the control unit 205 causes the display unit 401 to display detailed information of the job of acceptance number 0001, instead of the display of FIG. 23A.

Assume that the user presses the key 2304 while selecting the job of acceptance number 0001, as shown in the display of FIG. 23A. In response to the key operation, the control unit 205 causes the printer unit 203 to stop the print process of the job of acceptance number 0001 during printing. The control unit 205 erases the information of the job from the list. The control unit 205 erases, from the HDD 209, a print data string of the job that is stored in the HDD 209 in order to print. Then, the control unit 205 causes the printer unit 203 to start the print process of the job of acceptance number 0002 corresponding to a job of the second process turn.

Figure 23B:
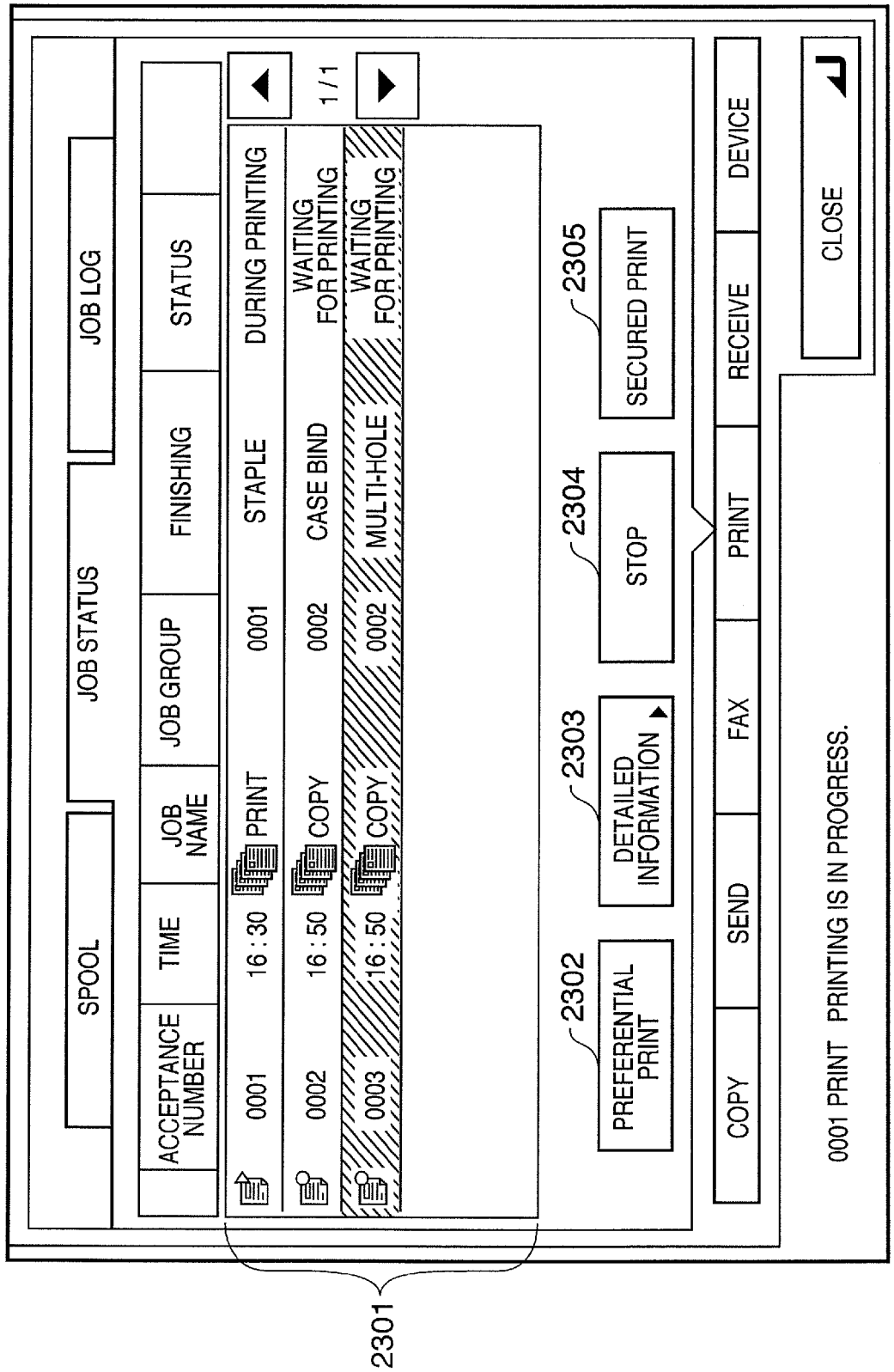
FIG. 23B is a view for explaining an example of control including display control on the UI unit to be executed in the embodiment.
Figure 23C:
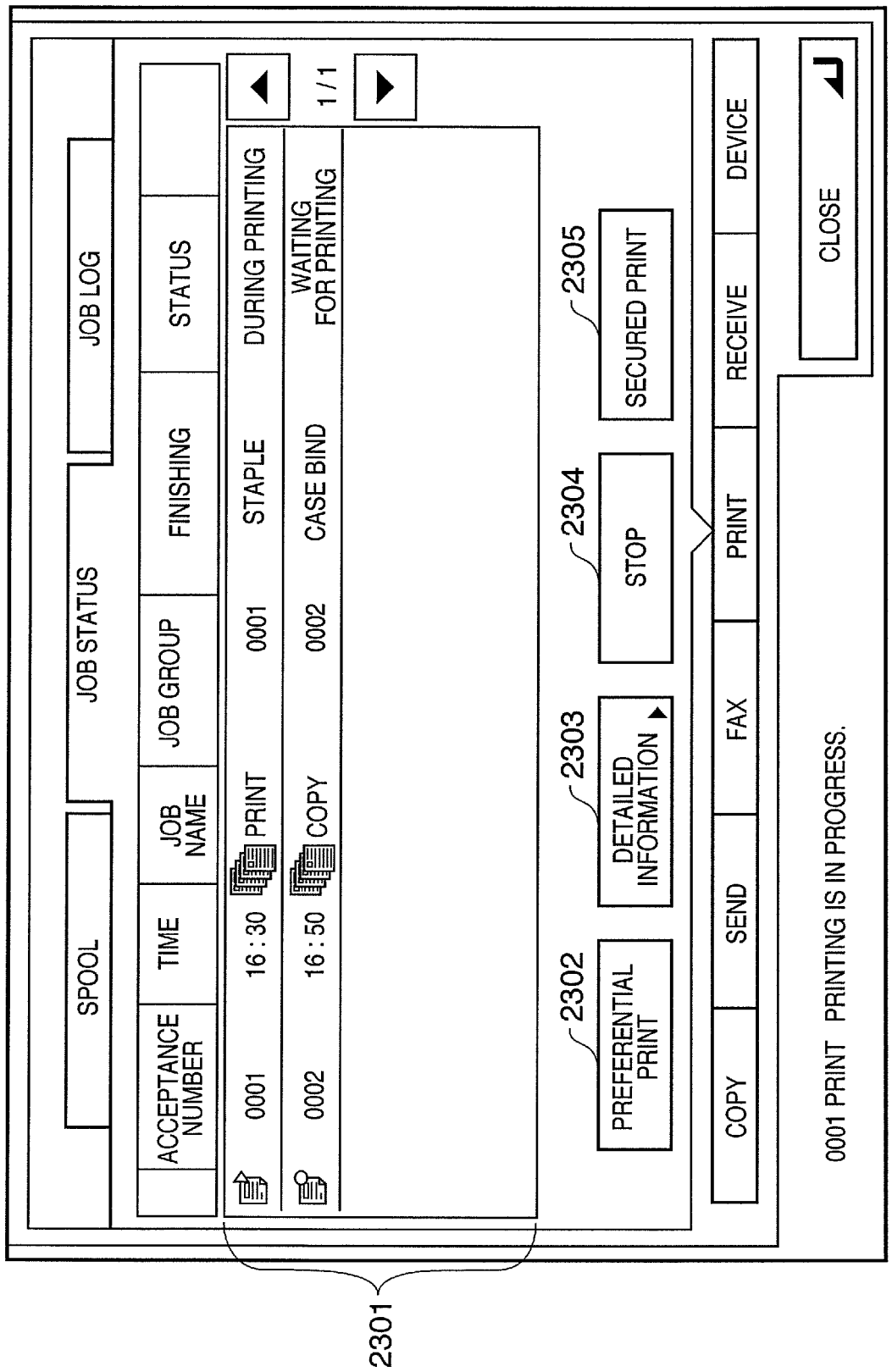
FIG. 23C is a view for explaining an example of control including display control on the UI unit to be executed in the embodiment.

The display example of FIG. 23B shows a display state when the user selects the job of acceptance number 0003 in the display field 2301 of FIG. 23A. In the display example of FIG. 23B, the user selects the job of acceptance number 0003 corresponding to a job of the third process turn at present. In the selection state of FIG. 23B, the control unit 205 controls to set a total of three types of processes whose requests are permitted to be accepted from the user, as processes for the job of acceptance number 0003, unlike the selection state of FIG. 23A.

One of the three types of processes is a "process to cause the display unit 401 to display details of the job of acceptance number 0003". The second process is a "process to stop processing the job of acceptance number 0003". The third process is a "process to execute the process of the job of acceptance number 0003 preferentially to the process of another job which is not under printing and waits for printing". In this example, the third process is called a "preferential print process". In the example of FIG. 23B, a "job which is not under printing and waits for printing" is only the job of acceptance number 0002 except for the job of acceptance number 0003. In this case, the control unit 205 causes the printer unit 203 to execute the print process of the job of acceptance number 0003 immediately upon completion of the print process of the job of acceptance number 0001.

In other words, the control unit 205 starts and completes the print process of the job of acceptance number 0003 before starting the print process of the job of acceptance number 0002 in wait for printing in FIG. 23B. The print process of the job of acceptance number 0003 is executable preferentially to that of the job of acceptance number 0002.

To selectively accept the execution requests of these three processes from the user, the control unit 205 validates the displays of all the three keys 2302, 2303, and 2304 in the selection state of FIG. 23B.

Assume that the user presses the key 2303 while selecting the job (corresponding to job C-2) of acceptance number 0003 at the third process turn at present, as shown in the display of FIG. 23B. In response to the key operation, the control unit 205 causes the display unit 401 to display detailed information of the job of acceptance number 0003, instead of the display of FIG. 23A. For example, the control unit 205 causes the display unit 401 to display detailed information such that this job is a "job requiring a specific type of finishing individually every designated number of copies. Printing is executed for one copy of job C requiring printing of 10 copies in total, and multi-hole punching is executed for the printed bundle."

Assume that the user presses the key 2303 while selecting the job (corresponding to job C-1) of acceptance number 0002 at the second process turn at present, as shown in the display field 2301 of FIG. 23A. In response to the key operation, the control unit 205 causes the display unit 401 to display detailed information of the job of acceptance number 0002, instead of the display of FIG. 23A. For example, the control unit 205 causes the display unit 401 to display detailed information such that this job is a "job requiring a specific type of finishing individually every designated number of copies. Printing is executed for nine copies of job C requiring printing of 10 copies in total, and a case binding process is executed for the printed bundles."

As described above, the control unit 205 divides job C, for which the user requests execution of two different types of finishings, into two jobs C-1 and C-2 equal in number to the total number of finishing types. The control unit 205 sets jobs C-1 and C-2 in the print queue in association with each other. The control unit 205 controls the display unit 401 to individually display detailed job information of these jobs in distinction from each other in accordance with a detailed information display request from the user while explicitly indicating their association.

Assume that the user presses the key 2304 while selecting the job (corresponding to job C-2) of acceptance number 0003 at the third process turn at present, as shown in the display of FIG. 23B. In response to the key operation, the control unit 205 stops the print process of the job of acceptance number 0003, and erases information of the job from the list. For example, when the job is erased, the control unit 205 controls the display unit 401 to change the display contents of FIG. 23B into those as shown in the display example of FIG. 23C. In this case, the control unit 205 inhibits erase of a print data string of the job of acceptance number 00003 from the HDD 209 at least until all processes are complete including a print process for nine sets necessary for the job (corresponding to job C-1) of acceptance number 0002 and nine case binding processes executed respectively for printed materials of the nine sets.

This is because the job of acceptance number 0003 is job C-2, i.e., the job is a "job requiring a specific type of finishing individually every designated number of copies". In addition, this is because the job of acceptance number 0002, which is another job having the same job group number as the job group number 0002 of the job of acceptance number 0003, is still set in the print queue and the process of the job of acceptance number 0002 is not complete.

Thus, when accepting a request to cancel the job of acceptance number 0003 from the user via the display of FIG. 23B, the control unit 205 controls to cancel execution of a print process for one set of the job of acceptance number 0003 and a punching process for a printed material of one set, and erase information on the job of acceptance number 0003 from the display window of FIG. 23B. In this case, however, the control unit 205 keeps holding all pages of target print data of the job of acceptance number 0003 in the HDD 209 without erasing them from the HDD 209. Upon completion of processing the job of acceptance number 0001 during printing, the control unit 205 causes the printer unit 203 to start a print process for the job of acceptance number 0002 corresponding to a job of the second process turn. As the print process of the job of acceptance number 0002, the control unit 205 causes the printer unit 203 to execute a print process using print data kept held in the HDD 209. After performing this print process, the control unit 205 causes the inline finisher to execute finishing necessary for the job of acceptance number 0002. That is, the control unit 205 causes the printer unit 203 to print a print data string of job C by nine sets as the process of job C-2 corresponding to the job of acceptance number 0002. Then, the control unit 205 causes the inline finisher to execute a case binding process for each bundle. In this manner, the control unit 205 controls the system 1000.

In the display example of FIG. 23B, the control unit 205 controls to execute printing of a print data string of job C for nine sets and a case binding process for the nine sets in accordance with a request "to execute case binding for nine sets and multi-hole punching for one remaining set in printing 10 sets" accepted from the user at the beginning as settings of job C. That is, the control unit 205 cancels execution of printing a print data string of job C and a multi-hole punching process for one remaining set. The control unit 205 causes the system 1000 to execute this job control.

The control unit 205 can also execute the following processes for job C for which the user issues a user request as illustrated in FIG. 23B (user request "to execute case binding for nine sets and multi-hole punching for one remaining set in printing 10 sets").

For example, the control unit 205 cancels execution of printing a print data string of job C for nine sets and a case binding process for the nine sets. The control unit 205 causes the print system 1000 to execute printing a print data string of job C and a multi-hole punching process for one set.

The control unit 205 controls to execute these processes for job C in response to execution of the following user operation.

Assume that the user selects the job (corresponding to job C-1) of acceptance number 0002 via the display field 2301 in the display of FIG. 23A, and then presses the stop key 2304. When the user selects a display item corresponding to job C-2 in the list of the display field 2301 and issues a job stop request via the stop key 2304, the control unit 205 controls to execute the above processes. In other words, the control unit 205 controls the system 1000 to inhibit execution of a series of operations including (operation 4) and (operation 5) necessary for job C-2, and execute only a series of operations including (operation 2) and (operation 3) necessary for job C-1.

As described above, the control unit 205 divides job C, for which the user requests execution of two different types of finishings, into two jobs C-1 and C-2 equal in number to the total number of finishing types. The control unit 205 sets jobs C-1 and C-2 in the print queue in association with each other. The control unit 205 controls the print system 1000 including the print apparatus 100 to individually cancel these jobs in accordance with a job cancellation request from the user.

By executing the above-described control, the following effects can be attained.

For example, after setting a request to execute different types of finishings every designated number of copies for a job to be processed, and inputting the job, the user finds out that execution of a specific type of finishing and a print operation for this finishing are unnecessary. In this case, the user can cancel not all processes but only the unnecessary type of finishing and printing.

More specifically, assume that the user issues a user request for job C to process respective printed bundles of nine copy sets by case binding and a printed bundle of one remaining set by multi-hole punching out of printed sets of 10 copies in total. After that, the user wants to cancel printing and multi-hole punching of one copy. Even in this situation, the user need not cancel execution of printing and the case binding process for nine copy sets out of printed sets of 10 copies in total.

That is, the embodiment can prevent problems such as undesirable cancellation of all processes in order to cancel printing and multi-hole punching for one set though the user wants to execute printing and a case binding process for nine copy sets of job C which requests printing of printed sets of 10 copies in total.

The control unit 205, by responding to a request from an operator via the UI unit of the embodiment, can cancel only the process of one copy necessary for a job requiring printing of a plurality of copies and execution of a specific type of finishing. The embodiment can prevent any operation to cancel all processes regarding a job in order to cancel only a process for one copy. This can further enhance the effects of the embodiment. Assume that the print apparatus 100 accepts a job requiring printing of a plurality of copies in total and requiring different types of finishings every designated number of copies input by the operator, like the above-mentioned job C. In this case, the control unit 205 generates divided jobs in association with each other by the number of finishing types requested every designated number of copies. As a concrete example of this configuration, the control unit 205 accepts, via the UI unit, the process request of job C for which the operator requests a total of two types of finishings every designated number of copies: a case binding process to be executed for each of nine printed sets and a punching process to be executed for one print set. Based on this request, the control unit 205 generates jobs C-1 and C-2 as two divided jobs equal in number to the two types of finishings, and sets jobs C-1 and C-2 in the print queue of the HDD 209 in association with each other. The control unit 205 allows the UI unit to display a job status window capable of notifying the operator in real time of the process statuses of these jobs in the system 1000, as illustrated in the job status window of FIG. 23A. As shown in the display of FIG. 23A, the control unit 205 assigns a common job group number 0002 to pieces of job information corresponding to jobs C-1 and C-2, and controls the display unit 401 to reflect these display contents. This achieves an effect of allowing the operator of the system 1000 to easily recognize that divided jobs C-1 and C-2 originally come from the same job C. This means that the control unit 205 controls the UI unit of the embodiment so that it can notify the operator that jobs C-1 and C-2 utilize the same content data in a print process but require different types of finishings. Furthermore, the control unit 205 controls the system 1000 to accept cancellation of the process of a divided job from the operator via the UI for each divided job, i.e., every designated number of copies accepted in the print setting of job C.

Assume that the user presses the key 2302 while selecting the job (corresponding to job C-2) of acceptance number 0003 corresponding to a job of the third process turn at present, as shown in the display of FIG. 23B. In response to this key operation, the control unit 205 controls to execute the print process of the job of acceptance number 0003 preferentially to that of another job waiting for printing.

In the situation illustrated in FIG. 23B, the job of acceptance number 0001 is under printing by the printer unit 203. At this time, the job of acceptance number 0001 does not wait for printing. To the contrary, the job of acceptance number 0002 waits for printing at present, and its process turn is earlier than that of the job of acceptance number 0003 selected via the display of FIG. 23B.

When the user presses the key 2302 while selecting the job of acceptance number 0003 illustrated in FIG. 23B, the control unit 205 controls to process these three jobs in the following process order:

(1) the job of acceptance number 0001→(2) the job of acceptance number 0003→(3) the job of acceptance number 0002. In other words, the control unit 205 controls the print system 1000 to process these three jobs by the following operation.

For example, when accepting a preferential print execution request from the user for the job of acceptance number 0003 via the display of FIG. 23B, the control unit 205 continues the process of the job of acceptance number 0001 during printing. Upon completion of all the processes of the job of acceptance number 0001, the control unit 205 starts and completes the process of the job of acceptance number 0003. That is, the control unit 205 controls to execute a series of operations including (operation 4) and (operation 5) necessary for job C-2. After the end of the series of operations for the job (job C-2) of acceptance number 0003, the control unit 205 starts and completes the process of the job of acceptance number 0002. That is, the control unit 205 controls to execute a series of operations including (operation 2) and (operation 3) necessary for job C-1.

As described above, the control unit 205 divides job C, for which the user requests execution of two different types of finishings, into two jobs C-1 and C-2 equal in number to the total number of finishing types. The control unit 205 sets jobs C-1 and C-2 in the print queue in association with each other. When these jobs wait for printing, the control unit 205 controls to change their process order in accordance with a preferential process execution request from the user.

By executing the above-described control, the following effects can be obtained.

For example, after setting a request to execute different types of finishings every designated number of copies for a job to be processed, and inputting the job, the user realizes that execution of a specific type of finishing and a print operation for this finishing seem to take a long time, and so wants to preferentially execute another type of finishing necessary for the job and printing for the finishing. The embodiment can cope with even this case.

More specifically, assume that the user issues a user request for job C to process respective printed bundles of nine copy sets by case binding and a printed bundle of one remaining set by multi-hole punching out of printed sets of 10 copies in total. And assume that the user wants to cancel printing and multi-hole punching of one copy. Furthermore, assume that the user wants to change the process order because printing and multi-hole punching of one copy seem to be completed earlier than printing and case binding of nine copy sets.

The embodiment can deal with even this case regardless of the acceptance order. The operator can flexibly change the process order of operations necessary for a job at his will in consideration of the print volume by a designated number of copies, the time taken for finishing, and the like. This can further enhance the effects of the embodiment.

Assume that the process order of jobs C-1 and C-2 obtained as relevant jobs by dividing job C by the control unit 205 in accordance with the total number of finishing types changes in accordance with a preferential execution request from the user. In this case, the control unit 205 controls the display unit 401 to change display contents representing the process statuses of jobs in the display field 2301 of the job status window into changed contents.

Assume that the user selects the item of the job of acceptance number 0003 corresponding to job C-2 in the display field 2301, and presses the key 2302, as shown in the display of FIG. 23B. In this case, as described above, the control unit 205 continues the process of the job of acceptance number 0001 during printing. Upon completion of processing the job, the control unit 205 executes the process of job C-2 corresponding to the job of acceptance number 0003. Upon completion of processing the job, the control unit 205 finally starts executing the process of job C-1 corresponding to the job of acceptance number 0002.

The control unit 205 controls the display unit 401 to notify the user that these three job processes are executed in this process order, together with the statuses of the jobs. For example, the control unit 205 controls the display unit 401 to change the display of the display field 2301 from display contents illustrated in FIG. 23B to those illustrated in FIG. 23D in accordance with a preferential process execution request as illustrated in FIG. 23B.

The control unit 205 schedules a plurality of jobs so as to process them in the job acceptance order (print execution order) of the job of acceptance number 0001→the job (job C-1) of acceptance number 0002→the job (job C-2) of acceptance number 0003. The control unit 205 causes the display unit 401 to execute a display as shown in FIG. 23A as a display which allows the user to confirm this process order.

The control unit 205 changes the process order as described above in response to selecting the job of acceptance number 0003 as illustrated in FIG. 23B and accepting the preferential execution request of the job. The control unit 205 reflects and displays the result of changing the job process order, as illustrated in the display field 2301 of FIG. 23D.

The control unit 205 controls the display unit 401 to execute a display which allows the user to confirm that the jobs are processed in an order of the job of acceptance number 0001→the job (job C-2) of acceptance number 0003→the job (job C-1) of acceptance number 0002, as shown in the display example of the display field 2301 of FIG. 23D.

By executing this display control synchronized with control to change the job process order, the embodiment can attach importance to the user's intention about a change of the process order, and can feed back the result of changing the process order to the user with high visibility in accordance with a request from the user. This can further enhance the effects of the embodiment.

Like the control example described using FIGS. 23A to 23D and the like, the control unit 205 of the embodiment divides a "job requiring execution of a specific type of finishing designated by the user every number of copies designated by the user" into a "plurality of jobs equal in number to the total number of finishing types designated by the user". The control unit 205 simultaneously, successively sets the jobs divided by the number of finishing types as relevant jobs to be processed in the print queue ensured in the HDD 209. The control unit 205 controls to individually process the divided jobs relevant to each other in accordance with various requests from the user.

For example, the control unit 205 causes the UI unit to individually display pieces of detailed job information of jobs C-1 and C-2 in accordance with a detailed information display request accepted from the user via the UI unit, as described above. For example, the control unit 205 causes the print apparatus 100 to individually cancel jobs C-1 and C-2 in accordance with a job cancellation execution request accepted from the user via the UI unit, as described above. For example, the control unit 205 causes the print apparatus 100 to individually preferentially process jobs C-1 and C-2 in accordance with a preferential print execution request accepted from the user via the UI unit, as described above.

The control unit 205 controls to execute the same process as the above one every time the print apparatus 100 accepts a "job requiring a specific type of finishing every specific number of copies". In other words, when there are a plurality of jobs of this type, the control unit 205 can execute the same process for the respective jobs.

Assume that the print apparatus 100 is to process job D whose print execution request is accepted from the user after setting sheet process conditions illustrated in FIG. 22B. In this case, the control unit 205 divides user-requested job D illustrated in FIG. 22B into three jobs. This is because the user requests execution of three different types of finishings (stapling, case binding, and multi-hole punching) for job D. For example, the control unit 205 performs the following job division process on the basis of analysis result information of a print process condition data string of job D.

Based on this information, the control unit 205 generates "job D-1 for printing a print data string of job D by two sets and executing a stapling process for each of printed bundles of the two sets" as the first job divided from job D. Based on the information, the control unit 205 generates "job D-2 for printing a print data string of job D by four sets and executing a case binding process for each of printed bundles of the four sets" as the second job divided from job D. Based on the information, the control unit 205 generates "job D-3 for printing a print data string of job D by four sets and executing multi-hole punching for each of printed bundles of the four sets" as the third job divided from job D. The control unit 205 causes the display field 2301 of the job status window as illustrated in FIG. 23A to display a list of the three divided jobs relevant to each other obtained by dividing job D on the basis of a user request. The control unit 205 controls to unify the job group numbers of the three jobs to the same number.

The user can confirm that the three jobs are jobs requiring specific types of finishings every designated number of copies. The control unit 205 controls to independently execute a job process requested by the user among a job information display process, job cancellation process, and preferential job process for a job selected by the user among the divided jobs D-1 to D-3 while discriminating the selected job from an unselected divided job.

The key 2305 illustrated in FIGS. 23A to 23D is used when the user selects a job (to be referred to as a secured print job in this example) whose printing is to start after making authentication on the operation unit 204. For example, when the user selects the job via the display field 2301, the control unit 205 causes the display unit 401 to display a password input request window. If the user inputs, via the password input request window, a password which coincides with one for permitting printing of job, the control unit 205 permits printing of the job. In other words, the control unit 205 inhibits the printer unit 203 from starting the print process of the job without executing the authentication process. The control unit 205 also executes this control.

In the embodiment, a job to be processed is also acceptable even from an external apparatus such as the PC 104. For this purpose, the display unit of the external apparatus can execute the same displays as those illustrated in FIGS. 23A to 23D. In addition, the same requests as various process requests (various user requests for a detailed job display process, job stop process, preferential job process, and the like) acceptable from the user via the display of the job status window as illustrated in FIGS. 23A to 23D are also acceptable from the user of the external apparatus via the display unit of the external apparatus. At this time, the control unit of the external apparatus executes this control. The control unit of the external apparatus controls to execute a process requested by the user of the external apparatus for a job selected via the display unit of the external apparatus. In this fashion, even the external apparatus can provide the same functions as those providable via the operation unit 204 of the print apparatus 100. This can further enhance the effects of the embodiment.

It is also a feature of the embodiment to incorporate various mechanisms considering use cases and user needs in order to maximize effects providable by the system 1000.

In the above-described embodiment, assume that the print apparatus 100 accepts a job requiring printing of a plurality of copies and requiring a specific type of finishing designated by the user every specific number of copies designated by the user. In this case, the control unit 205 controls to divide the job into a plurality of jobs by the total number of finishing types designated by the user, and individually process the jobs. This has been explained with reference to FIGS. 23A to 23D.

In the above example, the print apparatus 100 accepts job C for which the user requests execution of two types of finishings. In response to this, the control unit 205 divides job C into jobs C-1 and C-2, and sets them in the print queue. The control unit 205 controls to individually execute processes corresponding to requests from the user while recognizing that jobs C-1 and C2 are relevant to each other. As examples of "processes corresponding to requests from the user", the detailed job information display process, job cancellation process, and preferential job print process have been exemplified.

As described above, the print system 1000 according to the embodiment discriminates a job requiring printing of a plurality of copies and requiring a specific type of finishing every specific number of copies as a plurality of jobs. The print system 1000 can individually handle a plurality of jobs divided from one job. The print system 1000 comprises this configuration. It should be noted as a feature that the system 1000 of the embodiment can also execute the following control as a mechanism further developed from this configuration.

Job C will be exemplified. Job C requests a total copy count of 10. In other words, job C requires printing of 10 sets in total. For job C, printing of a 40-page print data string is printing of one set. For Job C, the user issues a user request to cause the inline finisher of the system 1000 to case-bind printed bundles of nine sets in printing a total of 10 sets.

For job C, the user issues a user request to cause the inline finisher of the system 1000 to form many punches in a printed bundle of one remaining set. The control unit 205 divides job C into two jobs C-1 and C-2, and simultaneously sets them in the print queue as jobs of acceptance numbers 0002 and 0003, as illustrated in FIG. 23A. The control unit 205 allows the system 1000 to sequentially process these two relevant jobs.

Assume that the printer unit 203 completes a print operation for the job (corresponding to a job other than a job requiring a plurality of types of finishings) of acceptance number 0001 in the list of the display of FIG. 23A.

Upon completion of processing the job of acceptance number 0001, the control unit 205 causes the system 1000 to process job C-1 corresponding to the job of acceptance number 0002 in the process order as shown in the display of FIG. 23A. For example, assume that the control unit 205 causes the printer unit 203 to execute all print operations for nine sets necessary for job C-1, and then, the control unit 205 causes the sheet-processing apparatus 200b in FIGS. 8A and 8B to complete a case binding operation for printed bundles of the nine sets necessary for job C-1.

Upon completion of processing job C-1, the control unit 205 causes the system 1000 to process job C-2 corresponding to the job of acceptance number 0003 in the process order as shown in the display of FIG. 23A. Accordingly, the system 1000 starts a series of operations necessary for job C-2. As the series of operations necessary for job C-2, the control unit 205 causes the printer unit 203 to execute the print operation of a print data string of job C for one set. Then, the control unit 205 causes the sheet-processing apparatus 200c in FIGS. 8A and 8B to execute a multi-hole punching process for a printed bundle of the one set bearing the print data of job C.

Assume that a factor of interrupting a process necessary to complete the process of job C-2 occurs in the system 1000 before the completion of the series of operations after the system 1000 starts processing of the job C-2 requiring the series of operations. In other words, assume that an interrupt factor which disables a multi-hole punching process necessary for job C-2 occurs in the system 1000 before the sheet-processing apparatus 200c in FIGS. 8A and 8B completes a multi-hole punching process for a printed bundle of one set for job C.

The interrupt factor is at least one of a plurality of types of interrupt factors to be described below.

(1) The printer unit 203 runs out of print resources necessary for job C-2 including at least either of print sheets and toner while printing 40 pages of job C.

(2) Print sheets jam in the printer unit 203 while the printer unit 203 prints 40 pages of job C.

(3) Sheets bearing print data of job C jam in a sheet-feeding path extending from point A to point C in the print system 1000 shown in FIG. 8B.

(4) Sheets bearing print data of job C jam in the sheet-processing apparatus 200c in FIG. 8B.

(5) An error (e.g., clogging of the punching unit or a failure of the punching unit) concerning the punching unit of the sheet-processing apparatus 200c in FIG. 8B occurs.

If a factor which interrupts the process of job C-2 and includes at least one of (1) to (5) occurs, a unit suffering the interrupt factor notifies the control unit 205 of this information via a signal line in the apparatus of FIG. 2. Upon reception of this notification, the control unit 205 causes the system 1000 to interrupt the process of job C-2, and waits until the interrupt factor is canceled.

An event corresponding to cancellation of the interrupt factor is, e.g., one of the following events.

(1) The user replenishes the printer unit 203 with print resources necessary for job C-2 including at least either of print sheets and toner.

(2) The user removes sheets bearing print data of job C that jam in the printer unit 203.

(3) The user removes sheets bearing print data of job C that jam in the sheet-feeding path extending from point A to point C in the print system 1000 shown in FIG. 8B.

(4) The user removes sheets bearing print data of job C that jam in the sheet-processing apparatus 200c in FIG. 8B.

(5) The user cancels an error concerning the punching unit of the sheet-processing apparatus 200c in FIG. 8B.

When an event corresponding to cancellation of the interrupt factor of job C-2, including at least one of (1) to (5), occurs, the unit which becomes free from the interrupt factor notifies the control unit 205 of the information via the signal line in the apparatus of FIG. 2. Upon reception of this notification, the control unit 205 controls the system 1000 to restart the process of job C-2.

One noteworthy feature will be described. Job C-2 originally forms part of job C. In the embodiment, job C is divided into two jobs C-1 and C-2 by the total number of finishing types requested by the user for job C, and two jobs C-1 and C-2 can be individually handled. Assume that a configuration different from that of the embodiment is a configuration of not dividing a job every finishing type. In this configuration, the system 1000 processes job C as one job.

The configuration different from that of the embodiment may simply restart the process of job C from the beginning in response to cancellation of the interrupt factor. More specifically, the configuration having no constituent feature of the embodiment may execute the following operation in response to cancellation of the interrupt factor.

For example, the process restarts again from the print operation for nine sets of job C in order to create again printed bundles to be case-bound. Further, the case binding operation is executed again for printed bundles of the nine sets.

The embodiment inhibits the system 1000 from restarting an operation which restarts in the configuration different from that of the embodiment, even upon cancellation of the interrupt factor.

That is, a factor of interrupting the process of job C-2 occurs in the system 1000 during execution of a series of operations necessary for job C-2 upon completion of a series of operations necessary for job C-1. After that, the factor of interrupting the process of job C-2 is canceled in the system 1000. In this case, the control unit 205 permits the system 1000 to restart the process in a series of operations necessary for job C-2. However, the control unit 205 inhibits the system 1000 from restarting the process in a series of operations necessary for job C-1.

More specifically, the control unit 205 confirms that events (1) to (5) corresponding to cancellation of interrupt factors occur in the system 1000.

In this case, the control unit 205 permits the printer unit 203 to execute a print operation for creating a printed bundle of one set with a print data string of job C requiring a multi-hole punching process. Also, the control unit 205 permits the sheet-processing apparatus 200c in FIGS. 8A and 8B to execute the multi-hole punching process for a printed bundle of one set bearing a print data string of job C. The control unit 205 controls the system 1000 to execute these operations as a recovery process necessary to complete the final product of job C.

In this case, however, the control unit 205 inhibits the printer unit 203 from executing a print operation for creating printed bundles of nine sets with a print data string of job C requiring a case binding process. Also, the control unit 205 inhibits the sheet-processing apparatus 200b in FIGS. 8A and 8B from executing the case binding process for printed bundles of nine sets bearing a print data string of job C. The control unit 205 inhibits the system 1000 from executing these operations as a recovery process necessary to complete the final product of job C.

As described above, the embodiment allows the print apparatus 100 to accept a job requiring printing of a plurality of copies and requiring a specific type of finishing designated by the user every specific number of copies designated by the user. When accepting such a job, the control unit 205 divides the job into a plurality of jobs by the total number of finishing types designated by the user. If an interrupt factor occurs in any of the divided jobs, the control unit 205 permits the system 1000 to execute the recovery process of the divided job suffering the interrupt factor after cancellation of the interrupt factor.

If, however, the system 1000 has already completed the process of any of the divided jobs before generation of the interrupt factor, the control unit 205 inhibits the system 1000 from executing the recovery process so as to restart the process of the divided job that has been processed before generation of the interrupt factor even if cancellation of the interrupt factor in the system 1000.

According to the configuration in this embodiment, this control can minimize any wasteful operation and minimize wasteful use of resources while maintaining high productivity. The above control can further enhance the effects of the embodiment.

Moreover, the embodiment executes control explained before the description of FIG. 19 and subsequent drawings, in order to maximize effects providable by the system 1000.

For example, the embodiment configures the system 1000 to execute not only "control by the high-productivity finishing sequence in printing a plurality of copies" but also "control by the standard finishing sequence in printing a plurality of copies". The control unit of the embodiment can selectively execute these two control operations.

In the embodiment, as an example, the control unit of the embodiment causes the UI unit of the embodiment to execute a display which allows a specific user (e.g., administrator) to determine in advance which of the two sequences is used to operate the system 1000. The UI unit may be, e.g., the operation unit 204 or the operation unit of an external apparatus such as the PC 104. The control unit 205 serving as an example of the control unit of the embodiment controls to operate the system 1000 in the control of a selected sequence upon completion of user selection. This has already been described prior to the description of FIG. 19 and subsequent drawings. Job process control examples based on these sequences in the system 1000 will be comparatively described with reference to FIGS. 30A and 30B.

Figure 30A:
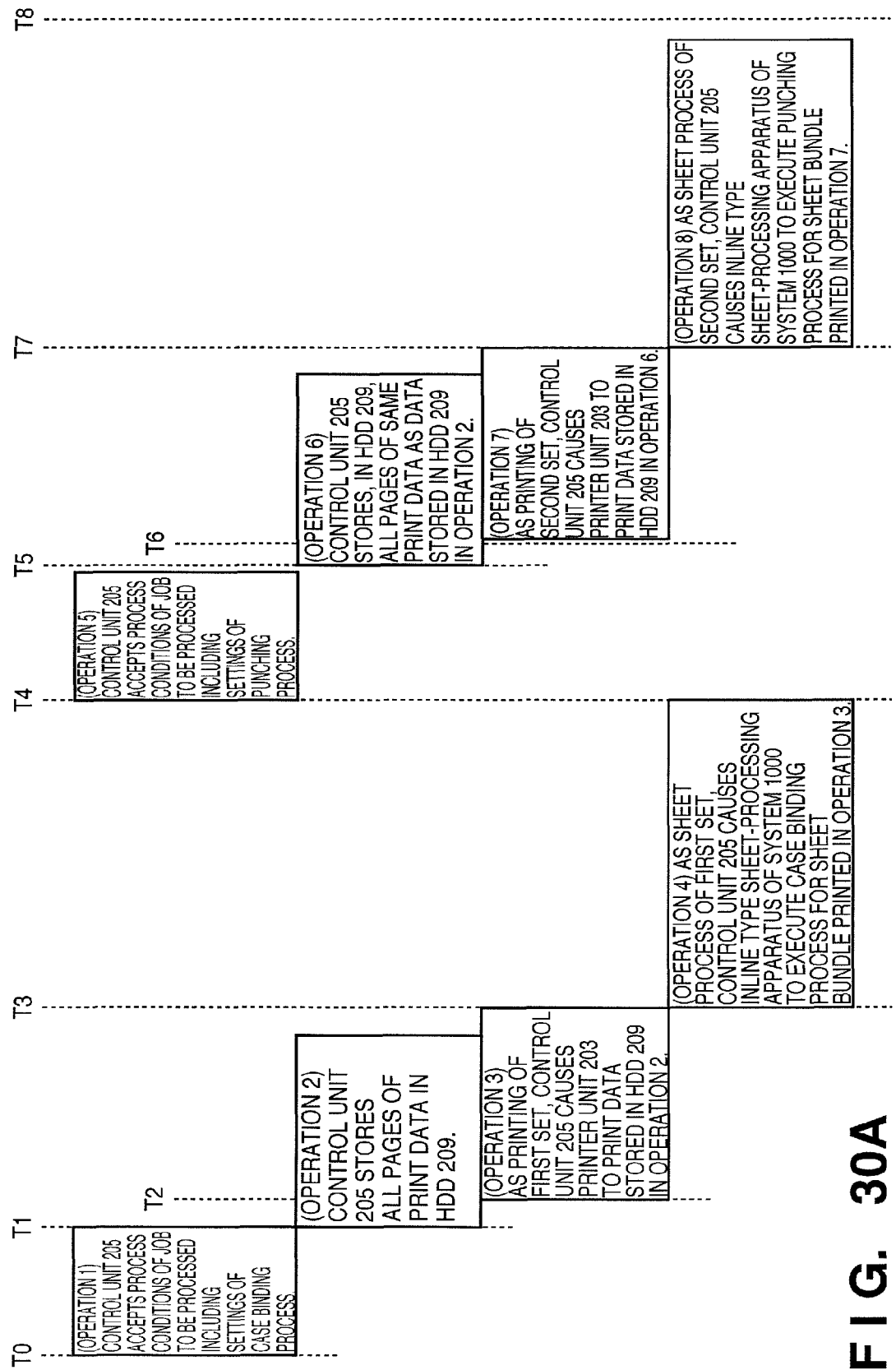
FIG. 30A is a chart for explaining an example of control to be executed in the embodiment.

[Description of FIG. 30A]

FIG. 30A is a chart for explaining a control example by the "standard finishing sequence in printing a plurality of copies" executable by the system 1000. In this example, the control unit 205 mainly executes this control. For this purpose, the HDD 209 stores computer-readable program data for executing this sequence. When the user selects this sequence, the control unit 205 reads out the program data from the HDD 209 and executes it. The control unit 205 causes the system 1000 to execute the control in accordance with the program data.

A job (to be referred to as job X hereinafter) to be processed in the control example illustrated in FIG. 30A requires printing of a 50-page document data string. Job X has at least the following two process conditions.

(Condition 1) Job X requires printing of two copies (printing for sheet bundles of two sets) as printing of a plurality of copies.

(Condition 2) Job X requires execution of a case binding process for a sheet bundle of one copy (one set) out of a total copy count "two copies", and execution of a punching process for sheets of the remaining copy.

Assume that the user wants to create a final product satisfying these process conditions by the system 1000. To obtain all printed results of job X by the system 1000, job X requires printing of two set in total, and execution of a case binding process for a printed bundle of the first set and a punching process for a printed bundle of the second set. For descriptive convenience, the punching process is a two-hole punching process.

Assume that the control unit 205 operates the print system 1000 of the embodiment in control by the "standard finishing sequence in printing a plurality of copies". In this case, to satisfy the process conditions of job X, the control unit 205 controls the system 1000 to execute the process for job X at the following timings by the following process procedures. The process for job X will be explained with reference to FIG. 30A. The abscissa axis in FIG. 30A is the time axis, and FIG. 30A shows operations in the system 1000 during the period of a series of operations including timings T0 to T8. In other words, FIG. 30A explicitly shows processes executed by the system 1000 and their timings under the control of the control unit of the embodiment.

Figure 30B:
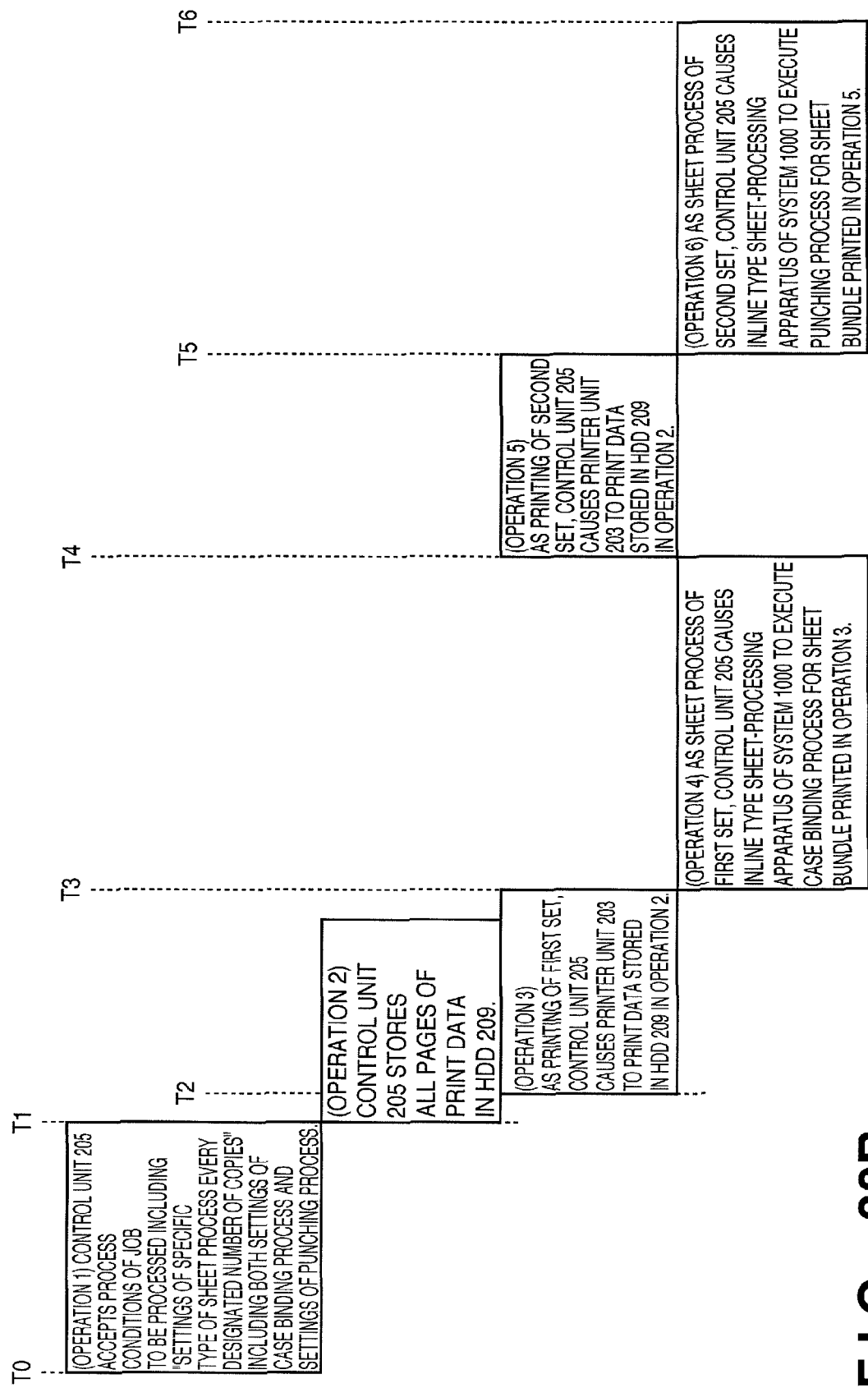
FIG. 30B is a chart for explaining an example of control to be executed in the embodiment.
Figure 30C:
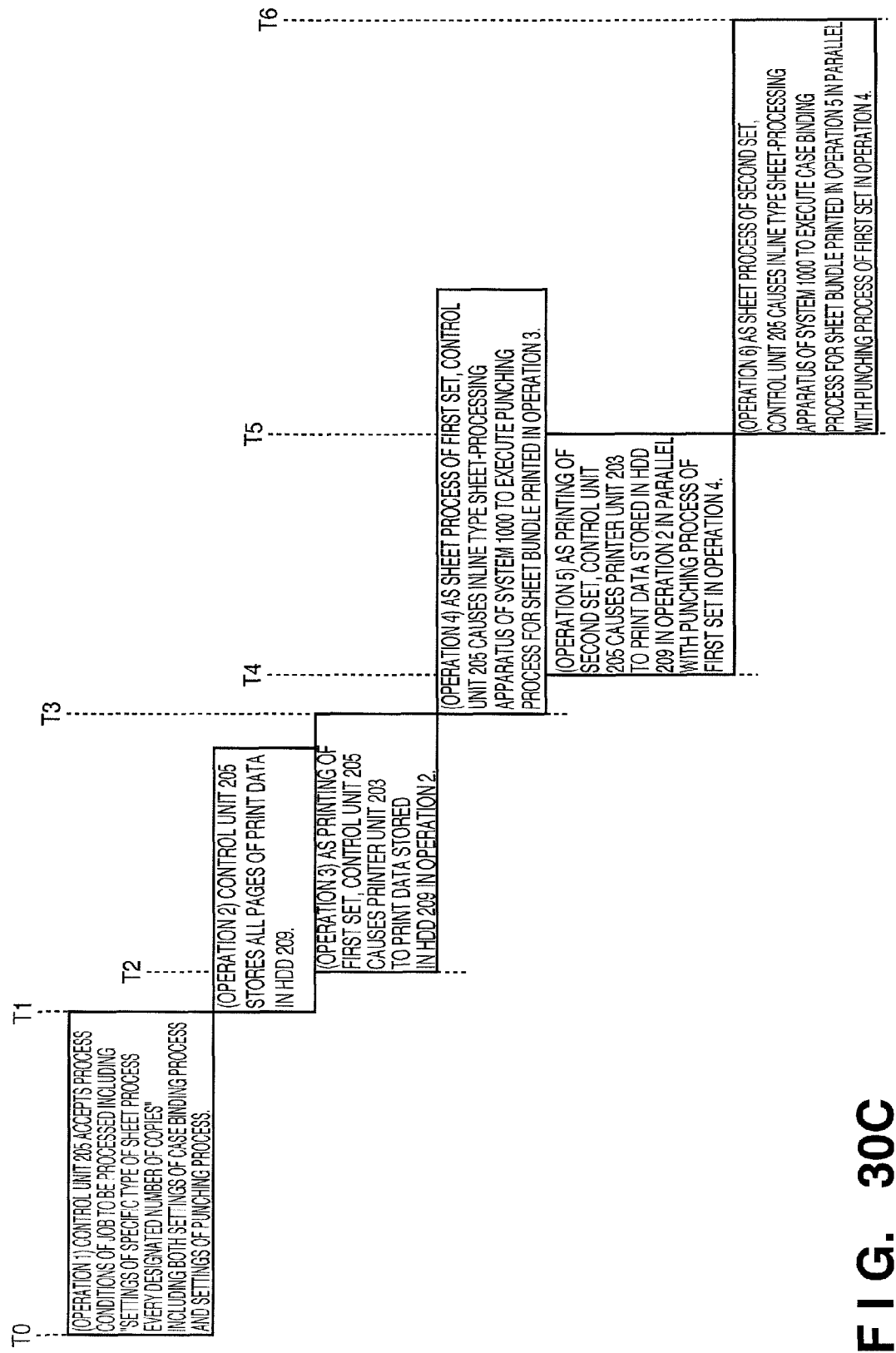
FIG. 30C is a chart for explaining an example of control to be executed in the embodiment.

Control examples illustrated in FIGS. 30A to 30C include various operations complying with user requests via the UI unit of the embodiment and control processes for these operations. The embodiment assumes a configuration capable of accepting a process request to the print system 1000 from the UI of any device such as the operation unit 204 of the print apparatus 100 or the operation unit of an external apparatus such as the PC 104. This has already been described above. The configuration illustrated in FIGS. 30A to 30C and the like is applicable to a user request from the UI of any device. The UI unit in FIGS. 30A to 30C is interpretable as, e.g., the UI unit of the print apparatus 100 or that of the external apparatus such as the PC 104.

A device having the UI unit for accepting various user requests illustrated in FIGS. 30A to 30C is desirably the print data generation source of a job subjected to processes according to the requests. For example, when accepting various user requests illustrated in FIGS. 30A to 30C via the UI unit of the print apparatus 100, the print data generation source is desirably the print apparatus 100. This is because print data input from the scanner unit 201 of the print apparatus 100 is an example of data to be printed in accordance with the request. Further, print data stored in the HDD 209, such as print data of a job in the box mode, is an example of data to be printed in accordance with the request.

The control example of FIG. 30A will be explained on the basis of this configuration premises.

At timing T0 in FIG. 30A, the control unit 205 accepts the process conditions of job X from the user via the UI unit of the embodiment.

At timing T0 in FIG. 30A, the control unit 205 controls to accept the execution request of only one type of finishing "case binding process" and "two-hole punching process" from the user via the UI unit of the embodiment. For example, at timing T0 in FIG. 30A, the control unit 205 accepts "process conditions for job X including no two-hole punching process execution request but a case binding process execution request" from the user via the UI unit of the embodiment. At timing T0 in FIG. 30A, the number of copies for job X accepted by the control unit 205 from the user is "1". That is, the control unit 205 accepts a request to execute a case binding process for a printed bundle of one set.

In FIG. 30A, as described above, the control unit 205 alternatively accepts the execution request of a different type of finishing (in other words, the control unit 205 cannot simultaneously accept the execution requests of different types of finishings) because of the following reason.

The main reason is that the control example of FIG. 30A shows an operation when the "standard finishing sequence in printing a plurality of copies" is selected as control to be executed by the system 1000, i.e., no "high-productivity finishing sequence in printing a plurality of copies" is selected, like the control example of FIG. 30B.

After the user sets process conditions for job X via the UI unit at T0 in FIG. 30A, the control unit 205 accepts the print execution request of a print data string for job X from the user via the UI unit. This timing is T1 in FIG. 30A.

The print execution request, which is accepted by the control unit 205 from the user via the UI unit at T1 in FIG. 30A in order to print the print data (a 50-page document data string) of job X, will be referred to as the "first print execution request for job X". The process condition settings for job X, which are accepted by the control unit 205 at T1 and include finishing settings for job X, will be referred to as the "first process condition settings for job X".

An operation executed by the control unit 205 to accept the first process condition settings for job X and the first print execution request for job X is (operation 1) starting from timing T0 in FIG. 30A.

In response to accepting the first print execution request for job X at T0 in FIG. 30A, the control unit 205 stores all pages of a print data string of job X in the HDD 209. This operation is (operation 2) starting from timing T1 in FIG. 30A.

In (operation 2) of FIG. 30A, the control unit 205 stores a print data string of job X sequentially from the start page (print data of the first page) to the final page (print data of the 50th page) in the HDD 209. In other words, operation 2 is an operation executed until the HDD 209 stores print data of the final page of job X.

Assume that no job to be processed other than job X exists in the print queue of the HDD 209 when the control unit 205 accepts the first print execution request for job X from the user (at timing T1 in FIG. 30A). In this case, the control unit 205 causes the printer unit 203 to start the print process of print data of job X immediately after the HDD 209 stores print data of the first page of job X. This operation is (operation 3) starting from timing T2 in FIG. 30A.

(Operation 3) in FIG. 30A continues until a print data string of job X is printed by reading it out from the HDD 209 sequentially from the start page (print data of the first page) of job X to the final page (print data of the 50th page) of job X. In other words, operation 3 is kept executed until print data of the final page of job X is read out from the HDD 209 and printed by the printer unit 203.

A series of print processes to print the print data of pages from the start to final pages once is printing of one set. The process conditions accepted at T0 represent a request "to execute printing of one set by the case binding process". Hence, in (operation 3) of FIG. 30A, the control unit 205 executes only printing of one set (printing of one copy) as the print operation of job X.

As described above, the embodiment provides many mechanisms of maximizing productivity. An example of constituent features also exists in the operation of FIG. 30A. Assume that no job to be processed other than job X exists at timing T1 in FIG. 30A, as described above. In this case, the control unit 205 controls to execute a series of operations (operation 3 in FIG. 30A) to print the print data of all pages of job X by the printer unit 203 via the HDD 209 in parallel with a series of operations (operation 2 in FIG. 30A) to store the print data (a total of 50-page print data) of all pages of job X in the HDD 209.

The control unit 205 controls to synchronously execute (operation 2) in FIG. 30A and (operation 3) in FIG. 30A in parallel with each other when the HDD 209 stores print data of the first page of job X. The parallel operations are an example of an operation starting from T2 in FIG. 30A (timing when the HDD 209 stores the first page of job X).

The constituent feature of maximizing the productivity of the system 1000 even in the "standard finishing sequence in printing a plurality of copies" is also a feature of the embodiment.

Upon completion of printing the first set of job X in (operation 3) of FIG. 30A, the control unit 205 causes the inline finisher of the system 1000 to execute a case binding process as a sheet process for a printed bundle of the first set. For example, when the system 1000 has the system configuration illustrated in FIGS. 8A and 8B, the control unit 205 causes the second sheet-processing apparatus 200b capable of executing the case binding process in FIGS. 8A and 8B to execute the case binding process. This operation is (operation 4) starting from timing T3 in FIG. 30A.

The control unit 205 executes the process of (operation 4) in FIG. 30A in response to accepting a "case binding process execution request" as a setting for job X from the user at T0 in FIG. 30A.

At a setting of operating the system 1000 in the "standard finishing sequence in printing a plurality of copies", the user of job X or the like requests the following user operation at the timing when (operation 1) to (operation 4) in FIG. 30A are complete. In the embodiment, when this sequence is selected, the system 1000 requires the following user intervention operation after executing at least (operation 1) in FIG. 30A.

For example, the control unit 205 accepts "process conditions for job X including no case binding process execution request but a two-hole punching process execution request" from the user via the UI unit at timing T4 in FIG. 30A. At this timing, the number of copies for job X accepted by the control unit 205 from the user is "1". That is, at T4 in FIG. 30A, the control unit 205 accepts a request to execute a two-hole punching process for a printed bundle of one set.

After the user sets process conditions for job X via the UI unit at T4 in FIG. 30A, the control unit 205 accepts the print execution request of a print data string for job X from the user via the UI unit. This timing is T5 in FIG. 30A.

The print execution request, which is accepted by the control unit 205 from the user via the UI unit at T5 in FIG. 30A in order to print the print data (a 50-page document data string) of job X, will be referred to as the "second print execution request for job X". The process condition settings for job X, which are accepted by the control unit 205 at T4 and include finishing settings for job X, will be referred to as the "second process condition settings for job X".

An operation executed by the control unit 205 to accept the second process condition settings for job X and the second print execution request for job X is (operation 5) starting from T4 in FIG. 30A.

In response to accepting the second print execution request for job X at T5 in FIG. 30A, the control unit 205 stores all pages of a print data string of job X in the HDD 209. This operation is (operation 6) starting from timing T5 in FIG. 30A.

In (operation 6) of FIG. 30A, the control unit 205 stores a print data string of job X sequentially from the start page (print data of the first page) to the final page (print data of the 50th page) in the HDD 209. In other words, operation 6 is an operation executed until the HDD 209 stores print data of the final page of job X.

A print data string stored in the HDD 209 in (operation 6) is the same as a print data string stored in the HDD 209 in (operation 2). That is, in (operation 6) of FIG. 30A, the control unit 205 stores again, in the HDD 209, a print data string (50-page print data) of job X which has been stored in the HDD 209 in (operation 2) of FIG. 30A. As described above, the HDD 209 stores the same data a plurality of number of times in the control example of FIG. 30A.

One reason for executing this operation is that the control example illustrated in FIG. 30A is control executed by the control unit 205 when selecting the "standard finishing sequence in printing a plurality of copies".

Assume that the operation sequence (operation mode) of the system 1000 is the standard sequence (mode), as illustrated in FIG. 30A. Further, the job to be processed requires different types of finishings with the print data of the same contents. Under these conditions, the control unit 205 controls the system 1000 to repetitively store print data of the job to be processed in the HDD 209 every finishing type requested by the user.

In other words, the control unit 205 controls to erase print data of the job to be processed from the HDD 209 every time one type of finishing is executed among a plurality of types of finishings desired by the user.

For example, upon completion of the case binding process for a printed bundle of the first set of job X in (operation 4) of FIG. 30A, the control unit 205 erases, from the HDD 209, all the pages of the print data of job X that have already been stored in the HDD 209 in (operation 2) of FIG. 30A. FIG. 30A shows an example of requesting execution of a case binding process for a printed bundle of one set out of printed bundles of two sets in total. At the timing, the data of job X that have been stored in (operation 2) of FIG. 30A are erased from the HDD 209.

In contrast, assume that job X requires a case binding process for each of printed bundles of two sets out of printed bundles of four sets. In this case, upon completion of the case binding process for each of printed bundles of two sets, the control unit 205 controls to erase, from the HDD 209, the data of job X that have already been stored in the HDD 209 in (operation 2) of FIG. 30A.

In this manner, when the "standard finishing sequence in printing a plurality of copies" is selected, a job to be processed by the system 1000 is a "job requiring printing of a plurality of copies with the same content data and requiring a plurality of types of finishings". In this case, the user intervention operation and the storage operation of a print data string of the job in the HDD 209 are necessary for each of the requested types of finishings.

When job X requires two types of finishings, as illustrated in FIG. 30A, a total of two finishing setting operations and a total of two print execution requests by the user via the UI unit are necessary in (operation 1) and (operation 5) of FIG. 30A. A total of two storage operations of a print data string of job X in the HDD 209 are necessary in (operation 2) and (operation 6) of FIG. 30A.

This "standard finishing sequence in printing a plurality of copies" requires the user intervention operation and the storage operation of data in the HDD 209 every time one type of finishing is executed among a plurality of types of finishings. Control capable of creating a final product desired by the user without executing these operations is the "high-productivity finishing sequence in printing a plurality of copies" illustrated in FIGS. 19 to 29, 30B, and the like. This difference is one of large differences between the two sequences.

The embodiment adopts these sequences and can selectively execute them. This mechanism is also an example of a configuration for enhancing the effects of the embodiment. This configuration achieves the following effects.

Assume that there is a request to independently manage a job to be processed for each type of finishing in a printing environment at the delivery destination of the system 1000. The fact that the embodiment assumes this request proves that the embodiment pays attention to prospective use cases and user needs in the POD environment, such as a change of the print fee charged to a customer for each finishing type. Also assume that a given POD company receives a request to create case-bound printed bundles today and create two-hole-punched printed bundles tomorrow for job X.

In this manner, there is a need to process each type of finishing by shifting the time. Considering such user cases and user needs, the system 1000 can execute the "standard finishing sequence in printing a plurality of copies". This sequence can appropriately satisfy the above-described requests.

On the contrary, assume that there is a need to maximize productivity in a printing environment at the delivery destination of the system 1000. For example, there is a POD company which wants to receive various effects of the embodiment obtained by control illustrated in FIGS. 19 to 29. Considering such user cases and user needs, the system 1000 can execute the "high-productivity finishing sequence in printing a plurality of copies". This sequence can appropriately satisfy the above-described requests.

The above-described effects can be achieved by selectively executing the two sequences by the system 1000, and a printing environment complying with use cases and user needs in a printing environment at the installation destination of the system 1000 can be flexibly built. In other words, the effects of the embodiment can be further enhanced. However, these control examples are merely examples of a mechanism for further enhancing the effects of the embodiment, and are not indispensable constituent features. This is because problems described in Description of the Related Art can be solved and best effects as described above can be achieved by executing only the "high-productivity finishing sequence in printing a plurality of copies" according to the embodiment by the system 1000. In other words, all mechanisms having no configuration associated with the "standard finishing sequence in printing a plurality of copies" but a configuration associated with the "high-productivity finishing sequence in printing a plurality of copies" fall within the scope of the embodiment.

Because of the above reasons, the configuration illustrated in FIG. 30A is employed.

Referring back to the description of FIG. 30A, assume that no job to be processed other than job X exists in the print queue of the HDD 209 when the control unit 205 accepts the second print execution request for job X from the user (at timing T5 in FIG. 30A). In this case, the control unit 205 causes the printer unit 203 to start the print process of print data of job X immediately after the HDD 209 stores print data of the first page of job X in (operation 6) of FIG. 30A. This operation is (operation 7) starting from timing T6 in FIG. 30A. As described above, the control unit 205 causes the system 1000 to synchronously execute (operation 6) in FIG. 30A and (operation 7) in FIG. 30A in parallel with each other because there is no job to be printed other than job X.

(Operation 7) in FIG. 30A continues until a print data string of job X is printed by reading them out from the HDD 209 sequentially from the start page (print data of the first page) of job X to the final page (print data of the 50th page) of job X. In other words, operation 7 is kept executed until print data of the final page of job X is read out from the HDD 209 and printed by the printer unit 203.

A series of print processes to print the print data of pages from the start to final pages once is printing of one set. The process conditions accepted at T4 represent a request "to execute printing of one set by the two-hole punching process". Hence, in (operation 7) of FIG. 30A, the control unit 205 executes only printing of one set (printing of one copy) as the print operation of job X.

Upon completion of printing the second set of job X in (operation 7) of FIG. 30A, the control unit 205 causes the inline finisher of the system 1000 to execute a two-hole punching process as a sheet process for a printed bundle of the second set. For example, when the system 1000 has the system configuration illustrated in FIGS. 8A and 8B, the control unit 205 causes the third sheet-processing apparatus 200c capable of executing the two-hole punching process in FIGS. 8A and 8B to execute the two-hole punching process. This operation is (operation 8) starting from timing T7 in FIG. 30A.

The control unit 205 executes the process of (operation 8) in FIG. 30A in response to accepting a "two-hole punching process execution request" as a setting for job X from the user at T4 in FIG. 30A. The timing when (operation 8) in FIG. 30A is complete is timing T8 in FIG. 30A.

By executing all (operation 1) to (operation 8) in FIG. 30A at timings T0 to T8 in FIG. 30A, creation of a final product requested by the user for job X is complete. That is, creation of printed bundles of two sets in total, i.e., a case-bound printed bundle of one set on which all the pages of print data of job X are printed, and a punched printed bundle of one set on which all the pages of print data of job X are printed is complete.

Control by the "standard finishing sequence in printing a plurality of copies" will be additionally explained. The control is not executed on the basis of the determination result in S1204 or S1206 of FIG. 24A. Similarly, the control is not executed on the basis of the determination result in S1704 or S1706 of FIG. 25A or 25B. In other words, the control is not executed on the basis of NO in S1204 or S1206 of FIG. 24A, or NO in S1704 or S1706 of FIG. 25A or 25B.

More specifically, even when the system 1000 has a system configuration capable of executing different types of finishings, the control unit 205 executes the control. The control unit 205 executes the control in response to input of an explicit request to execute the control from a specific user (e.g., administrator) via the UI unit of the embodiment, as illustrated above. This is because the embodiment achieves effects to, e.g., establish a flexible printing environment complying with a request from the user, as described above.

When the execution request of the control is set and registered in the system 1000, the control unit 205 executes the control without executing the processes in S1203, S1204, S1207, S1208, S1212, and S1214 of FIGS. 24A and 24B. In other words, this configuration is a mechanism of minimizing operations more than necessary such as control and a process to permit the system 1000 to execute an operation complying with a specific user request illustrated in S1208 of FIG. 24B though the administrator makes a setting of inhibiting acceptance of the specific user request in advance. This configuration is also a mechanism of further enhancing the effects of the embodiment.

An example of control by the "high-productivity finishing sequence in printing a plurality of copies" will be explained with reference to FIG. 30B. This control is a constituent feature executable by the embodiment for the system 1000 independently in distinction from control by the "standard finishing sequence in printing a plurality of copies" illustrated in FIG. 30A. This has already been described.

[Description of FIG. 30B]

FIG. 30B is a chart for explaining a control example by the "high-productivity finishing sequence in printing a plurality of copies" executable by the system 1000. In this example, the control unit 205 also mainly executes this control. For this purpose, the HDD 209 stores computer-readable program data for executing this sequence. When the user selects this sequence, the control unit 205 reads out the program data from the HDD 209 and executes it. The control unit 205 causes the system 1000 to execute the control in accordance with the program data.

The process conditions of a job to be processed in the control illustrated in FIG. 30B are the same as those in FIG. 30A. That is, the process conditions of a job to be processed in FIG. 30B include at least (condition 1) and (condition 2) illustrated in FIG. 30A. In this example, the job to be processed in FIG. 30B will be referred to as job Y in order to discriminate the control example in FIG. 30B from that in FIG. 30A. Job Y also requires printing of a 50-page document data string.

How to create the final product of job Y by the system 1000 when the system 1000 operates in control by the "high-productivity finishing sequence in printing a plurality of copies" will be explained.

At timing T0 in FIG. 30B, the control unit 205 accepts the process conditions of job Y from the user via the UI unit of the embodiment.

At timing T0 in FIG. 30B, the control unit 205 controls to accept the execution requests of a "case binding process" and "punching process" from the user via the UI unit of the embodiment. For descriptive convenience, the punching process is "two-hole punching".

Based on this, assume that the control unit 205 accepts the user request for job Y via the UI unit of the print apparatus 100. In this case, the control unit 205 executes the following control.

For example, the control unit 205 accepts a total copy count of "two" for job Y via the display of FIG. 19 executed by the display unit 401 in response to a user operation with the ten-key pad 506. In response to press of the key 609 in the display of FIG. 19 by the user, the control unit 205 causes the display unit 401 to execute the display of FIG. 20. In response to press of the key 2007 in the display of FIG. 20 by the user, the control unit 205 causes the display unit 401 to execute the display of FIG. 21.

The control unit 205 accepts the execution request of a "case binding process" from the user via the key 2104A in the display of FIG. 21. The control unit 205 accepts a specific copy count of "1" for the case binding process from the user via the display field 2104B in the display of FIG. 21. The control unit 205 accepts the execution request of a "two-hole punching process" from the user via the key 2106A in the display of FIG. 21. The control unit 205 accepts a specific copy count of "1" for the two-hole punching process from the user via the display field 2106B in the display of FIG. 21. In response to press of the key 2110 by the user, the control unit 205 determines that sheet process settings for job Y are complete.

After the user makes process condition settings for job Y including the above-described sheet process settings and presses the key 503, the control unit 205 determines that it has accepted the print execution request of job Y. In this case, the print data generation source of job Y is the print apparatus 100 (e.g., the scanner unit 201 or HDD 209).

When accepting the user request for job Y via the UI unit of an external apparatus or the like, the following control is executed. This control will be explained with the above-described PC 104.

For example, the control unit of the PC 104 accepts a total copy count of "two" for job Y via the designation field 1406 in the display of FIG. 26 executed by the display unit of the PC 104 in response to a mouse operation by the user of the PC 104. In response to press of the tab 1403 in the display of FIG. 26 by the user with the mouse, the control unit of the PC 104 causes the display unit of the PC 104 to execute the display of FIG. 27.

The control unit of the PC 104 accepts the execution request of a "case binding process" from the user via the designation field 1508 in the display of FIG. 27. The control unit of the PC 104 accepts a specific copy count of "1" for the case binding process from the user via the designation field 1509 in the display of FIG. 27. The control unit of the PC 104 accepts the execution request of a "two-hole punching process" from the user via the designation field 1512 in the display of FIG. 27.

The control unit of the PC 104 accepts a specific copy count of "1" for the two-hole punching process from the user via the designation field 1513 in the display of FIG. 27. In response to press of the key 1514 by the user with mouse, the control unit of the PC 104 determines that sheet process settings for job Y are complete.

Assume that the user presses a print execution request key in the window (not shown) of the PC 104 after making process condition settings for job Y including the above-described sheet process settings via the UI unit of the PC 104. The PC 104 transmits the print execution request of job Y to the control unit 205 of the print apparatus 100. Then, the control unit 205 determines that it has accepted the print execution request of job Y. In this case, the print data generation source of job Y is the PC 104.

The series of operations is (operation 1) in FIG. 30B starting from T0 in FIG. 30B. According to this method, the control unit 205 accepts process conditions for job Y including "settings to execute a specific type of sheet process every designated number of copies" including both the case binding process setting and punching process setting.

In the control example of FIG. 30B, an intervention operation demanded of the user is only an operation in (operation 1) of FIG. 30B in creating the entire final product of job Y by the system 1000. That is, the user suffices to execute a series of sheet process settings and a print execution request for job Y only once without repetitively executing them a plurality of number of times.

In response to accepting one print execution request for job Y at T0 in FIG. 30B, the control unit 205 stores all pages of a print data string of job Y in the HDD 209. This operation is (operation 2) starting from timing T1 in FIG. 30B.

In (operation 2) of FIG. 30B, the control unit 205 stores a print data string of job Y sequentially from the start page (print data of the first page) to the final page (print data of the 50th page) in the HDD 209. In other words, (operation 2) in FIG. 30B is an operation executed until the HDD 209 stores print data of the final page of job Y.

Assume that no job to be processed other than job Y exists in the print queue of the HDD 209 when the control unit 205 accepts one print execution request for job Y from the user (at timing T1 in FIG. 30B). In this case, the control unit 205 causes the printer unit 203 to start the print process of print data of job Y immediately after the HDD 209 stores print data of the first page of job Y. This operation is (operation 3) starting from timing T2 in FIG. 30B.

(Operation 3) in FIG. 30B continues until a print data string of job Y is printed by reading it out from the HDD 209 sequentially from the start page (print data of the first page) of job Y to the final page (print data of the 50th page) of job Y. In other words, (operation 3) in FIG. 30B is kept executed until print data of the final page of job Y is read out from the HDD 209 and printed by the printer unit 203.

When there is no job to be processed except for job Y, the control unit 205 controls the system 1000 to synchronously execute (operation 2) and (operation 3) in FIG. 30B in parallel with each other even in the sequence illustrated in FIG. 30B.

In the control example of FIG. 30B, the control unit 205 inhibits erase of a print data string of job Y from the HDD 209 even after the printer unit 203 completes printing the first set for the case binding process in (operation 3) of FIG. 30B. The control unit 205 controls the HDD 209 to read out the print data string of job Y again from the HDD 209 in (operation 5) of FIG. 30B (to be described below).

Upon completion of printing the first set of job Y in (operation 3) of FIG. 30B, the control unit 205 causes the inline finisher of the system 1000 to execute a case binding process as a sheet process for a printed bundle of the first set. For example, when the system 1000 has the system configuration illustrated in FIGS. 8A and 8B, the control unit 205 causes the second sheet-processing apparatus 200b capable of executing the case binding process in FIGS. 8A and 8B to execute the case binding process. This operation is (operation 4) starting from timing T3 in FIG. 30B.

The control unit 205 executes the process of (operation 4) in FIG. 30B in response to accepting a "request to execute a specific type of finishing every specific number of copies in order to execute a case binding process for a printed bundle of one set in printing a total of two sets and execute two-hole punching for a printed bundle of one remaining set" as a setting for job Y from the user at T0 in FIG. 30B.

Upon completion of (operation 4) in FIG. 30B, i.e., after executing at least (operation 3) in FIG. 30B, the control unit 205 controls to automatically execute (operation 5) in FIG. 30B. In other words, the control unit 205 controls the system 1000 to automatically execute (operation 5) and subsequent operations in FIG. 30B without any user intervention operation during the period including the start time of (operation 2) in FIG. 30B to the end time of (operation 4) in FIG. 30B, which corresponds to the period except for the period of (operation 1) in FIG. 30B.

As an operation in (operation 5) of FIG. 30B, the control unit 205 controls to execute the following operation.

For example, in (operation 5) of FIG. 30B, the control unit 205 causes the printer unit 203 to execute a print process as printing of the second set of job Y using again print data (a 50-page data string) of job Y already stored in the HDD 209 in (operation 2) of FIG. 30B. That is, data to be printed in (operation 3) of FIG. 30B and data to be printed in (operation 5) of FIG. 30B have the same contents. Both print data used in (operation 3) of FIG. 30B and print data used in (operation 5) of FIG. 30B are a print data string of job Y which is acquired in (operation 2) of FIG. 30B and stored in the HDD 209. That is, the control unit 205 causes the print apparatus 100 even in (operation 5) of FIG. 30B to execute the print process using data again which is used by the print apparatus 100 in the print process in (operation 3) of FIG. 30B.

(Operation 5) in FIG. 30B continues until a print data string of job Y is printed by reading it out from the HDD 209 sequentially from the start page (print data of the first page) of job Y to the final page (print data of the 50th page) of job Y. In other words, (operation 5) in FIG. 30B is kept executed until print data of the final page of job Y is read out from the HDD 209 and printed by the printer unit 203. A series of print processes to print the print data of pages from the start to final pages once is printing of one set.

This is because the control unit 205 accepts a "request to execute a specific type of finishing every specific number of copies in order to execute a case binding process for a printed bundle of one set in printing a total of two sets and execute two-hole punching for a printed bundle of one remaining set" as a setting for job Y from the user at T0 in FIG. 30B. As operations necessary for a series of operations based on this request, the control unit 205 controls the system 1000 to automatically execute (operation 5) in FIG. 30B after executing (operation 3) in FIG. 30B.

In response to completion of printing the second set of job Y in (operation 5) of FIG. 30B, the control unit 205 causes the inline finisher of the system 1000 to execute a two-hole punching process as a sheet process for a printed bundle of the second set. For example, when the system 1000 has the system configuration illustrated in FIGS. 8A and 8B, the control unit 205 causes the third sheet-processing apparatus 200c capable of executing the two-hole punching process in FIGS. 8A and 8B to execute the two-hole punching process. This operation is (operation 6) starting from timing T5 in FIG. 30B. The timing T6 in FIG. 30B is the timing when the two-hole punching process in (operation 6) of FIG. 30B is complete.

The control unit 205 controls the system 1000 to automatically execute (operation 6) in FIG. 30B after executing (operation 5) in FIG. 30B.

In other words, the control unit 205 controls the system 1000 to automatically execute (operation 6) in FIG. 30B after executing (operation 5) in FIG. 30B without setting any process condition and the like for creating the final product of job Y via the UI unit of the embodiment by the user during the period of T1 to T5 in FIG. 30B.

By executing all (operation 1) to (operation 6) in FIG. 30B at timings T0 to T6 in FIG. 30B, creation of a final product requested by the user for job Y is complete. That is, creation of printed bundles of two sets in total, i.e., a case-bound printed bundle of one set on which all the pages of print data of job Y are printed, and a two-hole-punched printed bundle of one set on which all the pages of print data of job Y are printed is complete.

When accepting the user request illustrated in (operation 1) of FIG. 30B via the UI unit of the embodiment, the control unit 205 controls the system 1000 to execute the above-described series of operations on the basis of the request.

In other words, the control unit 205 controls various units (e.g., the HDD 209, printer unit 203, and sheet-processing apparatus 200) to execute (operation 2) to (operation 6) in FIG. 30B by the system 1000 as a series of operations complying with the user request.

Moreover, the control unit 205 controls the system 1000 to automatically, successively execute a series of (operation 2) to (operation 6) in FIG. 30B only by accepting process conditions and a print execution request for job Y only once in (operation 1) of FIG. 30B via the UI unit by the user without setting any process condition and the like for creating the final product of job Y via the UI unit by the user during the period of T1 to T6 in FIG. 30B.

The final product of job X created by the system 1000 by the control of the embodiment illustrated in FIG. 30A is identical to that of job Y created by the system 1000 by the control of the embodiment illustrated in FIG. 30B.

However, the total time taken to complete creation of a final product when the system 1000 executes the control illustrated in FIG. 30B is much shorter than that taken to complete creation of a final product when the system 1000 executes the control illustrated in FIG. 30A. More specifically, the period required from T0 to T6 in FIG. 30B is shorter than that required from T0 to T8 in FIG. 30A. This is apparent from the fact that operations, i.e., (operation 5) and (operation 6) in a series of operations illustrated in FIG. 30A are unnecessary in a series of operations illustrated in FIG. 30B.

As is apparent from the comparative descriptions of FIGS. 30A and 30B, the embodiment can obtain the following effects by configuring the system 1000 to execute control by the "high-productivity finishing sequence in printing a plurality of copies". The system 1000 can process a target job at high productivity even for use cases and user needs assumed in Description of the Related Art. The system 1000 does not use its resources more than necessary. The system 1000 does not require operations more than necessary of the user. In other words, the embodiment can provide the effects as described with reference to FIGS. 19 to 29.

Furthermore, the print system 1000 of the embodiment also comprises another constituent feature capable of enhancing the effects as much as possible. An example of the constituent feature will be explained with reference to FIG. 30C and the like.

[Description of FIG. 30C]

FIG. 30C is a chart for explaining a control example for increasing the job productivity of the system 1000 more than the control example illustrated in FIG. 30B.

In this example, the control unit 205 also executes the control illustrated in FIG. 30C. For this purpose, the HDD 209 stores computer-readable program data for executing this sequence. When the user selects this sequence, the control unit 205 reads out the program data from the HDD 209 and executes it. The control unit 205 causes the system 1000 to execute the control in accordance with the program data.

It will be explained that the control illustrated in FIG. 30C achieves higher productivity than that by the control illustrated in FIG. 30A and that by the control illustrated in FIG. 30B. For descriptive convenience, the process conditions of a job to be controlled in FIG. 30C are the same as those of job X illustrated in FIG. 30A and those of job Y illustrated in FIG. 30B. That is, the process conditions of a job to be processed in FIG. 30C include at least (condition 1) and (condition 2) illustrated in FIGS. 30A and 30B. In this example, the job to be processed in FIG. 30C will be referred to as job Z in order to discriminate the control example in FIG. 30C from those in FIGS. 30A and 30B. Job Z also requires printing of a 50-page document data string.

The control illustrated in FIG. 30C is an example of control by the "high-productivity finishing sequence in printing a plurality of copies", similar to the control illustrated in FIG. 30B. However, the control illustrated in FIG. 30C further increases productivity more than that illustrated in FIG. 30B. For example, the control illustrated in FIG. 30B may be defined as the "first high-productivity finishing sequence in printing a plurality of copies", and the control illustrated in FIG. 30C may be defined as the "second high-productivity finishing sequence in printing a plurality of copies". Alternatively, the control in FIG. 30B may be referred to as "POD mode", and that in FIG. 30C may be referred to as "POD professional mode".

The embodiment allows the user to select, via the UI unit provided by the embodiment, which of the control illustrated in FIG. 30B and that illustrated in FIG. 30C is adopted to operate the system 1000. Examples of the UI unit are the operation unit 204 and the operation unit of an external apparatus such as the PC 104. However, the embodiment controls to limit a user permitted to select and determine these sequences. For example, an authentication process is necessary to permit only a specific user (e.g., administrator) to execute the selection operation. As the authentication process, any of password authentication, IC card authentication, and fingerprint authentication is applicable. After the control unit 205 confirms by the authentication process that the user is a specific one, it allows the specific user to make selection via the UI unit.

The embodiment controls the print system 1000 to run by control selected in accordance with an instruction from the specific user from control of FIG. 30B and that of FIG. 30C. The print system 1000 desirably comprises this constituent feature. A system configuration capable of executing only either of control of FIG. 30B and that of FIG. 30C is also possible.

Before the description of the control illustrated in FIG. 30C, a precondition to execute the control will be described additionally. The control unit 205 controls the system 1000 to execute the control illustrated in FIG. 30C after the control unit 205 confirms that the print system 1000 has the system configuration illustrated in FIGS. 8A and 8B. In other words, assume that the system 1000 has the system configuration illustrated in FIGS. 9A and 9B or FIGS. 10A and 10B. Under this condition, the control unit 205 inhibits the system 1000 from executing the control illustrated in FIG. 30C. The control unit 205 executes control based on a rule complying with the system configuration independently of the control in FIG. 30C.

In order to grasp the system configuration of the system 1000 by the control unit 205, the control unit 205 confirms system configuration information registered in the HDD 209 in this control. In the control example of FIG. 30C, as a result of confirming the system configuration information, the control unit 205 confirms that the system 1000 has the system configuration illustrated in FIGS. 8A and 8B. On condition of this confirmation, the control unit 205 executes the control illustrated in FIG. 30C. When executing the control illustrated in FIG. 30C, the control unit 205 also refers to rule information of a rule management table which defines specific rules illustrated in FIGS. 31A-1 to 31A-3.

The rule information is registered in advance in the HDD 209 in association with system configuration information of the system 1000. As control according to the rule information, the control unit 205 executes control illustrated in FIG. 30C. Details of FIGS. 31A-1 to 31A-3 will be described later.

As illustrated in FIGS. 8A to 10B, 18A, and 18B, the system 1000 of the embodiment allows cascade-connecting an arbitrary number of inline finishers to the print apparatus 100 in an arbitrary connection order under specific limitations. The embodiment can build various system configurations in order to improve system flexibility. For example, the system configuration of the system 1000 may change depending on a POD company serving as the delivery destination, or change after installation. There are a plurality of system configuration candidates of the system 1000.

In the description with reference to FIGS. 8A to 10B, three system configurations have been introduced. According to the embodiment, rule information for achieving the same purpose as that in FIGS. 31A-1 to 31A-3 is managed and held in the HDD 209 discriminatively for each of system configurations. The rule information may be dynamically, automatically created by the control unit 205 on the basis of system configuration information, or held as program data in advance in the HDD 209. This will also be explained later together with the description of FIGS. 31A-1 to 31A-3.

Under this precondition, the control example in FIG. 30C will be explained.

At timing T0 in FIG. 30C, the control unit 205 accepts the process conditions of job Z from the user via the UI unit of the embodiment.

At timing T0 in FIG. 30C, the control unit 205 controls to accept the execution requests of a "case binding process" and "punching process" from the user via the UI unit of the embodiment. For descriptive convenience, the punching process is "two-hole punching".

Based on this, assume that the control unit 205 accepts the user request for job Z via the UI unit of the print apparatus 100. In this case, the control unit 205 executes the following control.

For example, the control unit 205 accepts a total copy count of "two" for job Z via the display of FIG. 19 executed by the display unit 401 in response to a user operation with the ten-key pad 506. In response to press of the key 609 in the display of FIG. 19 by the user, the control unit 205 causes the display unit 401 to execute the display of FIG. 20. In response to press of the key 2007 in the display of FIG. 20 by the user, the control unit 205 causes the display unit 401 to execute the display of FIG. 21.

The control unit 205 accepts the execution request of a "case binding process" from the user via the key 2104A in the display of FIG. 21. The control unit 205 accepts a specific copy count of "1" for the case binding process from the user via the display field 2104B in the display of FIG. 21. The control unit 205 accepts the execution request of a "two-hole punching process" from the user via the key 2106A in the display of FIG. 21. The control unit 205 accepts a specific copy count of "1" for the two-hole punching process from the user via the display field 2106B in the display of FIG. 21. In response to press of the key 2110 by the user, the control unit 205 determines that sheet process settings for job Z are complete.

After the user makes process condition settings for job Z including the above-described sheet process settings and presses the key 503, the control unit 205 determines that it has accepted the print execution request of job Z. In this case, the print data generation source of job Z is the print apparatus 100 (e.g., the scanner unit 201 or HDD 209).

When accepting the user request for job Z via the UI unit of an external apparatus or the like, the following control is executed. This control will be explained with the above-described PC 104.

For example, the control unit of the PC 104 accepts a total copy count of "two" for job Z via the designation field 1406 in the display of FIG. 26 executed by the display unit of the PC 104 in response to a mouse operation by the user of the PC 104. In response to press of the tab 1403 in the display of FIG. 26 by the user with the mouse, the control unit of the PC 104 causes the display unit of the PC 104 to execute the display of FIG. 27.

The control unit of the PC 104 accepts the execution request of a "case binding process" from the user via the designation field 1508 in the display of FIG. 27. The control unit of the PC 104 accepts a specific copy count of "1" for the case binding process from the user via the designation field 1509 in the display of FIG. 27. The control unit of the PC 104 accepts the execution request of a "two-hole punching process" from the user via the designation field 1512 in the display of FIG. 27.

The control unit of the PC 104 accepts a specific copy count of "1" for the two-hole punching process from the user via the designation field 1513 in the display of FIG. 27. In response to press of the key 1514 by the user with mouse, the control unit of the PC 104 determines that sheet process settings for job Z are complete.

Assume that the user presses a print execution request key in the window (not shown) of the PC 104 after making process condition settings for job Z including the above-described sheet process settings via the UI unit of the PC 104. The PC 104 transmits the print execution request of job Z to the control unit 205 of the print apparatus 100. Then, the control unit 205 determines that it has accepted the print execution request of job Z. In this case, the print data generation source of job Z is the PC 104.

The series of operations is (operation 1) in FIG. 30C starting from T0 in FIG. 30C. According to this method, the control unit 205 accepts process conditions for job Z including "settings to execute a specific type of sheet process every designated number of copies" including the case binding process setting and punching process setting.

In the control example of FIG. 30C, an intervention operation demanded of the user is only an operation in (operation 1) of FIG. 30C in creating the entire final product of job Z by the system 1000. That is, the user suffices to execute a series of sheet process settings and a print execution request for job Z only once without repetitively executing them a plurality of number of times. This is the same as the control illustrated in FIG. 30B.

In response to accepting one print execution request for job Z at T0 in FIG. 30C, the control unit 205 stores all pages of a print data string of job Z in the HDD 209. This operation is (operation 2) starting from timing T1 in FIG. 30C.

In (operation 2) of FIG. 30C, the control unit 205 stores a print data string of job Z sequentially from the start page (print data of the first page) to the final page (print data of the 50th page) in the HDD 209. In other words, (operation 2) in FIG. 30C is an operation executed until the HDD 209 stores print data of the final page of job Z.

Assume that no job to be processed other than job Z exists in the print queue of the HDD 209 when the control unit 205 accepts one print execution request for job Z from the user (at timing T1 in FIG. 30C). In this case, the control unit 205 causes the printer unit 203 to start the print process of print data of job Z immediately after the HDD 209 stores print data of the first page of job Z. This operation is (operation 3) starting from timing T2 in FIG. 30C.

(Operation 3) in FIG. 30C continues until a print data string of job Z is printed by reading it out from the HDD 209 sequentially from the start page (print data of the first page) of job Z to the final page (print data of the 50th page) of job Z. In other words, (operation 3) in FIG. 30C is kept executed until print data of the final page of job Z is read out from the HDD 209 and printed by the printer unit 203.

When there is no job to be processed except for job Z, the control unit 205 controls the system 1000 to synchronously execute (operation 2) and (operation 3) in FIG. 30C in parallel with each other even in the sequence illustrated in FIG. 30C.

In the control example of FIG. 30C, the control unit 205 inhibits erase of a print data string of job Z from the HDD 209 even after the printer unit 203 completes printing the first set in (operation 3) of FIG. 30C. The control unit 205 controls the HDD 209 to read out the print data string of job Z again from the HDD 209 in (operation 5) of FIG. 30C (to be described below).

In response to completion of printing the first set of job Z in (operation 3) of FIG. 30C, the control unit 205 causes the inline finisher of the system 1000 to execute a two-hole punching process as a sheet process for a printed bundle of the first set. For example, when the system 1000 has the system configuration illustrated in FIGS. 8A and 8B, the control unit 205 causes the third sheet-processing apparatus 200c capable of executing the two-hole punching process in FIGS. 8A and 8B to execute the two-hole punching process. This operation is (operation 4) starting from timing T3 in FIG. 30C.

The control unit 205 executes the process of (operation 4) in FIG. 30C in response to accepting a "request to execute a specific type of finishing every specific number of copies in order to execute a case binding process for a printed bundle of one set in printing a total of two sets and execute two-hole punching for a printed bundle of one remaining set" as a setting for job Z from the user at T0 in FIG. 30C.

It should be noted that job Y to be controlled in the control illustrated in FIG. 30B and job Z to be controlled in the control illustrated in FIG. 30C have the same process conditions. In other words, operations included in a series of operations necessary to complete the final product of job Y are the same as those necessary to complete the final product of job Z. This is understood from the fact that the contents of (operation 1) to (operation 6) in FIG. 30B are the same as those of (operation 1) to (operation 6) in FIG. 30C. However, when executing the control illustrated in FIG. 30C, the control unit 205 controls the system 1000 to execute the plurality of operations necessary for job Z in a different order at different timings from those when executing the control in FIG. 30B.

More specifically, in the control illustrated in FIG. 30B, the control unit 205 causes the sheet-processing apparatus 200b in FIGS. 8A and 8B to execute a case binding process as (operation 4) in FIG. 30B for job Y. In contrast, in the control of FIG. 30C, the control unit 205 causes the sheet-processing apparatus 200c in FIGS. 8A and 8B to execute a two-hole punching process as (operation 4) in FIG. 30C for job Z.

The control illustrated in FIG. 30C corresponds to the system configuration of the system 1000. In other words, the control unit 205 controls the system 1000 to execute the control illustrated in FIG. 30C when the print apparatus 100 accepts a "job requiring printing of a plurality of copies and requiring a specific type of finishing every specific number of copies", like jobs Y and Z. The control unit 205 executes the control illustrated in FIG. 30C on the basis of the following pieces of criterion information.

(Information 1) Information on a finishing type necessary for a job requiring printing of a plurality of copies and requiring a specific type of finishing every specific number of copies.

(Information 2) Information on the system configuration of the system 1000.

(Information 3) Rule information corresponding to the system configuration of the system 1000 (e.g., rule information 3102A illustrated in FIGS. 31A-1 to 31A-3).

The control unit 205 checks these pieces of criterion information for a job requiring printing of a plurality of copies and requiring a specific type of finishing every specific number of copies. Based on the confirmation result, the control unit 205 controls to dynamically determine an order in which the system 1000 executes a plurality of types of finishings necessary for the job.

More specifically, the control unit 205 controls the system 1000 to execute "case binding" as (operation 4) when executing the control of FIG. 30B. However, the control unit 205 controls the system 1000 to execute "two-hole punching" as (operation 4) when executing the control of FIG. 30C. The control unit 205 controls to dynamically change the execution order of operations in a plurality of types of finishings necessary for the job in accordance with the system configuration of the print system 1000.

How to determine an order in which the system 1000 executes a plurality of types of finishings necessary for a job requiring printing of a plurality of copies and requiring a specific type of finishing every specific number of copies will be described.

For example, the control unit 205 confirms a finishing type requested by a job on the basis of process condition data accepted from the user via the UI unit of the embodiment. Based on system configuration information in the HDD 209, the control unit 205 confirms which inline finisher of the system 1000 is to execute the requested finishing. Based on the system configuration information in the HDD 209, the control unit 205 confirms an ordinal number at which the inline finisher is positioned in the system 1000.

As a result of the confirmation, assume that the control unit 205 confirms that finishers necessary to execute all types of finishings for the job are an inline finisher (sheet-processing apparatus 200a in the example of FIGS. 8A and 8B) connected first to the print apparatus 100 and an inline finisher (sheet-processing apparatus 200b in the example of FIGS. 8A and 8B) connected second to the print apparatus 100. In this case, the control unit 205 controls to start executing a finishing operation by the second inline finisher prior to executing a finishing operation by the first inline finisher.

As the description of job Z subjected in the control illustrated in FIG. 30C, the control unit 205 executes the following control.

For example, based on process condition data accepted from the user via the UI unit of the embodiment, the control unit 205 confirms that finishing types requested by job Z are "two, case binding and two-hole punching". Based on system configuration information in the HDD 209, the control unit 205 confirms that an inline finisher (corresponding to the sheet-processing apparatus 200b in FIGS. 8A and 8B) connected second to the print apparatus 100 executes "case binding". Also, based on the system configuration information in the HDD 209, the control unit 205 confirms that an inline finisher (corresponding to the sheet-processing apparatus 200c in FIGS. 8A and 8B) connected third to the print apparatus 100 executes "two-hole punching".

Based on the determination result when the system 1000 has the system configuration illustrated in FIGS. 8A and 8B, the control unit 205 controls to start executing a two-hole punching operation by the third inline finisher (sheet-processing apparatus 200c in FIGS. 8A and 8B) prior to executing a case binding operation by the second inline finisher (sheet-processing apparatus 200b in FIGS. 8A and 8B) in a series of operations for job Z.

In order to execute this control, the control unit 205 causes the sheet-processing apparatus 200c in FIGS. 8A and 8B to execute not "case binding" but "two-hole punching" as (operation 4) in FIG. 30C for job Z in the control illustrated in FIG. 30C.

Assume that a situation arises in which a job requiring printing of a plurality of copies and requiring a specific type of finishing every specific number of copies is accepted by the print apparatus 100 and is to be processed by the system 1000. In this case, the control unit 205 controls the execution order and timings of sheet-processing operations by sheet-processing apparatuses so as to utilize the sheet-processing apparatuses of the system 1000 sequentially from one (connected last) downstream in the sheet conveyance direction in a series of operations necessary for the job.

The above control is one control contained in the control illustrated in FIG. 30C.

Regarding the control illustrated in FIG. 30C, it should be noted that this control is not only to "control the execution order and timings of finishings in a series of operations for a job requiring printing of a plurality of copies and requiring a specific type of finishing every specific number of copies". In the control illustrated in FIG. 30C, the control unit 205 executes not only this control but also the following control. This is also a feature in the control illustrated in FIG. 30C.

In response to the start of (operation 4) in FIG. 30C, the control unit 205 controls to automatically start executing (operation 5) in FIG. 30C. In other words, the control unit 205 controls to start executing (operation 5) in FIG. 30C during execution of (operation 4) in FIG. 30C immediately after the completion of (operation 3) in FIG. 30C. The control unit 205 controls the system 1000 to parallel-execute the two operations: (operation 4) in FIG. 30C and (operation 5) in FIG. 30C. As for job Z to be controlled in FIG. 30C, the control unit 205 controls the system 1000 to execute the following parallel operations for job Z.

The control unit 205 causes the sheet-processing apparatus 200c in FIGS. 8A and 8B to execute a two-hole punching process as (operation 4) from T3 in FIG. 30C for a printed bundle of the first set on which a print data string of job Z is printed by (operation 3) in FIG. 30C. The control unit 205 causes the printer unit 203 to execute a print process as (operation 5) in FIG. 30C for a printed bundle of the second set of job Z during execution of the two-hole punching process for the printed bundle of the first set of job Z in (operation 4) of FIG. 30C.

(Operation 5) in FIG. 30C is a print operation for a printed bundle subjected to "case binding" which is a sheet process requested by the user together with "two-hole punching" for job Z at timing T0 in FIG. 30C.

Based on sensor information received from the sheet-processing apparatus 200c via the signal line in the apparatus of FIG. 2, the control unit 205 confirms that an entire printed bundle of the first set of job Z is supplied into the sheet-processing apparatus 200c in FIGS. 8A and 8B. This timing is timing T4 in FIG. 30C. As a result of the confirmation, the control unit 205 causes the printer unit 203 to start (operation 5) in FIG. 30C from timing T4 in FIG. 30C. In addition, the control unit 205 parallel-executes (operation 5) in FIG. 30C by the printer unit 203 and (operation 4) in FIG. 30C by the sheet-processing apparatus 200c in FIGS. 8A and 8B.

The control unit 205 controls to also automatically execute (operation 5) in FIG. 30C after executing (operation 3) in FIG. 30C. That is, the control unit 205 controls the system 1000 to automatically execute (operation 5) and subsequent operations in FIG. 30C without any user intervention operation during the period including the start time of (operation 2) in FIG. 30C to the end time of (operation 4) in FIG. 30C, which is the period except for the period of (operation 1) in FIG. 30C. This is the same as the control illustrated in FIG. 30B. A main difference from the control illustrated in FIG. 30B is that the control unit 205 controls to parallel-execute (operation 4) in FIG. 30C and (operation 5) in FIG. 30C by the control illustrated in FIG. 30C.

As an operation in (operation 5) of FIG. 30C, the control unit 205 controls to execute the following operation.

For example, in (operation 5) of FIG. 30C, the control unit 205 causes the printer unit 203 to execute a print process as printing of the second set of job Z using again print data (a 50-page data string) of job Z already stored in the HDD 209 in (operation 2) of FIG. 30C. That is, data to be printed in (operation 3) of FIG. 30C and data to be printed in (operation 5) of FIG. 30C have the same contents.

Both print data used in (operation 3) of FIG. 30C and print data used in (operation 5) of FIG. 30C are a print data string of job Z which is acquired in (operation 2) of FIG. 30C and stored in the HDD 209. In this fashion, the control unit 205 causes the print apparatus 100 even in (operation 5) of FIG. 30C to execute the print process using data again which is used by the print apparatus 100 in the print process in (operation 3) of FIG. 30C.

(Operation 5) in FIG. 30C continues until a print data string of job Z is printed by reading it out from the HDD 209 sequentially from the start page (print data of the first page) of job Z to the final page (print data of the 50th page) of job Z. In other words, (operation 5) in FIG. 30C is kept executed until print data of the final page of job Z is read out from the HDD 209 and printed by the printer unit 203.

A series of print processes to print the print data of pages from the start to final pages once is printing of one set. This is because the control unit 205 accepts a "request to execute a specific type of finishing every specific number of copies in order to execute a case binding process for a printed bundle of one set in printing a total of two sets and execute two-hole punching for a printed bundle of one remaining set" as a setting for job Z from the user at T0 in FIG. 30C. As operations necessary for a series of operations based on this request, the control unit 205 controls the system 1000 to automatically execute (operation 5) in FIG. 30C after executing (operation 3) in FIG. 30C.

This is also the same as the control illustrated in FIG. 30B. A main difference from the control example illustrated in FIG. 30B is that the control unit 205 controls to parallel-execute (operation 4) in FIG. 30C and (operation 5) in FIG. 30C by the control illustrated in FIG. 30C. Further, the control unit 205 also executes the following control in the control illustrated in FIG. 30C.

Upon completion of printing the second set of job Z in (operation 5) of FIG. 30C, the control unit 205 causes the inline finisher of the system 1000 to execute a case binding process as a sheet process for a printed bundle of the second set. For example, this control targets the system configuration example in FIGS. 8A and 8B, so the control unit 205 causes the second sheet-processing apparatus 200b capable of executing the case binding process in FIGS. 8A and 8B to execute the case binding process.

This operation is (operation 6) starting from timing T5 in FIG. 30C. The timing T6 in FIG. 30C is the timing when the sheet-processing apparatus 200c in FIGS. 8A and 8B completes the case binding process in (operation 6) of FIG. 30C.

The control unit 205 controls the system 1000 to also automatically execute (operation 6) in FIG. 30C after executing (operation 5) in FIG. 30C. That is, the control unit 205 controls the system 1000 to automatically execute (operation 6) in FIG. 30C after executing (operation 5) in FIG. 30C without setting any process condition and the like for creating the final product of job Z via the UI unit of the embodiment by the user during the period of T1 to T5 in FIG. 30C. This is also the same as the control illustrated in FIG. 30B.

However, in the control illustrated in FIG. 30C, the control unit 205 controls the system 1000 to parallel-execute (operation 4) in FIG. 30C and (operation 6) in FIG. 30C. This configuration is also a difference from the control illustrated in FIG. 30B.

To execute the control illustrated in FIG. 30C, a plurality of types of finishings are simultaneously executable in a series of operations for the same job (job Z in this example) requiring different types of finishings. As for job Z to be processed in the control illustrated in FIG. 30C, the control unit 205 controls the system 1000 to execute the following operation.

Assume that a "two-hole punching process by the sheet-processing apparatus 200c in FIGS. 8A and 8B for a printed bundle of the first set of job Z", which is necessary for (operation 4) in FIG. 30C, is in execution by the sheet-processing apparatus 200c as the current process status of the system 1000. As an example of this situation, sheets of a printed bundle of the first set of job Z are being conveyed in the sheet-processing apparatus 200b in FIGS. 8A and 8B.

As another example of this situation, a sheet bundle of one set of job Z necessary to execute a punching process by the punching unit in the sheet-processing apparatus 200c is being stacked on the sheet holding unit in the apparatus. As still another example, a sheet bundle of job Z is being aligned by the sheet holding unit.

These situations are conceivable, but their contents need not be particularly referred to. When the system 1000 is in such a situation, assume that a "print process by the printer unit 203 for a printed bundle of the second set of job Z for case binding" necessary for (operation 5) in FIG. 30C is complete.

As described above, assume that the system 1000 completes a print operation for the second set of job Z during execution of a two-hole punching operation for a printed bundle of the first set of job Z. In the embodiment, the control unit 205 can sequentially confirm the current situation in the system 1000 as process status information of the current job in the system 1000. At this time, the control unit 205 acquires information representing the execution status of a sheet-processing operation for job Z from the sheet-processing apparatus 200c via the signal line in the apparatus of FIG. 2.

In addition, the control unit 205 acquires information representing the execution status of a print operation for job Z from the printer unit 203 via the signal line in the apparatus of FIG. 2. The control unit 205 makes the above-mentioned confirmation on the basis of these pieces of acquired information.

This case corresponds to a process status concerning job Z in the system 1000 upon completion of (operation 5) in FIG. 30C (at timing T5 in FIG. 30C). In this case, as illustrated in FIG. 30C, the control unit 205 controls to parallel-execute (operation 4) in FIG. 30C by the sheet-processing apparatus 200c in FIGS. 8A and 8B and (operation 6) in FIG. 30C by the sheet-processing apparatus 200b in FIGS. 8A and 8B.

That is, the control unit 205 causes the sheet-processing apparatus 200b in FIGS. 8A and 8B to start executing (operation 6) in FIG. 30C from timing T5 in FIG. 30C in parallel with (operation 4) in FIG. 30C by the sheet-processing apparatus 200c in FIGS. 8A and 8B. As for job Z, the control unit 205 executes the following control.

The printer unit 203 completes a print operation necessary for a printed bundle of the second set of job Z for case binding during execution of a two-hole punching operation for a printed bundle of the first set by the sheet-processing apparatus 200c in FIGS. 8A and 8B. After confirming this status, the control unit 205 causes the sheet-processing apparatus 200b in FIGS. 8A and 8B to start a case binding operation for the printed bundle of the second set of job Z while keeping the sheet-processing apparatus 200c in FIGS. 8A and 8B executing the two-hole punching operation for job Z.

The control unit 205 controls the sheet-processing apparatus 200b in FIGS. 8A and 8B and the sheet-processing apparatus 200c in FIGS. 8A and 8B to parallel-execute these two types of finishing operations for job Z from timing T5 in FIG. 30C.

By executing all (operation 1) to (operation 6) in FIG. 30C at timings T0 to T6 in FIG. 30C, creation of a final product requested by the user for job Z is complete. That is, creation of printed bundles of two sets in total, i.e., a case-bound printed bundle of one set on which all the pages of print data of job Z are printed, and a two-hole-punched printed bundle of one set on which all the pages of print data of job Z are printed is complete.

When accepting the user request illustrated in (operation 1) of FIG. 30C via the UI unit of the embodiment, the control unit 205 controls the system 1000 to execute the above-described series of operations on the basis of the request. That is, the control unit 205 controls various units (e.g., the HDD 209, printer unit 203, and sheet-processing apparatus 200) to execute (operation 2) to (operation 6) in FIG. 30C by the system 1000 as a series of operations complying with the user request.

Further, the control unit 205 controls the system 1000 to automatically, successively execute a series of (operation 2) to (operation 6) in FIG. 30C only by accepting process conditions and a print execution request for job Z only once in (operation 1) of FIG. 30C via the UI unit by the user without setting any process condition and the like for creating the final product of job Z via the UI unit by the user during the period of T1 to T6 in FIG. 30C. This is the same as the case of executing the control illustrated in FIG. 30B.

However, when executing the control illustrated in FIG. 30C, the control unit 205 automatically determines the execution order and execution timings of a plurality of types of finishings necessary for a "job requiring printing of a plurality of copies and requiring different types of finishings every specific number of copies" on the basis of system configuration information of the system 1000 in the HDD 209.

More specifically, jobs having the same process conditions are process targets regardless of which of control by the "second high-productivity finishing sequence in printing a plurality of copies" illustrated in FIG. 30C and control by the "first high-productivity finishing sequence in printing a plurality of copies" illustrated in FIG. 30B is executed. However, depending on the configuration of the system 1000 and process conditions from the user for a job, the control unit 205 controls the system 1000 to execute a plurality of operations necessary for a job to be processed in a different process order at different timings from those when executing control by the "first high-productivity finishing sequence in printing a plurality of copies".

When executing control by the "second high-productivity finishing sequence in printing a plurality of copies" illustrated in FIG. 30C, the control unit 205 controls the system 1000 to parallel-execute the following types of operations on the basis of a finishing type requested by the user for a job to be processed by the above-described method, system configuration information, the current process status of the job in the system, and the like.

For example, in parallel with a specific type of finishing operation for printed bundles by a specific number of copies designated by the user for a job, the control unit 205 starts executing a print operation for another type of finishing further necessary for the job. By this control, the control unit 205 allows the system 1000 to parallel-execute (operation 4) and (operation 5) in FIG. 30C for job Z from timing T4 in FIG. 30C, as illustrated in FIG. 30C.

In parallel with the specific type of finishing operation designated by the user for the job, the control unit 205 causes the system 1000 to start executing another type of finishing operation further necessary for the job. By this control, the control unit 205 allows the system 1000 to parallel-execute (operation 4) and (operation 6) in FIG. 30C for job Z from timing T5 in FIG. 30C, as illustrated in FIG. 30C.

As described above, the same final product is creatable both when the control unit 205 causes the system 1000 to execute control by the "first high-productivity finishing sequence in printing a plurality of copies" illustrated in FIG. 30B and when the control unit 205 causes the system 1000 to execute control by the "second high-productivity finishing sequence in printing a plurality of copies" illustrated in FIG. 30C. In the latter control, however, the system 1000 can parallel-execute specific operations contained in a plurality of operations necessary for a "job requiring printing of a plurality of copies and requiring different types of finishings every designated number of copies".

As a result, the total time taken to complete creating a final product when the system 1000 executes control by the "second high-productivity finishing sequence in printing a plurality of copies" illustrated in FIG. 30C becomes shorter than that taken to complete creating a final product when the system 1000 executes control by the "first high-productivity finishing sequence in printing a plurality of copies" illustrated in FIG. 30B. In other words, the period required from T0 to T6 in FIG. 30C becomes shorter than that required from T0 to T6 in FIG. 30B.

By executing the control illustrated in FIG. 30C, effects concerning productivity can be enhanced among various effects described in the embodiment. That is, the effects of the embodiment can be further enhanced.

As described above, the control unit 205 executes the control illustrated in FIG. 30C when the system 1000 has the system configuration illustrated in FIGS. 8A and 8B. According to the embodiment, in executing this control, the control unit 205 can execute control based on management information 3100A in FIGS. 31A-1 to 31A-3.

The management information 3100A illustrated in FIGS. 31A-1 to 31A-3 is a data group registered in the HDD 209 in advance. The information 3100A is a data group used by the control unit 205 when the system 1000 has the system configuration illustrated in FIGS. 8A and 8B. Assume that the system 1000 has a system configuration (e.g., the system configuration illustrated in FIGS. 9A and 9B or that illustrated in FIGS. 10A and 10B) different from that illustrated in FIGS. 8A and 8B. In this case, the control unit 205 cannot use the management information 3100A in FIGS. 31A-1 to 31A-3.

The management information 3100A in FIGS. 31A-1 to 31A-3 and a control example executed by the control unit 205 using the management information 3100A will be described.

The management information 3100A in FIGS. 31A-1 to 31A-3 which is stored and managed as management information in the table form in the HDD 209 contains the system configuration information 3101A and rule information 3102A. The system configuration information 3101A in FIG. 31A-1 contains an information group serving as information which allows the control unit 205 to confirm that the system 1000 has the system configuration illustrated in FIGS. 8A and 8B.

(Information 1) to (information 5) contained in the system configuration information 3101A are information used by the control unit 205 in the confirmation process of S1203 in FIG. 24A. These pieces of information are information used by the control unit of an external apparatus (e.g., PC 104) capable of communicating data with the print apparatus 100 in the confirmation process of S1703 in FIG. 25A.

When the system 1000 has the system configuration in FIGS. 8A and 8B, the following information (1) to information (5) are held in the HDD 209 and used by the control unit 205 as the system configuration information 3101A.

(1) Inline finisher connection/non-connection information which allows the control unit 205 to specify that the print system 1000 illustrated in FIGS. 8A and 8B comprises an inline sheet-processing apparatus (synonymous with an inline finisher). This information is (information 1) in the system configuration information 3101A of FIG. 31A-1.

(2) Inline finisher connection count information which allows the control unit 205 to specify that the print system 1000 illustrated in FIGS. 8A and 8B comprises three inline finishers. This information is (information 2) in the system configuration information 3101A of FIG. 31A-1.

(3) Inline finisher type information which allows the control unit 205 to specify that the types of inline finishers in the print system 1000 illustrated in FIGS. 8A and 8B are a large-volume stacker, glue binding apparatus, and saddle-stitching apparatus. This information is (information 3) in the system configuration information 3101A of FIG. 31A-1.

(4) Finishing type information which allows the control unit 205 to specify that the types of sheet processes (synonymous with finishings) executable by the print system 1000 illustrated in FIGS. 8A and 8B are nine types (stapling, punching, cutting, shift delivery, saddle-stitching, folding, case binding, pad binding, and large-volume stacking). This information is (information 4) in the system configuration information 3101A of FIG. 31A-1.

(5) Inline finisher connection order information which allows the control unit 205 to specify that the large-volume stacker, glue binding apparatus, and saddle-stitching apparatus connect to the print apparatus 100 in the order named in the print system 1000 illustrated in FIGS. 8A and 8B. This information is (information 5) in the system configuration information 3101A of FIG. 31A-1.

The system configuration information 3101A in FIG. 31A-1 contains (information 1) to (information 5) described above as management information.

The rule information 3102A in FIGS. 31A-1 to 31A-3 contains rule definition information serving as specified articles (rules) based on the system configuration information 3101A in FIG. 31A-1. Nine pieces of rule information made in accordance with the system configuration of the print system 1000 illustrated in FIGS. 8A and 8B are registered in the information 3102A. The information 3102A is an information group formed as program codes which can be read out and referred to by the control unit 205, similar to the information 3101A.

System configuration information which is registered in the HDD 209 and exemplified by the system configuration information 3101A in FIG. 31A-1 is created on the basis of system configuration registration setting information input from the user via the UI unit of the embodiment, as illustrated in FIGS. 18A to 18D. Alternatively, the control unit 205 may automatically generate the information on the basis of information directly acquired from an inline finisher connected to the print apparatus 100 via the signal line in the inline finisher illustrated in FIG. 2.

When system configuration information is registered in the HDD 209, the control unit 205 may create, on the basis of the system configuration information, rule information which is registered in the HDD 209 and exemplified by the rule information 3102A in FIGS. 31A-1 to 31A-3. Alternatively, the rule information may be registered as program data in the HDD 209 in advance.

The above description is merely an example, and this configuration is not essential. In other words, any configuration is possible as long as the following control is executable on the basis of information such as system configuration information and rule information in the configuration of the system 1000. Control to be executed using the rule information 3102A in FIGS. 31A-1 to 31A-3 will be explained.

Rule information exemplified by the information 3102A in FIGS. 31A-1 to 31A-3 is a rule applied to a job when the system 1000 processes a "job requiring printing of a plurality of copies and requiring execution of a specific type of finishing designated by the user every specific number of copies designated by the user". The control unit 205 applies a decision defined by the rule information to a corresponding job, and executes control complying with the contents of the decision for the job. In the above-described control example, jobs to which the decision defined by this rule information is applied are jobs C, D, E, Y, and Z described above.

In other words, the control unit 205 does not execute control based on the decision of the rule information for jobs A, B, and F described above. Jobs such as jobs C, D, E, Y, and Z are handled as jobs within the application range of the rule information. To the contrary, jobs such as jobs A, B, and F are handled as jobs outside the application range of the rule information.

In control by the "second high-productivity finishing sequence in printing a plurality of copies" illustrated in FIG. 30C, the control unit 205 utilizes the rule information 3102A illustrated in FIGS. 31A-1 to 31A-3. For example, when the operation mode of the print system 1000 is the "POD professional mode", the control unit 205 utilizes the management information 3100A in FIGS. 31A-1 to 31A-3. However, this is merely an example.

Even in a configuration which does not support any mode selection or any concept of the mode, the system of the embodiment can execute control illustrated in FIGS. 31A-1 to 31A-3. The present invention incorporates any configuration as long as the print system can execute at least the following operation.

As described above, each of jobs C, D, E, Y, and Z requires a plurality of types of finishings when the print system 1000 completes a user-desired final product. For example, job C for which the user makes settings illustrated in FIG. 22A requires a total of two types of finishings: case binding for sheet bundles of nine sets out of sheet bundles of 10 sets, and multi-hole punching for a sheet bundle of one set.

This also applies to job E for which the user makes settings illustrated in FIG. 27. Job D for which the user makes settings illustrated in FIG. 22B requires a total of three types of finishings: "case binding" for printed bundles of four sets, "multi-hole punching" for printed bundles of four sets, and "stapling" for printed bundles of two sets.

Jobs C, D, E, Y, Z, and the like require at least printing of a plurality of sets. In other words, jobs C, D, E, Y, Z, and the like execute a series of print processes a plurality of number of times to print all pages of a print data string once. A sheet bundle necessary to print one set is called one sheet bundle. From this definition, the above-described job requires a plurality of sheet bundles to print a plurality of sets. Jobs C, D, and E require 10 sheet bundles. Jobs Y and Z require printing of two sets in total, and thus require two sheet bundles.

Control based on the rule information 3102A illustrated in FIGS. 31A-1 to 31A-3 is executed in printing one set, i.e., every sheet bundle in a series of operations necessary for a job requiring a plurality of sheet bundles in total, as described above. In the case of job Z illustrated in FIG. 30C, this control is executed in printing one set in (operation 3) or (operation 5) among (operation 1) to (operation 6) in FIG. 30C necessary for job Z.

A total of nine decisions respectively defined for a total of nine rules in the rule information 3102A of FIGS. 31A-1 to 31A-3 are determined on the basis of the following conditions.

(Condition 1) The type of finishing which is necessary for a printed bundle of one set and falls within a series of operations that is necessary for a job requiring printing of a plurality of copies and requiring execution of a plurality of types of finishings and is executed by the system 1000.

(Condition 2) The type of finishing necessary for another printed bundle of one set serving as a printed bundle immediately after the printed bundle of one set confirmed in condition 1 in the series of operations for the job.

The rule information 3102A in FIGS. 31A-1 to 31A-3 defines a printed bundle of one set confirmed in (condition 1) as a "preceding sheet bundle". The rule information 3102A in FIGS. 31A-1 to 31A-3 defines a printed bundle of one set confirmed in (condition 2) as a "succeeding sheet bundle" because this sheet bundle succeeds to the preceding sheet bundle.

These definitions will be explained by applying them to job Y illustrated in FIG. 30B. A printed bundle of the first set for which a print data string formed from a plurality of pages of job Y is printed in (operation 3) of FIG. 30B is a "preceding sheet bundle in a series of operations for job Y". A printed bundle of the second set for which a print data string formed from a plurality of pages of job Y is printed in (operation 5) of FIG. 30B is a "succeeding sheet bundle in a series of operations for job Y".

These definitions will be explained by applying them to job Z illustrated in FIG. 30C. A printed bundle of the first set for which a print data string formed from a plurality of pages of job Z is printed in (operation 3) of FIG. 30C is a "preceding sheet bundle in a series of operations for job Z". A printed bundle of the second set for which a print data string formed from a plurality of pages of job Z is printed in (operation 5) of FIG. 30C is a "succeeding sheet bundle in a series of operations for job Z".

Based on (condition 1) and (condition 2), the control unit 205 controls the operation of a job requiring printing of a plurality of copies and requiring a specific type of sheet process (synonymous with finishing) every printing of a specific number of copies. In the example of FIGS. 31A-1 to 31A-3, such a job (e.g., jobs C, D, E, Y, and Z in the above examples) is defined as a "specific job".

In the following description, a job which fits this definition is called a specific job. A concrete example of operations controlled by the control unit 205 for the specific job on the basis of (condition 1) and (condition 2) will be described.

For example, the control unit 205 determines whether to permit or inhibit execution of a print operation necessary for a "succeeding sheet bundle" in parallel with a sheet-processing operation necessary for a "preceding sheet bundle" in the specific job. In other words, the control unit 205 determines whether to permit the printer unit 203 to start or inhibit it from starting executing a print operation for a succeeding sheet bundle during execution of a finishing operation by an inline finisher for a preceding sheet bundle in the specific job.

Both the "finishing operation by an inline finisher for a preceding sheet bundle" and "print operation for a succeeding sheet bundle" fall within a series of operations which is necessary for a specific job and executed by the system 1000. The "succeeding sheet bundle" means a printed bundle immediately after the "preceding sheet bundle" in the specific job. The rule information 3102A in FIGS. 31A-1 to 31A-3 defines the "finishing operation by an inline finisher for a preceding sheet bundle" as a "sheet-processing operation for a preceding sheet bundle". Similarly, the rule information 3102A in FIGS. 31A-1 to 31A-3 defines the "print operation for a succeeding sheet bundle" as a "print operation for a succeeding sheet bundle".

A concrete example of control executed by the control unit 205 using the information in FIGS. 31A-1 to 31A-3 will be explained.

For example, based on the system configuration information 3101A of FIG. 31A-1 registered in the HDD 209, the control unit 205 confirms that the system 1000 has the system configuration illustrated in FIGS. 8A and 8B. In this case, the control unit 205 reads out the rule information 3102A in FIGS. 31A-1 to 31A-3, which is registered in the HDD 209 in association with the information 3101A, from the HDD 209, and refers to it. The control unit 205 causes the system 1000 to execute the following [control 1] to [control 9] on the basis of the rule information 3102A.

In the following control example, the sheet-processing apparatus 200a in FIGS. 8A and 8B corresponds to a "large-volume stacker" referred to in FIGS. 31A-1 to 31A-3, and the large-volume stacker can execute one sheet process whose type is "(1) sheet stacking process". The sheet-processing apparatus 200b in FIGS. 8A and 8B corresponds to a "glue binding apparatus" referred to in FIGS. 31A-1 to 31A-3, and the glue binding apparatus can execute two sheet processes whose types are "(1) case binding process and (2) pad binding process".

The sheet-processing apparatus 200c in FIGS. 8A and 8B is a "saddle-stitching apparatus" referred to in FIGS. 31A-1 to 31A-3, and the saddle-stitching apparatus can execute six sheet processes whose types are "(1) stapling process, (2) punching process (including two-hole punching and multi-hole punching), (3) cutting process, (4) shift delivery process, (5) saddle-stitching process, and (6) folding process".

Based on the above description, control examples complying with (rule 1) to (rule 9) in FIGS. 31A-1 to 31A-3 will be explained.

[Control 1 . . . Control Complying with Rule 1 in FIG. 31A-1]

The type of sheet process (synonymous with a finishing process by the inline finisher of the system 1000) necessary for a preceding sheet bundle in a specific job defined above is a sheet process executed by the saddle-stitching apparatus in FIGS. 8A and 8B (condition 1). In addition, the type of sheet process necessary for a succeeding sheet bundle in the specific job is also a sheet process executed by the saddle-stitching apparatus in FIGS. 8A and 8B (condition 2).

The job to be processed is the specific job, and the processes of the specific job satisfy these two conditions. In this case, the control unit 205 inhibits the system 1000 from executing a print operation necessary for the succeeding sheet bundle of the specific job in parallel with a sheet-processing operation necessary for the preceding sheet bundle of the specific job. In other words, the control unit 205 inhibits the system 1000 from starting the print operation necessary for the succeeding sheet bundle of the specific job during execution of the sheet-processing operation necessary for the preceding sheet bundle of the specific job in a series of operations for the specific job in the system 1000.

Two concrete examples of this situation are as follows.

(Case 1) The target job whose print execution request is accepted by the print apparatus 100 is a "job requiring printing of two sets in total, requiring a punching process for a printed bundle of the first set, and requiring saddle-stitching for a printed bundle of the second set". In the system configuration of FIGS. 8A and 8B, the saddle-stitching apparatus serving as the sheet-processing apparatus 200c in FIGS. 8A and 8B executes both the punching process and saddle-stitching process. The control unit 205 confirms and determines this.

In (case 1), the control unit 205 inhibits the printer unit 203 from executing the print process for sheets of a printed bundle of the second set of the job during execution of the punching process by the saddle-stitching apparatus in FIGS. 8A and 8B for a printed bundle of the first set of the job.

Also in (case 1), the control unit 205 allows the printer unit 203 to execute the print process on sheets of the printed bundle of the second set of the job upon completion of the punching process by the saddle-stitching apparatus in FIGS. 8A and 8B for the printed bundle of the first set of the job. Then, the control unit 205 causes the saddle-stitching apparatus in FIGS. 8A and 8B to saddle-stitch the printed bundle of the second set. The control unit 205 causes the stacking unit serving as the delivery destination Z in FIG. 8B to hold the punched printed bundle of the first set of the job. The control unit 205 also causes the stacking unit serving as the delivery destination Z in FIG. 8B to hold the saddle-stitched printed bundle of the second set of the job.

(Case 1) is an example of a case in which different types of finishings are executed for preceding and succeeding sheet bundles in a specific job defined above, and the same inline finisher executes these finishings.

(Case 2) The target job whose print execution request is accepted by the print apparatus 100 is a "job requiring printing of three sets in total, requiring saddle-stitching for printed bundles of the first and second sets, and requiring a punching process for a printed bundle of the third set". The control unit 205 confirms and determines this.

In (case 2), the control unit 205 inhibits the printer unit 203 from executing the print process for sheets of a printed bundle of the second set of the job during execution of saddle-stitching by the saddle-stitching apparatus in FIGS. 8A and 8B for a printed bundle of the first set of the job. Further, the control unit 205 inhibits the printer unit 203 from executing the print process for sheets of a printed bundle of the third set of the job during execution of the saddle-stitching process by the saddle-stitching apparatus in FIGS. 8A and 8B for the printed bundle of the second set of the job.

Also in (case 2), the control unit 205 allows the printer unit 203 to execute the print process on sheets of the printed bundle of the second set of the job upon completion of the saddle-stitching process by the saddle-stitching apparatus in FIGS. 8A and 8B for the printed bundle of the first set of the job. Then, the control unit 205 causes the saddle-stitching apparatus in FIGS. 8A and 8B to saddle-stitch the printed bundle of the second set. The control unit 205 causes the printer unit 203 to execute the print process on sheets of the printed bundle of the third set of the job upon completion of the saddle-stitching process by the saddle-stitching apparatus in FIGS. 8A and 8B for the printed bundle of the second set of the job.

Then, the control unit 205 causes the saddle-stitching apparatus in FIGS. 8A and 8B to execute the punching process for the printed bundle of the third set. The control unit 205 causes the stacking unit serving as the delivery destination Z in FIG. 8B to hold the saddle-stitched printed bundles of the first and second sets of the job. The control unit 205 also causes the stacking unit serving as the delivery destination Z in FIG. 8B to hold the punched printed bundle of the third set of the job.

The control unit 205 can execute the above control as one complying with the decision of (rule 1) in the rule information 3102A of FIG. 31A-1.

[Control 2 . . . Control Complying with Rule 2 in FIG. 31A-2]

The type of sheet process (synonymous with a finishing process by the inline finisher of the system 1000) necessary for a preceding sheet bundle in a specific job defined above is a sheet process executed by the saddle-stitching apparatus in FIGS. 8A and 8B (condition 1). In addition, the type of sheet process necessary for a succeeding sheet bundle in the specific job is a sheet process executed by the glue binding apparatus in FIGS. 8A and 8B (condition 2).

The job to be processed is the specific job, and the processes of the specific job satisfy these two conditions. In this case, the control unit 205 permits the system 1000 to execute a print operation for the succeeding sheet bundle of the specific job in parallel with a sheet-processing operation for the preceding sheet bundle of the specific job. In other words, the control unit 205 permits the system 1000 to start the print operation for the succeeding sheet bundle of the specific job during execution of the sheet-processing operation for the preceding sheet bundle of the specific job in a series of operations for the specific job in the system 1000.

The control unit 205 causes the printer unit 203 to execute the print operation necessary for the succeeding sheet bundle of the specific job subjected to a sheet-processing operation by the glue binding apparatus in FIGS. 8A and 8B while continuing the sheet-processing operation by the saddle-stitching apparatus in FIGS. 8A and 8B for the preceding sheet bundle of the specific job. In this case, upon completion of the print operation for the succeeding sheet bundle of the job during execution of the sheet-processing operation for the preceding sheet bundle of the job, the control unit 205 allows the glue binding apparatus in FIGS. 8A and 8B to execute the sheet-processing operation for the succeeding sheet bundle while continuing the sheet-processing operation by the saddle-stitching apparatus in FIGS. 8A and 8B for the preceding sheet bundle.

One control example of this situation is as follows.

(Case 1) The target job whose print execution request is accepted by the print apparatus 100 is a "job requiring printing of two sets in total, requiring a two-hole punching process for a printed bundle of the first set, and requiring a case binding process for a printed bundle of the second set". In the system configuration of FIGS. 8A and 8B, the punching process (including two-hole punching and multi-hole punching) is a sheet process executed by the saddle-stitching apparatus serving as the sheet-processing apparatus 200c in FIGS. 8A and 8B. The case binding process is a sheet process executed by the glue binding apparatus serving as the sheet-processing apparatus 200b in FIGS. 8A and 8B. The control unit 205 confirms and determines this.

In (case 1), the control unit 205 permits the printer unit 203 to execute the print process on sheets of a printed bundle of the second set of the job subjected to the case binding process by the glue binding apparatus in FIGS. 8A and 8B during execution of the two-hole punching process by the saddle-stitching apparatus in FIGS. 8A and 8B for a printed bundle of the first set of the job.

Also in (case 1), the control unit 205 causes the printer unit 203 to execute a print operation for the printed bundle of the second set of the job while continuing the two-hole punching process by the saddle-stitching apparatus in FIGS. 8A and 8B for the printed bundle of the first set of the job in the system 1000 of FIGS. 8A and 8B. In (case 1), assume that the print operation for the printed bundle of the second set of the job is complete during execution of the two-hole punching operation for the printed bundle of the first set of the job.

Then, the control unit 205 causes the glue binding apparatus in FIGS. 8A and 8B to execute the case binding process for the printed bundle of the second set while continuing the two-hole punching process by the saddle-stitching apparatus in FIGS. 8A and 8B for the printed bundle of the first set of the job. The control unit 205 causes the stacking unit serving as the delivery destination Z in FIG. 8B to hold the multi-hole-punched printed bundle of the first set of the job. The control unit 205 causes the stacking unit serving as the delivery destination Y in FIG. 8B to hold the case-bound printed bundle of the second set of the job.

(Case 1) is an example of a case in which different types of finishings are executed for preceding and succeeding sheet bundles in a specific job defined above, and different inline finishers execute these finishings.

Control for job Z illustrated in FIG. 30C is an application of the control in (case 1).

The control unit 205 can execute the above control as one complying with the decision of (rule 2) in the rule information 3102A of FIG. 31A-2.

[Control 3 . . . Control Complying with Rule 3 in FIG. 31A-2]

The type of sheet process (synonymous with a finishing process by the inline finisher of the system 1000) necessary for a preceding sheet bundle in a specific job defined above is a sheet process executed by the saddle-stitching apparatus in FIGS. 8A and 8B (condition 1). In addition, the type of sheet process necessary for a succeeding sheet bundle in the specific job is a sheet process executed by the large-volume stacker in FIGS. 8A and 8B (condition 2).

The job to be processed is the specific job, and the processes of the specific job satisfy these two conditions. In this case, the control unit 205 permits the system 1000 to execute a print operation for the succeeding sheet bundle of the specific job in parallel with a sheet-processing operation for the preceding sheet bundle of the specific job. In other words, the control unit 205 permits the system 1000 to start the print operation for the succeeding sheet bundle of the specific job during execution of the sheet-processing operation for the preceding sheet bundle of the specific job in a series of operations for the specific job in the system 1000.

Further in other words, the control unit 205 causes the printer unit 203 to execute the print operation necessary for the succeeding sheet bundle of the specific job subjected to a sheet-processing operation by the large-volume stacker in FIGS. 8A and 8B while continuing the sheet-processing operation by the saddle-stitching apparatus in FIGS. 8A and 8B for the preceding sheet bundle of the specific job. In this case, assume that the print operation for the succeeding sheet bundle of the job is complete during execution of the sheet-processing operation for the preceding sheet bundle of the job.

Then, the control unit 205 allows the large-volume stacker in FIGS. 8A and 8B to execute the sheet-processing operation for the succeeding sheet bundle of the job while continuing the sheet-processing operation by the saddle-stitching apparatus in FIGS. 8A and 8B for the preceding sheet bundle of the job.

One control example of this situation is as follows.

(Case 1) The target job whose print execution request is accepted by the print apparatus 100 is a "job requiring printing of two sets in total, requiring a multi-hole punching process for a printed bundle of the first set, and requiring a large-volume stacking process for a printed bundle of the second set". In the system configuration of FIGS. 8A and 8B, the punching process (including two-hole punching and multi-hole punching) is a sheet process executed by the saddle-stitching apparatus serving as the sheet-processing apparatus 200c in FIGS. 8A and 8B. The large-volume stacking process is a sheet process executed by the large-volume stacker serving as the sheet-processing apparatus 200a in FIGS. 8A and 8B. The control unit 205 confirms and determines this.

In (case 1), the control unit 205 permits the printer unit 203 to execute the print process on sheets of a printed bundle of the second set of the job subjected to the large-volume stacking process by the large-volume stacker in FIGS. 8A and 8B during execution of the multi-hole punching process by the saddle-stitching apparatus in FIGS. 8A and 8B for a printed bundle of the first set of the job.

Also in (case 1), the control unit 205 causes the printer unit 203 to execute a print operation for the printed bundle of the second set of the job while continuing the multi-hole punching process by the saddle-stitching apparatus in FIGS. 8A and 8B for the printed bundle of the first set of the job in the system 1000 of FIGS. 8A and 8B. In (case 1), assume that the print operation for the printed bundle of the second set of the job is complete during execution of the multi-hole punching operation for the printed bundle of the first set of the job.

Then, the control unit 205 causes the large-volume stacker in FIGS. 8A and 8B to execute the large-volume stacking process for the printed bundle of the second set while continuing the multi-hole punching process by the saddle-stitching apparatus in FIGS. 8A and 8B for the printed bundle of the first set of the job. The control unit 205 causes the stacking unit serving as the delivery destination Z in FIG. 8B to hold the multi-hole-punched printed bundle of the first set of the job. The control unit 205 causes the stacking unit serving as the delivery destination X in FIG. 8B to hold the large-volume-stacked printed bundle of the second set of the job.

The control unit 205 can execute the above control as one complying with the decision of (rule 3) in the rule information 3102A of FIG. 31A-2.

[Control 4 . . . Control Complying with Rule 4 in FIG. 31A-2]

The type of sheet process (synonymous with a finishing process by the inline finisher of the system 1000) necessary for a preceding sheet bundle in a specific job defined above is a sheet process executed by the glue binding apparatus in FIGS. 8A and 8B (condition 1). In addition, the type of sheet process necessary for a succeeding sheet bundle in the specific job is a sheet process executed by the saddle-stitching apparatus in FIGS. 8A and 8B (condition 2).

The job to be processed is the specific job, and the processes of the specific job satisfy these two conditions. In this case, the control unit 205 inhibits the system 1000 from executing a print operation for the succeeding sheet bundle of the specific job in parallel with a sheet-processing operation for the preceding sheet bundle of the specific job. In other words, the control unit 205 inhibits the system 1000 from starting the print operation necessary for the succeeding sheet bundle of the specific job during execution of the sheet-processing operation necessary for the preceding sheet bundle of the specific job in a series of operations for the specific job in the system 1000.

One concrete example of this situation is as follows.

(Case 1) The target job whose print execution request is accepted by the print apparatus 100 is a "job requiring printing of two sets in total, requiring a case binding process for a printed bundle of the first set, and requiring a two-hole punching process for a printed bundle of the second set". In the system configuration of FIGS. 8A and 8B, the glue binding apparatus serving as the sheet-processing apparatus 200b in FIGS. 8A and 8B executes case binding, and the saddle-stitching apparatus serving as the sheet-processing apparatus 200c in FIGS. 8A and 8B executes the two-hole punching process. The control unit 205 confirms and determines this.

In (case 1), the control unit 205 inhibits the printer unit 203 from executing the print process on sheets of a printed bundle of the second set of the job during execution of the case binding process by the glue binding apparatus in FIGS. 8A and 8B for a printed bundle of the first set of the job.

Also in (case 1), the control unit 205 allows the printer unit 203 to execute the print process on sheets of the printed bundle of the second set of the job upon completion of the case binding process by the glue binding apparatus in FIGS. 8A and 8B for the printed bundle of the first set of the job. Then, the control unit 205 causes the saddle-stitching apparatus in FIGS. 8A and 8B to execute the two-hole punching process for the printed bundle of the second set. The control unit 205 causes the stacking unit serving as the delivery destination Y in FIG. 8B to hold the case-bound printed bundle of the first set of the job. The control unit 205 causes the stacking unit serving as the delivery destination Z in FIG. 8B to hold the two-hole-punched printed bundle of the second set of the job.

Control for job Y illustrated in FIG. 30B also complies with the control in (case 1).

The control unit 205 can execute the above control as one complying with the decision of (rule 4) in the rule information 3102A of FIG. 31A-2.

[Control 5 . . . Control Complying with Rule 5 in FIG. 31A-2]

The type of sheet process (synonymous with a finishing process by the inline finisher of the system 1000) necessary for a preceding sheet bundle in a specific job defined above is a sheet process executed by the glue binding apparatus in FIGS. 8A and 8B (condition 1). In addition, the type of sheet process necessary for a succeeding sheet bundle in the specific job is also a sheet process executed by the glue binding apparatus in FIGS. 8A and 8B (condition 2).

The job to be processed is the specific job, and the processes of the specific job satisfy these two conditions. In this case, the control unit 205 inhibits the system 1000 from executing a print operation for the succeeding sheet bundle of the specific job in parallel with a sheet-processing operation for the preceding sheet bundle of the specific job. In other words, the control unit 205 inhibits the system 1000 from starting the print operation for the succeeding sheet bundle of the specific job during execution of the sheet-processing operation for the preceding sheet bundle of the specific job in a series of operations for the specific job in the system 1000.

One concrete example of this situation is as follows.

(Case 1) The target job whose print execution request is accepted by the print apparatus 100 is a "job requiring printing of two sets in total, requiring a case binding process for a printed bundle of the first set, and requiring a pad binding process for a printed bundle of the second set". In the system configuration of FIGS. 8A and 8B, the glue binding apparatus serving as the sheet-processing apparatus 200b in FIGS. 8A and 8B executes the case binding process and pad binding process. The control unit 205 confirms and determines this.

In (case 1), the control unit 205 inhibits the printer unit 203 from executing the print process on sheets of a printed bundle of the second set of the job during execution of the case binding process by the glue binding apparatus in FIGS. 8A and 8B for a printed bundle of the first set of the job.

Also in (case 1), the control unit 205 allows the printer unit 203 to execute the print process on sheets of the printed bundle of the second set of the job upon completion of the case binding process by the glue binding apparatus in FIGS. 8A and 8B for the printed bundle of the first set of the job. Then, the control unit 205 causes the glue binding apparatus in FIGS. 8A and 8B to execute the pad binding process for the printed bundle of the second set. The control unit 205 causes the stacking unit serving as the delivery destination Y in FIG. 8B to hold the case-bound printed bundle of the first set of the job. The control unit 205 also causes the stacking unit serving as the delivery destination Y in FIG. 8B to hold the pad-bound printed bundle of the second set of the job.

The control unit 205 can execute the above control as one complying with the decision of (rule 5) in the rule information 3102A of FIG. 31A-2.

[Control 6 . . . Control Complying with Rule 6 in FIG. 31A-3]

The type of sheet process (synonymous with a finishing process by the inline finisher of the system 1000) necessary for a preceding sheet bundle in a specific job defined above is a sheet process executed by the glue binding apparatus in FIGS. 8A and 8B (condition 1). In addition, the type of sheet process necessary for a succeeding sheet bundle in the specific job is a sheet process executed by the large-volume stacker in FIGS. 8A and 8B (condition 2).

The job to be processed is the specific job, and the processes of the specific job satisfy these two conditions. In this case, the control unit 205 permits the system 1000 to execute a print operation for the succeeding sheet bundle of the specific job in parallel with a sheet-processing operation for the preceding sheet bundle of the specific job. In other words, the control unit 205 permits the system 1000 to start the print operation for the succeeding sheet bundle of the specific job during execution of the sheet-processing operation for the preceding sheet bundle of the specific job in a series of operations for the specific job in the system 1000.

Further in other words, the control unit 205 causes the printer unit 203 to execute the print operation necessary for the succeeding sheet bundle of the specific job subjected to a sheet-processing operation by the large-volume stacker in FIGS. 8A and 8B while continuing the sheet-processing operation by the glue binding apparatus in FIGS. 8A and 8B for the preceding sheet bundle of the specific job.

In this case, assume that the print operation for the succeeding sheet bundle of the job is complete during execution of the sheet-processing operation for the preceding sheet bundle of the job. Then, the control unit 205 allows the large-volume stacker in FIGS. 8A and 8B to execute the sheet-processing operation for the succeeding sheet bundle of the job while continuing the sheet-processing operation by the glue binding apparatus in FIGS. 8A and 8B for the preceding sheet bundle of the job.

One control example of this situation is as follows.

(Case 1) The target job whose print execution request is accepted by the print apparatus 100 is a "job requiring printing of two sets in total, requiring a case binding process for a printed bundle of the first set, and requiring a large-volume stacking process for a printed bundle of the second set". In the system configuration of FIGS. 8A and 8B, the case binding process is a sheet process executed by the glue binding apparatus serving as the sheet-processing apparatus 200b in FIGS. 8A and 8B. The large-volume stacking process is a sheet process executed by the large-volume stacker serving as the sheet-processing apparatus 200a in FIGS. 8A and 8B. The control unit 205 confirms and determines this.

In (case 1), the control unit 205 permits the printer unit 203 to execute the print process on sheets of a printed bundle of the second set of the job subjected to the large-volume stacking process by the large-volume stacker in FIGS. 8A and 8B during execution of the case binding process by the glue binding apparatus in FIGS. 8A and 8B for a printed bundle of the first set of the job.

Also in (case 1), the control unit 205 causes the printer unit 203 to execute a print operation for the printed bundle of the second set of the job while continuing the case binding process by the glue binding apparatus in FIGS. 8A and 8B for the printed bundle of the first set of the job in the system 1000 of FIGS. 8A and 8B. In (case 1), assume that the print operation for the printed bundle of the second set of the job is complete during execution of the case binding operation for the printed bundle of the first set of the job.

Then, the control unit 205 causes the large-volume stacker in FIGS. 8A and 8B to execute the large-volume stacking process for the printed bundle of the second set of the job while continuing the glue binding process by the glue binding apparatus in FIGS. 8A and 8B for the printed bundle of the first set of the job. The control unit 205 causes the stacking unit serving as the delivery destination Y in FIG. 8B to hold the case-bound printed bundle of the first set of the job. The control unit 205 causes the stacking unit serving as the delivery destination X in FIG. 8B to hold the large-volume-stacked printed bundle of the second set of the job.

The control unit 205 can execute the above control as one complying with the decision of (rule 6) in the rule information 3102A of FIG. 31A-3.

[Control 7 . . . Control Complying with Rule 7 in FIG. 31A-3]

The type of sheet process (synonymous with a finishing process by the inline finisher of the system 1000) necessary for a preceding sheet bundle in a specific job defined above is a sheet process executed by the large-volume stacker in FIGS. 8A and 8B (condition 1). In addition, the type of sheet process necessary for a succeeding sheet bundle of specific job is a sheet process executed by the saddle-stitching apparatus in FIGS. 8A and 8B (condition 2).

The job to be processed is the specific job, and the processes of the specific job satisfy these two conditions. In this case, the control unit 205 inhibits the system 1000 from executing a print operation for the succeeding sheet bundle of the specific job in parallel with a sheet-processing operation for the preceding sheet bundle of the specific job. In other words, the control unit 205 inhibits the system 1000 from starting the print operation for the succeeding sheet bundle of the specific job during execution of the sheet-processing operation for the preceding sheet bundle of the specific job in a series of operations for the specific job in the system 1000.

One concrete example of this situation is as follows.

(Case 1) The target job whose print execution request is accepted by the print apparatus 100 is a "job requiring printing of two sets in total, requiring a large-volume stacking process for a printed bundle of the first set, and requiring a cutting process for a printed bundle of the second set". In the system configuration of FIGS. 8A and 8B, the large-volume stacker serving as the sheet-processing apparatus 200*a* in FIGS. 8A and 8B executes the large-volume stacking process, and the saddle-stitching apparatus serving as the sheet-processing apparatus 200*c* in FIGS. 8A and 8B executes the cutting process. The control unit 205 confirms and determines this.

In (case 1), the control unit 205 inhibits the printer unit 203 from executing the print process on sheets of a printed bundle of the second set of the job during execution of the large-volume stacking process by the large-volume stacker in FIGS. 8A and 8B for a printed bundle of the first set of the job.

Also in (case 1), the control unit 205 allows the printer unit 203 to execute the print process on sheets of the printed bundle of the second set of the job upon completion of the large-volume stacking process by the large-volume stacker in FIGS. 8A and 8B for the printed bundle of the first set of the job. Then, the control unit 205 causes the saddle-stitching apparatus in FIGS. 8A and 8B to execute the cutting process for the printed bundle of the second set. The control unit 205 causes the stacking unit serving as the delivery destination X in FIG. 8B to hold the large-volume-stacked printed bundle of the first set of the job. The control unit 205 causes the stacking unit serving as the delivery destination Z in FIG. 8B to hold the cut printed bundle of the second set of the job.

The control unit 205 can execute the above control as one complying with the decision of (rule 7) in the rule information 3102A of FIG. 31A-3.

[Control 8 . . . Control Complying with Rule 8 in FIG. 31A-3]

The type of sheet process (synonymous with a finishing process by the inline finisher of the system 1000) necessary for a preceding sheet bundle in a specific job defined above is a sheet process executed by the large-volume stacker in FIGS. 8A and 8B (condition 1). In addition, the type of sheet process necessary for a succeeding sheet bundle in the specific job is a sheet process executed by the glue binding apparatus in FIGS. 8A and 8B (condition 2).

The job to be processed is the specific job, and the processes of the specific job satisfy these two conditions. In this case, the control unit 205 inhibits the system 1000 from executing a print operation for the succeeding sheet bundle of the specific job in parallel with a sheet-processing operation for the preceding sheet bundle of the specific job. In other words, the control unit 205 inhibits the system 1000 from starting the print operation for the succeeding sheet bundle of the specific job during execution of the sheet-processing operation for the preceding sheet bundle of the specific job in a series of operations for the specific job in the system 1000.

One concrete example of this situation is as follows.

(Case 1) The target job whose print execution request is accepted by the print apparatus 100 is a "job requiring printing of two sets in total, requiring a large-volume stacking process for a printed bundle of the first set, and requiring a case binding process for a printed bundle of the second set". In the system configuration of FIGS. 8A and 8B, the large-volume stacker serving as the sheet-processing apparatus 200*a* in FIGS. 8A and 8B executes the large-volume stacking process, and the glue binding apparatus serving as the sheet-processing apparatus 200*b* in FIGS. 8A and 8B executes the glue binding process. The control unit 205 confirms and determines this.

In (case 1), the control unit 205 inhibits the printer unit 203 from executing the print process on sheets of a printed bundle of the second set of the job during execution of the large-volume stacking process by the large-volume stacker in FIGS. 8A and 8B for a printed bundle of the first set of the job.

Also in (case 1), the control unit 205 allows the printer unit 203 to execute the print process on sheets of the printed bundle of the second set of the job upon completion of the large-volume stacking process by the large-volume stacker in FIGS. 8A and 8B for the printed bundle of the first set of the job. Then, the control unit 205 causes the glue binding apparatus in FIGS. 8A and 8B to execute the case binding process for the printed bundle of the second set. The control unit 205 causes the stacking unit serving as the delivery destination X in FIG. 8B to hold the large-volume-stacked printed bundle of the first set of the job. The control unit 205 causes the stacking unit serving as the delivery destination Y in FIG. 8B to hold the case-bound printed bundle of the second set of the job.

The control unit 205 can execute the above control as one complying with the decision of (rule 8) in the rule information 3102A of FIG. 31A-3.

[Control 9 . . . Control Complying with Rule 9 in FIG. 31A-3]

The type of sheet process (synonymous with a finishing process by the inline finisher of the system 1000) necessary for a preceding sheet bundle in a specific job defined above is a sheet process executed by the large-volume stacker in FIGS. 8A and 8B (condition 1). In addition, the type of sheet process necessary for a succeeding sheet bundle in the specific job is a sheet process executed by the large-volume stacker in FIGS. 8A and 8B (condition 2).

The job to be processed is the specific job, and the processes of the specific job satisfy these two conditions. In this case, the control unit 205 inhibits the system 1000 from executing a print operation for the succeeding sheet bundle of the specific job in parallel with a sheet-processing operation for the preceding sheet bundle of the specific job. In other words, the control unit 205 inhibits the system 1000 from starting the print operation for the succeeding sheet bundle of the specific job during execution of the sheet-processing operation for the preceding sheet bundle of the specific job in a series of operations for the specific job in the system 1000.

One concrete example of this situation is as follows.

(Case 1) The target job whose print execution request is accepted by the print apparatus 100 is a "job requiring printing of three sets in total, requiring a large-volume stacking process for printed bundles of the first and second sets, and requiring a case binding process for a printed bundle of the third set". The control unit 205 confirms and determines this.

In (case 1), the control unit 205 inhibits the printer unit 203 from executing the print process on sheets of a printed bundle of the second set of the job during execution of the large-volume stacking process by the large-volume stacker in FIGS. 8A and 8B for a printed bundle of the first set of the job.

After executing this control, the control unit 205 applies (rule 8) in FIG. 31A-3 to the job. In other words, the control unit 205 inhibits the printer unit 203 from executing the print process on sheets of a printed bundle of the third set of the job subjected to the case binding process by the glue binding apparatus in FIGS. 8A and 8B during execution of the stacking process by the large-volume stacker in FIGS. 8A and 8B for the printed bundle of the second set of the job.

Also in (case 1), the control unit 205 allows the printer unit 203 to execute the print process on sheets of the printed bundle of the second set of the job upon completion of the sheet stacking process by the large-volume stacker in FIGS. 8A and 8B for the printed bundle of the first set of the job. Then, the control unit 205 causes the large-volume stacker in FIGS. 8A and 8B to execute the sheet stacking process for the printed bundle of the second set. The control unit 205 causes the printer unit 203 to execute the print process on sheets of the printed bundle of the third set of the job upon completion of the sheet stacking process by the large-volume stacker in FIGS. 8A and 8B for the printed bundle of the second set of the job.

Then, the control unit 205 causes the glue binding apparatus in FIGS. 8A and 8B to execute the case binding process for the printed bundle of the third set. The control unit 205 causes the stacking unit serving as the delivery destination X in FIG. 8B to hold the large-volume-stacked printed bundles of the first and second sets of the job. The control unit 205 causes the stacking unit serving as the delivery destination Y in FIG. 8B to hold the case-bound printed bundle of the third set of the job.

The control unit 205 can execute the above control as one complying with the decision of (rule 9) in the rule information 3102A of FIG. 31A-3.

The control unit 205 can execute various control examples such as [control 1] to [control 9] on the basis of the management information 3100A in FIGS. 31A-1 to 31A-3 when the print system 1000 has the system configuration in FIGS. 8A and 8B.

In [control 1] to [control 9] illustrated in FIGS. 31A-1 to 31A-3, the control unit 205 confirms a specific job defined above. At this time, the control unit 205 refers to the system configuration information 3101A. The control unit 205 also refers to a print process condition data string set by the user via the UI unit for a job to be processed. As described above, the HDD 209 stores the process condition data string in association with a print data string of the job. Based on these pieces of information, the control unit 205 specifies which of (rule 1) to (rule 9) in FIGS. 31A-1 to 31A-3 is applied, and controls the system 1000 to execute an operation complying with the decision of the rule. Accordingly, the control unit 205 can execute control such as [control 1] to [control 9].

Control illustrated in FIG. 30B is a control example when the control unit 205 operates the system 1000 in accordance with (rule 4) in the rule information 3102A of FIG. 31A-2 without automatically changing the execution order of a plurality of types of finishing operations necessary for the above-defined specific job by the control unit 205. Control illustrated in FIG. 30C is a control example when the control unit 205 automatically changes or determines the execution order of a plurality of types of finishing operations necessary for the above-defined specific job so as to apply (rule 2) in the rule information 3102A of FIG. 31A-2 without applying (rule 4) in the rule information 3102A of FIG. 31A-2.

As described above with reference to FIGS. 31A-1 to 31A-3, the embodiment proposes many mechanisms capable of further enhancing the effects of the embodiment.

The embodiment has explained (rule 1) to (rule 9) in FIGS. 31A-1 to 31A-3, but may also adopt a configuration which cannot execute all these control examples. For example, the embodiment may also employ a configuration capable of executing control corresponding to at least one of (rule 2), (rule 3), and (rule 6) in FIGS. 31A-2 and 31A-3. This is because a configuration capable of executing even one control of the above controls falls within an example of a mechanism of achieving effects capable of further enhancing the above-described effects. The configuration of the embodiment can flexibly cope with various use cases and user needs.

The control illustrated in FIGS. 31A-1 to 31A-3 is also definable as control executed on condition that the system 1000 has the system configuration in FIGS. 8A and 8B. If the system 1000 has a system configuration different from that in FIGS. 8A and 8B, the control unit 205 applies a rule different from (rule 1) to (rule 9) in FIGS. 31A-1 to 31A-3. The control unit 205 controls the system 1000 to execute an operation complying with the rule. Two examples of this control will be explained with reference to FIGS. 31B-1 to 31B-3, 31C-1, and 31C-2.

[Description of FIGS. 31B-1 to 31B-3]

Management information 3100B in FIGS. 31B-1 to 31B-3 is an information group used by the control unit 205 in the system configuration of FIGS. 9A and 9B. Rules defined by rule information 3102B created on the basis of the system configuration information 3101B of the management information 3100B in FIGS. 31B-1 to 31B-3, and control examples complying with these rules are apparent from the description of FIGS. 31A-1 to 31A-3, and a detailed description thereof will be omitted. The control unit 205 suffices to execute at least the following control on the basis of the management information 3100B held in the HDD 209 on condition that the system 1000 has the system configuration in FIGS. 9A and 9B.

For example, a job accepted by the print system 1000 having the system configuration in FIGS. 9A and 9B is the above-described specific job (job requiring printing of a plurality of copies and requiring a specific type of finishing designated by the user every specific number of copies designated by the user). The type of sheet process to be executed for the preceding sheet bundle of the specific job is a "sheet process by the saddle-stitching apparatus in FIGS. 9A and 9B".

In addition, the type of sheet process to be executed for the succeeding sheet bundle of the specific job is also a "sheet process by the saddle-stitching apparatus in FIGS. 9A and 9B". The control unit 205 confirms these three points. This case is defined by (rule 1) in FIG. 31B-1.

Alternatively, a job accepted by the print system 1000 having the system configuration in FIGS. 9A and 9B is the above-described specific job. The type of sheet process to be executed for the preceding sheet bundle of the specific job is a "sheet process by the glue binding apparatus in FIGS. 9A and 9B". In addition, the type of sheet process to be executed for the succeeding sheet bundle of the specific job is a "sheet process by the saddle-stitching apparatus in FIGS. 9A and 9B". The control unit 205 confirms these three points. This case is defined by (rule 4) in FIG. 31B-2.

Alternatively, a job accepted by the print system 1000 having the system configuration in FIGS. 9A and 9B is the above-described specific job. The type of sheet process to be executed for the preceding sheet bundle of the specific job is a "sheet process by the glue binding apparatus in FIGS. 9A and 9B". In addition, the type of sheet process to be executed for the succeeding sheet bundle of the specific job is also a "sheet process by the glue binding apparatus in FIGS. 9A and 9B". The control unit 205 confirms these three points. This case is defined by (rule 5) in FIG. 31B-2.

Alternatively, a job accepted by the print system 1000 having the system configuration in FIGS. 9A and 9B is the above-described specific job. The type of sheet process to be executed for the preceding sheet bundle of the specific job is a "sheet process by the glue binding apparatus in FIGS. 9A and 9B". In addition, the type of sheet process to be executed for the succeeding sheet bundle of the specific job is a "sheet process by the large-volume stacker in FIGS. 9A and 9B". The control unit 205 confirms these three points. This case is defined by (rule 6) in FIG. 31B-3.

Alternatively, a job accepted by the print system 1000 having the system configuration in FIGS. 9A and 9B is the above-described specific job. The type of sheet process to be executed for the preceding sheet bundle of the specific job is a "sheet process by the large-volume stacker in FIGS. 9A and 9B". In addition, the type of sheet process to be executed for the succeeding sheet bundle of the specific job is a "sheet process by the saddle-stitching apparatus in FIGS. 9A and 9B". The control unit 205 confirms these three points. This case is defined by (rule 7) in FIG. 31B-3.

Alternatively, a job accepted by the print system 1000 having the system configuration in FIGS. 9A and 9B is the above-described specific job. The type of sheet process to be executed for the preceding sheet bundle of the specific job is a "sheet process by the large-volume stacker in FIGS. 9A and 9B". In addition, the type of sheet process to be executed for the succeeding sheet bundle of the specific job is also a "sheet process by the large-volume stacker in FIGS. 9A and 9B". The control unit 205 confirms these three points. This case is defined by (rule 9) in FIG. 31B-3.

Assume that the current case meets one of rules 1, 4, 5, 6, 7, and 9 in FIGS. 31B-1 to 31B-3. In this case, the control unit 205 inhibits execution of a print operation for the succeeding sheet bundle of a specific job to be processed in parallel with a sheet-processing operation for the preceding sheet bundle of the specific job. In other words, the control unit 205 inhibits the printer unit 203 from starting the print operation for the succeeding sheet bundle of the specific job during execution of the sheet-processing operation by an inline finisher for the preceding sheet bundle of the specific job in a series of operations for the specific job in the system 1000.

A case which does not meet any of the rules is the following situation.

For example, a job accepted by the print system 1000 having the system configuration in FIGS. 9A and 9B is the above-described specific job. The type of sheet process to be executed for the preceding sheet bundle of the specific job is a "sheet process by the saddle-stitching apparatus in FIGS. 9A and 9B". In addition, the type of sheet process to be executed for the succeeding sheet bundle of the specific job is a "sheet process by the glue binding apparatus in FIGS. 9A and 9B". The control unit 205 confirms these three points. This case is defined by (rule 2) in FIG. 31B-2.

Alternatively, a job accepted by the print system 1000 having the system configuration in FIGS. 9A and 9B is the above-described specific job. The type of sheet process to be executed for the preceding sheet bundle of the specific job is a "sheet process by the saddle-stitching apparatus in FIGS. 9A and 9B". In addition, the type of sheet process to be executed for the succeeding sheet bundle of the specific job is a "sheet process by the large-volume stacker in FIGS. 9A and 9B". The control unit 205 confirms these three points. This case is defined by (rule 3) in FIG. 31B-2.

Alternatively, a job accepted by the print system 1000 having the system configuration in FIGS. 9A and 9B is the above-described specific job. The type of sheet process to be executed for the preceding sheet bundle of the specific job is a "sheet process by the large-volume stacker in FIGS. 9A and 9B". In addition, the type of sheet process to be executed for the succeeding sheet bundle of the specific job is a "sheet process by the glue binding apparatus in FIGS. 9A and 9B". The control unit 205 confirms these three points. This case is defined by (rule 8) in FIG. 31B-3.

Assume that the current case meets one of rules 2, 3, and 8 in FIGS. 31B-1 to 31B-3. In this case, the control unit 205 permits execution of a print operation for the succeeding sheet bundle of a specific job in parallel with a sheet-processing operation for the preceding sheet bundle of the specific job. In other words, the control unit 205 permits the printer unit 203 to start the print operation for the succeeding sheet bundle of the specific job during execution of the sheet-processing operation by an inline finisher for the preceding sheet bundle of the specific job in a series of operations for the specific job in the system 1000. In this case, assume that the print operation for the succeeding sheet bundle of the specific job is complete during execution of the sheet-processing operation for the preceding sheet bundle of the specific job.

Then, the control unit 205 controls the system 1000 to execute a sheet-processing operation for the succeeding sheet bundle of the specific job while continuing the sheet-processing operation for the preceding sheet bundle of the specific job. For example, the control unit 205 controls a plurality of inline finishers to execute different types of sheet processes in the system 1000.

The control unit 205 can execute the above-described control when the system 1000 has the system configuration in FIGS. 9A and 9B. The embodiment has exemplified (rule 1) to (rule 9) in FIGS. 31B-1 to 31B-3, but may also adopt a configuration which cannot execute all these control examples. For example, the embodiment may also employ a configuration capable of executing control corresponding to at least one of (rule 2), (rule 3), and (rule 8) in FIGS. 31B-2 and 31B-3.

[Description of FIGS. 31C-1 and 31C-2]

Management information 3100C illustrated in FIGS. 31C-1 and 31C-2 is an information group used by the control unit 205 in the system configuration of FIGS. 10A and 10B. Rules defined by rule information 3102C created on the basis of the system configuration information 3101C of the management information 3100C in FIGS. 31C-1 and 31C-2, and control examples complying with these rules are apparent from the description of FIGS. 31A-1 to 31A-3, and a detailed description thereof will be omitted. The control unit 205 suffices to execute at least the following control on the basis of the management information 3100C held in the HDD 209 on condition that the system 1000 has the system configuration in FIGS. 10A and 10B.

For example, a job accepted by the print system 1000 having the system configuration in FIGS. 10A and 10B is the above-described specific job (job requiring printing of a plurality of copies and requiring a specific type of finishing designated by the user every specific number of copies designated by the user). The type of sheet process to be executed for the preceding sheet bundle of the specific job is a "sheet process by the saddle-stitching apparatus in FIGS. 10A and 10B". In addition, the type of sheet process to be executed for the succeeding sheet bundle of the specific job is also a "sheet process by the saddle-stitching apparatus in FIGS. 10A and 10B". The control unit 205 confirms these three points. This case is defined by (rule 1) in FIG. 31C-1.

Alternatively, a job accepted by the print system 1000 having the system configuration in FIGS. 10A and 10B is the above-described specific job. The type of sheet process to be executed for the preceding sheet bundle of the specific job is a "sheet process by the large-volume stacker in FIGS. 10A and 10B". In addition, the type of sheet process to be executed for the succeeding sheet bundle of the specific job is a "sheet process by the saddle-stitching apparatus in FIGS. 10A and 10B". The control unit 205 confirms these three points. This case is defined by (rule 3) in FIG. 31C-2.

Alternatively, a job accepted by the print system 1000 having the system configuration in FIGS. 10A and 10B is the above-described specific job. The type of sheet process to be executed for the preceding sheet bundle of the specific job is a "sheet process by the large-volume stacker in FIGS. 10A and 10B". In addition, the type of sheet process to be executed for the succeeding sheet bundle of the specific job is also a "sheet process by the large-volume stacker in FIGS. 10A and 10B". The control unit 205 confirms these three points. This case is defined by (rule 4) in FIG. 31C-2.

Assume that the current case meets one of rules 1, 3, and 4 in FIGS. 31C-1 and 31C-2. In this case, the control unit 205 inhibits execution of a print operation for the succeeding sheet bundle of a specific job in parallel with a sheet-processing operation for the preceding sheet bundle of the specific job. In other words, the control unit 205 inhibits the printer unit 203 from starting the print operation for the succeeding sheet bundle of the specific job during execution of the sheet-processing operation by an inline finisher for the preceding sheet bundle of the specific job in a series of operations for the specific job in the system 1000.

A case which does not meet any of the rules is the following situation.

For example, a job accepted by the print system 1000 having the system configuration in FIGS. 10A and 10B is the above-described specific job. The type of sheet process to be executed for the preceding sheet bundle of the specific job is a "sheet process by the saddle-stitching apparatus in FIGS. 10A and 10B". In addition, the type of sheet process to be executed for the succeeding sheet bundle of the specific job is a "sheet process by the large-volume stacker in FIGS. 10A and 10B". The control unit 205 confirms these three points. This case is defined by (rule 2) in FIG. 31C-2.

Assume that the current case meets rule 2 in FIG. 31C-2. In this case, the control unit 205 permits execution of a print operation for the succeeding sheet bundle of a specific job in parallel with a sheet-processing operation for the preceding sheet bundle of the specific job. In other words, the control unit 205 permits the printer unit 203 to start the print operation for the succeeding sheet bundle of the specific job during execution of the sheet-processing operation by an inline finisher for the preceding sheet bundle of the specific job in a series of operations for the specific job in the system 1000. In this case, assume that the print operation for the succeeding sheet bundle of the specific job is complete during execution of the sheet-processing operation for the preceding sheet bundle of the specific job.

Then, the control unit 205 controls the system 1000 to execute a sheet-processing operation for the succeeding sheet bundle of the specific job while continuing the sheet-processing operation for the preceding sheet bundle of the specific job. For example, the control unit 205 controls the saddle-stitching apparatus in FIGS. 10A and 10B and the large-volume stacker in FIGS. 10A and 10B to parallel-execute different types of finishings for the specific job.

The control unit 205 can execute the above-described control when the system 1000 has the system configuration in FIGS. 10A and 10B. The embodiment has exemplified (rule 1) to (rule 4) in FIGS. 31C-1 and 31C-2, but may also adopt a configuration which cannot execute all these control examples. For example, the embodiment may also employ a configuration capable of executing only control corresponding to (rule 2) in FIG. 31C-2.

As described in the control examples of FIGS. 31A-1 to 31C-2, control for a job requiring printing of a plurality of copies and requiring different types of finishings every designated number of copies is switchable every time the system configuration status of the print system 1000 changes.

Control for a specific job defined in FIGS. 31A-1 to 31C-2 and the like has been explained on the basis of the definitions of a "preceding sheet bundle" and "succeeding sheet bundle". It should be noted that this control is executed not only when the defined specific job is a "job requiring printing of two copies in total". Assume that the defined specific job requires printing of three copies in total. This job requires a print operation for a printed bundle of the first set, a print operation for a printed bundle of the second set, and a print operation for a printed bundle of the third set.

Attention is paid to the relationship between printed bundles of the first and second sets of the job. Assume that operations for the printed bundles of the first and second sets of the job are in execution or immediately before execution by the system 1000. In this situation, the printed bundle of the first set is a "preceding sheet bundle" because it is a sheet bundle processed prior to the printed bundle of the second set. The printed bundle of the second set is a "succeeding sheet bundle" because it is a sheet bundle processed immediately after the printed bundle of the first set. The printed bundles of the first and second sets have this relationship. Attention is paid to the relationship between printed bundles of the second and third sets of the job. Assume that a process for the printed bundle of the first set is executed, and operations for the printed bundles of the second and third sets of the job are in execution or immediately before execution by the system 1000.

In this situation, the printed bundle of the second set of the job is a "preceding sheet bundle" because it is a sheet bundle processed prior to the printed bundle of the third set. The printed bundle of the third set of the job is a "succeeding sheet bundle" because it is a sheet bundle processed immediately after the printed bundle of the second set. The printed bundles of the second and third sets have this relationship. In this manner, targets handled as a "preceding sheet bundle" and "succeeding sheet bundle" in a specific job shift with time (as the process of the job proceeds). In other words, every time one printed bundle is processed, control illustrated in FIGS. 31A-1 to 31C-2 is sequentially executed.

The above control is also executed for a job requiring printing of three or more copies in total and requiring different types of finishings every printing of a specific number of copies in printing the plurality of copies. That is, jobs to be processed in control illustrated in FIGS. 19 to 29 also undergo this control.

Control illustrated in FIGS. 31A-1 to 31C-2 can also be executed to further enhance effects concerning productivity illustrated in FIGS. 19 to 30C-2 when the system 1000 processes, e.g., a job requiring printing of a plurality of copies and requiring different types of finishings every designated number of copies. However, this control is also merely an example.

On the premise of a configuration having constituent features capable of executing at least one of various control examples illustrated in FIGS. 19 to 31C-2, the configuration may comprise the following constituent features. In other words, the following control is an example of a configuration adoptable as another constituent feature to any control illustrated in FIGS. 19 to 31C-2.

Assume that the control unit 205 accepts, from the user via the UI unit provided by the embodiment, a request to execute a job which is a specific job requiring printing of a plurality of copies and requiring different types of finishing operations every designated number of copies. In response to this execution request, the control unit 205 confirms system configuration information of the system 1000, the operation status and state of the system 1000, and the like. As a result, the control unit 205 determines that the print system 1000 cannot execute different types of finishing operations. This case corresponds to at least one of the following situations. However, these situations are merely examples, and the present invention is not limited to them.

(1) The system configuration can execute only one type of finishing.

(2) The system configuration can execute a plurality of types of finishings, but cannot execute a plurality of types of finishings requested by the user.

(3) The system configuration can execute a plurality of types of finishings requested by the user, but an inline finisher for executing the finishing is out of order.

(4) The system configuration can execute a plurality of types of finishings requested by the user, but an inline finisher runs out of consumables (e.g., staples for stapling or saddle-stitching or glue for case binding or pad binding) necessary for finishing requested by the user (remaining amount is 0).

(5) The system configuration can execute a plurality of types of finishings requested by the user, but many print jobs wait for printing in the system 1000, and the process of a specific job requested by the user cannot be executed immediately.

When determining one of these cases owing to a factor corresponding to the case, the control unit 205 inhibits the system 1000 from executing a finishing operation requested by the specific job. The control unit 205 controls the system 1000 to inhibit execution of the finishing operation necessary for the specific job, and also inhibit execution of a print operation necessary for the specific job by the print apparatus 100.

At this time, the control unit 205 controls the printer unit 203 not to print even one page of print data of the specific job even if the HDD 209 holds print data of all pages as a print data string of the specific job. If the print data of the specific job is unnecessary, the control unit 205 controls the HDD 209 to automatically erase the print data string of the specific job from the HDD 209 after making the above determination. In a situation corresponding to the above determination result, similar to these control examples, the control unit 205 controls to cancel execution of a finishing operation necessary for a specific job, and also cancel execution of a print operation for the job. This configuration may be employed as a constituent feature for the print system 1000 according to the embodiment.

The embodiment adopts the above-mentioned configuration to further enhance the effects of the embodiment in a printing environment such as the POD environment. For example, assume that a POD company is the delivery destination of the print system 1000 according to the embodiment. In this case, a job requested of the print system 1000 by an operator in the company is highly likely to be a job complying with a print order request from a customer. In this situation, printing becomes useless if execution of printing is permitted though different types of finishing operations are unexecutable every designated number of copies. For example, the system 1000 may create a printed material (final product) different from a customer-desired one. The print system 1000 may not obtain an output which satisfies the customer.

If this situation occurs, the system may bear an unnecessary load, and various problems such as wasteful use of print resources may arise. Execution of an unnecessary process may delay the process of another job, and may delay the delivery time of a job to be delivered to another customer. The embodiment may adopt the above-described configuration in order to minimize these problems.

However, the above control is a mechanism considering user merits, and is not always indispensable. It is desirable to obtain the following effects (1) to (9) by various characteristic configurations of the print system 1000 according to the embodiment disclosed in the embodiment and drawings of this specification.

(1) Even problems, use cases, and user needs described in Description of the Related Art can be coped with. (2) A convenient printing environment adaptable not only to the office environment but also to the POD environment can be established. (3) A mechanism of minimizing intervention work by an operator that may occur in the POD environment due to, e.g., the specifications of a print apparatus is providable. Efficient work is implementable by reducing the workload on the operator. (4) A mechanism capable of flexibly coping with various needs from various users as much as possible in consideration of various situations and use environments is providable.

(5) In establishing a convenient, flexible printing environment capable of coping with use cases and needs assumed in the POD environment in Description of the Related Art, even a request to execute different finishings with print data of the same contents can be satisfied without repetitively performing the same work. (6) Various user needs can be efficiently met at high productivity even in a printing environment such as the POD environment where how to process a plurality of jobs is expected to be important. (7) A mechanism of minimizing factors which may influence the productivity of jobs to be processed by the print system, and maintaining high productivity is providable. For example, a digital print system is providable which is suitable for even the POD environment or the like where use cases and needs are different from those in the office environment, and which can cope with various needs to perform, e.g., various types of finishings every specific number of copies with print data of the same contents while maintaining high productivity.

(8) The present invention can contribute to practical use of a digital print system capable of meeting, at productivity as high as possible, various prospective needs including at least one of the following user needs (1) and (2) in a printing environment such as the POD environment where use cases and user needs are different from those in the office environment and viewpoints such as an increase in productivity of jobs, quality, and cost performance are more important.

An example of user need (1) is a user need to meet a request "to perform various types of finishings every designated number of copies with print data of the same contents" at productivity and operability as high as possible. A printed material described in the embodiment means, e.g., a printed material subjected to a post-process by the inline finisher of the system 1000 (i.e., a medium printed by the printer unit 203). As is apparent from the following control example, a material to be printed by the printer unit 203 (i.e., a print medium before executing a print process by the printer unit 203) is also called a printed material in the embodiment. The present invention should not be limitedly interpreted by, e.g., the description "printed material".

An example of user need (2) is a user need to meet a request "not to execute a specific process, which is desired to be executed for printed materials necessary for a print process by the first specific number of copies, for printed materials necessary for a print process by the second specific number of copies though the two print processes use the same print data" at productivity and operability as high as possible.

At productivity and operability as high as possible, one print system or one print apparatus such as the print system 1000 or print apparatus 100 according to the embodiment can flexibly cope with prospective user needs such as user needs (1) and (2) in a printing environment such as the POD environment.

(9) Various mechanisms are providable toward practical use of a product applicable not only to the office environment but also to the POD environment.

Embodiments may incorporate all configurations capable of attaining effects (1) to (9) by the print system 1000 disclosed in the embodiment. However, other embodiments may incorporate a configuration that cannot attain all the effects.

Various examples and embodiments according to the present invention have been described. For example, the following configuration is incorporated as one embodiment of the present invention.

For example, the print system 1000 disclosed in the embodiment can supply the printed material of a job printed by the printer unit 203 from the print apparatus 100 having the printer unit 203 capable of printing data in the HDD 209 capable of storing data of a plurality of jobs to an inline finisher which is disclosed in the embodiment and can execute a post-process for the printed material of the job printed by the printer unit 203.

The control unit which is disclosed in the embodiment and typified by the control unit 205 for controlling the system 1000 causes the UI unit disclosed in the embodiment to execute a specific display which is disclosed in the embodiment and typified by the display of the window 2100 shown in FIG. 21, that of the designation field 2701 shown in FIG. 27, or the like.

The control unit which is disclosed in the embodiment and typified by the control unit 205 controls to accept a user request from a user via the specific display to execute a specific operation disclosed in the embodiment by the system 1000.

As is apparent from the disclosure described above in the embodiment with reference to FIGS. 1 to 31C-2, their description, and the like, the specific operation disclosed in the embodiment requires, for example, the first specific operation to cause the printer unit 203 to execute a print process by the first specific number of copies, and the second specific operation to cause the printer unit 203 to execute a print process by the second specific number of copies using data of the same contents as those of the data printed by the print process by the first specific number of copies.

The first specific number of copies disclosed in the embodiment is the number of copies which is accepted from the user by the control unit disclosed in the embodiment via the specific display disclosed in the embodiment, corresponds to the execution count of the first specific type of post-process, and is based on the first user instruction. In the embodiment, the second user instruction is inputtable via the specific display disclosed in the embodiment in distinction from the first user instruction. The second specific number of copies disclosed in the embodiment is the number of copies which is accepted from the user by the control unit disclosed in the embodiment via the specific display, corresponds to the execution count of the second specific type of post-process, and is based on the second user instruction.

On the premise of this configuration, as is apparent from the disclosure described above in the embodiment with reference to FIGS. 1 to 31C-2, their description, and the like, the control unit disclosed in the embodiment controls the system 1000 to execute the specific operation for a job to be processed in response to accepting a user request via the specific display to execute the specific operation by the system 1000 for the job to be processed.

When causing the system 1000 to execute the specific operation for the job to be processed, the control unit disclosed in the embodiment controls the system 1000 to execute the first specific type of process in the first specific operation necessary for the specific operation requiring the first and second specific operations. When causing the system 1000 to execute the specific operation for the job to be processed, the control unit disclosed in the embodiment controls the system 1000 to execute the second specific type of process, which corresponds to a process of a type different from the first specific type of process executed in the first specific operation on the basis of a user request, in the second specific operation which needs to be executed together with the first specific operation in the specific operation.

As a typical example of this control, the embodiment has disclosed a configuration in which the control unit 205 controls the system 1000 to process a job requiring the print process of a plurality of copies in total as a job requiring different finishings every designated number of copies. As described above, the embodiment has disclosed the configuration in which the control unit 205 controls the inline finisher of the system 1000 to execute a case binding process every set for printed materials of nine sets printed by the printer unit 203 in the print process of nine copies for a job requiring the print process of 10 copies in total on the basis of setting contents shown in FIG. 22A accepted from the user via the display of FIG. 21. The embodiment has disclosed the configuration in which the control unit 205 controls the inline finisher of the system 1000 to execute not a case binding process but a punching process for a printed material of one set printed by the printer unit 203 in the print process of one remaining copy for the job requiring the print process of 10 copies in total.

This configuration is a mechanism of achieving effects capable of coping with user needs to meet a request by one print system 1000 of the embodiment at productivity and operability as high as possible to perform a case binding process for printed materials of nine sets out of printed materials of 10 sets in total and a punching process for a printed material of one set. In other words, this configuration is a mechanism of achieving effects capable of coping with user needs to meet a request by one print system 1000 of the embodiment at productivity and operability as high as possible to perform a case binding process for printed materials of nine sets out of printed materials of 10 sets in total without performing any case binding process for a printed material of one set.

When causing the system 1000 to execute the specific operation requiring the first and second specific operations, the control unit disclosed in the embodiment controls the system 1000 to execute, in the second specific operation, the second specific type of process, which corresponds to a process of a type different from the first specific type of process executed in the first specific operation by the system 1000 on the basis of a user request accepted via the UI unit of the embodiment. This control corresponds to a configuration incorporated as an example of configurations in which, when causing the system 1000 to execute the specific operation, the control unit disclosed in the embodiment controls the system 1000 to inhibit it from executing, in the second specific operation by the system 1000, the same process as a specific process executed by the system 1000 in the first specific operation on the basis of a specific user request. A concrete example of this configuration will be described in detail by the above typical example.

For example, in the above-mentioned control example, the embodiment has disclosed a configuration in which the control unit 205 controls the system 1000 so as to cause an inline finisher to execute a case binding process corresponding to a post-process based on a user request every set for printed materials of nine sets printed by the printer unit 203 in the print process of nine copies for a job requiring a process based on setting contents in FIG. 22A and requiring the print process of 10 copies in total. The embodiment has disclosed the configuration in which the control unit 205 controls the system 1000 to inhibit execution of the case binding process, which is executed every set for printed materials of nine sets, for a printed material of one set printed by the printer unit 203 in the print process of one remaining copy for the job requiring the print process of 10 copies in total. The embodiment has disclosed the configuration in which the control unit 205, which inhibits execution of the case binding process for the printed material of one set, controls the system 1000 so as to cause an inline finisher to execute a punching process corresponding to a post-process based on a user request, which is of a type different from the case binding process, for the printed material of one set.

As described above, when causing the specific operation to the system 1000, the embodiment has disclosed the configuration in which the control unit disclosed in the embodiment controls the system 1000 to inhibit it from executing, in the second specific operation by the system 1000, a process of the same type as the first specific type of process based on a user request. The configuration disclosed in the embodiment also incorporates a configuration disclosed by the following typical example, which will also be understood from the disclosure described above in the embodiment with reference to FIGS. 1 to 31C-2, their description, and the like.

Assume that the print apparatus 100 accepts the process of a job (to be referred to as job XX hereinafter) requiring the print process of 15 copies in total as a job requiring the print process of a plurality of copies when the system 1000 installed in the POD environment 10000 of FIG. 1 has the system configuration shown in FIGS. 8A and 8B. In this case, job XX requires execution of a case binding process corresponding to a post-process based on the first user request every set for printed materials of five sets to be created by the print process of five copies corresponding to the first specific number of copies in the print process of 15 copies in total, and requires execution of a punching process corresponding to a post-process based on the second user request different from the first user request every set for printed materials of 10 sets to be created by the print process of 10 copies corresponding to the second specific number of copies. Job XX is processed in the POD environment 10000.

Assume that the inline finisher of the system 1000 cannot execute any punching process due to a failure or the like in the puncher unit (see FIG. 13 for the internal structure) of the saddle-stitching apparatus shown in FIG. 8B when the operator of the system 1000 operates to input the process execution request of job XX via the UI unit of the embodiment. The embodiment can cope with even this case as follows using the system 1000 for job XX, achieving the effects disclosed in the embodiment as much as possible.

For example, the control unit 205 accepts a total copy count of "15" copies of job XX in this example via a display field 610 in the display of FIG. 19. In response to press of the key 2007 shown in FIG. 20 by the operator, the control unit 205 causes the operation unit 204 to execute the display of FIG. 21. In accordance with an operator instruction using the key 2104A and the display field 2104B in the display of FIG. 21, the control unit 205 accepts a request to execute the case binding process corresponding to a post-process based on a user request from the key 2104A by the glue binding apparatus of the system 1000 in FIG. 8B serving as an inline finisher every set for printed materials of five sets to be created by the print process of five copies corresponding to the first specific number of copies in job XX. This descriptive example corresponds to a situation in which the inline finisher of the system 1000 cannot execute any punching process. Hence, the control unit 205 invalidates all the display constituent components of the keys 2105A and 2106A, and the display field 2105B and 2106B in the display of FIG. 21, and inhibits accepting an operator request from these keys and display fields. Even in this situation, assume that a non-inline type post-processing apparatus such as the post-processing apparatus 107, 108, 109, or 110 shown in FIG. 1, which is not an inline finisher defined in the embodiment, can execute the punching process in the POD environment 10000 where the system 1000 is installed.

In this case, the control unit 205 allows the user to input, via the key 2104A and display field 2104B in the display of FIG. 21, execution of the case binding process for printed materials of five sets as one of operations necessary for job XX requiring printing of 15 copies in total, and also input the next instruction via the display of FIG. 21. In this case, for example, the control unit 205 can accept a request to deliver (or only sort printed materials), directly from the inline finisher, printed materials of 10 sets to be created by the print process of 10 copies corresponding to the second specific number of copies in job XX in accordance with an operator instruction using the key 2101A and display field 2101B in the display of FIG. 21 or the like without executing any post-process using post-process consumables such as glue and staples for each set. After the operator inputs all instructions to be executed by the system 1000, the control unit 205 controls the system 1000 to process job XX as follows in accordance with the operator instructions accepted via the UI unit of the embodiment.

As an operation included in the first specific operation necessary for the specific operation in job XX, the control unit 205 causes the printer unit 203 to print five sets of job XX. The control unit 205 controls the system 1000 so that the glue binding apparatus (second inline finisher) in FIG. 8B executes a case binding process corresponding to a post-process executable by the system 1000 every set for printed materials of the five printed sets in job XX. As an operation included in the second specific operation in job XX, the control unit 205 causes the printer unit 203 to print 10 sets by reading out, from the HDD 209, print data of job XX corresponding to data of the same contents as the data printed by the print process in the first specific operation. The control unit 205 controls the system 1000 to inhibit the glue binding apparatus (second inline finisher) in FIG. 8B from executing, for printed materials of the 10 printed sets in job XX, the case binding process corresponding to a post-process of the same type as the post-process necessary for printed materials in the first specific operation. The control unit 205 controls the system 1000 to discharge the printed materials of the 10 printed sets in job XX directly to a specific discharge destination (e.g., the stack tray shown in FIG. 13 serving as an example of the delivery destination Z of the saddle-stitching apparatus in FIG. 8B, or the stack tray shown in FIG. 11 corresponding to the delivery destination X of the large-volume stacker in FIG. 8B) of the inline finisher without causing the inline finisher to execute any post-process using post-process consumables such as staples and glue. When inhibiting the inline finisher from executing any post-process using post-process consumables such as staples and glue, the control unit 205 controls the system 1000 to execute at least a sorting process such as shift delivery to stack the printed materials of the 10 sets on the tray with a shift every set for job XX on the basis of a user instruction from the key 2101A or the like.

After that, the operator takes out the printed materials of job XX by the 10 sets printed by the second specific operation that are stacked at the delivery destination of the system 1000 without executing any post-process using post-process consumables by the inline finisher of the embodiment. The operator sets the printed materials of job XX in a non-inline type post-processing apparatus which can execute a punching process originally desired by job XX and is installed on the same work site as the POD environment 10000 in FIG. 1 where the print system 1000 is installed. The punching process is executed by the non-inline type post-processing apparatus every set for the printed materials of the 10 sets of job XX.

As a result, creation work is complete on work site for all printed materials of 15 sets in total as a final product originally desired by job XX, i.e., in this case, printed materials of five sets having undergone the case binding process by the inline type post-processing apparatus corresponding to a post-process executable by the system 1000, and printed materials of 10 sets having undergone the punching process by the non-inline type post-processing apparatus corresponding to a post-process unexecutable by the system 1000.

If a customer who is a client for printing of the job approves, the printed materials of the 10 sets of job XX may be delivered together with those of the five sets of job XX without executing any post-process by the non-inline type post-processing apparatus for the printed materials of the 10 sets. In this case, all the processes of job XX may be regarded to be complete on work site upon completion of, e.g., the print process of the five sets of job XX by the printer unit 203 in the second specific operation.

As is understood from the control example of job XX, the configuration disclosed in the embodiment can obtain effects which allow the system 1000 as much as possible to cope with even a case in which a job requiring the print process of a plurality of copies requires execution of a post-process not supported by the system 1000. For example, the system 1000 can meet as much as possible a request from the user "to execute a desired specific type of post-process for printed materials of part of a job requiring the print process of a plurality of copies but not to execute any post-process including the desired specific type of post-process for remaining print materials". Even if such a use case or user need arises, the configuration of the embodiment allows one print system 1000 to perform a process, and can apply and obtain various effects described in the embodiment as much as possible. That is, effects of further enhancing various effects described in the embodiment are providable via one system 1000 of the embodiment.

Similar to various control examples described above, when causing the system 1000 to execute the specific operation of a job requiring execution of both the first and second specific operations, the control unit 205 causes the printer unit 203 to execute a print process for printed materials (synonymous with print media) by the second specific number of copies in the second specific operation using data of the same contents as those of print data used by the printer unit 203 in the print process by the first specific number of copies in the first specific operation. When causing the system 1000 to execute the specific operation of the job requiring execution of both the first and second specific operations, the control unit 205 permits the inline type post-processing apparatus of the system 1000 to execute the first specific type of post-process executed on the basis of a user request for materials printed by the printer unit 203 in the first specific operation. However, when causing the system 1000 to execute the specific operation of the job requiring execution of both the first and second specific operations, the control unit 205 inhibits the inline type post-processing apparatus of the system 1000 from executing a post-process of the same type as the first specific type of post-process, which is executed on the basis of a user request for materials printed in the first specific operation, for materials printed by the printer unit 203 in the second specific operation. Execution of various processes in a specific operation can be permitted or inhibited in the system 1000 of the embodiment.

In this way, when the system 1000 performs a specific operation disclosed in the embodiment, similar to the above typical example, the control unit which is disclosed in the embodiment and typified by the control unit 205 inhibits the system 1000 from executing a process of the same type as the first process, which is executed on the basis of the first specific user request in the first specific operation necessary for the specific operation by the system 1000, in the second specific operation necessary for the specific operation by the system 1000. In addition, when the system 1000 performs the specific operation disclosed in the embodiment, the control unit disclosed in the embodiment controls the system 1000 to execute the second process corresponding to a process of a type different from the first process in the second specific operation on the basis of the second specific user request of a type different from the first specific user request. As constituent features of the print system 1000 disclosed in the embodiment, the following constituent features may also be adopted in addition to various constituent features described above in the embodiment in order to further enhance the effects described in the embodiment.

The embodiment has disclosed a configuration in which, when causing the system 1000 to execute a specific operation as described above for a job requiring the print process of a plurality of copies, the control unit 205 inhibits the system 1000 from executing, in the second specific operation by the system 1000, the same process as a specific process executed on the basis of a user request in the first specific operation necessary for the specific operation. According to the embodiment, when causing the system 1000 to execute the specific operation, the control unit 205 inhibits the system 1000 from executing, in the second specific operation necessary for the specific operation by the system 1000, a process of the same type as the first process corresponding to the specific process. The embodiment has disclosed the configuration in which, when causing the system 1000 to execute the specific operation, the control unit 205 causes the system 1000 to execute, in the second specific operation necessary for the specific operation by the system 1000, the second process corresponding to a process of a type different from the first process. The following configuration disclosed in the embodiment is a typical example of a configuration incorporated as one of a concept subordinate to this configuration.

Assume that a job whose print execution request by the print apparatus 100 is issued from the user via the UI unit (e.g., the operation unit 204 or the operation unit of the PC 103) disclosed in the embodiment is a job (to be referred to as job YY hereinafter) requiring the print process of five copies in total as an example of a job requiring the print process of a plurality of copies by the printer unit 203, similar to the above-described typical example in the embodiment. As a process which is desired by the user and is to be executed for job YY, the print apparatus 100 of the system 1000 executes a print process in the first specific type of print form for printed materials of, e.g., two sets out of printed materials of five sets in total. The print apparatus 100 of the system 1000 executes a print process in the second specific type of print form corresponding to a print form of a type different from the first specific type of print form for printed materials of three remaining sets. The user desires to cause the printer unit 203 to execute print processes in different types of print forms every designated number of copies. In this case, the control unit disclosed in the embodiment controls the system 1000 similarly to the following typical example.

For example, the control unit 205 accepts a total copy count of "5" of job YY in this example via the display field 610 in the display of FIG. 19 from the user. If the user inputs the total copy count of job YY via the operation unit 204, the control unit 205 causes the operation unit 204 to display a specific type of display key (not shown) which allows the user to input a request to execute print processes in different print forms by the print apparatus 100 every designated number of copies. The display key (to be referred to as key YY hereinafter: not shown) corresponds to a configuration example based on a constituent feature disclosed in the embodiment in association with the key 2007.

If the user inputs key YY via the operation unit 204, the control unit 205 causes the operation unit 204 to display a setup window (not shown) which allows the operator to input an instruction to execute print processes in different types of print forms by the print apparatus 100 every designated number of copies based on the user input. The setup window (to be referred to as window YY hereinafter) corresponds to a configuration example based on a constituent feature disclosed in the embodiment in association with the window 2100.

The control unit 205 accepts, via the display of window YY on the operation unit 204, the first user instruction to execute a print process in the first specific type of print form by the print apparatus 100 for printed materials of two sets of job YY requiring the print process of five copies in total. Together with the first user instruction, via the display of the window YY, the control unit 205 also accepts the second user instruction to execute a print process in the second specific type of print form by the print apparatus 100 for printed materials of three remaining sets of job YY requiring the print process of five copies in total.

If the user inputs the print execution request of job YY via the key 503 upon completion of setting a series of print process conditions necessary for job YY by the user, the control unit 205 causes the system 1000 to execute a series of operations including the following operations as the specific operation of job YY.

The control unit 205 stores print data of job YY in the HDD 209 from a print data input source such as the scanner unit 201. Then, the control unit 205 controls the system 1000 so as to cause the printer unit 203 to execute the print process in the first specific type of print form based on the first user instruction input from the user via window YY every set for printed materials of two sets necessary for the print process of two copies of job YY. The print process of two copies of job YY corresponds to an example of the first specific operation necessary for the specific operation disclosed in the embodiment for job YY requiring the print process of five copies in total. As an operation included in the second specific operation further necessary for the specific operation of job YY, the control unit 205 reads out, from the HDD 209, print data (original document data) of job YY corresponding to data of the same contents as those of data used in the print process in the first specific operation of job YY, and causes the printer unit 203 to print by three sets.

The control unit 205 controls the system 1000 to inhibit the printer unit 203 from executing a print process in a print form of the same type as the first specific type of print form for printed materials necessary for the first specific operation of job YY, as a print process executed every set for printed materials of three sets necessary for the second specific operation of job YY. In this case, the control unit 205 controls the system 1000 so as to cause the printer unit 203 to execute the print process in the second specific type of print form based on the second user instruction input from the user via window YY every set for printed materials of three sets necessary for the print process of three copies of job YY. The print process of three copies of job YY corresponds to an example of the second specific operation necessary for the specific operation disclosed in the embodiment for job YY requiring the print process of five copies in total.

Consequently, the system 1000 completes creation work for printed materials of five sets in total necessary for job YY as a final product desired by the user for job YY, i.e., printed materials of two sets of job YY having undergone the print process in the first specific type of print form by the printer unit 203 and printed materials of three sets of job YY having undergone the print process in the second specific type of print form by the printer unit 203.

The print system 1000 may be configured to incorporate, as the "print form" described in the control example of job YY, at least one of a print form concerning single-sided printing/double-sided printing, a print form concerning a page layout process, a print form concerning the print density, a print form concerning the copy ratio, a print form concerning the size of a print medium necessary for a print process, a print form concerning the type of print medium necessary for a print process, and a print form concerning the print color.

For example, the print form of job YY is the "print form concerning single-sided printing/double-sided printing". In this case, the print process in the first specific type of print form of job YY is a "print process in a form of printing print data of job YY by single-sided printing", and the print process in the second specific type of print form is a "print process in a form of printing print data of job YY by double-sided printing". This case is incorporated as an example of the control example of job YY.

For example, the print form of job YY is the "print form concerning a page layout process". In this case, the print process in the first specific type of print form of job YY is a "print process in a 2UP layout form of laying out print data of two pages of job YY on the same plane of one print medium", and the print process in the second specific type of print form is a "print process in a 4UP layout form of laying out print data of four pages of job YY on the same plane of one print medium". This case is incorporated as an example of the control example of job YY.

For example, the print form of job YY is the "print form concerning the print density". In this case, the print process in the first specific type of print form of job YY is a "print process in a form of printing print data of job YY at low print density", and the print process in the second specific type of print form is a "print process in a form of printing print data of job YY at high print density". This case is incorporated as an example of the control example of job YY.

For example, the print form of job YY is the "print form concerning the copy ratio". In this case, the print process in the first specific type of print form of job YY is a "print process in a form of printing print data of job YY at a copy ratio of 100%", and the print process in the second specific type of print form is a "print process in a form of printing print data of job YY at a copy ratio of 75%". This case is incorporated as an example of the control example of job YY.

For example, the print form of job YY is the "print form concerning the size of a print medium necessary for a print process". In this case, the print process in the first specific type of print form of job YY is a "print process in a form of printing print data of job YY on a print medium whose paper size is A4", and the print process in the second specific type of print form is a "print process in a form of printing print data of job YY on a print medium whose paper size is A3". This case is incorporated as an example of the control example of job YY.

For example, the print form of job YY is the "print form concerning the type of print medium necessary for a print process". In this case, the print process in the first specific type of print form of job YY is a "print process in a form of printing print data of job YY on a print medium whose paper type is plain paper", and the print process in the second specific type of print form is a "print process in a form of printing print data of job YY on a print medium whose paper type is glossy paper". This case is incorporated as an example of the control example of job YY.

For example, the print form of job YY is the "print form concerning the print color". In this case, the print process in the first specific type of print form of job YY is a "print process in a form of printing print data of job YY in monochrome", and the print process in the second specific type of print form is a "print process in a form of printing print data of job YY in full color". This case is incorporated as an example of the control example of job YY.

The above-described cases are typical examples. Various configurations in the embodiment described with reference to FIGS. 1 to 31C-2 incorporate configurations of concepts subordinate to the configuration concerning the control example of job XX and that concerning the control example of job YY.

These configurations can further enhance the effects described in the embodiment.

Especially, these configurations can further enhance the effects of the embodiment capable of flexibly coping using one print system 1000 at operability and productivity as high as possible with a user need "not to execute a process, which is the same as a specific process based on a user request necessary for printed materials to be created by a print process by the first specific number of copies, for at least printed materials to be created by a print process by the second specific number of copies though the two print processes use the same print data", which user need may arise in a printing environment such as the POD environment where an increase in productivity of not only one job but a plurality of jobs, quality, cost performance, and the like may be more important in the future and use cases and user needs are different from those in the office environment. Effects can be obtained which can further enhance the effects described in the embodiment and achievable by the constituent features of the print system 1000 disclosed in the embodiment.

In the embodiment, the print apparatus 100 incorporates the control unit 205 which executes various control examples described in the embodiment with reference to FIGS. 1 to 31C-2. This is also a characteristic configuration example. Alternatively, a control unit incorporated in an apparatus (e.g., the inline finisher or PC 103) other than the print apparatus 100 may execute all or some of control examples disclosed in the embodiment which are executed by the control unit 205, and the print system 1000 disclosed in the embodiment may deal with these control examples.

[Other Mechanisms]

A host computer (e.g., the PC 103 or 104) may use an externally installed program to achieve the functions shown in the drawings in the embodiment. In this case, data for displaying the same operation windows as those described in the embodiment including operation windows are externally installed to provide various user interface windows on the display unit of the host computer. This process is described with reference to the configuration based on the UI windows of FIGS. 17A and 17B. In this configuration, the present invention is also applicable to a case in which an output apparatus receives a set of information including a program from a storage medium such as a CD-ROM, flash memory, or FD, or from an external storage medium via a network.

There may also be provided a storage medium which records software program codes for implementing the functions of the above-described embodiment to a system or apparatus, and reading out and executing the program codes stored in the storage medium by the computer (CPU or MPU) of the system or apparatus.

In this case, the program codes read out from the storage medium implement new functions, and the storage medium which stores the program codes embodies the present invention.

The program form is arbitrary such as an object code, a program executed by an interpreter, or script data supplied to an OS as long as a program function is attained.

The storage medium for supplying the program includes a flexible disk, hard disk, optical disk, magnetooptical disk, MO (magneto-optic disc), CD-ROM, CD-R, CD-RW, magnetic tape, nonvolatile memory card, ROM, and DVD.

In this case, the program code read out from the storage medium implements the functions of the above-described embodiment, and the storage medium which stores the program codes embodies the present invention.

As another program supply method, the program can be supplied by connecting a client computer to an Internet homepage via the browser of the client computer, and downloading the computer program or a compressed file containing an automatic installing function from the homepage to a recording medium such as a hard disk. The program can also be implemented by grouping program codes which form the program into a plurality of files, and downloading the files from different homepages.

That is, the present invention may also be embodied in a WWW server, FTP server, and the like which prompt a plurality of users to download the program files for implementing functional processes by a computer.

The program can be encrypted, stored in a storage medium such as a CD-ROM, and distributed to a user. A user who satisfies predetermined conditions is prompted to download decryption key information from a homepage via the Internet. The user executes the encrypted program using the key information, and installs the program in the computer.

The functions of the above-described embodiment are implemented when the computer executes the readout program codes. Also, the functions of the above-described embodiment are implemented when an OS (Operating System) or the like running on the computer performs some or all of actual processes on the basis of the instructions of the program codes.

The functions of the above-described embodiment are also implemented when the program codes read out from the storage medium are written in the memory of a function expansion board inserted into the computer or the memory of a function expansion unit connected to the computer, and the CPU of the function expansion board or function expansion unit performs some or all of actual processes on the basis of the instructions of the program codes.

The present invention embodied in a system including a plurality of devices or an apparatus formed by a single device. The effects described above can also be achieved by supplying a program to the system or apparatus. In this case, the system or apparatus can obtain the effects by providing, to the system or apparatus, a storage medium which stores a program represented by software.

The present invention is not limited to the above embodiment, and various modifications (including organic combinations of embodiments) can be made without departing from the scope of the invention, and are not excluded from the scope of the invention. For example, the control unit 205 in the print apparatus 100 mainly performs various control operations, but the external controller of a housing different from the print apparatus 100 may execute one or all of various control operations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-053801 filed Feb. 28, 2006 and No. 2006-346657 filed Dec. 22, 2006, which are hereby incorporated by reference herein in their entirety.

What is claimed is:

1. A job processing method for a print system adapted to be able to perform a processing concerning a job to be processed by a print apparatus which is capable of performing a print-processing based on the job and a post-processing apparatus which is capable of performing a post-processing for print media which has undergone the print-processing and has been conveyed from the print apparatus, the method comprising the steps of:

enabling, before performing both a first operation and a second operation, by using a user interface an input of an instruction for performing both the first operation and the second operation, the first operation being an operation that needs to perform a first print-processing for a first number of copies based on the job by using the printer apparatus and needs to perform a first post-processing by using the post-processing apparatus for print media of the first number of copies which have undergone the first print-processing and have been conveyed from the print apparatus, the second operation being an operation that needs to perform a second print-processing for a second number of copies based on the job by using the print apparatus and does not needs to perform the first post-processing, and performing, after receiving the instruction via the user interface, both the first operation and the second operation by using the print apparatus and the post-processing apparatus.

2. A method according to claim 1, wherein the second operation is an operation that needs to perform a second post-processing by using the post-processing apparatus for print media of the second number of copies which have undergone the second print-processing and have been conveyed from the print apparatus.

3. A method according to claim 1, wherein the first post-processing is at least one of: a stapling process, a punching process, a case binding process, a pad binding process, a saddle stitching process, a stacking process, and a cutting process.

4. A method according to claim 1, wherein the input of the instruction is permitted in a case that plural kinds of post-processing can be used by the system.

5. A method according to claim 4, further comprising a step of enabling the second print-processing in parallel with the first post-processing in a case that the input of the instruction is performed.

6. A method according to claim 2, wherein the input of the instruction is permitted in a case that print media can be supplied to a plurality of post-processing apparatuses from the print apparatus.

7. A method according to claim 6, further comprising a step of enabling the second post-processing in parallel with the first post-processing in a case that the input of instruction is performed.

8. A method according to claim 2, wherein the first print-processing is performed by the print apparatus based on a first print form, and wherein the second print-processing is performed by the print apparatus based on a second print form different from the first print form.

9. A method according to claim 8, wherein the first print form is at least one of concerns:

single-sided printing/double-sided printing, a print form concerning a page layout process, a print form concerning a print density, a print form concerning a copy ratio, a print form concerning a size of a print medium necessary for a print process, a print form concerning a type of print medium necessary for a print process, and a print form concerning a print color.

10. A method according to claim 1, further comprising a step of disabling the input of the instruction for a job in a case that the job to be processed is a job that does not need to perform printing for a plurality of number of copies.

11. A method according to claim 1, further comprising a step of selecting one of a first mode and a second mode for a job in a case that the job to be processed is a job that needs to perform printing for a plurality of number of copies, the first mode being a mode for performing both the first operation and the second operation, the second mode being a mode for not performing both the first operation and the second operation.

12. A method according to claim 1, further comprising a step of recovering the second operation without recovering the first operation in a case that a print interruption factor of the second print-processing is occurred.

13. A method according to claim 1, further comprising a step of causing the user interface to display a screen adapted to be able to distinguish the status of the second operation from the status of the first operation.

14. A method according to claim 1, further comprising a step of allowing cancellation of the first operation without canceling of the second operation on the basis of a user request from the user interface.

15. A method according to claim 14, wherein print data of the job are not erased till the second operation is completed even if the first operation is canceled.

16. A method according to claim 1, further comprising a step of permitting an input of a user request for changing a start order of the first operation and the second operation during execution of another operation by using the print apparatus.

17. A method according to claim 1, wherein the instruction is input by using the user interface of the print apparatus.

18. A method according to claim 1, wherein the instruction is input by using the user interface of an external device, the external device being able to communicate with the print apparatus.

19. A computer-readable storage medium storing a program for causing a computer to execute a job processing method for a print system adapted to be able to perform a processing concerning a job to be processed by a print apparatus which is capable of performing a print-processing based on the lob and a post-processing apparatus which is capable of performing a post-processing for print media which has undergone the print-processing and has been conveyed from the print apparatus, the method comprising the steps of:

enabling, before performing both a first operation and a second operation, by using a user interface an input of an instruction for performing both the first operation and the second operation, the first operation being an operation that needs to perform a first print-processing for a first number of copies based on the lob by using the printer apparatus and needs to perform a first post-processing by using the post-processing apparatus for print media of the first number of copies which have undergone the first print-processing and have been conveyed from the print apparatus, the second operation being an operation that needs to perform a second print-processing for a second number of copies based on the job by using the print apparatus and does not needs to perform the first post-processing, and performing, after receiving the instruction via the user interface, both the first operation and the second operation by using the print apparatus and the post-processing apparatus.

20. A print system adapted to be able to perform a processing concerning a lob to be processed by a print apparatus which is capable of performing a print-processing based on the lob and a post-processing apparatus which is capable of performing a post-processing for print media which has undergone the print-processing and has been conveyed from the print apparatus, the print system comprising:

an input unit configured to input, before performing both a first operation and a second operation, an instruction for performing both the first operation and the second operation, the first operation being an operation that needs to perform a first print-processing for a first number of copies based on the job by using the print apparatus and needs to perform a first post-processing by using the post-processing apparatus for print media of the first number of copies which have undergone the first print-processing and have been conveyed from the print apparatus, the second operation being an operation that needs to perform a second print-processing for a second number of copies based on the job by using the print apparatus and does not needs to perform the first post-processing, and a control unit configured to control, after receiving the instruction, the print apparatus and the post-processing apparatus to perform both the first operation and the second operation by using the print apparatus and the post-processing apparatus.

* * * * *